(12) United States Patent
Greer et al.

(10) Patent No.: US 10,833,318 B2
(45) Date of Patent: Nov. 10, 2020

(54) THREE-DIMENSIONAL ARCHITECTED PYROLYZED ELECTRODES FOR USE IN SECONDARY BATTERIES AND METHODS OF MAKING THREE-DIMENSIONAL ARCHITECTED ELECTRODES

(71) Applicant: CALIFORNIA INSTITUTE OF TECHNOLOGY, Pasadena, CA (US)

(72) Inventors: Julia R. Greer, San Marino, CA (US);
Andrey Vyatskikh, Irvine, CA (US);
John S. Thorne, Sunnyvale, CA (US);
Akira Kudo, San Gabriel, CA (US);
Kai Narita, Pasadena, CA (US);
Michael A. Citrin, South Pasadena, CA (US); Xuan Zhang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 11 days.

(21) Appl. No.: 16/151,186

(22) Filed: Oct. 3, 2018

(65) Prior Publication Data
US 2019/0103600 A1  Apr. 4, 2019

Related U.S. Application Data

(60) Provisional application No. 62/567,352, filed on Oct. 3, 2017.

(51) Int. Cl.
| | |
|---|---|
| *H01M 4/133* | (2010.01) |
| *H01M 4/587* | (2010.01) |
| *H01M 4/62* | (2006.01) |
| *H01G 11/26* | (2013.01) |
| *H01G 11/32* | (2013.01) |

(Continued)

(52) U.S. Cl.
CPC ............ *H01M 4/133* (2013.01); *H01G 11/26* (2013.01); *H01G 11/32* (2013.01); *H01G 11/38* (2013.01); *H01G 11/84* (2013.01); *H01G 11/86* (2013.01); *H01M 4/1393* (2013.01);

(Continued)

(58) Field of Classification Search
None
See application file for complete search history.

(56) References Cited

U.S. PATENT DOCUMENTS

| | | |
|---|---|---|
| 7,653,279 B1 | 1/2010 | Jacobsen et al. |
| 7,687,132 B1 | 3/2010 | Gross et al. |

(Continued)

OTHER PUBLICATIONS

U.S. Appl. No. 14/254,824, filed Apr. 16, 2014.
(Continued)

*Primary Examiner* — Scott J. Chmielecki
(74) *Attorney, Agent, or Firm* — Leydig, Voit & Mayer, Ltd.

(57) ABSTRACT

In an aspect, an electrode for an electrochemical cell comprises: a structure having a nano- or micro-architected three-dimensional geometry; said structure comprising one or more active carbon allotrope materials; wherein said structure is characterized by an average density less than or equal to 2.3 g cm$^{-3}$ and an average specific strength (strength-to-density ratio) greater than or equal to 0.004 GPa g$^{-1}$ cm$^3$. Also disclosed herein are methods for making an electrode for an electrochemical cell, and methods for making an electrochemical cell.

25 Claims, 62 Drawing Sheets

(51) Int. Cl.
  *H01G 11/84* (2013.01)
  *H01M 4/1393* (2010.01)
  *H01G 11/86* (2013.01)
  *H01G 11/38* (2013.01)
  *H01G 11/34* (2013.01)
  *H01G 11/46* (2013.01)

(52) U.S. Cl.
  CPC ........... *H01M 4/587* (2013.01); *H01M 4/625* (2013.01); *H01G 11/34* (2013.01); *H01G 11/46* (2013.01)

(56) References Cited

U.S. PATENT DOCUMENTS

| | | | |
|---|---|---|---|
| 9,362,553 | B2 | 6/2016 | Lahiri et al. |
| 9,379,418 | B2 | 6/2016 | Wang et al. |
| 9,590,228 | B1 | 3/2017 | Wang et al. |
| 9,660,292 | B2 | 5/2017 | Rust, III et al. |
| 9,758,382 | B1 | 9/2017 | Roper et al. |
| 9,878,303 | B1* | 1/2018 | Zhamu ............... B01J 20/28061 |
| 2008/0118832 | A1* | 5/2008 | Artman ............... H01M 4/808 429/209 |
| 2009/0108251 | A1* | 4/2009 | Kabir ............... H01J 9/025 257/14 |
| 2009/0136809 | A1* | 5/2009 | Wang ............... C04B 38/0022 429/532 |
| 2009/0324485 | A1* | 12/2009 | Miller ............... C04B 35/532 423/448 |
| 2010/0068623 | A1 | 3/2010 | Braun et al. |
| 2010/0147504 | A1* | 6/2010 | King ............... E21B 43/119 166/55 |
| 2011/0020631 | A1* | 1/2011 | Miller ............... C04B 35/524 428/315.5 |
| 2011/0045346 | A1 | 2/2011 | Chiang et al. |
| 2011/0111283 | A1 | 5/2011 | Rust, III et al. |
| 2011/0171518 | A1 | 7/2011 | Dunn et al. |
| 2012/0021218 | A1* | 1/2012 | Lee ............... C23C 18/36 428/395 |
| 2012/0077095 | A1 | 3/2012 | Roumi et al. |
| 2014/0029161 | A1* | 1/2014 | Beidaghi ............... H01G 11/24 361/502 |
| 2014/0141224 | A1* | 5/2014 | Pasquali ............... C04B 41/4869 428/219 |
| 2014/0315093 | A1 | 10/2014 | Greer et al. |
| 2015/0207138 | A1 | 7/2015 | Barker et al. |
| 2016/0073920 | A1* | 3/2016 | Kassegne ........... A61B 5/04001 600/395 |
| 2016/0126558 | A1 | 5/2016 | Lewis et al. |
| 2017/0145561 | A1* | 5/2017 | Farquhar ............... B32B 5/18 |
| 2017/0145562 | A1* | 5/2017 | Farquhar ............... B01D 1/00 |
| 2017/0194105 | A1* | 7/2017 | Zhamu ............... H01G 11/32 |
| 2018/0088462 | A1 | 3/2018 | Vyatskikh et al. |

OTHER PUBLICATIONS

U.S. Appl. No. 16/206,163, filed Nov. 30, 2018.
U.S. Appl. No. 15/719,338, filed Sep. 28, 2017.
Abueidda, D. et al. (Apr. 2016) "Effective conductivities and elastic moduli of novel foams with triply periodic minimal surfaces," *Mechanics of Materials* 95: 102-115.
Amato, L. et al. (2015) "Dense high-aspect ratio 3D carbon pillars on interdigitated microelectrode arrays," *Carbon* 94: 792-803.
An, S.J. et al. (Aug. 2016) "The state of understanding of the lithium-ion-battery graphite solid electrolyte interphase (SEI) and its relationship to formation cycling," *Carbon* 105: 52-76.
Arthur, T.S. et al. (2011) "Three-dimensional electrodes and battery architectures," *MRS Bulletin* 36(7): 523-531.
Bae, C.J. et al. (publicly available 2012) "Design of Battery Electrodes with Dual-Scale Porosity to Minimize Tortuosity and Maximize Performance," *Adv. Mater,*25(9): 1254-1258. (published 2013).
Barg, S. et al. (2014) "Mesoscale assembly of chemically modified graphene into complex cellular networks," *Nat. Commun.* 5: 4328.
Bates, J.B. et al. (2000) "Thin-film lithium and lithium-ion batteries," *Solid State Ionics* 135(1-4): 33-45.
Bauer, J. et al. (publicly available Feb. 2016) "Approaching theoretical strength in glassy carbon nanolattices," *Nat. Mater.* 15: 438-444. (published Apr. 2016).
Bauer, J. et al. (2014) "High-strength cellular ceramic composites with 3D microarchitecture," *Proc. Natl. Acad. Sci. U.S.A.* 111(7): 2453-2458.
Bazant, Z.P. & Xiang, Y. (1997) "Size effect in compression fracture: Splitting crack band propagation," *J. Eng. Mech.* 123(2): 162-172.
Billaud, J. et al. (Jul. 2016) "Magnetically aligned graphite electrodes for high-rate performance Li-ion batteries," *Nat. Energy* 1: 1-6.
Bruley, J. et al. (1995) "Quantitative near-edge structure analysis of diamond-like carbon in the electron microscope using a two-window method," *J. Microsc.* 180(1): 22-32.
Buiel, E. & Dahn, J.R. (1999) "Li-insertion in hard carbon anode materials for Li-ion batteries," *Electrochim. Acta* 45(1-2): 121-130.
Buqa, H. et al. (2005) "High Rate Capability of Graphite Negative Electrodes for Lithium-Ion Batteries," *J. Electrochem. Soc.* 152(2): A474-A481.
Burckel, D.B. et al. (2009) "Lithographically Defined Porous Carbon Electrodes," *Small* 5(24): 2792-2796.
Burckel, D.B. et al. (2010) "Pyrolysis of two-dimensional and three-dimensional interferometrically patterned resist structures," *J. of Vacuum Sci. & Technology B* 28: C6P14.
Cancado et al. (2006) "General equation for the determination of the crystallite size $L_a$ of nanographite by Raman spectroscopy," *Appl. Phys. Lett.* 88: 163106-1-163106-3.
Cannarella, J. et al. (Jan. 2014) "Stress evolution and capacity fade in constrained lithium-ion pouch cells," *J. Power Sources* 245: 745-751.
Cao, A. et al. (2005) "Super-compressible foam-like carbon nanotube films," *Science* 310(5752): 1307-1310.
Challis, V.J. (2014) "High specific strength and stiffness structures produced using selective laser melting," *Mater. Design* 63: 783-788.
Chen, X. et al. (publicly available Jul. 2017) "Cellular carbon microstructures developed by using stereolithography," *Carbon* 123: 34-44 (published Oct. 2017).
Chen, Z. et al. (2011) "Three-dimensional flexible and conductive interconnected graphene networks grown by chemical vapour deposition," *Nat. Mater.* 10: 424-428.
Chung, D.W. et al. (2013) "Validity of the Bruggeman relation for porous electrodes," *Model. Simul. Mater. Sci. Eng.* 21(7): 1-16.
Cirigliano, N. et al. (2014) "3D Architectured Anodes for Lithium-Ion Microbatteries with Large Areal Capacity," *Energy Technology* 2(4): 362-369.
Cowlard F.C. & Lewis, J.C. (1967) "Vitreous carbon—a new form of carbon," *J. Mater. Sci.* 2(6): 507-512.
Dahbi, M. et al. (Apr. 2017) "Synthesis of hard carbon from argan shells for Na-ion batteries," *J. Mater. Chem. A* 5(20): 9917-9928.
Dahn, J.R. et al. (1995) "Mechanisms for Lithium insertion in Carbonaceous Materiels," *Science* 270(5236): 590-593.
Danner, T. et al. (Dec. 2016) "Thick electrodes for Li-ion batteries: A model based analysis," *J. Power Sources* 334: 191-201.
Deshpande, V.S. et al. (2001) "Effective properties of the octet-truss lattice material," *J. Mech. Phys. Solids* 49(8): 1747-1769.
Deubel, M. et al. (publicly released 2005) "3D—2D—3D photonic crystal heterostructures fabricated by direct laser writing," *Optics Lett.* 31(6): 805-807. (published 2006).
Dikin, D. et al. (2007) "Preparation and characterization of graphene oxide paper," *Nature* 448: 457-460.
Dunlay, W.A. et al. (1989) "A proposed uniaxial compression test for high strength ceramics," *DTIC Document.*
Dusoe, K.J. et al. (Oct. 2017) "Ultrahigh elastic strain energy storage in metal-oxide-infiltrated patterned hybrid polymer nanocomposites," *Nano Lett.* 17(12): 7416-7423.

(56) References Cited

OTHER PUBLICATIONS

Du, Z. et al. (publicly available Feb. 2017) "Understanding limiting factors in thick electrode performance as applied to high energy density Li-ion batteries," *J. Appl. Electrochem.* 47(3): 405-415. (published Mar. 2017).

Ebner, M. et al. (2014) "Tortuosity Anisotropy in Lithium-Ion Battery Electrodes," *Adv. Energy Mater.* 4(5): 1-6.

Eckel, Z.C. et al. (Jan. 2016) "Additive manufacturing of polymer-derived ceramics," *Science* 351(6268): 58-62.

Etiemble, A. et al. (2014) "3D morphological analysis of copper foams as current collectors for Li-Ion batteries by means of X-ray tomography," *Mater. Sci. Eng. B*, 187: 1-8.

Fairen-Jimenez, D. et al. (2007) "Adsorption of benzene, toluene, and xylenes on monolithic carbon aerogels from dry air flows," *Langmuir* 23(20): 10095-10101.

Ferrari, A.C. et al. (2000) "Interpretation of Raman spectra of disordered and amorphous carbon," *Phys. Rev. B*, 61(20): 14095-14107.

Freymann, G. et al. (2010) "Three-Dimensional Nanostructures for Photonics," *Adv. Fund. Mater.* 20(7): 1038-1052.

Fu, K. et al. (publicly available Feb. 2016) "Graphene Oxide-Based Electrode Inks for 3D-Printed Lithium-Ion Batteries," *Adv. Mater.* 28(13): 2587-2594. (published Apr. 2016).

Fu, S.Y. et al. (2000) "Tensile properties of short-glass-fiber-and short-carbon-fiber-reinforced polypropylene composites," *Composites Part A* 31(10): 1117-1125.

Gao, H. et al. (2003) "Materials become insensitive to flaws at nanoscale: lessons from nature," *Proc. Natl. Acad. Sci. U.S.A.* 100(10): 5597-5600.

Gallagher, K. et al. (publicly available Nov. 2015) "Optimizing Areal Capacities through Understanding the Limitations of Lithium-Ion Electrodes," *J. Electrochem. Soc.* 163(2): A138-A149. (published 2016).

Gogotsi, Y. (2015) "Not just graphene: The wonderful world of carbon and related nanomaterials," *MRS Bull.* 40(12): 1110-1120.

Goriparti, S. et al. (2014) "Review on recent progress of nanostructured anode materials for Li-ion batteries," *J. Power Sources* 257: 421-443.

Greer, J.R. et al. (2005) "Size dependence of mechanical properties of gold at the micron scale in the absence of strain gradients," *Acta Mater.* 53(6): 1821-1830.

Greer, J.R. et al. (2011) "Plasticity in small-sized metallic systems: Intrinsic versus extrinsic size effect," *Prog. Mater. Sci.* 56(6): 654-724.

Griffith, K.J. et al. (Jul. 2018) "Niobium tungsten oxides for high-rate lithium-ion energy storage," *Nature* 559: 556-563.

Gu, X.W. & Greer J.R. (2015) "Ultra-strong architected Cu meso-lattices," *Extreme Mech. Lett.* 2: 7-14.

Hamm, C.E. et al. (2003) "Architecture and material properties of diatom shells provide effective mechanical protection," *Nature* 421: 841-843.

Harris, P.J.F. (2005) "New perspectives on the structure of graphitic carbons," *Crit. Rev. Solid State* 30(4): 235-253.

Hofmann, G. et al. (2000) "An investigation of the relationship between position within coater and pyrolytic carbon characteristics using nanoindentation," *Carbon* 38(5): 645-653.

Hou, H. et al. (publicly available Mar. 2017) "Carbon Anode Materials for Advanced Sodium-Ion Batteries," *Adv. Energy Mater.* 7(24): 1-30 (published Dec. 2017).

Hu, M. et al. (Jun. 2017) "Compressed glassy carbon: An ultrastrong and elastic interpenetrating graphene network," *Sci. Adv.* 3: e1603213.

Hur, J.I. et al. (Jun. 2018) "High Areal Energy Density 3D Lithium-Ion Microbatteries," *Joule*, 2(6): 1187-1201.

Irisarri, E. et al. (2015) "Review—Hard carbon Negative Electrode Materials for Sodium-Ion Batteries," *J. Electrochem. Soc.* 162(14): A2476-A2482.

Iwashita, N. et al. (2001) "Elasto-plastic deformation of glass-like carbons heat-treated at different temperatures," *Carbon* 39(10): 1525-1532.

Jacobsen, A.J. et al. (2011) "Vitreous carbon micro-lattice structures," *Carbon* 49(3): 1025-1032.

Jang, D. et al. (2012) "Deformation mechanisms in nanotwinned metal nanopillars," *Nat. Nanotechnol.* 7: 594-601.

Jang, D. et al. (2013) "Fabrication and deformation of three-dimensional hollow ceramic nanostructures," *Nat. Mater.* 12: 893-898.

Jang, D. & Greer, J.R. (2010) "Transition from a strong-yet-brittle to a stronger-and-ductile state by size reduction of metallic glasses," *Nat. Mater.* 9: 215-219.

Jennings, A.T. & Greer J.R. (2011) "Tensile deformation of electroplated copper nanopillars," *Phil. Mag.* 91(7-9): 1108-1120.

Ji, H. et al. (2012) "Ultrathin Graphite Foam: A Three-Dimensional Conductive Network for Battery Electrodes," *Nano Lett.* 12(5): 2446-2451.

Jordan, J. et al. (2005) "Experimental trends in polymer nanocomposites—a review,"*Mater. Sci. Eng. A* 393(1-2): 1-11.

Kaae, J.L. (1971) "Structure and mechanical properties of isotropic pyrolytic carbons deposited below 1600° C.," *J. Nucl. Mater.* 38(1): 42-50.

Kaae, J.L. (1972) "The mechanical properties of glassy and isotropic pyrolytic carbons," *J. Biomed. Mater. Res.* 6(3): 279-282.

Kang, B. & Ceder, G. (2009) "Battery materials for ultrafast charging and discharging," *Nature* 458: 190-193.

Kawamura, K. & Jenkins, G.M. (1972) "Mechanical properties of glassy carbon fibres derived from phenolic resin," *J. Mater. Sci.* 7(10): 1099-1112.

Kim, C.S. & Ahn, S.H. (2014) "Mechanical behavior of microscale carbon pillar fabricated by focused ion beam induced deposition," *Int. J. Precis. Eng. Man.* 15(7): 1485-1488.

Kotlensky, W.V. & Martens, H.E. (1965) "Tensile Properties of Glassy Carbon to 2,900° C.," *Nature* 206: 1246-1247.

Lacey, S.D. et al. (publicly available Jan. 2018) "Extrusion-Based 3D Printing of Hierarchically Porous Advanced Battery Electrodes," *Adv. Mater.* 30(12): 1-9, (published Mar. 2018).

Lai, A. et al. (2013) "Shape memory and superelastic ceramics at small scales," *Science* 341(6153): 1505-1508.

Lai, J. et al. (Jan. 2018) "3D Porous Carbonaceous Electrodes for Electrocatalytics Applications," *Joule* 2: 1-18.

Lai, W. et al. (2010) "Ultrahigh-Energy-Density Microbatteries Enabled by New Electrode Architecture and Micropackaging Design," *Adv. Mater.* 22(20): E139-E144.

Lee, C. et al. (2008) "Measurement of the elastic properties and intrinsic strength of monolayer graphene," *Science* 321(5887): 385-388.

Lee, J.A. et al. (2008) "Fabrication and characterization of free-standing 3D carbon microstructures using multi-exposures and resist pyrolysis," *J. Micromech. Mficroeng.* 18(3): 035012.

Lee, J.S. et al. (2012) "Three-dimensional nano-foam of few-layer graphene grown by CVD for DSSC," *Phys. Chem. Chem. Phys.* 14(22): 7938-7943.

Lee, K.T. et al. (2005) "Synthesis and Rate Performance of Monolithic Macroporous Carbon Electrodes for Lithium-Ion Secondary Batteries," *Adv. Funct. Mater.* 15(4): 547-556.

Libonati, F. et al. (publicly available May 2016) "Bone-inspired materials by design: Toughness amplification observed using 3D printing and testing," *Adv. Eng. Mater.* 18(8): 1354-1363. (published Aug. 2016).

Li, J. et al. (Apr. 2017) "A hybrid three-dimensionally structured electrode for lithium-ion batteries via 3D printing," *Mater. & Des.* 119: 417-424. Abstract.

Li, J. et al. (2017; Month Unknown) "3D Printed Hybrid Electrodes for Lithium-Ion Batteries," *J. Electrochem. Soc.* 77(11): 1209-1218. Abstract.

Lim, C. et al. (Oct. 2016) "Analysis of geometric and electrochemical characteristics of lithium cobalt oxide electrode with different packing densities," *J. Power Sources* 328: 46-55.

Liontas, R. & Greer J.R. (Jul. 2017) "3D nano-architected metallic glass: Size effect suppresses catastrophic failure," *Acta. Mater.* 133: 393-407. Accepted Manuscript, 47 pages.

Liu, C. et al. (2014) "An all-in-one nanopore battery array," *Nature Nanotechnology* 9: 1031-1039.

(56) References Cited

OTHER PUBLICATIONS

Liu, C. et al. (Aug. 2017) "Fabrication and Characterization of 3D-Printed Highly-Porous 3D LiFePO$_4$ Electrodes by Low Temperature Direct Writing Process," *Materials* 10(8):934, 1-13.

Li, X. & Gao, H. (publicly available Mar. 2016) "Smaller and stronger," *Nat. Mater.* 15: 373-374 (published Apr. 2016).

Lopez-Honorato, E. et al. (2008) "Structure and mechanical properties of pyrolytic carbon produced by fluidized bed chemical vapor deposition," *Nucl. Eng. Des.* 238(11): 3121-3128.

Lowry, M.B. et al. (2010) "Achieving the ideal strength in annealed molybdenum nanopillars," *Acta Mater.* 58(15): 5160-5167.

Lu, L. et al. (2004) "Ultrahigh strength and high electrical conductivity in copper," *Science* 304(5669): 422-426.

Lu et al. (publicly available Mar. 2018) "Wood-Inspired High-Performance Ultrathick Bulk Battery Electrodes," *Advanced Materials* 30: 1-9 (published May 2018).

Maggi A. et al. (Nov. 2017) "Three-dimensional nano-architected scaffolds with tunable stiffness for efficient bone tissue growth," *Acta Biomater.* 63: 294-305. Author Manuscript, 25 pp.

Manoharan, M.P. et al. (2010) "Elastic properties of 4-6 nm-thick glassy carbon thin films," *Nanoscale Res. Lett.* 5: 14-19.

Marks, T. et al. (2011) "A Guide to Li-Ion Coin-Cell Electrode Making for Academic Researchers," *J. Electrochem. Soc.* 158(1): A51-A57.

Messner, M.C. (publicly available Jul. 2016) "Optimal lattice-structured materials," *J. Mech. Phys. Solids* 96: 162-183 (published Nov. 2016).

Meza, L.R. et al. (publicly available Aug. 2017) "Reexamining the mechanical property space of three-dimensional lattice architectures," *Acta. Mater.* 140: 424-432 (published Nov. 2017).

Meza, L.R. et al. (2015) "Resilient 3D hierarchical architected metamaterials," *Proc. Natl. Acad. Sci. U.S.A.* 112(37): 11502-11507.

Meza, L.R. et al. (2014) "Strong, lightweight, and recoverable three-dimensional ceramic nanolattices," *Science* 345(6202): 1322-1326.

Miranda, D. et al. (publicly available Jan. 2016) "Computer simulations of the influence of geometry in the performance of conventional and unconventional lithium-ion batteries," *Applied Energy* 165: 318-328 (published Mar. 2016).

Moshtev, R. & Johnson, B. (2000) "State of the art of commercial Li ion batteries," *J. Power Sources* 91(2): 86-91.

Muth, J.T. et al. (Feb. 2017) "Architected cellular ceramics with tailored stiffness via direct foam writing," *Proc. Natl. Acad. Sci. USA* 114(8): 1832-1837.

Nitta, N. et al. (2015) "Li-ion battery materials: present and future," *Mater. Today* 18(5): 252-264.

Ogihara, N. et al. (2006) "Disordered carbon negative electrode for electrochemical capacitors and high-rate batteries," *Electrochim. Acta* 52(4): 1713-1720.

Oku, T. et al. (2008) "Effects of ion irradiation on the hardness properties of graphites and C/C composites by indentation tests," *J. Nucl. Mater.* 381(1-2): 92-97.

Panasonic (Dec. 2009) "Headquarters News: Panasonic Develops High-Capacity Lithium-Ion Battery Cells That Can Power Laptops and Electric Vehicles," http://news.panasonic.com/global/press/data/en091225-3/en091225-3.html. Accessed Sep. 28, 2017.

Pawlyta, M. et al. (2015) "Raman microspectroscopy characterization of carbon blacks: Spectral analysis and structural information," *Carbon* 84: 479-490.

Plimpton, S. (1995) "Fast parallel algorithms for short-range molecular dynamics," *J. Comp. Phys.* 117(1): 1-19.

Portela, C.M. et al. (publicly available Jun. 2018) "Impact of node geometry on the effective stiffness of non-slender three-dimensional truss lattice architectures," *Extreme Mech. Lett.* 22: 138-148 (published Jul. 2018).

Qin, X. et al. (2011) "Hierarchically porous and conductive LiFePO$_4$ bulk electrode: binder-free and ultrahigh volumetric capacity Li-ion cathode," *J. Mater. Chem.* 21(33): 12444-12448.

Qin, Z. et al. (Jan. 2017) "The mechanics and design of a lightweight three-dimensional graphene assembly," *Sci. Adv.* 3: e1601536.

Qu, L. et al. (2008) "Carbon nanotube arrays with strong shear binding-on and easy normal lifting-off," *Science* 322(5899): 238-242.

Qu, R. & Zhang, Z. (2013) "A universal fracture criterion for high-strength materials," *Sci. Rep.* 3: 1117.

Rasool, H.I. et al. (2013) "Measurement of the intrinsic strength of crystalline and polycrystalline graphene," *Nat. Commun.* 4: 2811.

Robertson, J. (1986) "Amorphous carbon," *Adv. Phys.* 35(4): 317-374. (Table 1: [1] Dischler and Brandt (1985), [5] Hauser (1975), [6] Fink et al. (1983)).

Roylance, D. (2001) "Stress-Stress Curves," MIT Course, http://web.mit.edu/course/3/3.11/www/modules/ss.pdf. Accessed Oct. 2018.

Sadezky, A. et al. (2005) "Raman microspectroscopy of soot and related carbonaceous materials: Spectral analysis and structural information," *Carbon* 43(8): 1731-1742.

Saleh, M.S. et al. (publicly available Jul. 2018) "3D printed hierarchically-porous microlattice electrode materials for exceptionally high specific capacity and areal capacity lithium ion batteries," *Addit. Manuf.* 23: 70-78 (published Oct. 2018).

Sander, J.S. et al. (Jul. 2016) "High-performance battery electrodes via magnetic templating," *Nat. Energy* 1: 1-7.

Sanders, P.G. et al. (1997) "Elastic and tensile behavior of nanocrystalline copper and palladium," *Acta Mater* 45(10): 4019-4025.

Schaedler, T.A. et al. (2011) "Ultralight metallic microlattices," *Science* 334(6058): 962-965.

Singh, M. et al. (2015) "Thick Electrodes for High Energy Lithium Ion Batteries," *J. Electrochem. Soc.* 162(7): A1196-A1201.

Smekens, J. et al. (Feb. 2016) "Influence of Electrode Density on the Performance of Li-Ion Batteries: Experimental and Simulation Results," *Energies* 9(2): 1-12.

Song, Z. et al. (publicly available Dec. 2014) "Defect-detriment to graphene strength is concealed by local probe: the topological and geometrical effects," *ACS Nano* 9(1): 401-408. (published 2015).

Stein, I.Y. et al. (publicly available Mar. 2017) "Structure-mechanical property relations of non-graphitizing pyrolytic carbon synthesized at low temperatures," *Carbon* 117: 411-420 (published Jun. 2017).

Stevens, D.A. & Dahn, J.R. (2000) "High Capacity Anode Materials for Rechargeable Sodium-Ion Batteries," *J. Electrochem. Soc.* 147(4): 1271-1273.

Stuart, S.J. et al. (2000) "A reactive potential for hydrocarbons with intermolecular interactions," *J. Chem. Phys.* 112(14): 6472-6486.

Sun, K. et al. (2013) "3D Printing of Interdigitated Li-Ion Microbattery Architectures," *Adv. Mater.* 25(33): 4539-4543.

Swain, M.V. & Field, J.S. (1996) "Investigation of the mechanical properties of two glassy carbon materials using pointed indenters,"*Philos. Mag. A* 74(5): 1085-1096.

Thakur, M. et al. (2012) "Freestanding Macroporous Silicon and Pyrolyzed Polyacrylonitrile as a Composite Anode for Lithium Ion Batteries," *Chem. Mater.* 24(15): 2998-3003.

Thiel, M. et al. (2009) "Three-Dimensional Bi-chiral Photonic Crystals," *Adv. Mater.* 21(46): 4680-4682.

Torrents, A. et al. (2012) "Characterization of nickel-based microlattice materials with structural hierarchy from the nanometer to the millimeter scale," *Acta. Mater.* 60(8): 3511-3523.

Valdevit, L. et al. (2013) "Compressive strength of hollow microlattices: Experimental characterization, modeling, and optimal design," *J. Mater. Res.* 28(17): 2461-2473.

Vetter, J. et al. (2005) "Ageing mechanisms in lithium-ion batteries," *J. Power Sources* 147(1-2): 269-281.

Vyatskikh, A. et al. (Feb. 2018) "Additive manufacturing of 3D nano-architected metals," *Nat. Commun.* 9: 593.

Vyatskikh, A. et al. (publicly available Mar. 2018) "Additive manufacturing of polymer-derived titania for one-step solar water purification," *Mater. Today Commun.* 15: 288-293 (published Jun. 2018).

Wang, C. et al. (2004) "C-MEMS for the Manufacture of 3D Microbatteries," *Electrochem. Solid-State Lett.* 7(11): A435-A438.

Wang, H. et al. (Jan. 2017) "Synthesis of single-crystal-like nanoporous carbon membranes and their application in overall water splitting," *Nat. Commun.* 8: 1-9.

(56) References Cited

OTHER PUBLICATIONS

Wang, H. et al. (Jun. 2017) "Ultralight, scalable, and high-temperature-resilient ceramic nanofiber sponges," *Sci. Adv.* 3(6): 1-9.
Wang, J. et al. (2012) "Pitch modified hard carbons as negative materials for lithium-ion batteries," *Electrochim. Acta* 74: 1-7.
Wang, J.S. et al. (2011) "Formulation and characterization of ultra-thick electrodes for high energy lithium-ion batteries employing tailored metal foams," *J. Power Sources* 196(20): 8714-8718.
Wegst, U.G.K. et al. (publicly available Oct. 2014) "Bioinspired structural materials," *Nat. Mater.* 14: 23-36. (published Jan. 2015).
Weiner, S. & Wagner, H.D. (1998) "The material bone: structure-mechanical function relations," *Annu. Rev. Mater. Sci.* 28: 271-298.
Wenzel, S. et al. (2011) "Room-temperature sodium-ion batteries: Improving the rate capability of carbon anode materials by templating strategies," *Energy Environ. Sci.* 4(9): 3342-3345.
Wei, T.S. et al. (publicly available Mar. 2018) "3D Printing of Customized Li-Ion Batteries with Thick Electrodes," *Adv. Mater.* 30(16): 1-7 (published Apr. 2018).
Wei, Y. et al. (2012) "The nature of strength enhancement and weakening by pentagon-heptagon defects in graphene," *Nat. Mater.* 11: 759-763.
Whittingham, M.S. (2012) "History, Evolution, and Future Status of Energy Storage," *Proc. IEEE* 100: 1518-1534.
Wood, V. (Sep. 2018) "X-ray tomography for battery research and development," *Nat. Rev. Mater.* 3: 293-295.
Wu, B. et al. (2005) "Mechanical properties of ultrahigh-strength gold nanowires," *Nat. Mater.* 4: 525-529.
Xiao, X. et al. (2012) "Lithographically Defined Three-Dimensional Graphene Structures," *Am. Chem. Soc.* 6(4): 3573-3579.
Xing, W. et al. (1996) "Optimizing Pyrolysis of Sugar Carbons for Use as Anode Materials in Lithium-Ion Batteries," *J. Electrochem. Soc.* 143(10): 3046-3052.
Yajima, S. et al. (1972) "Micro-hardness of pyrolytic graphite and siliconated pyrolytic graphite," *Tanso* 69: 41-47.
Yang, G.F. et al. (Jan. 2015) "Ultra-thick Li-ion battery electrodes using different cell size of metal foam current collectors," *RSC Adv.* 5: 16702-16706.
Yang, J. et al. (2012) "Study of nano-porous hard carbons as anode materials for lithium ion batteries," *Mater. Chem. Phys.* 135(2-3): 445-450.
Zhang, H. et al. (publicly available May 2015) "Fluidized bed chemical vapor deposition of pyrolytic carbon-III. Relationship between microstructure and mechanical properties," *Carbon* 91: 346-357 (published Sep. 2015).
Zhang, P. et al. (2014) "Fracture toughness of graphene," *Nat. Commun.* 5: 3782.
Zhang, X. et al. (Jun. 2018) "Three-dimensional high-entropy alloy-polymer composite nanolattices that overcome the strength-recoverability trade-off," *Nano. Lett.* 18(7): 4247-4256.
Zhang, Y. et al. (2014) "Microstructures and properties of high-entropy alloys," *Prog. Mater. Sci.* 61: 1-93.
Zhao, J.X. et al. (1985) "The fracture toughness of glassy carbons at elevated temperatures," *Carbon* 23(1): 15-18.
Zheng, T. et al. (1995) "High-Capacity Carbons Prepared from Phenolic Resin for Anodes of Lithium-Ion Batteries," *J. Electrochem. Soc.* 142(11): L211-L214.
Zheng, X. et al. (Jul. 2016) "Multiscale metallic metamaterials," *Nat. Mater.* 15: 1100-1106.
Zheng, X. et al. (2014) "Ultralight, ultrastiff mechanical metamaterials," *Science* 344(6190): 1373-1377.
Zhou, Y.N. et al. (2013) "Nanostructured thin film electrodes for lithium storage and all-solid-state thin-film lithium batteries," *J. Power Sources* 234: 310-332.
Zhu, C. et al. (2015) "Highly compressible 3D periodic graphene aerogel microlattices," *Nat. Commun.* 6: 6962.

\* cited by examiner

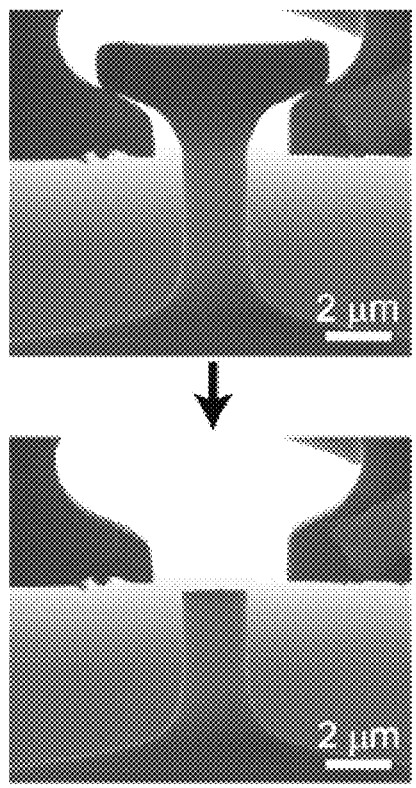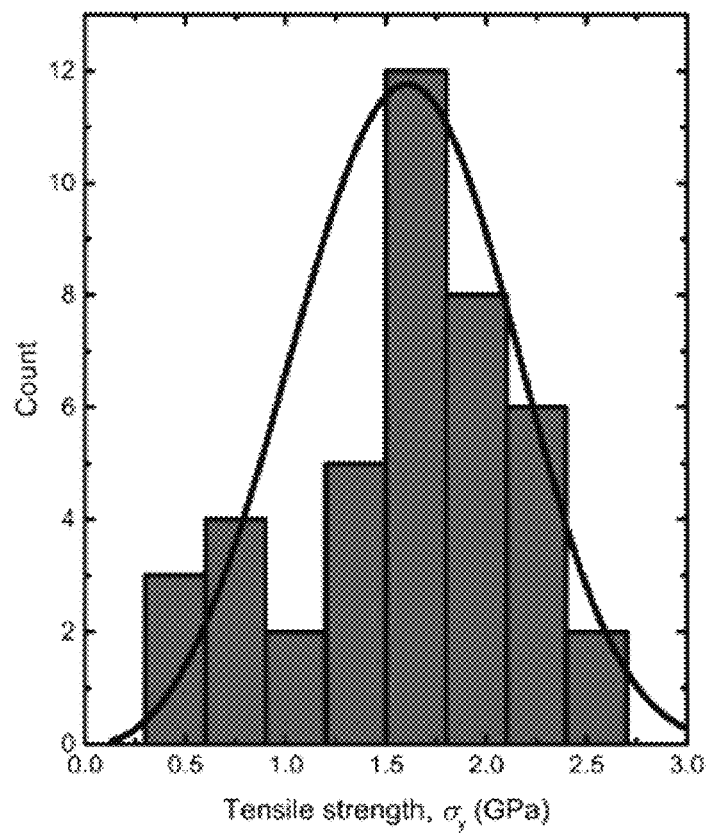
FIG. 2E
FIG. 2F

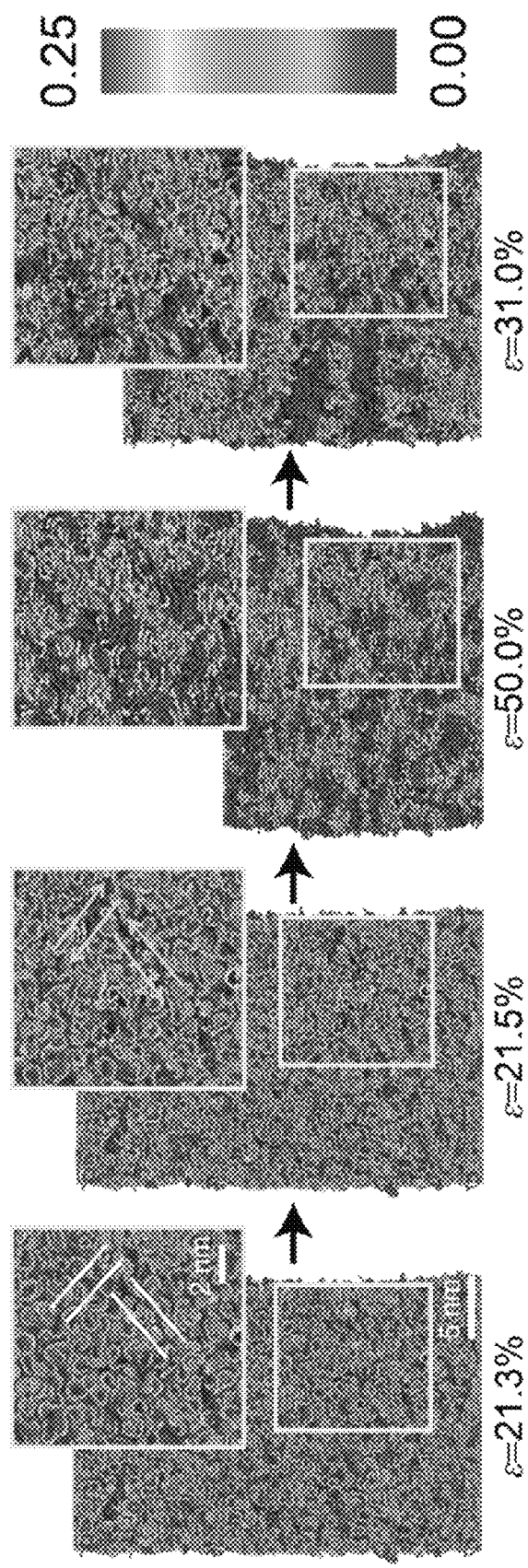

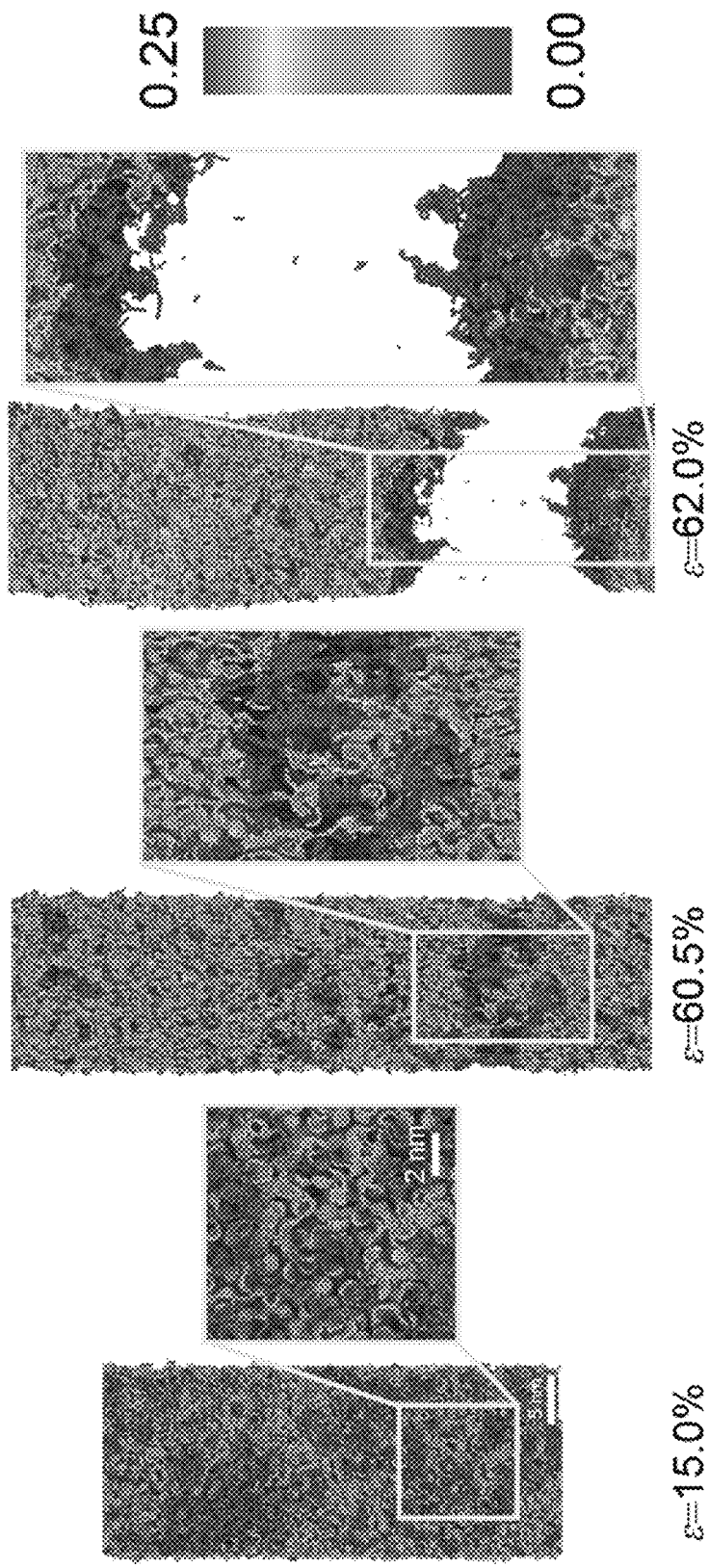

■ sp
▨ sp$^2$
░ sp$^3$

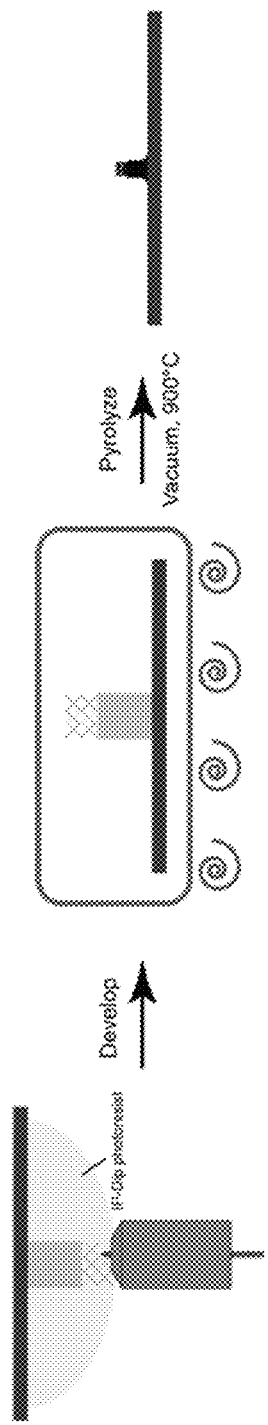
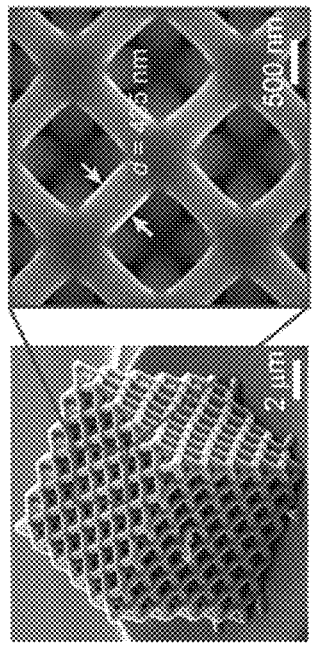
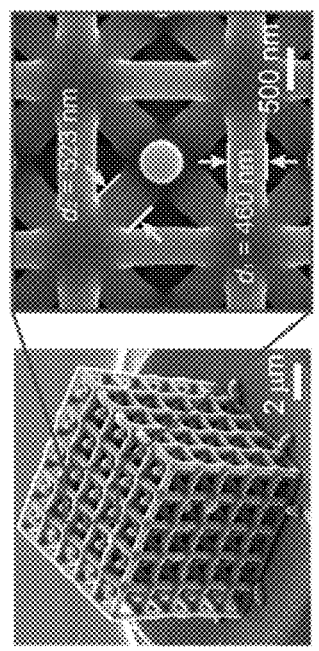
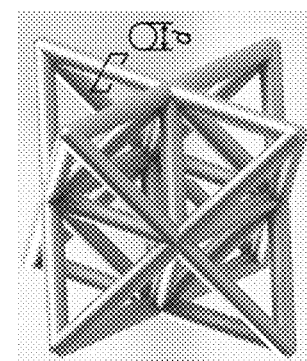
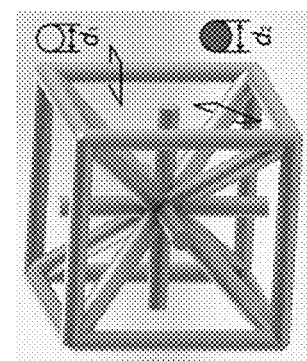
FIG. 9A
FIG. 9B
FIG. 9C
FIG. 9D
FIG. 9E

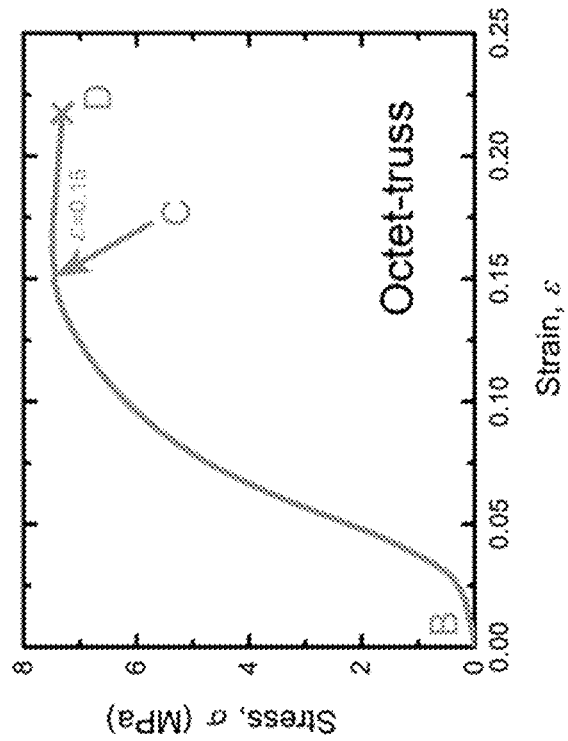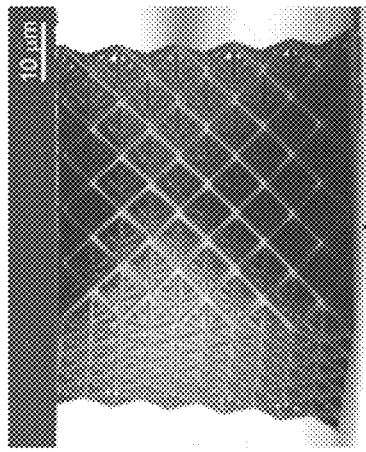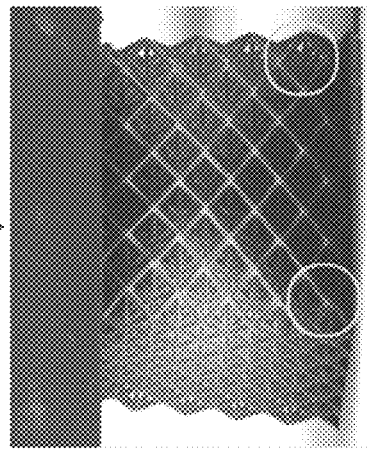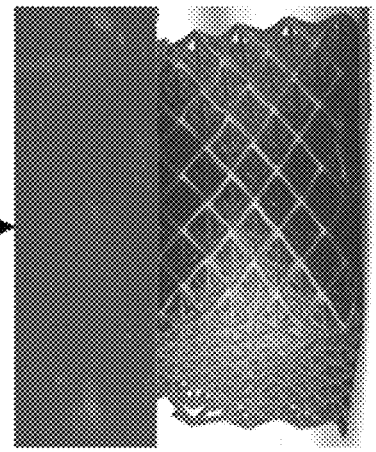
FIG. 14A
FIG. 14B
FIG. 14C
FIG. 14D

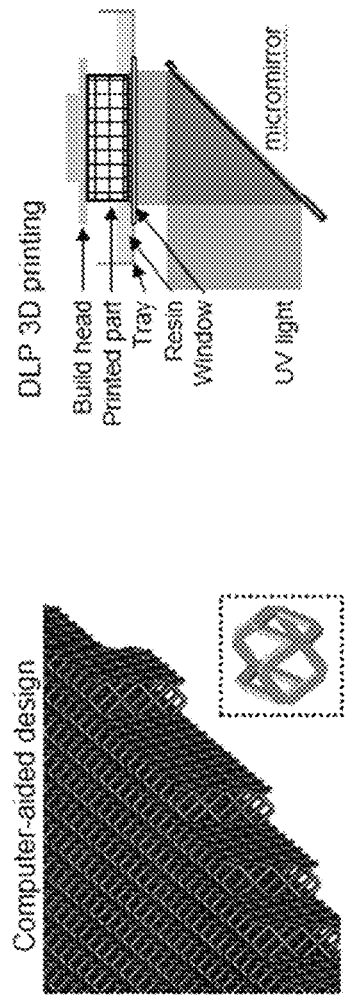
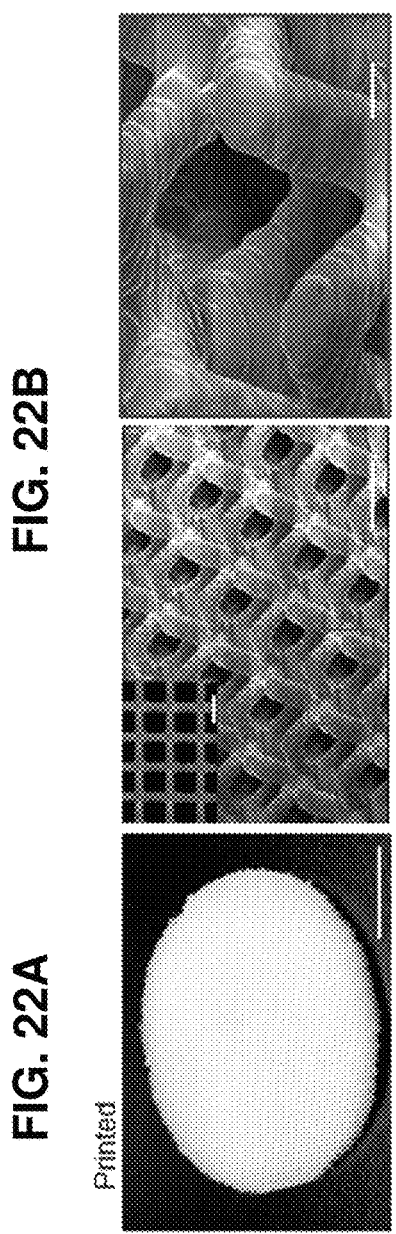
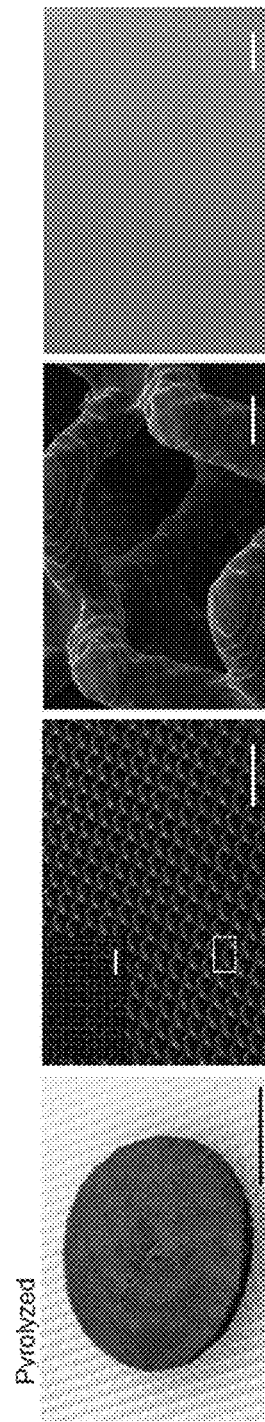
FIG. 22A
FIG. 22B
FIG. 22C
FIG. 22D
FIG. 22E
FIG. 22F
FIG. 22G
FIG. 22H
FIG. 22I

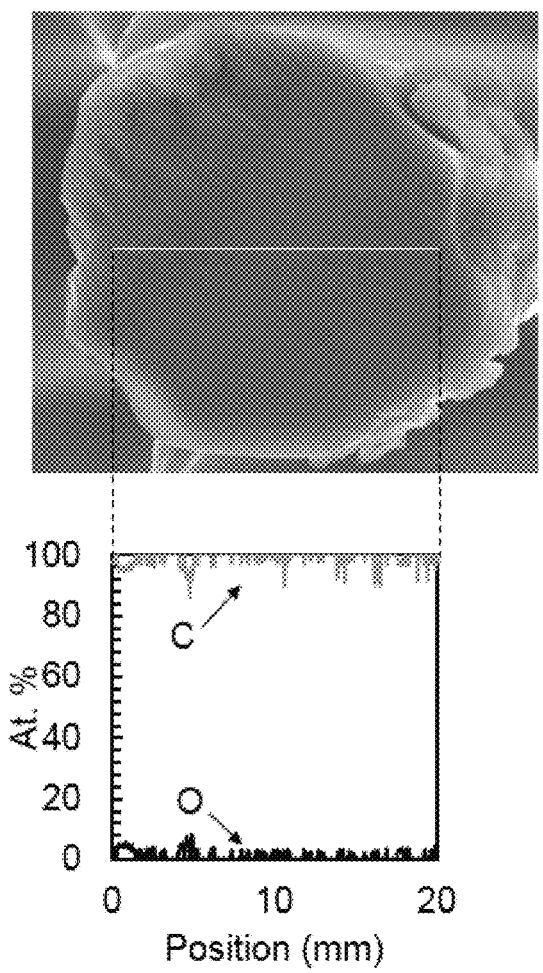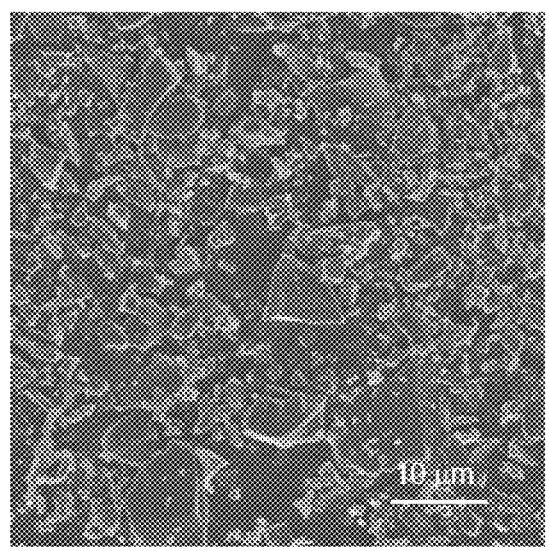
FIG. 26B
FIG. 26A

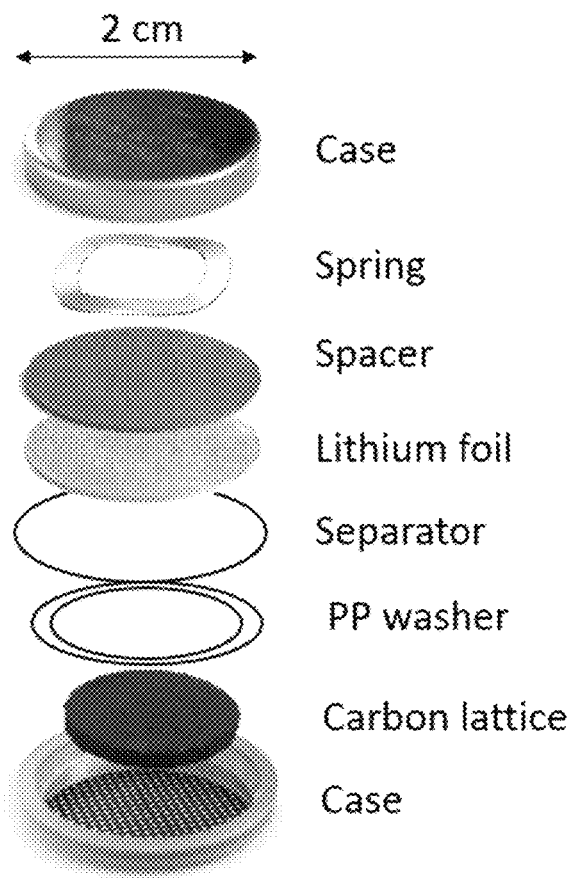
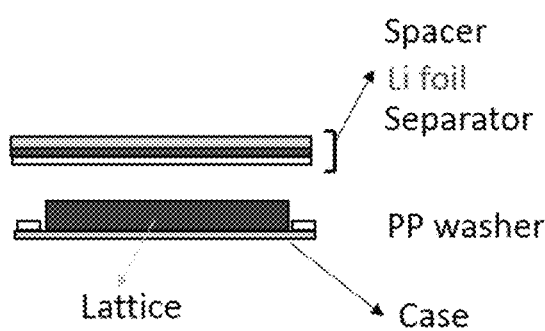
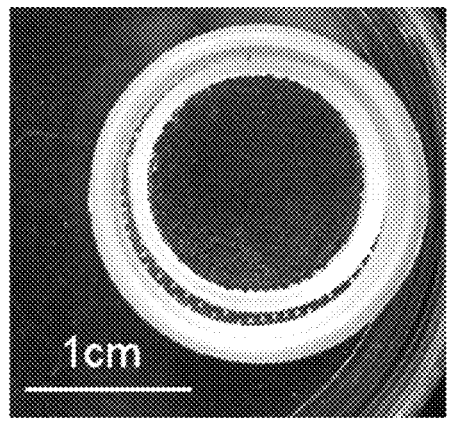
FIG. 29A
FIG. 29B
FIG. 29C

THREE-DIMENSIONAL ARCHITECTED PYROLYZED ELECTRODES FOR USE IN SECONDARY BATTERIES AND METHODS OF MAKING THREE-DIMENSIONAL ARCHITECTED ELECTRODES

CROSS-REFERENCE TO RELATED APPLICATIONS

This application claims the benefit of U.S. Provisional Application No. 62/567,352, filed Oct. 3, 2017, which is hereby incorporated by reference in its entirety, to the extent not inconsistent herewith.

STATEMENT REGARDING FEDERALLY SPONSORED RESEARCH OR DEVELOPMENT

This invention was made with government support under Grant No. N00014-16-1-2827 awarded by the Office of Naval Research. The government has certain rights in the invention.

BACKGROUND OF INVENTION

Battery technologies are becoming increasingly portable and suitable for powering an increasingly larger array of electronics. In particular, lithium (Li)-ion batteries are at the forefront of battery technology development. A battery system generates electrical energy via transfer of charge carriers (e.g. Li-ions) through an electrolyte between a positive and a negative electrode. The composition, properties, and configuration of each electrode determine, for example, the theoretical maximum capacity of the battery. Therefore, a significant focus of battery technology development has been the development of electrode material composition.

The structure and configuration of each electrode, however, plays a significant role and improves or limits achievable performance of the battery. For example, a fraction of active materials in an overall battery design including non-active materials such as binders, conductive additives, current collector, and separator determine practical volumetric energy density. For example, tortuosity in an electrode affects effective ion diffusion length, which limits kinetics and resultant power density. A conventional and commercially employed electrode structure has active particles randomly stacked on a current collector with binders and conductive additives, which may be referred to as a slurry electrode. The slurry electrode has trade-off relationship between tortuosity and active materials fraction due to its random porous structure. In recent years, engineering of electrode structures has been explored to increase electrode thickness and then the active materials fraction in a battery package, which affect overall volumetric energy density, with sustaining low tortuosity and high electric conductivity, which have a significant influence on power density. The recent development in additive manufacturing has also contributed to the engineering of the electrode structure to make pre-designed structures.

Despite recent progress, conventional electrodes and methods are limited in one or more aspects, such as scalability, facileness, non-active components requirement, mechanical resilience, tortuosity, effective active materials fraction, and range of controllable form-factors. For example, strength and density of porous materials typically scale together. A long-standing challenge in modern material design has been to create porous materials that are simultaneously lightweight, strong and stiff. Recent conventional developments in material processing techniques, including in three-dimensional (3D) microfabrication and additive manufacturing, have provided lightweight materials, which may possess beneficial properties like high specific stiffness, high specific strength and good resilience/recoverability. The penalty for the ultra-light weight in these conventional nano- and micro-architected materials is a severe reduction in their stiffness and strength, which renders developing methodologies to create materials that are simultaneously lightweight and strong/stiff, while maintaining their other properties (e.g., thermal stability, electrical conductivity, magnetism, recoverability, etc.) a grand unsolved challenge because of the restricted material choices and limited architectures. Provided herein are electrodes and associated methods that address these and other challenges.

SUMMARY OF THE INVENTION

Provided herein are electrodes, methods for making electrodes, and methods for making electrochemical cells that address various challenges associated with conventional electrodes and electrochemical cells. In some embodiments, these electrodes are useful as negative electrodes in electrochemical cells. The electrodes describes herein comprise a porous and three-dimensional structure, which includes nano- and/or micro-sized features. These electrodes described herein have a combination of features and properties that are elusive in conventional electrodes, including, but not limited to, high strength, high deformability/ductility, large elastic limit, low weight, and low density. The electrodes describes herein may comprise one or more carbon allotrope materials, which may serve as active materials of the electrode. Certain features and properties of the electrodes are highly tunable and controllable. Additionally, the methods provided herein, which include additive manufacture processes, allow for well-controlled or deterministic formation of the electrodes and electrochemical cells described herein. These electrodes provided for improve performance of electrochemical cells, such as secondary batteries.

In an aspect, an electrode for an electrochemical cell comprises: a structure having a nano- or micro-architected three-dimensional geometry; said structure comprising one or more active carbon allotrope materials; wherein said structure is characterized by an average density less than or equal to 2.3 g cm$^{-3}$ and an average specific strength (strength-to-density ratio) greater than or equal to 0.004 GPa g$^{-1}$ cm$^3$. According to certain embodiments, the said structure is characterized by an average density less than or equal to 1.8 g cm$^{-3}$. According to certain embodiments, the said structure is characterized by an average density less than or equal to 1.5 g cm$^{-3}$. According to certain embodiments, the said structure is characterized by an average specific strength (strength-to-density ratio) greater than or equal to 0.005 GPa g$^{-1}$ cm$^3$. According to certain embodiments, the said structure is characterized by an average specific strength (strength-to-density ratio) greater than or equal to 0.037 GPa g$^{-1}$ cm$^3$, preferably greater than or equal to 0.1 GPa g$^{-1}$ cm$^3$.

According to certain embodiments, the nano- or micro-architected geometry is a deterministic three-dimensional geometry characterized by said plurality of features independently having physical dimensions independently selected to a tolerance within (±) 10 μm, preferably within (±) 1 μm, more preferably within (±) 100 nm, and more preferably within (±) 10 nm. In certain embodiments, the electrode is fabricated via one or more an additive manufacture processes and one or more pyrolysis processes.

According to certain embodiments, the structure comprises at least 50% by volume ("vol. %") of said one or more active carbon allotrope materials. In certain embodiments, the structure comprises at least 60 vol. %, preferably at least 70%, more preferably at least 80 vol. %, more preferably at least 85 vol. %, more preferably at least 90 vol. %, and still more preferably at least 95 vol. %, of said one or more active carbon allotrope materials. In certain embodiments, the structure comprises a plurality of features characterized by a core that is at least 50% by volume of said one or more active carbon allotrope materials. In certain embodiments, the structure comprises a plurality of features characterized by a core that is at least 60 vol. %, preferably at least 70%, more preferably at least 80 vol. %, more preferably at least 85 vol. %, more preferably at least 90 vol. %, and still more preferably at least 95 vol. %, of said one or more active carbon allotrope materials.

The electrodes describes herein have advantageous physical and mechanical properties. Generally, development of electrodes involves trade-offs among a number properties or features. In the case of lightweight electrodes, a challenge is the trade-off among density, strength, and stiffness. The electrodes described herein address these challenges via a combination of properties and features, such as low density and high strength.

According to certain embodiments, the structure is porous. According to certain embodiments, the porosity of the structure is selected from the range of 10% to 95%, optionally 10% to 80%, optionally 30% to 40%, optionally 30% to 60%, optionally 45-60%, optionally 60% to 95%. According to certain embodiments, the porosity of the structure is at least 15%, preferably at least 20%, preferably at least 40%, optionally at least 60%, and optionally at least 80%.

According to certain embodiments, the structure is characterized by a plurality of features independently having at least one physical dimension less than or equal to 50 µm. According to certain embodiments, the structure is characterized by a plurality of features independently having at least one physical dimension selected from the range of 10 nm to 100 µm, optionally 50 nm to 300 µm, optionally 50 nm to 200 µm, optionally 100 nm to 200 µm, optionally 100 nm to 200 µm, optionally 1 µm to 100 µm, optionally 10 nm to 1 µm, and optionally 100 nm to 1 µm.

According to certain embodiments, the structure is characterized by an average specific strength (strength-to-density ratio) of selected from the range of 0.14 to 1.90 GPa $g^{-1}$ $cm^3$. According to certain embodiments, the structure is characterized by an average specific strength (strength-to-density ratio) of selected from the range of 0.14 to 1.90 GPa $g^{-1}$ $cm^3$ for a structure having a density less than 1.0 g/$cm^3$. According to certain embodiments, the electrode is characterized by an average specific strength (strength-to-density ratio) of greater than 0.14 GPa $g^{-1}$ $cm^3$, preferably greater than or equal to 0.14 GPa $g^{-1}$ $cm^3$, preferably greater than or equal to 0.2 GPa $g^{-1}$ $cm^3$, preferably greater than or equal to 0.3 GPa $g^{-1}$ $cm^3$, preferably greater than or equal to 0.5 GPa $g^{-1}$ $cm^3$, preferably greater than or equal to 0.6 GPa $g^{-1}$ $cm^3$, preferably greater than or equal to 0.8 GPa $g^{-1}$ $cm^3$, preferably greater than or equal to 1.0 GPa $g^{-1}$ $cm^3$, preferably greater than or equal to 1.1 GPa $g^{-1}$ $cm^3$, preferably greater than or equal to 1.5 GPa $g^{-1}$ $cm^3$, more preferably greater than or equal to 1.7 GPa $g^{-1}$ $cm^3$, and still more preferably greater than or equal to 1.9 GPa $g^{-1}$ $cm^3$.

According to certain embodiments, the structure is characterized by an average density selected from the range of 0.24 to 1.0 g $cm^{-3}$. According to certain embodiments, the structure is characterized by an average density selected from the range of 0.2 to 0.4 g $cm^{-3}$. According to certain embodiments, the structure is characterized by an average density less than or equal to 1.0 g $cm^{-3}$, preferably less than or equal to 0.95 g $cm^{-3}$, and optionally less than or equal to 0.9 g $cm^{-3}$.

According to certain embodiments, the structure is characterized by an average Young's modulus selected from the range of 0.16 to 1.2 GPa. According to certain embodiments, the structure is characterized by an average Young's modulus selected from the range of 0.16 (e.g., at first fracture) to 1.2 GPa (e.g., at third fracture). According to certain embodiments, the structure is characterized by an average Young's modulus selected from the range of 0.034 to 20 GPa, optionally 0.1 to 20 GPa, optionally 0.16 to 18.6 GPa, optionally 0.34 to 18.6 GPa, preferably at least 0.2 GPa, more preferably at least 0.5 GPa, more preferably at least 1.0 GPa, more preferably at least 2 GPa, more preferably at least 5 GPa, more preferably at least 10 GPa, more preferably at least 15 GPa, and still more preferably at least 18.6 GPa.

According to certain embodiments, the structure is characterized by a compressive strength selected from the range of 0.5 to 50 MPa, optionally 5 to 50 MPa, optionally 7 to 32 MPa, preferably at least 30 MPa, more preferably at least 50 MPa, more preferably at least 0.1 GPa, more preferably at least 0.2 GPa, more preferably at least 0.5 GPa, still more preferably at least 1.0 GPa, and still more preferably at least 1.90 GPa. According to certain embodiments, the structure is characterized by a compressive strength selected from the range of 5 MPa to 1.90 GPa. In an embodiment, a compressive strength of the structure is a fracture strength of the structure.

According to certain embodiments, the structure has a strain-to-fracture of 10% to 20%, optionally 14% to 17%.

The electrodes described herein are compatible with a wide variety of materials, such as a variety of carbon allotrope materials that may be active materials in an electrochemical cell.

According to certain embodiments, the active carbon allotrope material is characterized by an sp carbon to $sp^2$ carbon ratio of less than or equal to 0.2, preferably less than or equal to 0.1, more preferably less than or equal to 0.01, and more preferably substantially 0. According to certain embodiments, the active carbon allotrope material is characterized by an $sp^3$ carbon to $sp^2$ carbon ratio of less than or equal to 0.2, preferably less than or equal to 0.1, more preferably less than or equal to 0.01, and more preferably substantially 0.

According to certain embodiments, the active carbon allotrope material is porous. According to certain embodiments, the active carbon allotrope material is characterized by a porosity of less than 10%, optionally less than 5%, optionally less than 1%, optionally less than 0.01%, and optionally less than 0.001%. According to certain embodiments, the active carbon allotrope material is characterized by a porosity selected from the range of 10% to 60%, preferably 30% to 40%, optionally at least 30%, and optionally at least 40%.

According to certain embodiments, the active carbon allotrope material is characterized by an average density of defects of less than or equal to 100 $cm^{-3}$, preferably less than or equal to 10 $cm^{-3}$, more preferably less than or equal to 1 $cm^{-3}$, still more preferably less than or equal to 0.1 $cm^{-3}$, still more preferably less than or equal to 0.01 $cm^{-3}$, still more preferably less than or equal to 0.001 cm$^{-3}$, still more preferably less than or equal to 0.00001 cm$^{-3}$.

According to certain embodiments, the active carbon allotrope material is characterized by an average characteristic crystallite size selected from the range of 0.9 nm to 20 µm, optionally 0.9 nm to 1 µm, optionally 0.9 nm to 100 nm, and optionally 0.9 nm to 10 nm.

According to certain embodiments, the structure has a specific surface area selected from the range of 1000 m$^2$/g to 2000 m$^2$/g.

According to certain embodiments, the active carbon allotrope materials are selected from the groups consisting of glassy carbon, graphitic carbon, amorphous carbon, pyrolytic carbon, graphite, carbon black, and any combination thereof. According to certain embodiments, the active carbon allotrope material is pyrolytic carbon. According to certain embodiments, the active carbon allotrope material is graphitic carbon. According to certain embodiments, the active carbon allotrope material is glassy carbon. According to certain embodiments, the active electrode carbon allotrope material is a composite comprising glassy carbon, pyrolytic carbon, graphitic carbon, amorphous carbon, or a combination of these, and one or more additives selected from the group consisting of nickel, copper, cobalt, iron, silicon, germanium, tin, magnesium, aluminum, titanium, vanadium, chromium, zinc, molybdenum, antimony, phosphorous, and metal oxides, including but not limited to, nickel oxide, niobium oxide, tungsten oxide, niobium tungsten oxide, copper oxide, titanium oxide, lithium titanium oxide, MnO, MnO$_2$, Mn$_2$O$_3$, Mn$_3$O$_4$, Cr$_2$O$_3$, Fe$_3$O$_4$, Fe$_2$O$_3$, CoO, Co$_3$O$_4$, Co$_2$O$_3$, TiO$_2$, NiO, and NiO$_2$. According to certain embodiments, the active electrode carbon allotrope material is a composite comprising glassy carbon, pyrolytic carbon, graphitic carbon, amorphous carbon, or a combination of these, and one or more additives selected from the group consisting of nickel, copper, cobalt, and iron. According to certain embodiments, the active electrode carbon allotrope material is a composite comprising glassy carbon, amorphous carbon, or a combination of these, and one or more additives selected from the group consisting of nickel, copper, cobalt, iron, silicon, germanium, tin, magnesium, aluminum, titanium, vanadium, chromium, zinc, molybdenum, antimony, phosphorous, and metal oxides, including but not limited to, nickel oxide, niobium oxide, tungsten oxide, niobium tungsten oxide, copper oxide, titanium oxide, lithium titanium oxide, MnO, MnO$_2$, Mn$_2$O$_3$, Mn$_3$O$_4$, Cr$_2$O$_3$, Fe$_3$O$_4$, Fe$_2$O$_3$, CoO, Co$_3$O$_4$, Co$_2$O$_3$, TiO$_2$, NiO, and NiO$_2$. According to certain embodiments, the active electrode carbon allotrope material comprises less than 10% by weight (wt. %) of the one or more additives. According to certain embodiments, the active electrode carbon allotrope material comprises less than 5 wt. % of the one or more additives.

The electrodes described herein can have a wide range of geometries and configurations suitable for and advantageous for electrochemical cells. In addition to beneficial physical and mechanical embodiments noted above, these electrodes include low tortuosity, for example.

According to certain embodiments, the three-dimensional geometry is characterized by a plurality of features, wherein at least a portion of said features independently have one or more average cross sectional physical dimensions selected over the range of 50 nm to 200 µm, optionally 10 nm to 100 µm, optionally 10 nm to 10 µm, optionally 10 nm to 1 µm, and optionally 100 nm to 1 µm. According to certain embodiments, at least a portion of these features are characterized by one or more average longitudinal physical dimensions selected over the range of 10 nm to 2000 µm, optionally 50 nm to 1000 µm, optionally 100 nm to 200 µm, optionally 100 nm to 100 µm, and optionally 50 nm to 10 µm. According to certain embodiments, these features comprise one or more of struts, beams, ties, trusses, sheets, and shells, optionally intersecting at a plurality of nodes.

According to certain embodiments, the three-dimensional electrode geometry is an isotropic or anisotropic lattice geometry. According to certain embodiments, the lattice geometry is characterized by unit-cell dimensions selected over the range of 100 nm to 200 µm, beam diameters selected over the range of 20 nm to 50 µm, and densities of less than or equal to 2.3 g/cm$^{-3}$. In an embodiment, unit-cell dimensions are characterized by beam diameters in the range of 10 nm to 50 µm, optionally 100 nm to 50 µm. According to certain embodiments, the unit-cell dimensions are selected from the range of 10 nm to 10 µm. According to certain embodiments, the unit-cell density is less than 1.8 g/cm$^3$, preferably less than 1.5 g/cm$^3$, and more preferably less than 1.0 g/cm$^3$.

In an embodiment, for example, the structure having a nano- or micro-architected three-dimensional geometry is not a random porous medium. In an embodiment, for example, the structure having a nano- or micro-architected three-dimensional geometry is not a foam or nanofoam. According to certain embodiments, the lattice geometry is—is an octet- and iso-truss unit cell geometry. According to certain embodiments, the said three-dimensional electrode geometry is a free-standing electrode geometry.

According to certain embodiments, the three-dimensional geometry is a node-free geometry. The structure having a node-free geometry is characterized by exceptional mechanical resilience. According to certain embodiments, the structure is characterized by a strain-to-failure value of greater than or equal to 10%, preferably greater than or equal to 20%. According to certain embodiments, the structure is characterized by a compressive strength of greater than or equal to 100 MPa, preferably greater than or equal to 500 MPa, still more preferably greater than or equal to 1 GPa. According to certain embodiments, the structure has mechanical resilience characterized by greater than or equal to 50 compression/unloading cycles to substantially 20%, optionally to exactly 20%, without catastrophic failure of the structure. According to certain embodiments, the structure has mechanical resilience characterized by greater than or equal to 50 compression/unloading cycles to at least 20% without catastrophic failure of the structure. Strength-to-fracture and strain-to-fracture of a structure may depend on the particular geometry of the structure. Generally, a node-free geometry can have fewer stress concentrators, or points of stress concentrations, compared to geometries with nodes.

The electrodes described herein are suitable for a wide range of electrochemical cells and configurations. According to certain embodiments, the electrode is an interdigitated electrode in said electrochemical cell. According to certain embodiments, the electrode is in said electrochemical cell, and wherein said electrochemical cell is a secondary cell. According to certain embodiments, the electrode structure is characterized by an average specific capacity selected from the range of 50 to 1000 mAhg$^{-1}$ and/or an average areal capacity greater than or equal to 3 mAhcm$^{-2}$, or preferably greater than 4 mAhcm$^{-2}$. The average specific capacity may be selected from the range of 50 to 410 mAhg$^{-1}$. According to certain embodiments, the electrode is a negative electrode in a lithium ion or sodium ion secondary cell. According to certain embodiments, the electrode is in said electrochemical cell, and wherein said electrochemical cell is primary cell, a secondary cell, a fuel cell, a supercapacitor, a metal-air battery, a flow battery, a lithium-ion battery, a sodium ion battery, lithium metal battery, magnesium ion battery, an alkaline battery, a lead acid battery, a redox flow battery, an electrochemical capacitor, a lithium-silicon battery, or a silicon-air battery.

Disclosed herein are also methods for making any of the electrodes disclosed herein. In an aspect, a method of making an electrode for an electrochemical cell comprises steps of: preparing a framework using an additive manufacturing process; said framework comprising a precursor material and characterized by a three-dimensional framework geometry comprising one or more nano-sized features, micro-sized features or both; and processing said framework structure via heat treatment under conditions to at least partially transform said framework into a structure having a nano- or micro-architected three-dimensional geometry; said structure comprising one or more active carbon allotrope materials; wherein said structure comprises at least 50% by volume of said one or more active carbon allotrope materials. According to certain embodiments, the framework has a nano- or micro-architected three-dimensional geometry. According to certain embodiments, the framework is a deterministic nano- or micro-architected three-dimensional geometry. According to certain embodiments, the framework is porous. According to certain embodiments, the method further comprises designing the three-dimensional framework geometry using a computer-aided design method. According to certain embodiments, the structure comprises a plurality of features characterized by a core that is at least 50% by volume of said one or more active carbon allotrope materials. According to certain embodiments, the structure is porous.

According to certain embodiments, the additive manufacturing process is selected from the group consisting of: a sterolithographic (SLA) technique; a digital light processing (DLP) technique; a continuous liquid interface production technique; a micro-stereolithographic (µ-SLA) technique; a two-photon polymerization lithography technique; an interference lithography technique; a holographic lithography technique; a stimulated emission depletion (STED) lithography technique; other vat photopolymerization technique; a material extrusion technique; a powder bed fusion technique; a material jetting technique; and a combination of these. According to certain embodiments, the additive manufacturing process is a three-dimensional lithography technique.

According to certain embodiments, the heat treatment comprises a pyrolysis process. According to certain embodiments, the pyrolysis process is carried out over a temperature range select from the range of 500° C. to 3000° C. and for a duration less than 336 hours. According to certain embodiments, the pyrolysis process is carried out over a temperature range select from the range of 500° C. to 3000° C. and for a duration selected from the range of 1 hour to 336 hours. Optionally, the pyrolysis process is characterized by a duration of less than 1 hour, or optionally less than 1 minute. According to certain embodiments, the pyrolysis process is carried out over a temperature range select from the range of 500° C. to 1500° C. and for a duration selected from the range of 1 hour to 10 hours. According to certain embodiments, the pyrolysis process is characterized by a heating rate selected from the range of 1° C./min to 100° C./min. Optionally, the pyrolysis process is characterized by a plurality of temperature-hold periods, wherein a temperature-hold period is characterized by a pyrolysis temperature being held for at least 10 seconds, optionally at least 30 seconds, and preferably at least 1 minute. The pyrolysis temperature may be held at an intermediate temperature (e.g., a temperature between room temperature and the highest temperature) to facilitate outgassing, such as outgassing of elements other than carbon, such oxygen, nitrogen, or hydrogen. According to certain embodiments, the pyrolysis process is carried out under vacuum. According to certain embodiments, the pyrolysis process is carried out at a gas pressure selected from the range of 20 mTorr to 760 mTorr. According to certain embodiments, the gas pressure corresponds to one or more gases selected from the group consisting of Ar, $N_2$, $H_2$, an oxygen-free gas, dry air, $CO_2$, He, and Ne. According to certain embodiments, the gas pressure corresponds to one or more oxygen-free gases.

According to certain embodiments, the heat treatment provides for a shrinkage ratio of said three-dimensional framework geometry to said nano- or micro-architected three-dimensional geometry selected from the range of 2.5 to 3.5. According to certain embodiments, the heat treatment provides for a shrinkage ratio of said three-dimensional framework geometry to said nano- or micro-architected three-dimensional geometry of substantially 3.

Disclosed herein are also methods for making electrochemical cells, according to any of the embodiments disclosed herein. In an aspect, a method of making an electrochemical cell comprises steps of: preparing a framework using an additive manufacturing process; said framework comprising a precursor material and characterized by a three-dimensional framework geometry comprising one or more nano-sized features, micro-sized features or both; processing said framework structure via heat treatment under conditions to at least partially transform said framework into a structure having a nano- or micro-architected three-dimensional geometry; wherein said structure comprises at least 50% by volume of said one or more active carbon allotrope materials; thereby generating an electrode; and providing said electrode in said electrochemical cell. According to certain embodiments, the framework has a nano- or micro-architected three-dimensional geometry. According to certain embodiments, the framework is a deterministic nano- or micro-architected three-dimensional geometry. According to certain embodiments, the framework is porous. According to certain embodiments, the structure comprises a plurality of features characterized by a core that is at least 50% by volume of said one or more active carbon allotrope materials. According to certain embodiments, the structure is porous.

According to certain embodiments, the precursor material comprises one or more photoinitiators, one or more radical polymerizable monomers, one or more UV blockers, or any combination thereof. According to certain embodiments, the precursor material comprises one or more thermoset polymers. According to certain embodiments, the precursor material comprises one or more phenolic resin photoresists. An exemplary photoresist is, but is not limited to, SU-8 photoresist. According to certain embodiments, the precursor material comprises one or more acrylic photopolymers. Exemplary photopolymers include, but are not limited to, PR48, IP-Dip, IP-S, and other photopolymers including those available from Nanoscribe (https://www.nanoscribe/de/en/products/ip-photoresist/). According to certain embodiments, the precursor material comprises one or more photoinitiators, one or more radical polymerizable monomers, one or more UV blockers, one or more thermoset polymers, one or more phenolic resin photoresists, one or more acrylic photopolymers, or any combination thereof.

According to certain embodiments, the nano- or micro-architected three-dimensional geometry enables use of said electrode in said electrochemical cell characterized by one or more enhanced electrochemical performance parameters selected from the group consisting of energy density, discharge rate capability, charge rate capability, volumetric energy density, gravimetric energy density, specific capacity, volumetric capacity, capacity retention, impedance, hysteresis, electrical conductivity, ionic conductivity, and energy retention.

According to certain embodiments, the electrochemical cell is a secondary electrochemical cell. According to certain embodiments, the electrochemical cell is a lithium ion or sodium ion secondary cell. According to certain embodiments, the electrochemical cell is a primary cell, a secondary cell, a fuel cell, a supercapacitor, a metal-air battery, a flow battery, a lithium-ion battery, a sodium ion battery, lithium metal battery, magnesium ion battery, an alkaline battery, a lead acid battery, a redox flow battery, an electrochemical capacitor, a lithium-silicon battery, or a silicon-air battery. Exemplary metal electrode for metal-air and metal-ion batteries include, but are not limited to, Mg, K, Ca, Li, Zn, Al, and Na.

Disclosed herein are electrodes having any one or combination of the embodiments of electrodes or structures described herein. Disclosed herein are methods for making an electrode comprising any one or a combination of the embodiments of the methods and/or embodiments of the electrodes or structures described herein. Disclosed herein are methods for making an electrochemical cell comprising any one or a combination of the embodiments of the methods and/or embodiments of the electrodes or structures described herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1A. Schematic illustration of the fabrication process. This process includes the TPL DLW of cylindrical pillars from IP-Dip polymer resin and subsequent pyrolysis under vacuum at 900° C. FIGS. 1B-1C. SEM images of a representative micropillar before and after pyrolysis, showing substantial volumetric shrinkage. FIG. 1D. Bright-field TEM image of the pyrolytic carbon. The diffraction pattern in the inset reveals its amorphous microstructure. FIGS. 1E-1F. HRTEM images of the two regions outlined by solid boxes in FIG. 1D. These images reveal the presence of some sub-nanometer-sized voids (denoted by red arrows). FIG. 1G. Raman spectrum of a pyrolytic carbon micropillar. The typical G and D bands at the energies 1359 cm$^{-1}$ and 1595 cm$^{-1}$ indicate sp$^2$-hybridization. FIG. 1H. EELS of the pyrolytic carbon, where the green and purple shaded areas correspond to the 1 s–π* and 1 s–σ* peaks of carbon, respectively. Quantitative analysis of the data indicates that the pyrolyzed carbon contains approximately 96.5% sp$^2$ bonds.

FIGS. 2A-2F. Uniaxial compression and tension experiments on the pyrolytic carbon micropillars. FIG. 2A. Compressive stress-strain data of pyrolytic carbon pillars with diameters of 4.6-12.7 µm. All of these micropillars deformed elastically up to ~20-30% strain and exhibited marginal plastic strain (~8-10%) before failure. The dashed lines indicate the linear slopes. FIG. 2B. SEM images of a typical pyrolytic carbon micropillar described in FIG. 2A before and after compression, which reveals the occurrence of brittle fracture via multiple fragments. FIG. 2C. Representative stress-strain data set from the in situ deformation of a 2.25 µm-diameter pyrolytic carbon pillar, which underwent significant plastic deformation up to 33.6% strain. The inset shows an SEM image of the micropillar before compression. A sequence of snapshots obtained during the in situ deformation is shown above the plot, with numbered frames corresponding to the same-numbered red arrows in the stress-strain curve. The SEM images on the right of the stress-strain data show the compressed micropillar from the front and back views. The nucleation and propagation of the splitting crack correspond to the strain burst indicated by the blue arrow in the stress-strain curve. FIG. 2D. Tensile stress-strain data of pyrolytic carbon dog-bone-shaped samples with gauge diameters of 0.7-2.0 µm. FIG. 2E. SEM images of a typical tensile specimen before and after the experiment. FIG. 2F. Statistical distribution of tensile fracture strengths.

FIG. 3A. Variation in compressive strength with increasing micropillar diameter. The blue dashed line represents the average compressive strength of micropillars with diameters smaller than 2.3 µm. FIG. 3B. Twenty-cycle force-displacement curve of a deformable pillar with a diameter of 1.28 µm under a maximum compressive strain of ~23%, showing nearly full recovery in every cycle except the first cycle. The SEM images depict the pre-deformation and post-deformation pillar from 20 loading cycles.

FIGS. 4A-4J. Atom istic simulations of the uniaxial compression and tension of pyrolytic carbon nanopillars. FIG. 4A. Atomic configurations and cross-sectional morphology of a simulated sample with a diameter of 20 nm. FIGS. 4B-4C. Compressive and tensile stress-strain curves of pyrolytic carbon nanopillars. FIGS. 4D-4G. Snapshots of a deformed pillar at different compressive strains. FIGS. 4H-4J. Snapshots of a deformed pillar at different tensile strains. The atoms in FIGS. 4D-4J are colored according to the von Mises atomic strain.

FIG. 5A. Ashby chart of strength versus density for various structural materials, including our pyrolytic carbon micropillars. FIG. 5B. Comparison of specific tensile and compressive strengths between our pyrolytic carbon micropillars and other structural materials. FIG. 5C. Summary of specific strength versus fracture strain for our pyrolytic carbon micropillars and other structural materials. The excellent combination of specific strength and deformability of our pyrolytic carbon surpasses that of almost all other materials.

FIGS. 9A-9F. Fabrication and microstructural characterization of pyrolytic carbon nanolattices. FIG. 9A. Schematic illustration of the fabrication process of pyrolytic carbon nanolattices. CAD rendition of a (FIG. 9B) octet and (FIG. 9D) iso-truss unit cell. SEM images of (FIG. 9C) an octet nanolattice with a strut diameter of d=435 nm and (FIG. 9E) an iso-truss nanolattice fabricated with a vertical strut diameter of $d_1$=460 nm and a slanted strut diameter of $d_2$=523 nm. FIG. 9F. An HRTEM image of pyrolytic carbon extracted from the nanolattice, which indicates the amorphous nature of the pyrolytic carbon.

FIGS. 10A-10B. Mechanical response of pyrolytic carbon octet- and iso-truss nanolattices with different relative densities obtained from in situ compressions. FIGS. 10C-10D. SEM images of an octet-truss nanolattice with d=382 nm before and after compression. FIGS. 10E-10F. SEM images of the iso-truss nanolattice with $d_1$=538 nm and $d_2$=612 nm before and after compression, which reveal brittle failure. Initial detectable structural imperfections caused by fabrication process are circled in (FIG. 10C) and (FIG. 10E).

FIG. 11A. Young's modulus and (FIG. 11B) compressive strength of pyrolytic carbon nanolattices plotted versus density on a log-log scale. For comparison, these charts include several micro- and nano-architected materials reported so far, such as alumina hollow nanolattices (11), alumina-polymer nanolattices (16), glassy carbon nanolattices (18), carbon aerogel (22), graphene aerogel microlattices (23), vitreous carbon nanolattice (24), cellular carbon microstructure (25) and SiOC microlattices (26).

FIGS. 12A-12C. Simulated configurations of octet-, iso- and tetrahedron-truss nanolattices with pre-existing defects introduced by imposing the initial deflection of struts. The insets show the zoom-in views of local structures with initial deflection of struts. FIGS. 12D-12F. Compressive stress-strain curves of octet-truss, iso-truss and tetrahedron-truss nanolattices with different relative densities and initial specific deflection.

FIGS. 14A-14H. In situ compression tests on polymer nanolattices. FIG. 14A. Compressive stress-strain curve of octet-truss nanolattice with d=1.12 μm. FIGS. 14B-14D. SEM snapshots of deformed octet-truss nanolattice under different compressive strains. FIG. 14E. Compressive stress-strain curve of iso-truss nanolattice with $d_1$=1.30 μm and $d_2$=1.49 μm. FIGS. 14F-14H. SEM snapshots of deformed iso-truss nanolattice under different compressive strains. The circled regions in FIG. 14C and FIG. 14G indicate the buckling of struts during compression.

FIGS. 22A-22I. Fabrication processes of 3D architected carbon. FIG. 22A. Computer-aided design (CAD) of 3D architected structure. Inlet shows unit structure of the periodic structure. FIG. 22B. Schematic of Digital light processing (DLP) 3D printing process. Photographs and scanning electron microscope (SEM) images of FIGS. 22C-22E the 3D architected polymer and FIGS. 22F-22I 3D architected carbon at different magnifications. Top-left inlets in FIG. 22D and FIG. 22G are top views showing non-tortuous structure. Scale bars are 1 cm for FIG. 22C, 500 μm for FIG. 22D, FIG. 22G and their insets, 100 μm for FIG. 22E, 5 mm for FIG. 22F, 30 μm for FIG. 22H, 500 nm for FIG. 22I.

FIG. 25A. SEM image of cross-section and energy dispersive spectroscopy (EDS) spectrum on the cross-section. FIG. 25B. Raman spectrum with experimental data (•), fitted curves for each band (dot lines), and linear combination of these peaks (red line). FIG. 25C. X-ray diffraction (XRD) pattern. FIG. 25D. Transmitted electron microscope (TEM) high resolution image and diffraction pattern (inlet). Scale bars are 5 μm for FIG. 25A, and 5 nm in FIG. 25D.

FIG. 26A. Line analysis of EDS on the cross-section. FIG. 26B. Particles crushed from the 3D architected carbon used for XRD analysis.

FIG. 29A. Schematic images of coin cell components. FIG. 29B. schematic side view of coin cell components (without cases and spring). FIG. 29C. Top view of the 3D architected carbon surrounded by a PP washer on a bottom case.

FIG. 30A. The first and second discharge-charge curves at low current (2 mA/g). FIG. 30B. Columbic efficiency (top) and discharge capacities (bottom) at step currents and long cycle at 16.6 mA/g. FIG. 30C. Long cycling at 100 mA/g. FIGS. 30D-30F. Representative SEM images of the 3D architected carbon after more than 300 cycles at 100 mA/g at different magnifications. Scale bars are 500 µm for FIG. 30D, 50 µm for FIG. 30E, and 500 nm for FIG. 30F.

FIG. 44A: Snapshots of stretched nanopillars at strains of 56.3-60.5%. Nanoscale cavities (indicated by orange arrow) nucleated and grew up during stretching, and then merged with each other, leading to formation of nanoscale cracks. FIG. 44B: Snapshots of stretched nanopillars at strains of 61.0-61.8%. As the tensile strain increases, nanoscale cracks propagated along a direction normal to tensile direction, resulting in the smooth fracture surface. All atoms in FIG. 44A and FIG. 44B are colored by atomic von Mises strain.

STATEMENTS REGARDING CHEMICAL COMPOUNDS AND NOMENCLATURE

Figure 1A:
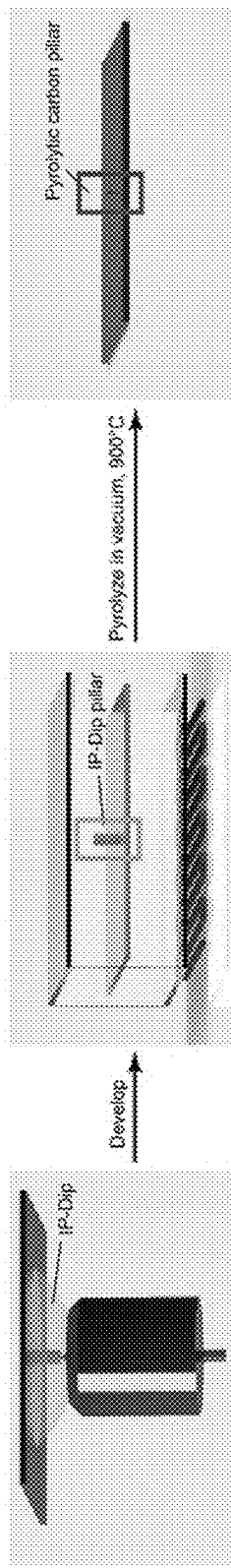
FIGS. 1A-1H. Fabrication and microstructural characterization of the pyrolytic carbon micropillars.

In general, the terms and phrases used herein have their art-recognized meaning, which can be found by reference to standard texts, journal references and contexts known to those skilled in the art. The following definitions are provided to clarify their specific use in the context of the invention.

The term "electrochemical cell" refers to devices and/or device components that convert chemical energy into electrical energy or electrical energy into chemical energy. Electrochemical cells have two or more electrodes (e.g., positive and negative electrodes) and one or more electrolytes. For example, an electrolyte may be a fluid electrolyte or a solid electrolyte. Reactions occurring at the electrode, such as sorption and desorption of a chemical species or such as an oxidation or reduction reaction, contribute to charge transfer processes in the electrochemical cell. Electrochemical cells include, but are not limited to, primary (non-rechargeable) batteries and secondary (rechargeable)

batteries. In certain embodiments, the term electrochemical cell includes metal hydride batteries, metal-air batteries, fuel cells, supercapacitors, capacitors, flow batteries, solid-state batteries, and catalysis or electrocatalytic cells (e.g., those utilizing an alkaline aqueous electrolyte).

The term "electrode" refers to an electrical conductor where ions and electrons are exchanged with the aid of an electrolyte and an outer circuit. The term "negative electrode" refers to the electrode that is conventionally referred to as the anode during discharging of the electrochemical cell. During charging of the electrochemical cell, the negative electrode is one that is conventionally referred to as the cathode. The negative electrode may comprise a porous structure. An exemplary negative electrode includes, but is not limited to, a carbon allotrope such as graphite, graphitic carbon, or glassy carbon. The term "positive electrode" refers to the electrode that is conventionally referred to as the cathode during discharging of the electrochemical cell. During charging of the electrochemical cell, the positive electrode is one that is conventionally referred to as the anode. An exemplary positive electrode includes, but is not limited to, lithium cobalt oxide.

The term "three dimensional geometry", when referring to an element, refers to the element having a three-dimensional geometric configuration. In an embodiment, when referring to a structure, the structure has a three dimensional geometry when a a three-coordinate system of space is required to fully describe the dimensions of a unit cell of the structure. A three dimensional geometry may be nano-architected and/or micro-architected. In an embodiment, a structure characterized by a nano-architected three dimensional geometry is a structure characterized one or more features having at least one physical size dimension (e.g., length, width, or height) in the range of 1 nm to less than 1 µm. The one or more features include, but are not limited to, beams, struts, ties, trusses, sheets, shells, and nodes. In an embodiment, a structure characterized by a nano-architected three dimensional geometry is a structure characterized by a unit cell having whose at least one physical size dimension (e.g., length, width, or height) is in the range of 1 nm to less than 1 µm. In an embodiment, a structure characterized by a micro-architected three dimensional geometry is a structure characterized one or more features having at least one physical size dimension (e.g., length, width, or height) in the range of 1 µm to 1000 µm. In an embodiment, a structure characterized by a micro-architected three dimensional geometry is a structure characterized by a unit cell having whose at least one physical size dimension (e.g., length, width, or height) is in the range of 1 µm to 1000 µm.

The term "architected" refers to a structure or element having features, such as a structure or element having features that are designed and formed according to the design. In an embodiment, an architected structure is deterministic or formed according to deterministic process(es). In an embodiment, substantially all features, and physical dimensions thereof, are designed, or pre-determined, and formed according to the design such that the substantially all features, and physical dimensions thereof, are substantially equivalent to those of the design.

The term "features," when referring to a structure, such as a structure having a nano- or micro-architected three-dimensional geometry according to an embodiment of the invention, includes, but is not limited to, beams, struts, ties, trusses, sheets, shells, and nodes.

The term "cross-sectional physical dimension" refers to a physical dimension of a feature measured in a transverse or cross-sectional axis. In an embodiment, the transverse axis is perpendicular to a longitudinal axis of the feature. In an embodiment, a cross-sectional physical dimension corresponds to a width or a diameter of a feature such as a beam, strut, or tie. In an embodiment, a longitudinal physical dimension is a dimension of a feature along the longitudinal axis of the feature, wherein the longitudinal axis is perpendicular to a cross-sectional axis. Optionally, the longitudinal physical dimension is measured between two nodes. Optionally, the longitudinal physical dimensions is measured between to physical ends of a structure.

The term "unit cell" refers to the smallest arrangement, configuration, or geometry of a plurality of features such that an entire structure having characterized by said unit cell can be formed by repetition of the unit cell. For example, repetition of the unit cell in three dimensions may form a three-dimensional structure. The entire structure may be a three-dimensional structure, such as a three-dimensional porous structure. The entire structure may be a three-dimensional structure that is at least part of an electrode of an electrochemical cell. The plurality of features include, but are not limited to, beams, struts, ties, trusses, sheets, shells, and nodes.

The term "porous" refers to a material, element, or structure that has porosity. The term "porosity" refers to the amount of a material or structure, such as a three-dimensional structure of an electrode, corresponding to an absence of said material or structure, such as absence corresponding to pores, such as apertures, channels, voids, etc. Porosity may be expressed as the percentage of the volume of a material, structure or device component, such as an electrode or a three-dimensional structure of an electrode, which corresponds to pores, such as apertures, channels, voids, etc., relative to the total volume occupied by the material, structure or device component. In an embodiment, an electrode comprises a porous structure having a three-dimensional geometry, wherein the porous structure is characterized by a porosity selected from the range of 20% to 95%, preferably for some applications a porosity selected from the range of 50% to 95%, and optionally for some applications 60% to 95%. In some embodiments, porosity of a material, such as a carbon allotrope material, refers to porosity of within an individual feature, or portion thereof, that is formed of said material. For example, porosity of a carbon allotrope material of a structure may refer to porosity of a feature, such as a beam or strut, that is formed of said carbon allotrope material. Pores of a porous material may be characterized by an average diameter selected from the range of 1 nm to 1000 nm. In an embodiment, the average diameter of the pores of a material is less than the cross-sectional diameter of a feature formed of the material.

Carbon has a plurality of different forms, known as allotropes, all having the same physical state (e.g., solid). Each carbon allotrope may different from other carbon allotropes by the configuration of carbon atoms (e.g., the crystal structure). Exemplary carbon allotropes include, but are not limited to: diamond; graphite; graphitic carbon or graphitized carbon; non-graphitic carbon; graphitizable (or, "soft") carbon; pyrolytic carbon; carbon black; graphene; graphenylene; AA'-graphene; amorphous carbon; diamond-like carbon (DLC); coal; soot; activated carbon; charcoal; carbon fiber; nanocarbons, such as buckminsterfullerenes ("fullerenes"), carbon nanotubes, carbon nanobuds, and Schwarzites; aggregated diamond nanorod; glassy carbon, carbon nanofoam; carbide-derived carbon; and Lonsdaleite carbon (hexagonal diamond). Preferable carbon allotrope materials include, but are not limited to: graphite; graphitic carbon or graphitized carbon; non-graphitic carbon; graphitizable (or, "soft") carbon; pyrolytic carbon; carbon black; amorphous carbon; diamond-like carbon (DLC); and glassy carbon.

The term "pyrolytic carbon" refers to a carbon allotrope resulting in the pyrolysis of a carbon-containing material. In an embodiment, pyrolytic carbon is similar to graphite but further comprising a degree of covalent bonding between graphene sheets. In an embodiment, pyrolytic carbon is produced via heating one or more hydrocarbon materials to a temperature less than or equal to a decomposition temperature of one or more of the one or more hydrocarbon materials wherein the resulting material exhibits crystallization to form pyrolytic carbon. In an embodiment, pyrolytic carbon is a carbon allotrope resulting from pyrolysis of one or more carbon materials (e.g., hydrocarbon). In an embodiment, a process of pyrolysis involves thermally decomposing one or more carbon materials (e.g., hydrocarbon), preferably in an inert atmosphere. In an embodiment, an inert atmosphere is substantially free of oxygen gas and water vapor. In an embodiment, an inert atmosphere is substantially nitrogen gas, argon gas, helium gas, neon gas, or a combination of these.

The term "glassy carbon" refers to a carbon allotrope. Glassy carbon is characterized by an $sp^2$ carbon to $sp^3$ carbon ratio substantially equal to 1, preferably at least 0.95. Glassy carbon is also known in the art as glass-like carbon and vitreous carbon. In an embodiment, glassy carbon is a non-graphitizing or non-graphitizable carbon, or carbon that cannot be graphitized or be converted to graphite.

The terms "sp carbon", "$sp^2$ carbon", and "$sp^3$ carbon" refer to carbon atom(s) characterized by sp, $sp^2$, or $sp^3$ hybrid molecular orbital hydridization, respectively. For example, $sp^3$ carbon involves four $sp^3$-hybrid orbitals. For example, $sp^2$ carbon involves three $sp^2$-hybrid orbitals. For example, sp carbon involves two sp-hybrid orbitals. A ratio of $sp^2$ carbon to sp carbon refers the ratio of the amount of $sp^2$ carbon to the amount of sp carbon in a material, element, or structure. A ratio of $sp^2$ carbon to $sp^3$ carbon refers the ratio of the amount of $sp^2$ carbon to the amount of $sp^3$ carbon in a material, element, or structure. The ratio of sp2 carbon to sp carbon or sp2 carbon to sp3 carbon may be determined via one or more conventional methods known in the art, such as methods including Raman spectroscopy, X-ray photoluminescence spectroscopy (XPS), and electron energy loss spectroscopy (EELS).

"Active material" refers to the material in an electrode that takes part in electrochemical reactions which store and/or deliver energy in an electrochemical cell.

"Young's modulus" is a mechanical property of a material, device or layer which refers to the ratio of stress to strain for a given substance. Young's modulus may be provided by the expression:

$$E = \frac{(stress)}{(strain)} = \left(\frac{L_0}{\Delta L}\right)\left(\frac{F}{A}\right), \quad (I)$$

where E is Young's modulus, $L_0$ is the equilibrium length, $\Delta L$ is the length change under the applied stress, F is the force applied, and A is the area over which the force is applied. Young's modulus may also be expressed in terms of Lame constants via the equation:

$$E = \frac{\mu(3\lambda + 2\mu)}{\lambda + \mu}, \quad (II)$$

where $\lambda$ and $\mu$ are Lame constants. The Young's modulus may be measured according a method conventionally known, or not yet known, in the art. For example, the Young's modulus corresponds to the slope of a linear portion of a stress-strain curve as described by Roylance ("Stress-Stress Curves," MIT course, Aug. 23, 2001; accessed at time of filing at http://web.mit.edu/course/3/3.11/www/modules/ss.pdf).

The term "average," when used in reference to a material or structure property, refers to a calculated arithmetic mean of at least two, or preferably at least three, identical measurements or calculations of said property. For example, an average density of a structure is the arithmetic mean of at least two measurements performed identically, of the density of said structure.

The term "density" refers to volumetric mass density. Density is represented in units of mass-per-volume (e.g., $g/cm^3$). When referring to a material, the term density corresponds to the volumetric mass density of the material. When referring to a structure, the term density corresponds to the volumetric mass density of the structure, which is a function of the geometric configuration (geometry) of the structure as well as a function of the material(s) of which the structure is formed, such that an increase in porosity of said structure corresponds to a decrease in density of said structure. The density of a structure, such as a structure having a three-dimensional geometry according to an embodiment of the invention, may be measured according a method conventionally known, or not yet known, in the art. For example, the density of a structure may be determined by determining mass, height, and diameter for a disk-shape sample (e.g., see FIG. 22F), and then calculating the determined mass divided by volume for the sample, with assuming the sample is substantially a complete circle.

The term "specific strength" refers to a ratio of strength to density of a material, element, or structure, where strength refers to force per unit area at the point of failure of the material, element, or structure. Specific strength may also be referred to as strength-to-weight ratio. In an embodiment, "strength" refers to compressive strength. In an embodiment, "strength" refers to tensile strength. In an embodiment, compressive strength is the maximum stress a material can sustain under crush loading. In an embodiment, compressive strength of a material, structure, or element that fails by shattering fracture can be defined within fairly narrow limits as an independent property. In an embodiment, the compressive strength of a material, structure, or element that does not shatter in compression is the amount of stress required to distort the material an arbitrary amount. In an embodiment, compressive strength is calculated by dividing the maximum load, on the material, structure, or element, by the original cross-sectional area of the material, structure, or element being examined.

The term "stiffness" refers to an extent to which a material, structure, or element resists deformation in response to an applied force. Stiffness corresponds to a ratio of force applied to a material, structure, or element versus the displacement produced by the applied force along the same degree of freedom (e.g., same axis or direction) exhibited by the material, structure, or element. The term "specific stiffness" refers to a ratio of stiffness to density of the material, element, or structure. In an embodiment, the stiffness of a material, structure, or element is the Young's modulus of the material, structure, or element.

According to certain embodiments, the electrode comprises a structure having a node-free geometry. The node-free geometry has exceptional mechanical resilience.

Mechanical resilience may be understood, for example, in terms of strain-to-failure and strength-to-failure. In an embodiment, strength-to-failure of a material, element, or structure corresponds to compressive strength of the material, element, or structure. In an embodiment, a structure of the invention has a strain-to-failure of 2% to 5%, optionally 2.9% to 3.5%. Strain-to-failure may be determined according a method conventionally known, or not yet known, in the art. For example, strain-to-failure may be determined from the strain value corresponding a linear portion, such as the third linear portion, of stress vs. strain data (e.g., see FIG. 28) until sudden stress loss (fracture) of a structure.

The term "deterministic" refers a material or structure characterized by at least one feature and/or at least one property that is known and/or controlled to be within 20%, preferably within 10%, more preferably within 5%, more preferably within 1%, or more preferably within 0.1% of a determined or desired value. In an embodiment, a deterministic structure is characterized one or more features each independently having at least one physical dimension which, prior to or during formation of said structure, is pre-determined to be within 20%, preferably within 10%, more preferably within 5%, more preferably within 1%, or more preferably within 0.1% of a determined or desired value.

The term "additive manufacture" refers to a process for forming a structure or element via deposition, or otherwise building up, of a material. The terms "additive manufacture process" and "additive manufacturing process" may be used interchangeably. An additive manufacture process may involve layer-by-layer deposition of a material to form a complex three-dimensional structure or element. The deposited material may include, but is not limited to, inorganic materials, hybrid organic-inorganic materials, polymers, metals, or combinations of these. Exemplary additive manufacture processes include, but are not limited to, 3D printing, stereolithography (SLA), fused deposit modeling (FDM), and 2-photon lithography. In some embodiments, an additive manufacture process does not require a subtractive manufacture to form the structure or element. Examples of subtractive manufacture processes include, but are not limited to, milling, machining, electron discharge machining, carving, shaping, grinding, drilling, and etching. In an embodiment, an additive manufacture process involves or is aided by computer-aided design (CAD).

In an embodiment, the term "defect" may refers to a fabrication-induced imperfection, or unintended feature or property, such as, but not limited to, local deformation, crack, beam junction offset, beam bulging, curvature of a strut, and pit or void.

The term "node" may refer to a junction or intersection of a plurality of features, such as beams or struts. A structure may have a three-dimensional geometry that is a node-free geometry.

The term "core," when referring to a feature of a structure having a three-dimensional geometry, according to an embodiment, refers to an inner volume of the feature up to and excluding the external surface of the feature. In an embodiment, the core of a feature corresponds to the feature's internal volume excluding that of any coatings, particularly coatings introduced after a pyrolysis process, present thereon.

The term "pre-polymer" or "prepolymer" refers to a monomer or mixture comprising one or more monomers where the monomer(s) have been reacted to an intermediate molecular mass state. The prepolymer is capable of undergoing further polymerization to a fully cured higher molecular weight state. In some embodiments, the terms prepolymer and monomer may be used interchangeably.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications.

The term "substantially" refers to a property that is within 10%, within 5%, within 1%, or is equivalent to a reference property. The term "substantially equal", "substantially equivalent", or "substantially unchanged", when used in conjunction with a reference value describing a property or condition, refers to a value that is within 10%, optionally within 5%, optionally within 1%, optionally within 0.1%, or optionally is equivalent to the provided reference value. For example, a ratio is substantially equal to 1 if it the value of the ratio is within 10%, optionally within 5%, optionally within 1%, or optionally equal to 1. The term "substantially greater", when used in conjunction with a reference value describing a property or condition, refers to a value that is at least 2%, optionally at least 5%, or optionally at least 10% greater than the provided reference value. The term "substantially less", when used in conjunction with a reference value describing a property or condition, refers to a value that is at least 2%, optionally at least 5%, or optionally at least 10% less than the provided reference value.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Figure 36:
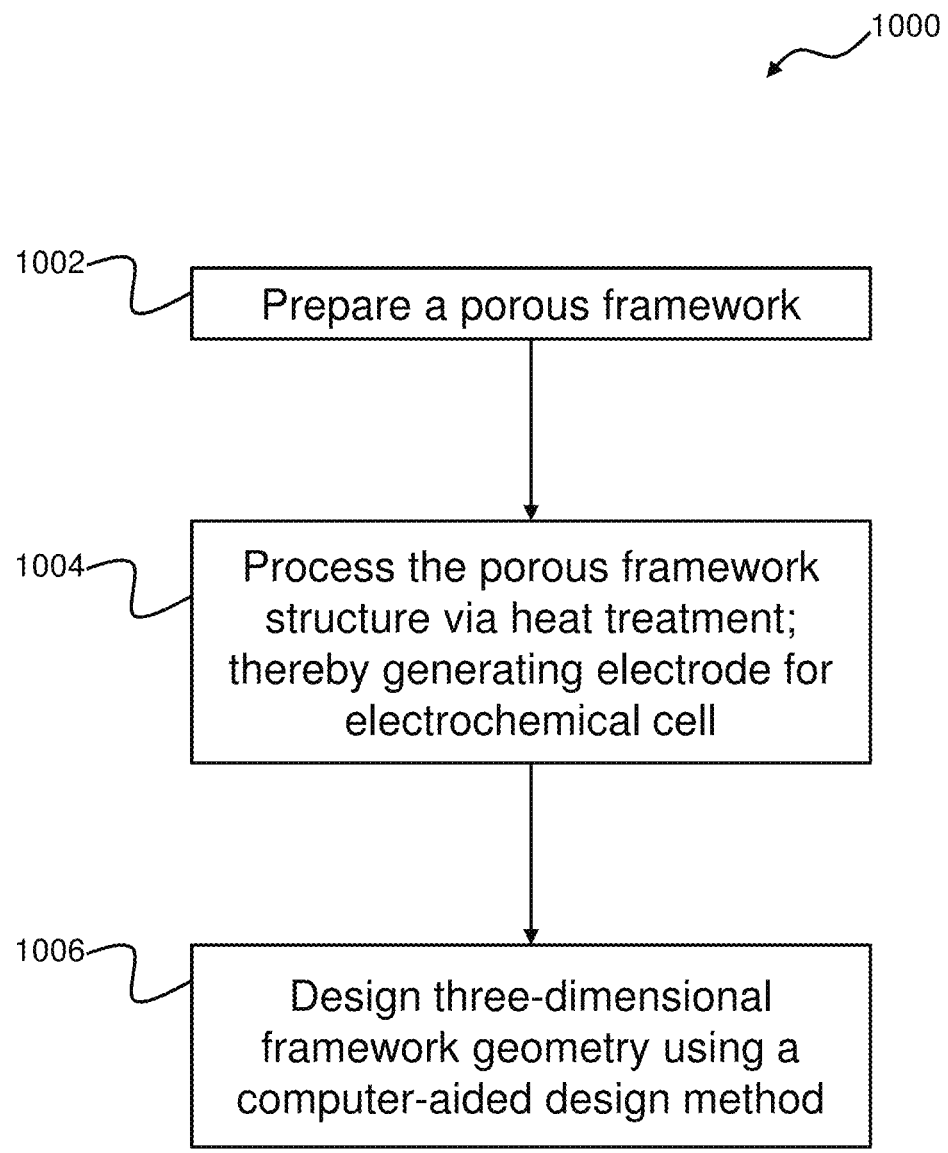
FIG. 36. A flowchart of a method for making an electrode, according to certain embodiments.

FIG. 36 is a flowchart of a method 1000 for making an electrode for an electrochemical cell. Method 1000 includes steps 1002 and 1004. Step 1002 includes preparing a porous framework using an additive manufacturing process. The porous framework comprises a precursor material and is characterized by a three-dimensional framework geometry comprising one or more nano-sized features, micro-sized features or both. Step 1004 includes processing said framework structure via heat treatment under conditions to at least partially transform said framework into a structure having a nano- or micro-architected three-dimensional geometry. The structure comprising one or more active carbon allotrope materials and the structure comprises at least 50% by volume of said one or more active carbon allotrope materials. In an embodiment, step 1004 comprises generating the electrode for the electrochemical cell. In an embodiment, method 1000 comprises step 1006, which includes designing the three-dimensional framework geometry using a computer-aided design method.

Figure 37:
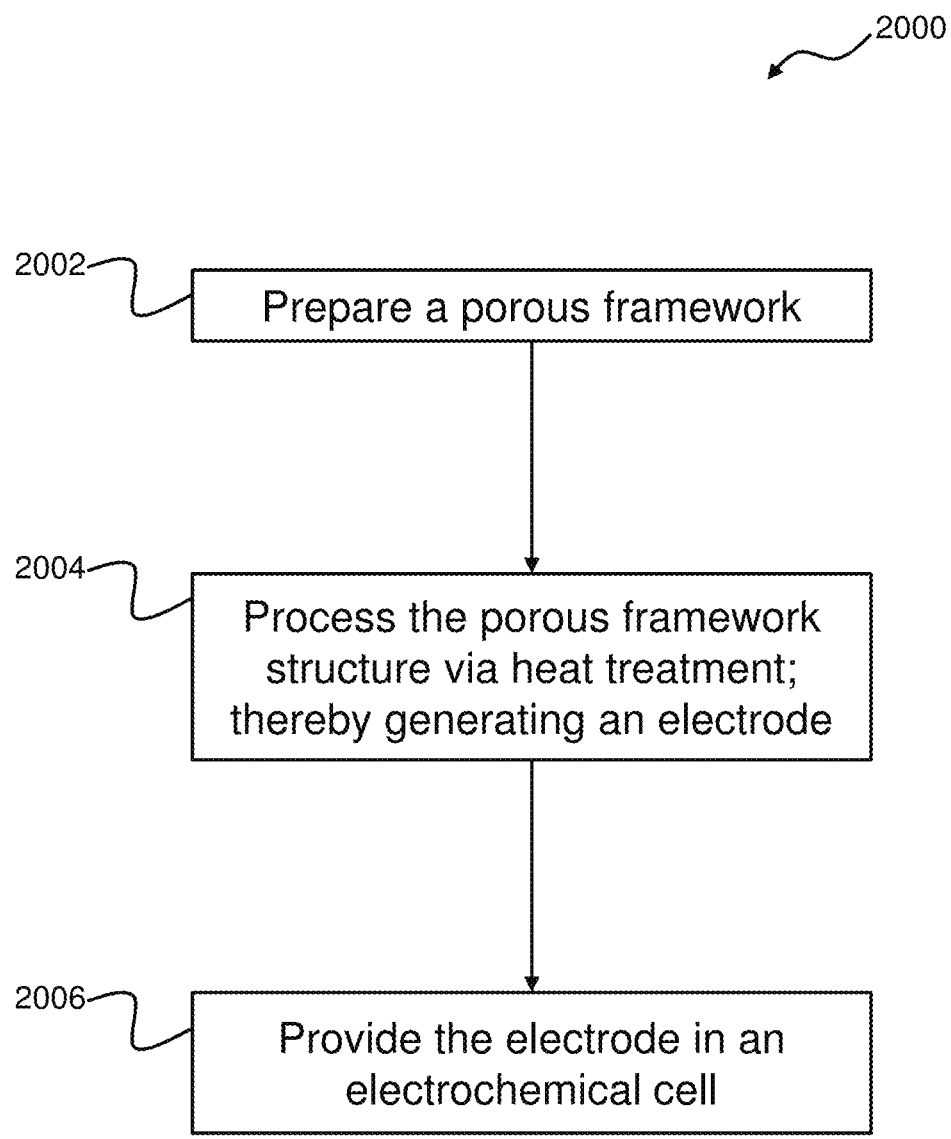
FIG. 37. A flowchart of a method for making an electrochemical cell, according to certain embodiments.
Figure 38A:
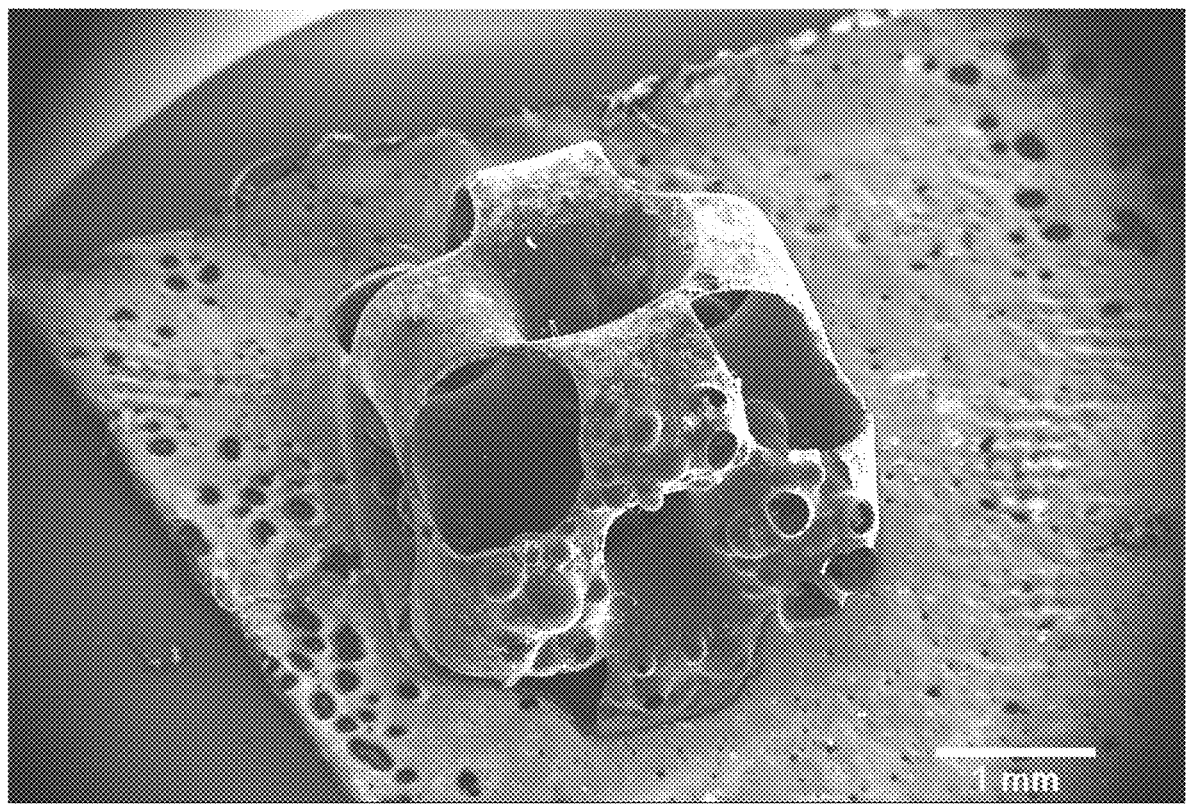
FIG. 38A and FIG. 38B. Images showing architected three-dimensional structures having node-free geometries, according to certain embodiments of the invention. Additional exemplary node-free geometries may be found in Abueidda, et al. ("Effective conductivities and elastic moduli of novel foams with triply periodic minimal surfaces", Mechanics of Materials, vol. 95, April 2016, pages 102-115), which is incorporated herein by reference.
Figure 38B:
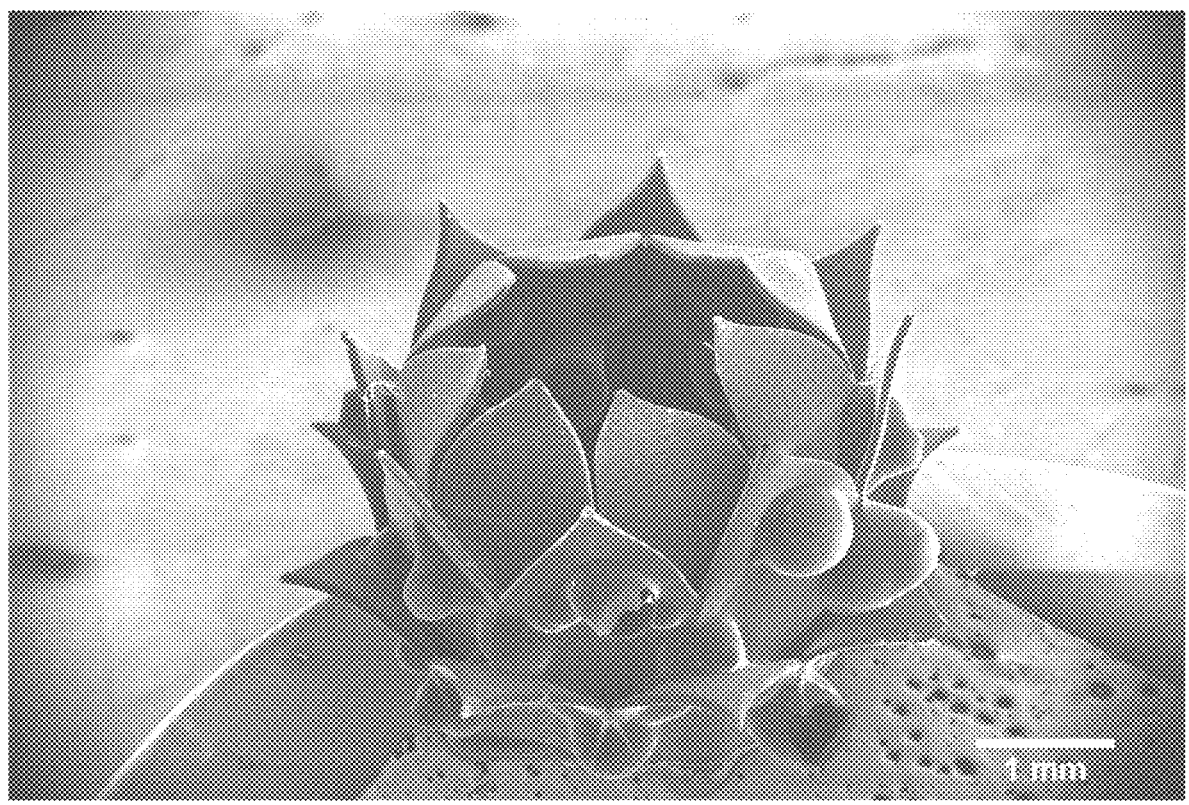

FIG. 37 is a flowchart of a method 2000 for making an electrochemical cell. Method 2000 includes steps 2002, 2004, and 2006. Step 2002 includes preparing a porous framework using an additive manufacturing process. The porous framework comprises a precursor material and is characterized by a three-dimensional framework geometry comprising one or more nano-sized features, micro-sized features or both. Step 2004 includes processing said framework structure via heat treatment under conditions to at least partially transform said framework into a structure having a nano- or micro-architected three-dimensional geometry. The structure comprises at least 50% by volume of said one or more active carbon allotrope materials. In an embodiment, step 2004, comprises generating an electrode. In an embodiment, step 2004 comprises generating an electrode. Step 2006 comprises providing the electrode in the electrochemical cell.

Figure 39:
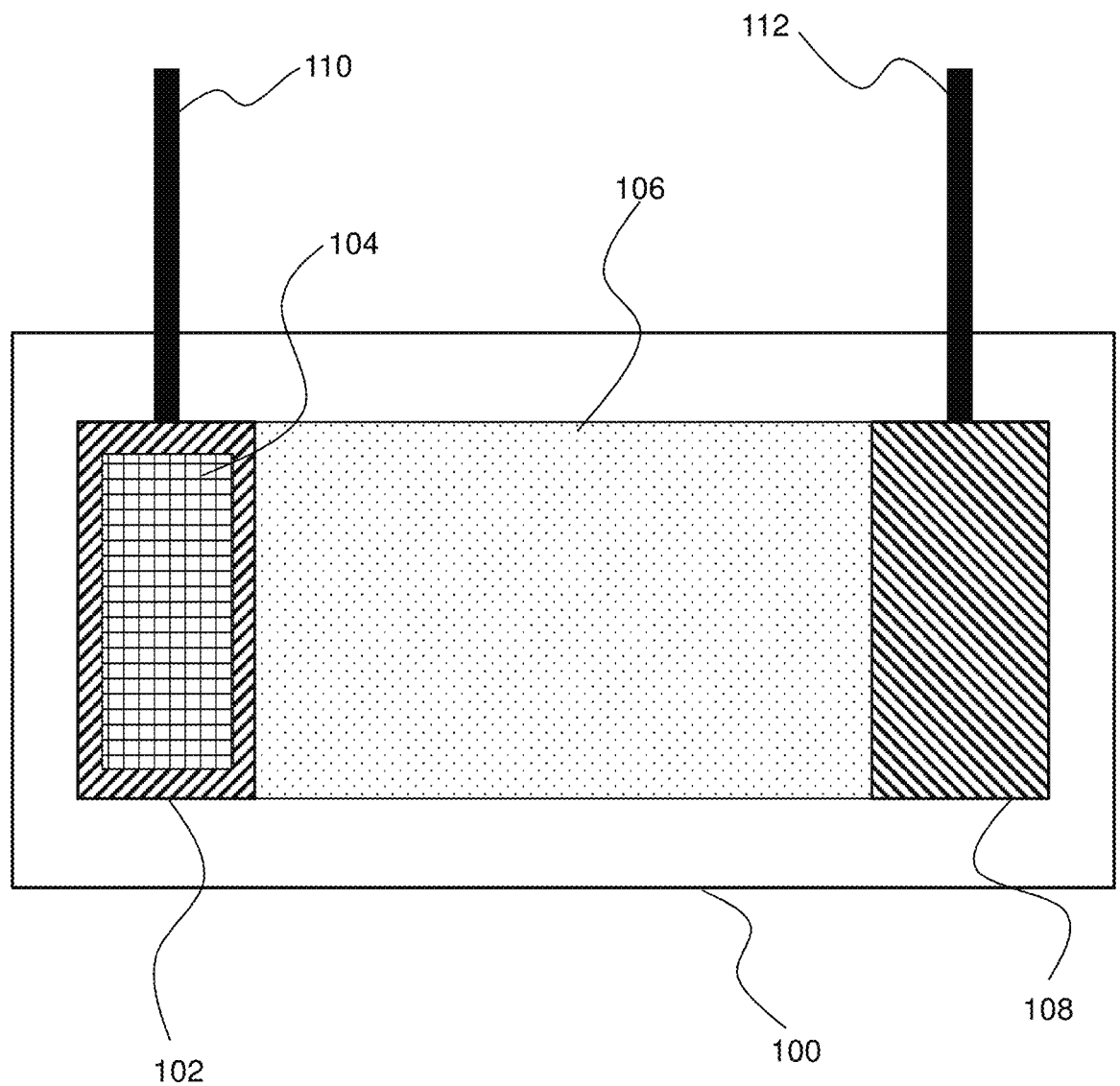
FIG. 39. A schematic showing an exemplary electrochemical cell, including an electrode comprising a structure having a nano- or micro-architected three-dimensional geometry, according to certain embodiments of the invention.

FIG. 39 is a schematic of an exemplary electrochemical cell 100, according to an embodiment. Electrochemical cell 100 comprises electrodes 102 and 108. Electrode 102 may be a negative electrode and electrode 108 may be a positive electrode, for example, or vice versa. Electrode 102 comprises a structure 104, where structure 104 has a nano- or micro-architected three-dimensional geometry, according to any embodiment(s) described herein. Electrochemical cell 100 further includes an electrolyte 106. Optionally, at least a portion of the pores of electrode 102 and/or of structure 104 are at least partially filled with electrolyte 106. In an embodiment, electrochemical cell 100 includes current collected 110 in electrical communication with electrode 102. In an embodiment, electrochemical cell 100 includes a current collector 112 in electrical communication with electrode 108. In an embodiment, electrode 108 also comprises a structure having a nano- or micro-architected three-dimensional geometry, according to any embodiment(s).

The invention can be further understood by the following non-limiting examples.

Example 1: Carbon by Design Through Atomic-Level Architecture

Overview: It has been a longstanding challenge to design and create materials with a combination of high strength, high deformability/ductility, large elastic limit and low density, as these properties may be mutually exclusive. Here, we have created pyrolytic carbon micropillars with a specific type of atomic-level architecture by controlling the precursor material and conditions of pyrolysis. Nanomechanical experiments demonstrated that the pyrolytic carbon micropillars exhibit a tensile strength of ~2.5 GPa and a compressive strength approaching theoretical limit of ~11.0 GPa, a substantial elastic limit of 20-30%, and a low density of 1.0-1.8 g/cm$^3$, corresponding to a specific strength of 8.07 GPa/g cm$^3$ which surpasses the property of all existing structural materials. Pyrolytic carbon micropillars with diameters below 2.3 μm exhibited a rubber-like behavior and sustained a large compressive strain of approximately 50% without catastrophic failure, while larger ones exhibited brittle fracture at a strain of ~20%. Large-scale atomistic simulations revealed that these excellent mechanical properties are enabled, at least in part, by the local deformation of 1 nm curled graphene fragments within the pyrolytic carbon microstructure, the interactions between neighboring fragments, and the presence of strong covalent bonds between the carbon atoms.

In modern advanced material design, the creation of high-performance materials that combine high strength, substantial deformability, a large elastic limit, and low density is a longstanding goal and challenge. Two pairs of apparent conflicts exist for nearly all structural materials: high strength versus high deformability/ductility and high strength versus low density. For example, metals and alloys are ductile and can sustain fracture strain beyond 10% due to accommodation of dislocation plasticity during deformation[1], but their yield strengths are usually limited on the order of ~100 MPa and their elastic limits are only around 2%. Ceramics have higher strength (up to several GPa), but their fracture strains are usually below 5% due to the absence of mobile lattice dislocations during deformation[1]. Metallic and ceramic materials generally have densities beyond 2.7 g/cm$^3$. Polymers[2] and porous materials (like foams[3], nanolattices[4], nanosponges[5]) are lightweight, and their densities are much lower than those of most metals and ceramics. These materials are significantly deformable and can typically sustain elastic strains beyond 50%[2-5], but their strengths are only on the order of ~10 MPa.

Numerous studies[6-13] have shown that mechanical properties (such as strength and ductility) of materials are significantly determined by their microstructures and intrinsic and extrinsic dimensions. Therefore, tailoring the microstructures or intrinsic and extrinsic dimensions is an effective way to alter the mechanical properties of materials. For some polycrystalline metals, reducing the grain size and incorporating nanotwinned microstructure[6,7] at the atomic level have increased their strengths from ~100 MPa to ~1 GPa. High-entropy alloys (HEAs), which contain five or more principal elements with nearly equal atomic concentrations, exhibit high yield strengths of 1-3 GPa and fracture strains of 10-30%[8] due to solid solution, which is controlled by the mixture of multiple principal elements at the lattice scales[8]. Single crystalline metals with extrinsic dimensions (i.e., sample size) below ~10 μm exhibit the so-called "smaller and stronger" size effect[9-11]; examples include Au nanowires/nanopillars with diameters of tens of nanometers that exhibit ultra-high tensile strengths of 5.6 GPa, close to the theoretical limits[10]. This ultra-high strength is associated with a pristine and nearly defect-free crystalline microstructure and/or dislocation source exhaustion[9] at nanoscale. For ceramics, recent studies[12] showed that micro-sized shape memory zirconia pillars with few crystal grains along the gauge section can withstand pseudo-elastic strains of approximately 7% by undergoing a martensitic phase transformation; the compressive strengths of these ceramic pillars were up to 1.5-2.5 GPa. For polymer, when strong and hard phases (in forms of nanofibers or nanoparticles) are introduced into polymer matrices, the resultant polymer-based composite typically have strengths up to ~0.5 GPa[13,14].

Carbon-family materials contain a large number of allotropes[15] due to the unique electronic structure of the carbon atom, which allows the formation of sp-, sp[2]- and sp[3]-hybridized bonds. The mechanical and physical properties of carbon materials can vary widely as a result of different bonding structures. As two representative carbon allotropes, graphene and carbon nanotubes with 100% sp[2] bonds have been reported to have ultra-high tensile strengths up to 100 GPa[16]. The mechanical properties of these two allotropes are extremely sensitive to defects such as vacancies, pentagon-heptagon pairs, and grain boundaries, which can significantly decrease their strength due to stress concentrations around the defects[16-20]. The small dimensions of individual graphene sheets and nanotubes render them impractical for structural applications at larger scales, but their three-dimensional (3D) assemblies exhibit superelastic behavior via buckling and bending of the basic building blocks and can be scaled up to the macroscopic level[21-24]. The porous microstructure of 3D graphene assemblies makes it possible for these architectured materials to be extremely lightweight, with low densities of 0.001-1.0 g/cm[3] and superior elastic limits up to 50%, but strengths as low as 10 MPa[21-23]. Recently, various pyrolytic carbon materials[25-28] have been synthesized via pyrolysis using polymeric precursors. Bulk pyrolytic carbon samples[26] prepared at 1000° C. had an optimal hardness of 4 GPa and a density of 1.1-1.4 g/cm[3]. Micro-sized glassy carbon[27] synthesized at a high temperature of 400-1000° C. and a high pressure of 10-25 GPa exhibited a compressive strength of 9 GPa and a density of 2.0-2.5 g/cm[3]. The pyrolytic carbon materials usually have a cleavage plane with a fracture strain below 3%[27]. Glassy carbon nanolattices[28,29] with characteristic strut sizes of approximately 200 nm and densities of 0.3-0.7 g/cm[3] have been fabricated via pyrolysis using photoresist-based microarchitectures made via two-photon lithography, achieving a compressive strength of approximately 300 MPa at a fracture strain below 10%. The microstructures of these pyrolytic carbon materials typically consist of curved carbon layers or fullerene-like fragments with dimensions of a few nanometers, leading to a strong dependence of their mechanical properties and performance on the initial precursors, the atomic-level microstructure after pyrolysis, and processing temperature and pressure[25,26]. These studies suggest that multiple properties (including density, strength and deformability) of materials could be simultaneously improved by designing and controlling the atomic-level architectures and reducing the characteristic dimensions. It also highlights both the promise and the challenges associated with the design and fabrication of high-performance materials that possess a combination of high strength, substantial ductility, large elastic limit, and low density.

Here, we disclose pyrolytic carbon micropillars with diameters of 0.7-12.7 μm through two-photon lithography and pyrolysis. Characterization based on transmission electron microscopy (TEM), Raman spectroscopy and electron energy loss spectroscopy (EELS) revealed that these micropillars comprise 1 nm-sized curled graphene fragments, an atomic-level architecture achieved by controlling the precursor material and conditions of pyrolysis. In situ nanomechanical testing showed that the pyrolytic carbon have ultra-large elastic limits of 20-30%, high tensile and compressive strengths of 2.5 and 11.0 GPa, low densities of 1.0-1.8 g/cm[3], and ultra-high specific strengths up to 8.07 GPa/g cm[3], and that samples with diameters below 2.3 μm can undergo substantial plastic deformation without failure even at applied strains in excess of 40%, exhibiting a rubber-like behavior. We incorporated the experimentally obtained microstructures into large-scale atomistic simulations to investigate the deformation mechanisms underlying the superior mechanical properties of the pyrolytic carbon pillars under uniaxial compression and tension.

Figure 1C:
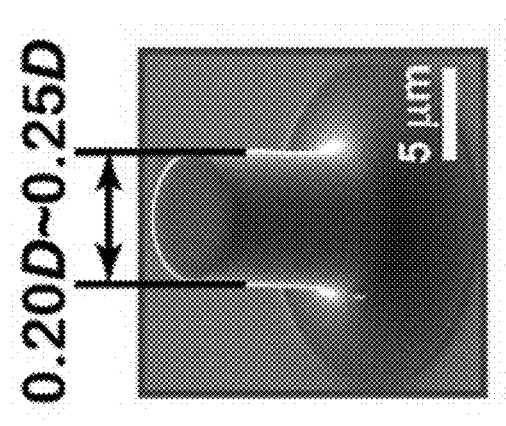
Figure 1B:
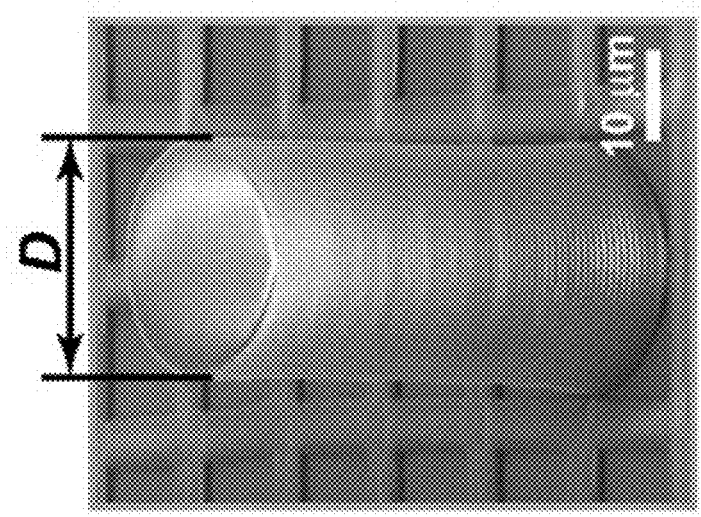

FIG. 1A shows a schematic of the fabrication process of cylindrical micropillars with diameters of 6-50 μm and heights of 12-100 μm, printed using two-photon lithography direct laser writing (TPL DLW) from IP-Dip, a commercial acrylate-based photoresist. During fabrication via TPL DLW, the sample geometry and dimension can be accurately controlled. The subsequent pyrolysis at 900° C. for 5 hours in vacuum leads to complete carbonization and 98% volume shrinkage of the polymeric samples[29]. The resulting pyrolytic carbon pillars have diameters ranging from 1.28 to 12.7 μm (20-25% of the dimension prior to pyrolysis) (FIGS. 1B-1C). A residual carbon ring visible on the silicon substrate represents the footprint of the original pillar and the constraint posed by the substrate during pyrolysis. Some samples were fabricated with caps to accommodate the grips for uniaxial tension experiments. More details on the synthesis are provided below in this Example.

Figure 1D:
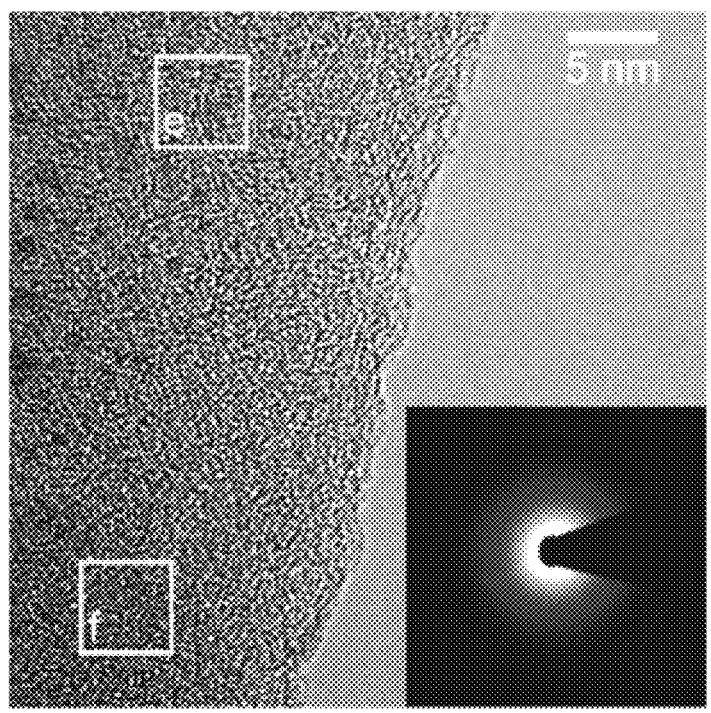
Figure 1E:
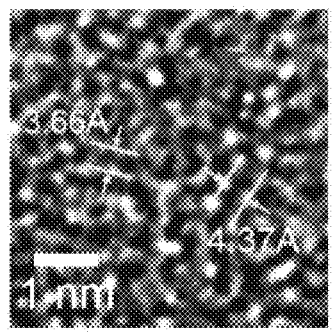
Figure 1F:
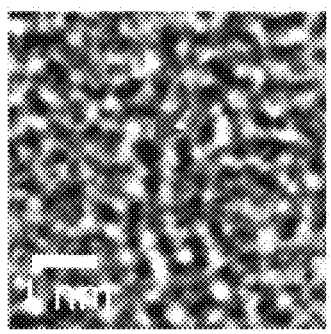
Figure 1G:
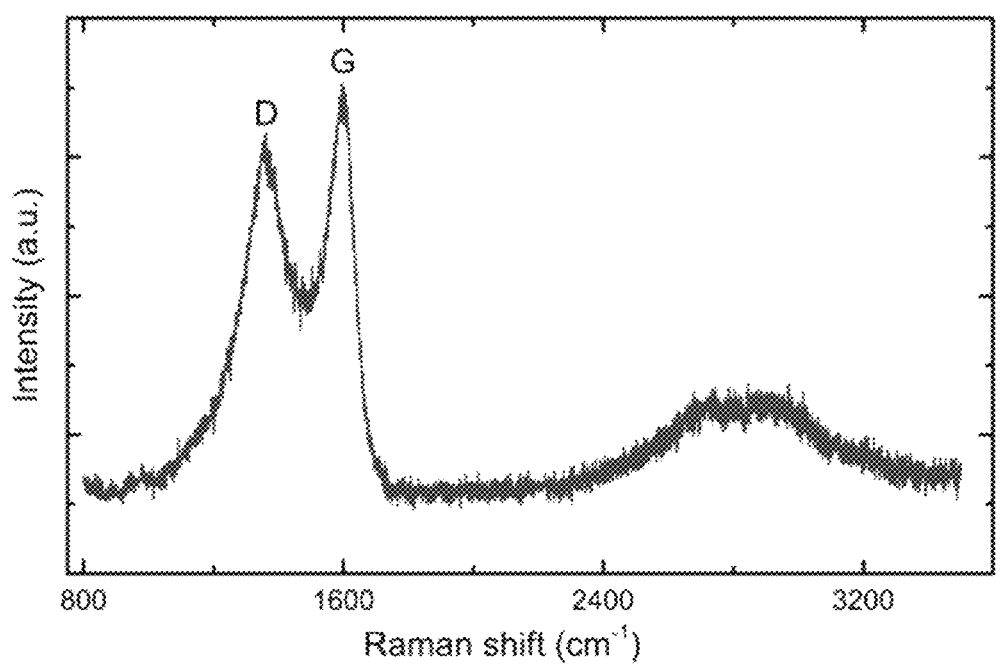
Figure 1H:
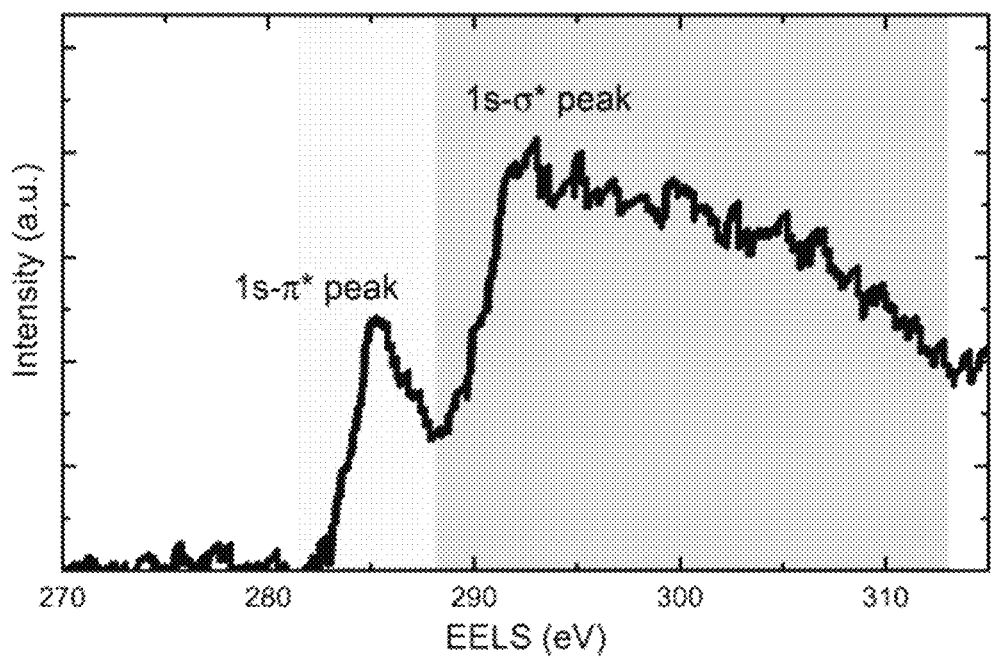

FIG. 1D contains a representative high-resolution TEM (HRTEM) image of the pyrolytic carbon pillar, with the selected area electron diffraction (SAED) pattern in the inset, revealing its amorphous microstructure. The magnified TEM images in FIGS. 1E-1F indicate the presence of numerous 1.0-1.5 nm-sized curled atomic fragments, which create sub-nanometer-sized voids (indicated by red arrows in FIGS. 1E-1F), distributed randomly throughout the pillar volume. Both the size of the carbon layer fragments and spacing between neighboring layers in our pyrolytic carbon samples are much smaller than those (about 4-6 nm and 1.67-1.99 nm, respectively) fabricated previously[26,27]. These microstructural features provide a useful foundation for estimating the density of pyrolytic carbon micropillars by augmenting a reported geometric model developed for non-graphitized glassy carbon[26]. In this geometric model, the density is dependent on the average size and curvature of the carbon layer and on the spacing between neighboring layers. Using this model, we determined the density of the pyrolytic carbon micropillars in this work to be 1.0-1.8 g/cm[3], which is close to that of low-density type-I glassy carbon[27,30]. The relevant method details are provided later in this Example. FIG. 1G shows the Raman spectrum of a representative pyrolytic carbon micropillar, which contains two prominent peaks at Raman shifts of 1359 cm[-1] and 1595 cm[-1] that correspond to the graphitic D and G peaks, respectively. The ratio $(I_D/I_G)$ of the integrated area under the D band to that under the G band allowed us to calculate the approximately characteristic crystallite size L of the curled carbon layer fragment[31] observed in the HRTEM images (FIGS. 1E-1F), as indicated by the following equation[31]:

$$L \approx \alpha \lambda_l^4 \left(\frac{I_D}{I_G}\right)^{-1} \qquad (1)$$

where α is a constant of $2.4 \times 10^{-10}$, and $\lambda_l$ is the wavelength (in units of nanometers) of the laser used in the Raman experiment. Using this equation, the characteristic crystallite size of the carbon layer fragment was calculated to be 2.4 nm, which is basically consistent with the size of 1.0-1.5 nm determined from our HRTEM observations. It should be noted that for evaluation of the crystallite size in the carbon layer, HRTEM observations have higher accuracy than the approximate prediction from Eq. (1) based on Raman spectrum. In the subsequent calculations, the characteristic crystallite size of the curled carbon layer were determined to be 1.0-1.5 nm, as derived from the HRTEM observations. EELS, as shown in FIG. 1H, revealed the presence of a 1 s–σ* peak at 292 eV and a 1 s–π* peak at 285 eV, which are consistent with the σ and π bonds characteristic of $sp^2$-hybridized carbon. The fraction of $sp^2$ bonds was estimated by using the two-window method[32] and adopting all-$sp^2$ raw glassy carbon as a reference material[27]. The fraction of $sp^2$ bonds is as high as 96.5%, which indicates the dominance of $sp^2$ hybridization in the pyrolytic carbon micropillars. This result is consistent with previous experimental observations that pyrolytic carbon materials treated at high temperature contain mainly disordered $sp^2$ bonds[27] because $sp^3$-hybridized amorphous carbon is unstable above ~700° C.[30]. This result also implies that these bonds correspond to layers of graphene. More details on the estimations and analyses based on the Raman spectra and EELS data are supplied in the description of method later in this Example. The above microstructural characterization revealed that our pyrolytic carbon is an assembly of nanometer-sized curled graphene fragments interspersed with sub-nanometer-sized voids. Overall, this specific and delicate microstructure was designed and created by selecting the precursor materials, and controlling the dimensions/geometry of the printed samples and the pyrolysis conditions.

Figure 2A:
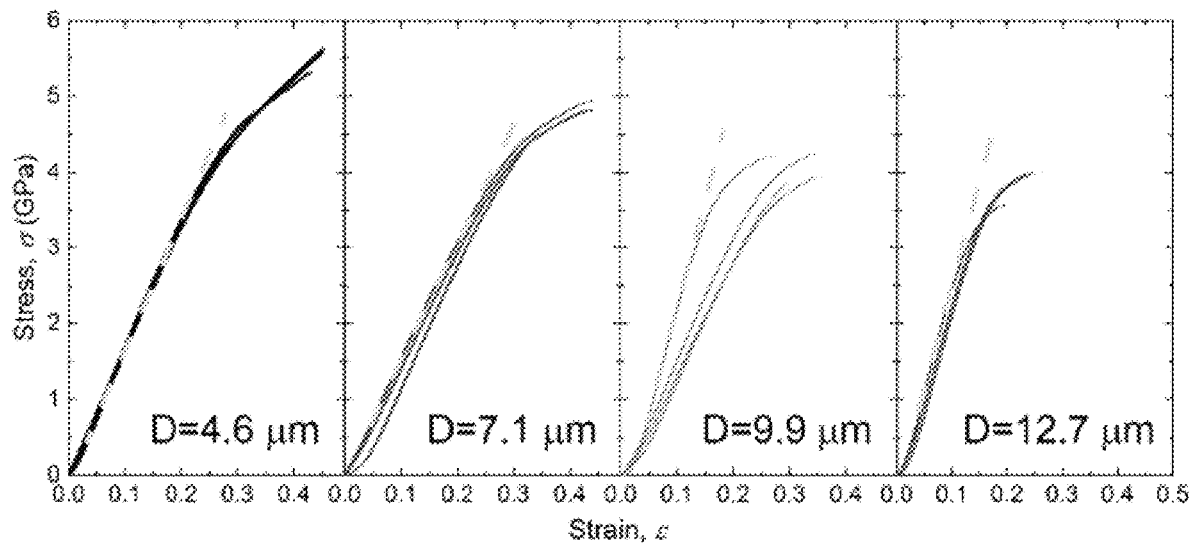
Figure 2B:
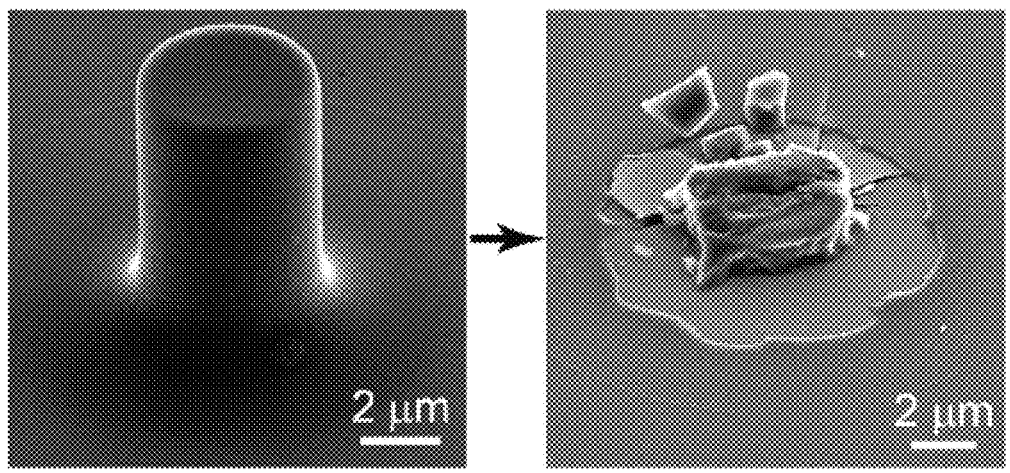

To characterize the mechanical properties of the pyrolytic carbon micropillars, we carried out a series of nanomechanical experiments. The ex situ uniaxial compression experiments were conducted in a nanoindenter equipped with a 120 μm-diameter flat punch indenter tip. FIG. 2A shows all compressive stress-strain data sets for micropillars with diameters from 4.6 μm to 12.7 μm. It appears that all the micropillars deformed smoothly until failure, first deforming elastically up to approximately 20-30% strain, then yielding and plastically deforming over an additional ~8-10% strain before fracture. Nonlinear behaviors occurred under the first ~1-3% strain due to slight misalignment at the top surface of the micropillars. We estimated the Young's modulus to be 16-26 GPa based on fitting the linear elastic portions of the stress-strain curves in FIG. 2A. The failure strength of these micropillars increased from 3.8 GPa to 5.6 GPa with decreasing diameter. FIG. 2B shows SEM images of a typical micropillar with a diameter of 7.17 μm before and after deformation, demonstrating that it broke into small pieces via brittle fracture.

Figure 2C:
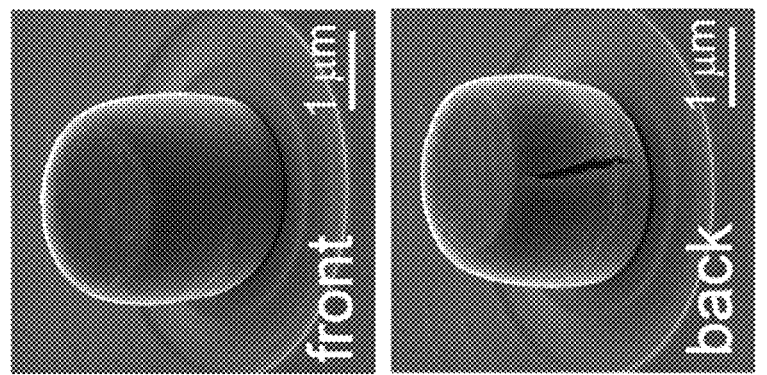
Figure 2C:
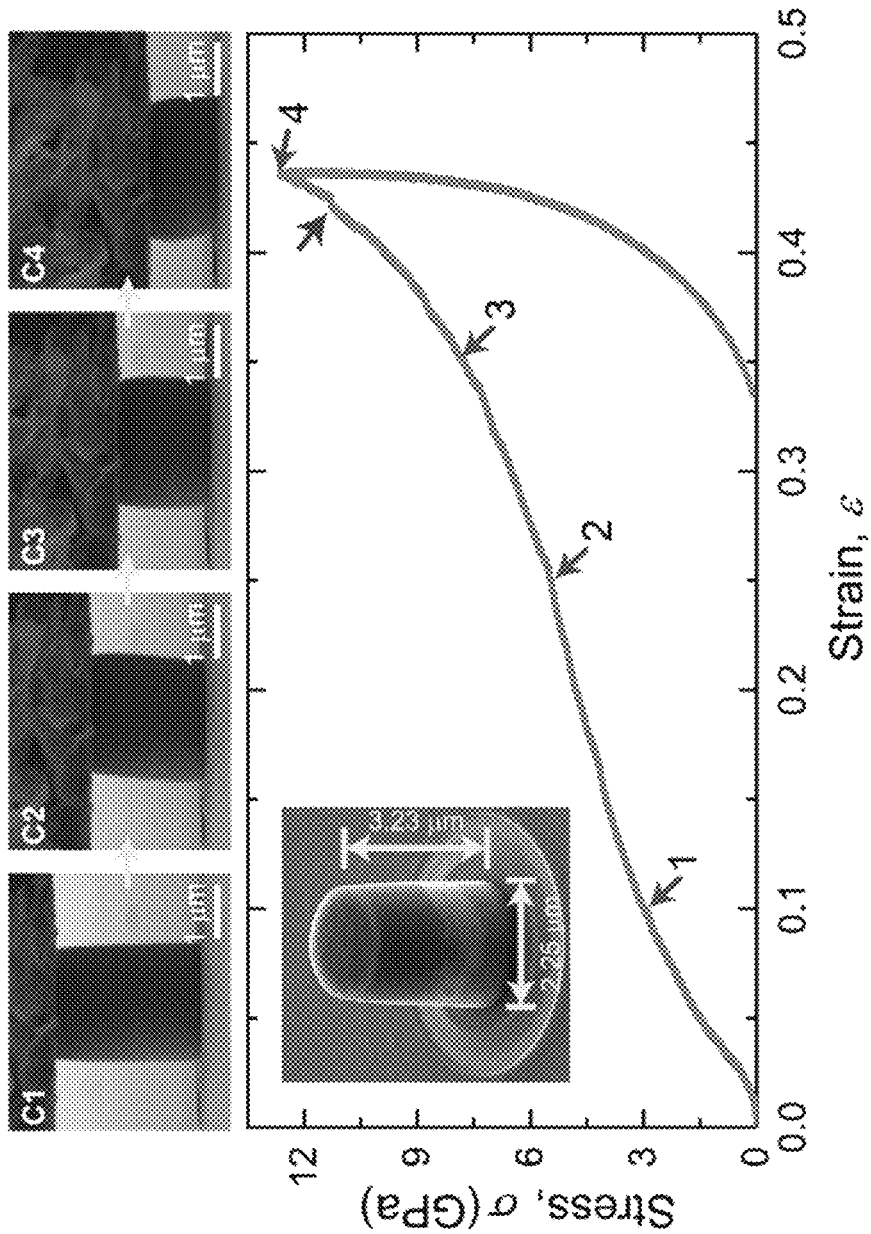
Figure 41:
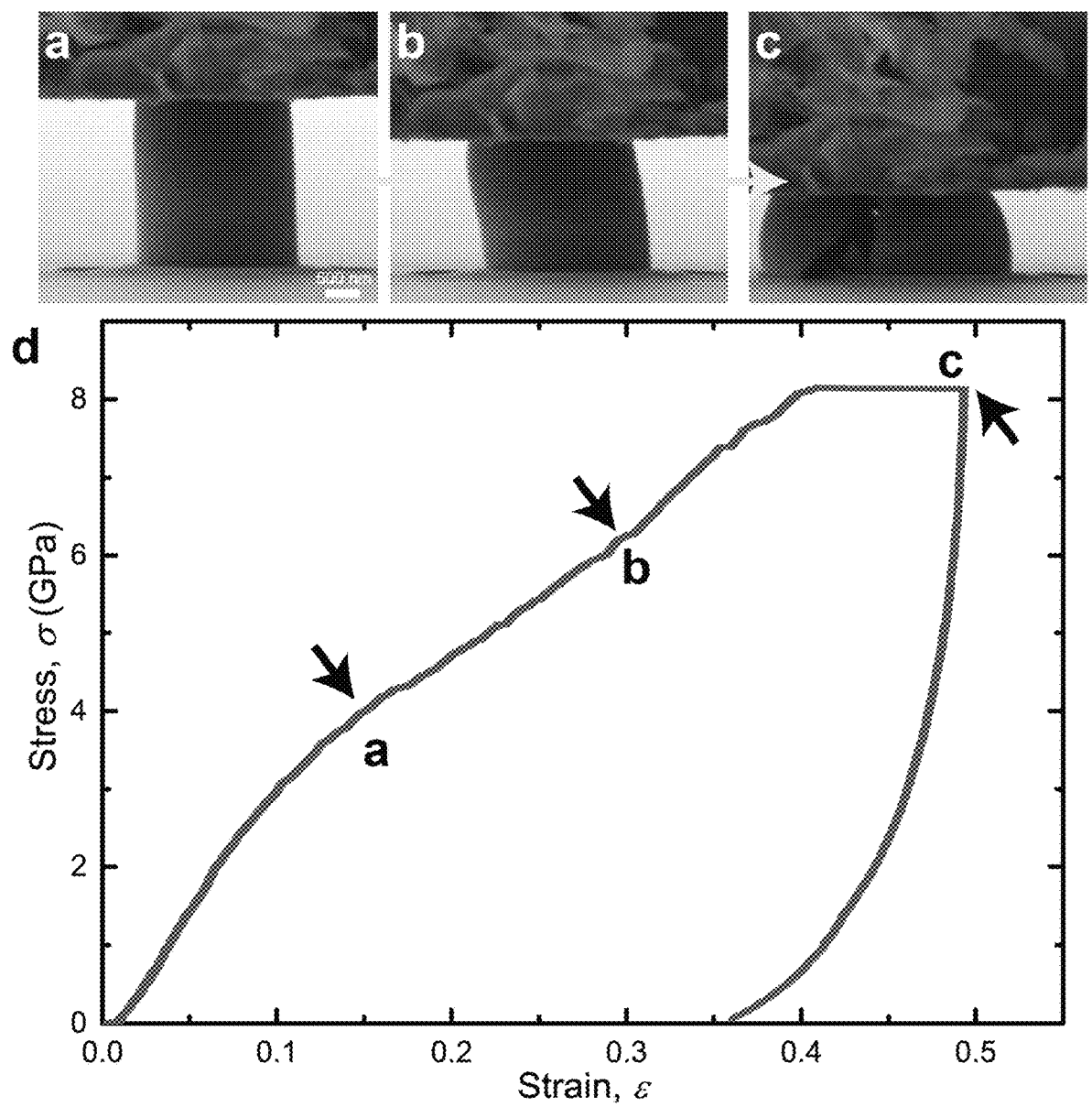
FIG. 41. In situ compression experiment of pyrolytic micropillar without the residual ring. Panels (a), (b) and (c): Snapshots of in situ compressive test on the pyrolytic carbon pillar without the residual ring. In (c), a splitting crack nucleated and rapidly propagated under high compressive stress, leading to the catastrophic fracture of the micropillar. Panel (d): Corresponding compressive stress-strain curve.
Figure 42:
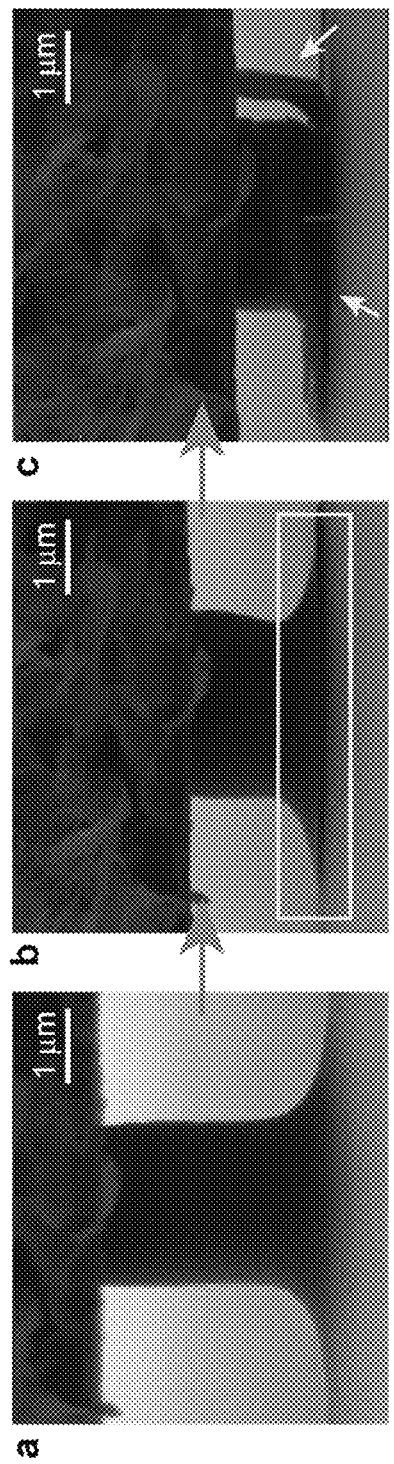
FIG. 42. Influence of residual carbon rings on compression of pyrolytic carbon micropillars. Panels (a), (b), and (c): Snapshots of in situ compressive test on the pyrolytic carbon pillar with the residual ring. Panel (d): Corresponding compressive stress-strain curve. The slight burst marked by "b" is corresponding to the bulging of the edge of the ring due to high stress concentration. The large strain burst marked by "c" represents the cleavage of the pillar as well as the peeling up of the ring.
Figure 42:
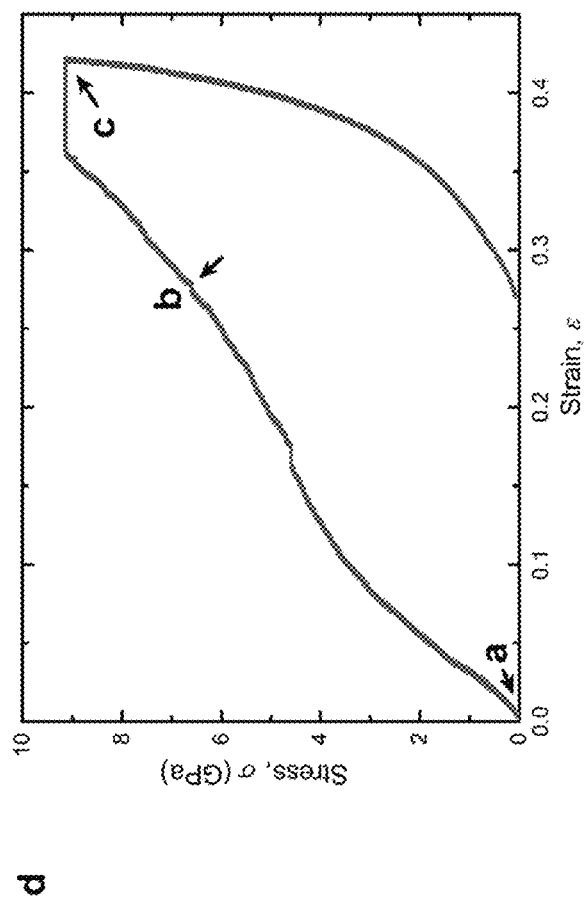

We also carried out similar and in situ compression experiments on micropillars with diameters of ~2 μm and smaller. The in situ compression experiments were conducted in a custom-made in situ nanomechanical instrument (SEMentor), which allows the precise control of deformation with simultaneous video capture[33]. FIG. 2C shows the compressive stress-strain response of a 2.25 μm-diameter micropillar, which is characterized by a linear elastic regime up to ~10% strain, followed by an extensive plateau-like plastic region up to ~25% strain, and a final stage in which the stress rapidly increased from 5.48 to 12.63 GPa over a strain increase of ~18%. This stress-strain curve is similar to that of rubber. After unloading from the maximum stress of 12.63 GPa, the micropillar partially recovered upon the release of approximately 10% elastic strain. FIG. 2C depicts a sequence of snapshots of this sample during the experiment, with the numbered frames corresponding to the same numbered red arrows in the data. We observed that the micropillar shortened and thickened gradually, without localization or catastrophic failure until the maximum applied strain of 43.6%. (In situ compression of pyrolytic carbon micropillar with diameter of 2.25 μm is performed. During compression, the micropillar shortens and thickens gradually with increasing of compressive strain. A slight tilt sometimes occurs during compression. After unloading, the micropillar has an elastic recovery of about 10% strain.) SEM images obtained from front and back views of the pillar revealed a vertically aligned splitting microcrack, which likely nucleated under a large applied compressive stress and led to a slight strain burst, indicated by the blue arrow in the stress-strain data (FIG. 2C). In this Example 1, the compressive strength of such samples corresponds to the stress at the first burst. FIG. 41 shows the detailed in situ deformation process of another micropillar with a diameter of 2.26 μm under compression and captures the nucleation and propagation of the splitting microcrack. The corresponding stress-strain data in FIG. 41, panel (d), show similar features to the plot in FIG. 2C. A clear difference between these two data sets is that a large strain burst is visible in FIG. 41, panel (d), which may be caused by the fast propagation of microcracks. A similar deformation and failure signature is observed during the compression of nearly all the 2 μm-diameter micropillars. To eliminate the possible influence of the residual carbon ring (FIG. 2B), we focus ion beam (FIB) milling to remove the ring from the samples (see FIG. 2C and FIG. 41, panel (d), before compression). FIG. 42 the compressive deformation of a 1.86-μm-diameter micropillar that retained the residual carbon ring, which bulged and detached from the substrate during compression and led to a substantial strain burst at a strain of ~36%, as shown in FIG. 42, panel (d). The maximum attained stresses in FIG. 42, panel (d), are comparable to those in FIG. 2C and FIG. 41, panel (d), which suggests a marginal contribution of the residual carbon ring to the strength.

Figure 2D:
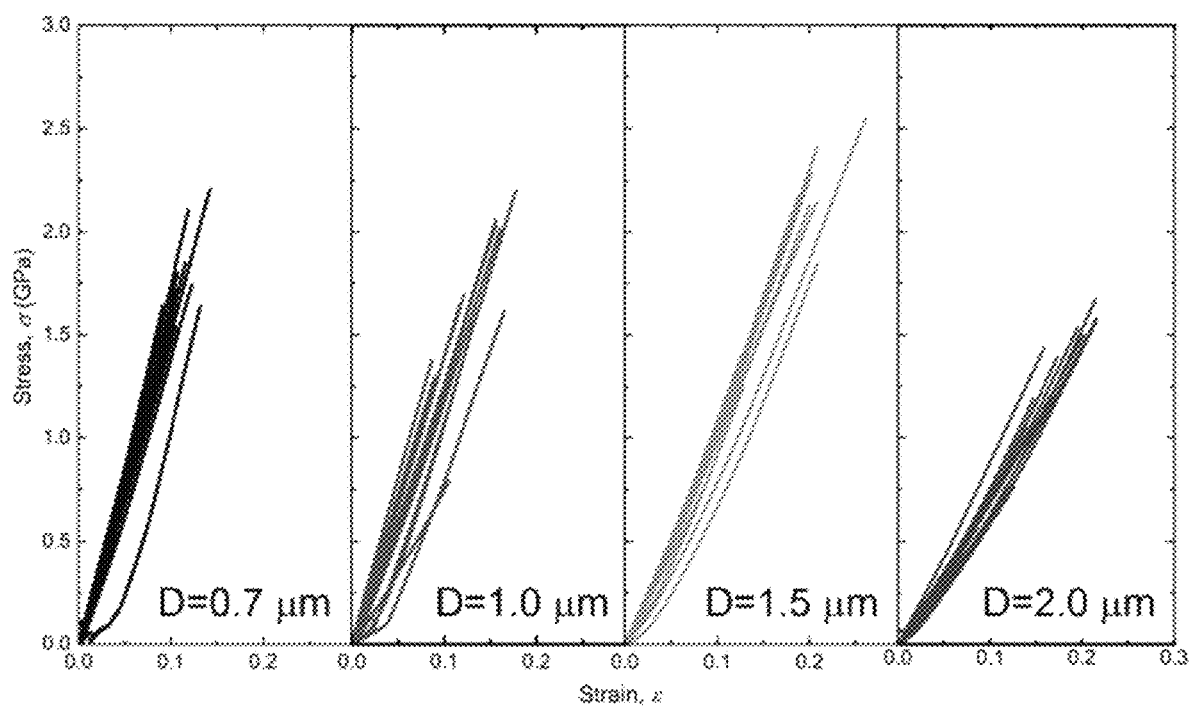

Uniaxial tension experiments on dog-bone-shaped specimens fabricated using the same procedure were conducted in situ, inside an SEMentor, which enables tensile testing that cannot be accomplished in a regular nanoindenter[33]. FIG. 2D summarizes the tensile stress-strain data for samples with diameters of 0.7-2.0 μm. We observed that all the samples failed after linear elastic loading to an elongation of 10-25% via brittle fracture. (In situ tension of pyrolytic carbon micropillar with diameter of 1.5 μm is performed. The micropillar is stretched to fail with a smooth fracture surface; the tensile fracture strain is up to about 26%.) A typical smooth fracture surface is shown in FIG. 2E. A statistical distribution of the tensile strengths of all tested pyrolytic carbon samples is shown in FIG. 2F and fits a two-parameter Weibull distribution, $$f(\sigma_y) = \frac{m}{\sigma_0}\left(\frac{\sigma_y}{\sigma_0}\right)^{m-1} e^{-\left(\frac{\sigma_y}{\sigma_0}\right)^m},$$

where $\sigma_0$ and m are material parameters. This distribution yields a characteristic strength $\sigma_0$ of 1.78 GPa and a low Weibull modulus m of 3.42, which indicates high variability in the failure strength. This high variability in the failure strength of pyrolytic carbon samples suggests that their failure likely originates from internal flaws.

Figure 3A:
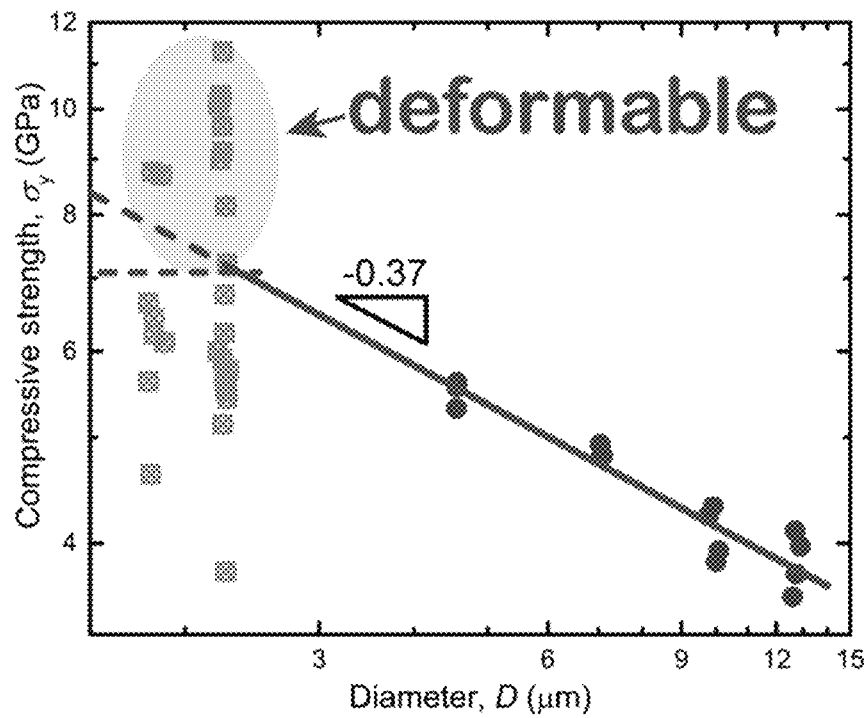
FIGS. 3A-3B. Change in strength with diameter and the ultra-large elastic limit of pyrolytic carbon micropillars.
Figure 3B:
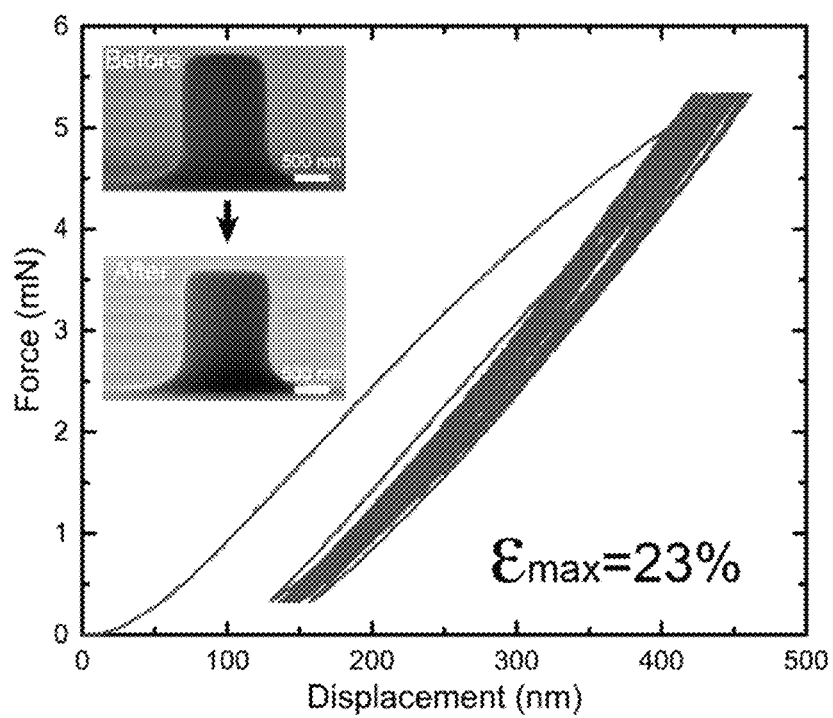

FIG. 3A presents all experimental data obtained from the compression experiments, where the strength is defined as the compressive fracture stress. This plot reveals that for samples with diameters larger than 2.3 μm, the compressive strength $\sigma_y$ increases with decreasing diameter D according to a power law, $\sigma_y \sim D^{-0.37}$ (FIG. 3A). This scaling law agrees well with the theoretical prediction of $\sigma_y \sim D^{-0.40}$, which was derived from the asymptotic analysis of a fracture mechanics-based model[34] describing the compressive failure of quasi-brittle columns with characteristic diameter D. In this model, the columns are found to fail via the propagation of a splitting crack with an initial length h, similar to the experimental observations (e.g., FIG. 2C and FIG. 41). This model also offers an expression for the theoretical limit, $\sigma_{th}$, of the compressive strength[34]:

$$\sigma_{th} \approx 2.76 \left( \frac{E^3 \Gamma^2}{h^2} \right)^{1/5} \quad (2)$$

where E is the Young's modulus, and $\Gamma$ is the fracture energy. Using the modulus E=19.5 GPa (the average modulus obtained from the compression experiments on all samples) and the fracture energy of glassy carbon, $\Gamma$=29.9-61.9 J/m$^2$, reported in Ref. 35, we used Eq. 2 to calculate a theoretical limit range of $\sigma_{th}$=4.0-13.5 GPa for the initial length of the splitting crack, h=100 nm-1 µm. This predicted range is similar to the experimentally acquired compressive strengths of 3.8-11.3 GPa (FIG. 3A), which implies that the strength of pyrolytic carbon pillars with diameters less than 2.3 µm approaches the theoretical limit. In the highlighted region above the average strength (indicated by a blue dashed line in FIG. 3A), the micropillars can sustain an ultra-high compressive stress of 7.2-11.3 GPa and a high compressive strain in excess of 40%. The significant fluctuations in the compressive strength of the micropillars with D<2.3 µm mainly arise from the variation in the length of the initial splitting microcrack h. The compressive strengths of the micropillars with D<2.3 µm are, on average, higher by a factor of 3.5 than the corresponding tensile strengths of 0.8-2.5 GPa. This tension-compression asymmetry is consistent with the theoretical prediction of an asymmetry factor of 2.5-4.4 that arises in high-strength, covalently bonded isotropic materials, as determined from a recent ellipse fracture criterion[36]. The compression and tension experiments revealed that the pyrolytic carbon micropillars with D<2.3 µm exhibit high deformability, i.e., >40% compressive strain and ~20% tensile strain prior to failure. The cyclic compression experiments on these samples exhibited nearly full recovery after each cycle beyond the first one. FIG. 3B shows a 20-cycle force-displacement data set of a 1.28 µm-diameter micropillar with a maximum compressive strain of 23%. These data, in combination with the pre-/post-deformation SEM images shown in the insets of FIG. 3B, indicate that after 20 cycles of compression to 23% strain, the micropillar recovered 95% of its original height.

Figure 4A:
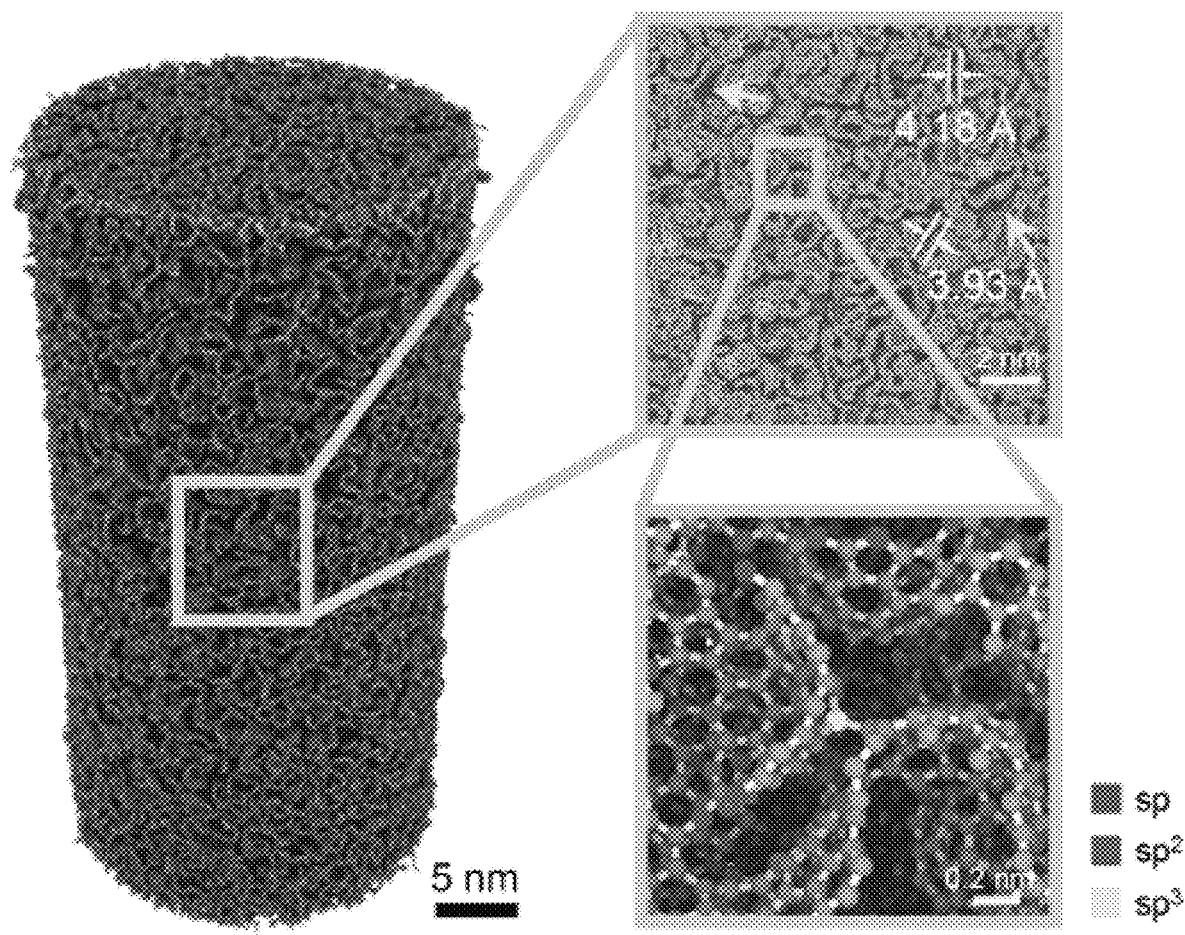
Figure 4C:
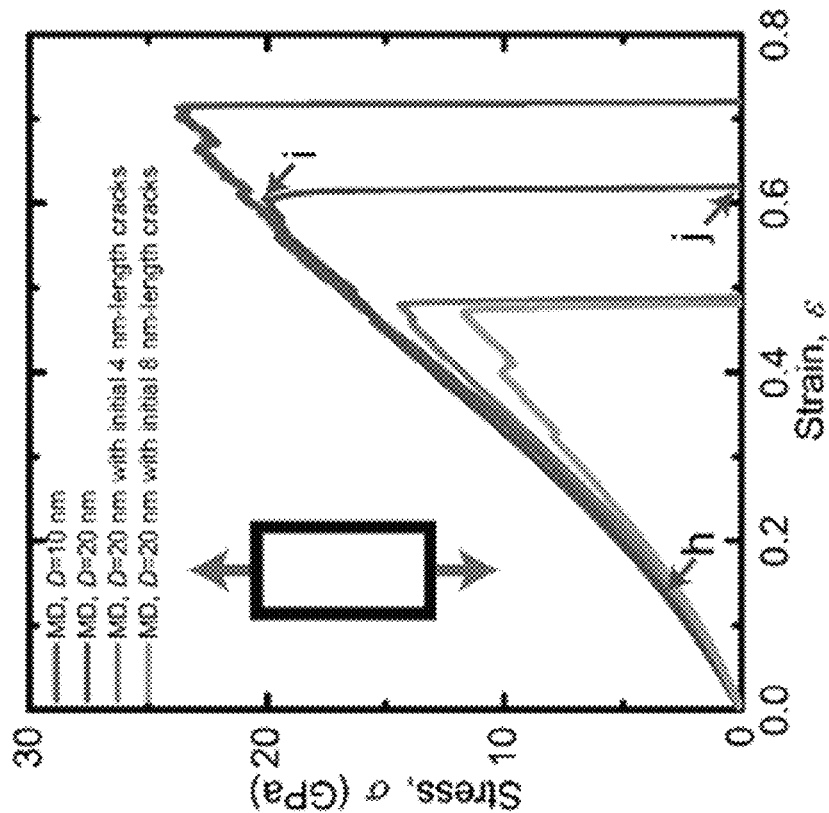
Figure 4B:
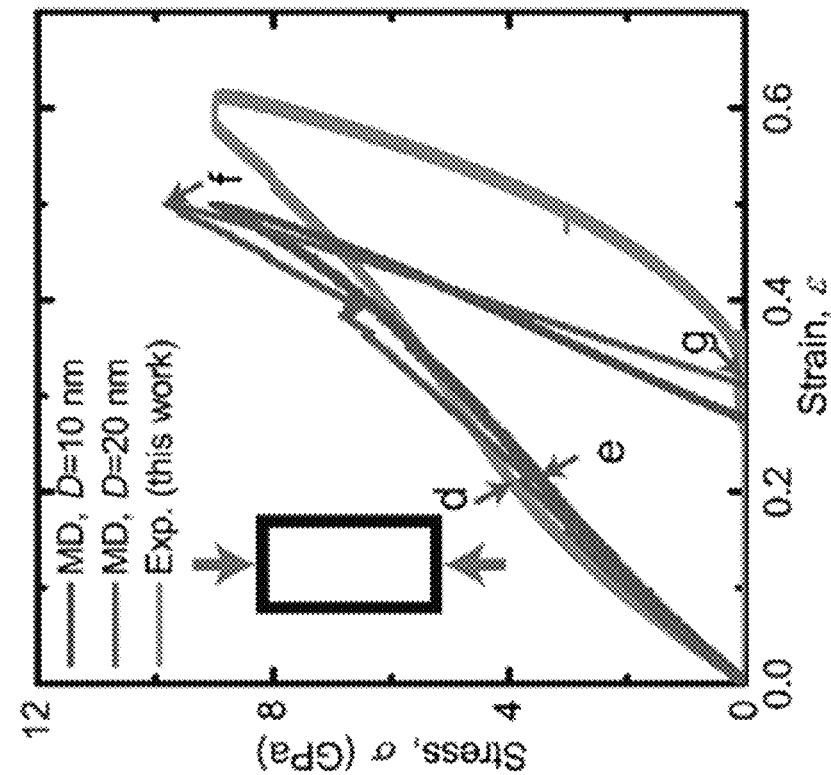
Figure 43:
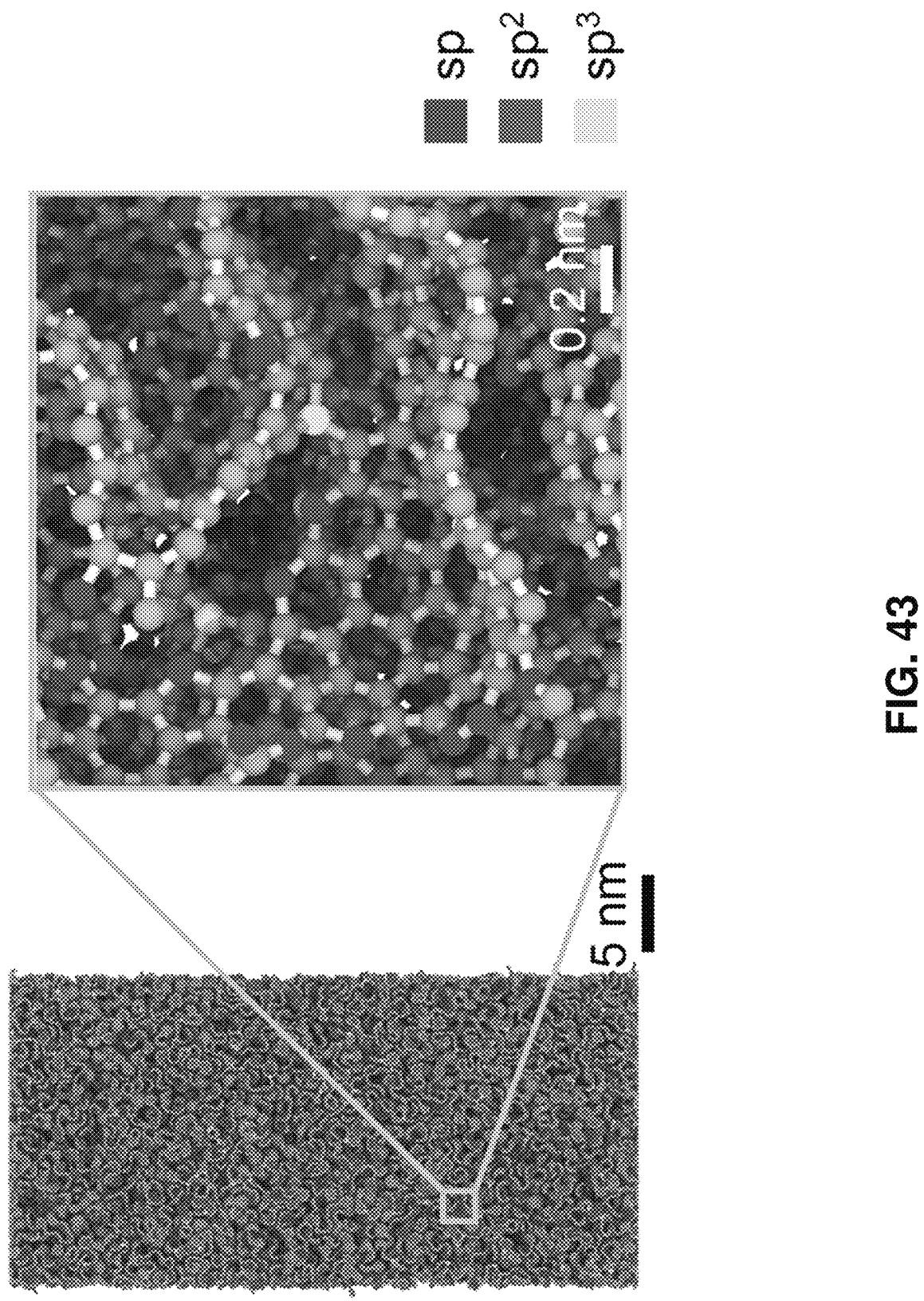
FIG. 43. Bonding structures of pyrolytic carbon pillars used for atomistic simulations. The $sp^2$ bonds are much more ubiquitous than sp and $sp^3$ bonds. The sp bonds are mainly localized at the edges of the curved graphene layers; the $sp^3$ bonds generally connect neighboring graphene layers to one another or form at the high-energy curved surface of graphene layers.

To reveal the underlying mechanisms that enable the observed large deformability and ultra-high strength of the small-scale pyrolytic carbon, we performed large-scale molecular dynamics (MD) simulations of the uniaxial compression and tension of pyrolytic carbon pillars with diameters of 10-20 nm and a constant aspect ratio of 2 via LAMMPS[37]. During the simulations, nanopillars were compressed or stretched along the axial direction with a constant strain rate of 5×10$^8$ s$^{-1}$ and a constant temperature of 300 K. Throughout the simulations, we used the adaptive intermolecular reactive empirical bond order force field[38] to describe the interatomic interactions. This force field is capable of capturing the formation and breakage of carbon bonds[38]. A complete description of the atomistic simulations is presented in Methods. The simulated samples consist of many ~1 nm-sized curled graphene layer fragments and possess a density of 1.4 g/cm$^3$, which is consistent with the TEM observations of our experimental samples, as illustrated in FIG. 4A. These fragments were connected by covalent bonding or van der Waals interactions. The magnified image in FIG. 4A shows that the spacing between neighboring graphene fragments is approximately 0.4 nm and that several sub-nanometer-sized voids are present adjacent to them, as in the HRTEM images in FIGS. 1D-1F. The hybridization of carbon atoms in graphene is typically such that the sp bonds are mainly concentrated within the edges of graphene layers, and the sp$^3$ bonds generally connect the neighboring graphene layers to each other or form at their high-energy curved surfaces (FIG. 4A). In certain simulated samples, the fraction of sp$^2$ bonds is at least one order of magnitude higher than the fractions of sp and sp$^3$ (see FIG. 43) bonds, indicating the dominance of sp$^2$ bonds, which is consistent with the above analyses from EELS. FIGS. 4B-4C present the compressive and tensile stress-strain response determined from the MD simulations and reveal similar trends and stresses to those in the experimental data. This result partially confirms the similarity of the microstructure and densities of the simulated and experimental samples. FIGS. 4D-4G depict several snapshots of the cross-section of a simulated deformed sample at different compressive strains. In the initial elastic stage, the curled graphene layers approached each other, and some bent significantly (FIG. 4D). As the applied compressive strain increased, several graphene layers slipped relative to the neighboring ones, which led to the abrupt fracture of the graphene layers under shear (FIGS. 4D-4E). Such discrete failure events gave rise to stress fluctuations in the mechanical response at a strain of 21.5%, as shown in FIG. 4B. At a compressive strain of 50%, the sub-nanometer-sized voids collapsed and caused densification of the nanopillars. Slight tilting occurred in the nanopillar due to the interlayer slipping and shear of neighboring graphene layers (FIG. 4F). During unloading, the nanopillar exhibited recovery associated with the release of the stored elastic strain energy; the distances between graphene layers increased, and the sub-nanometer-sized voids partially reopened (FIG. 4G). The recovered strain is 19%, which is comparable to the experimental results (FIG. 4B). (Additionally, atom istic simulation of uniaxial compression on pyrolytic carbon nanopillars with diameter of 20 nm is performed. In the initial compressive stage, the curled graphene layers approach each other, and some graphene layers bend significantly. As the compressive strain increases, a few graphene layers slip relative to the neighboring layers, leading to the abrupt fracture of the graphene layers under shear. When the compressive strain is 50%, the sub-nanometer-sized voids tend to close, resulting in the densification of the pillars. Slight tilting occurs in the nanopillar due to the interlayer slipping and shear of neighboring graphene layers. During unloading, the nanopillar exhibits a certain elastic recovery. The distances between graphene layers increases and the sub-nanometer-sized voids partially reopen.)

Figure 44A:
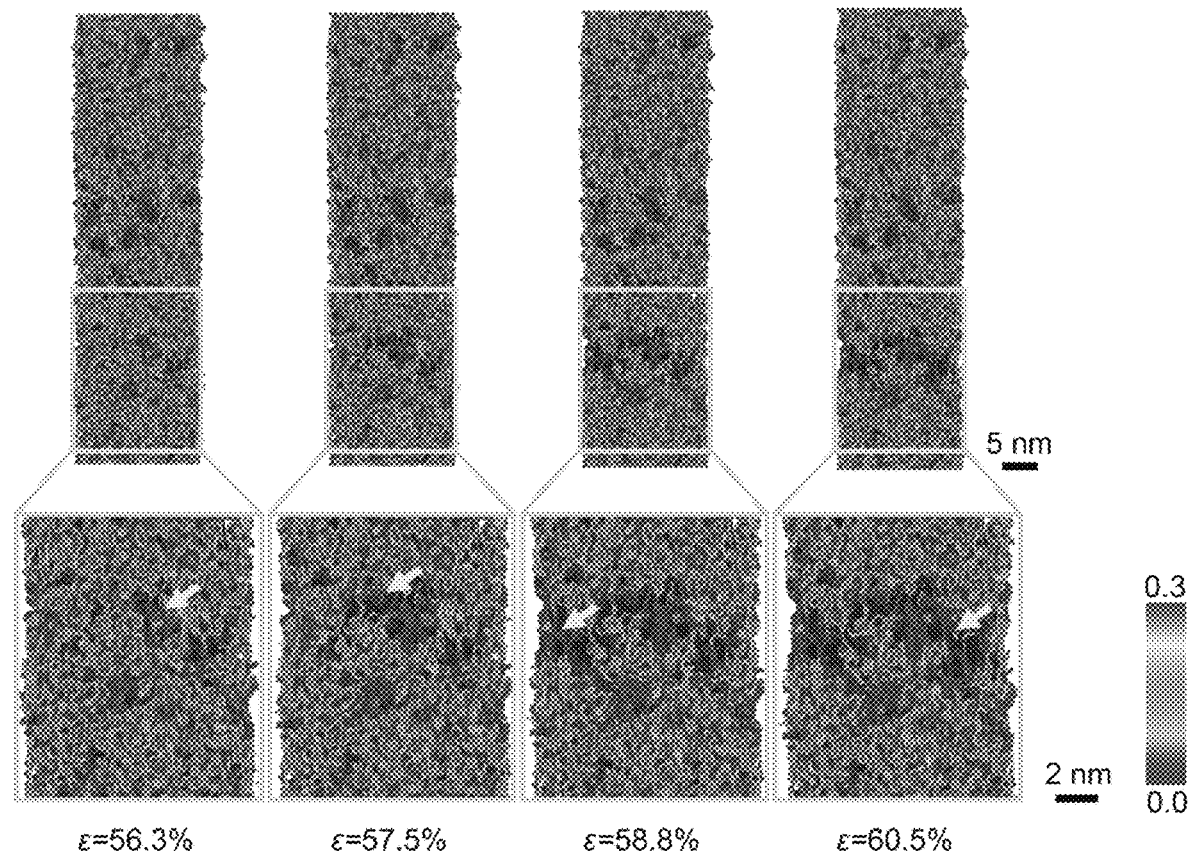
FIGS. 44A and 44B. Fracture mechanisms of pyrolytic carbon nanopillars under uniaxial tension.
Figure 44B:
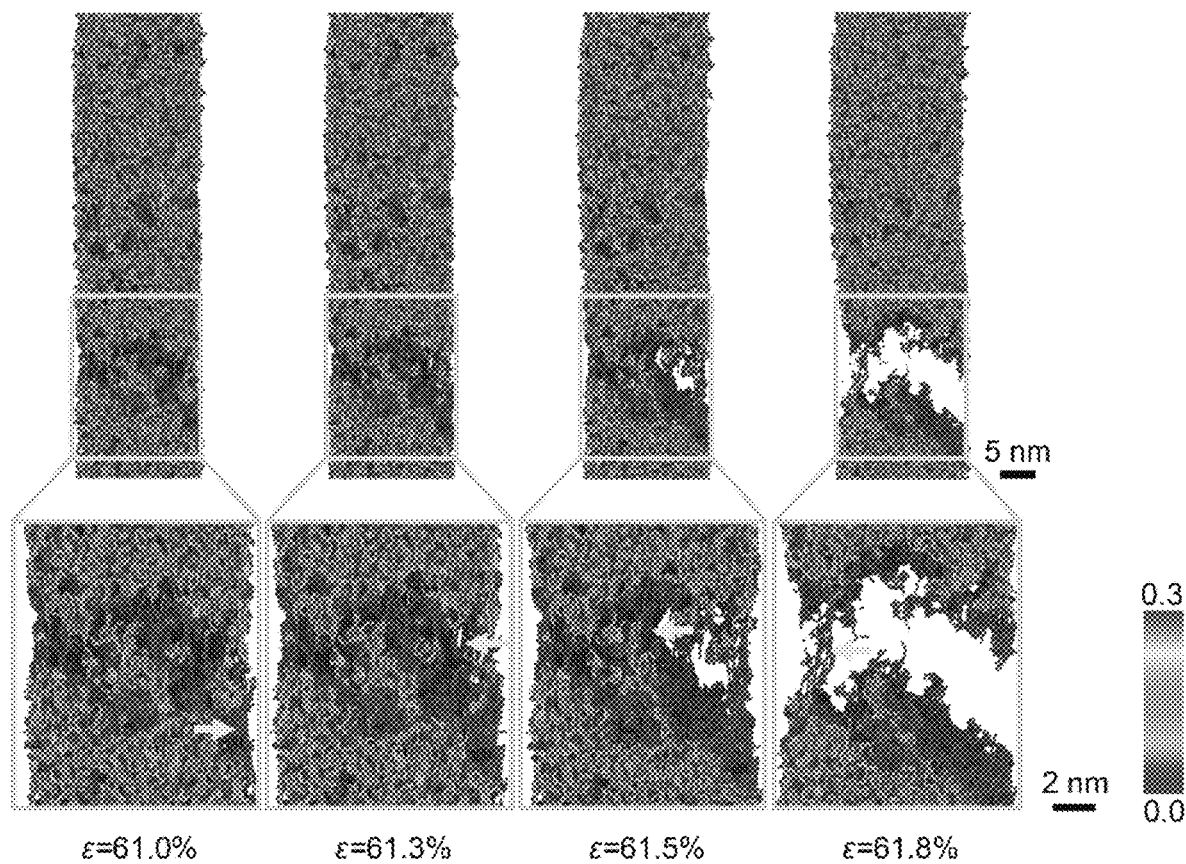
Figure 45:
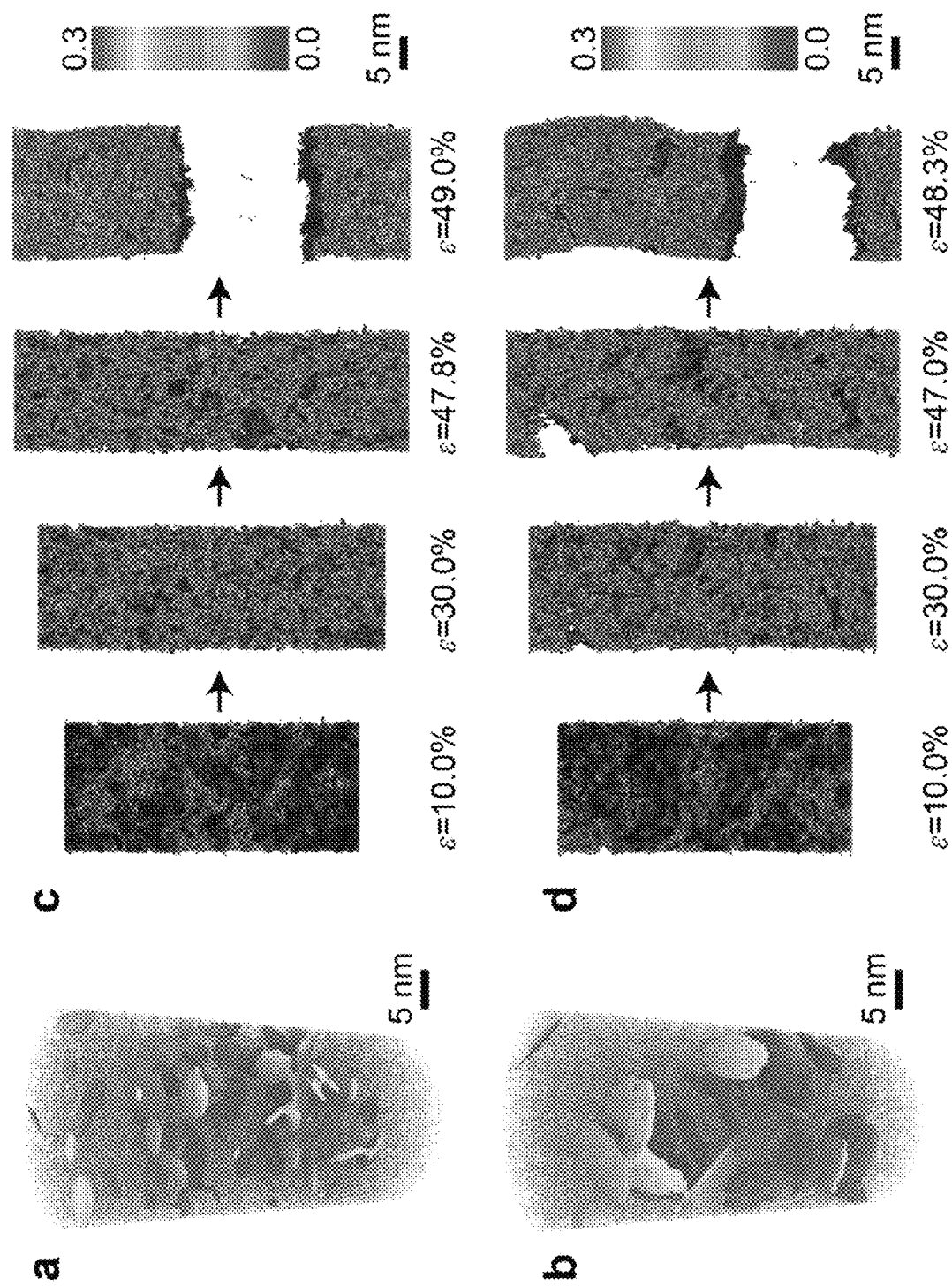
FIG. 45. Effects of initial flaws on tensile strength of pyrolytic carbon pillars. Panels (a) and (b): Atomic configurations of simulated samples containing initial cracks with length of 4 nm and 8 nm, respectively. All initial cracks are shown by the white flakes. Panels (c) and (d): A sequence of snapshots of pillars with initial cracks with length of 4 nm and 8 nm, respectively. The failure of both nanopillars always initiated from the growth and extension of pre-existing nanocracks. Both samples after failure have the smooth fracture surface, showing a brittle fracture mode. All atoms in Panel (c) and Panel (d) are colored by atomic von Mises strain.

Another similarity to the experiments is that all simulated nanopillars subjected to tension failed after undergoing nearly linear elastic deformation (FIG. 4C). FIGS. 4H-4J show a sequence of snapshots of the cross-section of a stretched sample at different strains. We observed that a number of nanoscale cavities nucleated, expanded under tension, and then coalesced, leading to the formation of nanoscale cracks (FIG. 4I and FIG. 44A). Eventually, these nanoscale cracks propagated in the direction normal to the tensile loading, resulting in a smooth fracture surface (FIG. 4J and FIG. 44B). This cleavage fracture is similar to the experimental observations shown in FIG. 2E. (Additionally, atomistic simulation of uniaxial tension on pyrolytic carbon nanopillars with diameter of 20 nm is performed. During tension, the curved graphene layers are stretched. A number of nanoscale cavities nucleate, grow up and then coalesce, leading to the formation of nanoscale cracks. Eventually, these nanoscale cracks propagate in the direction normal to the tensile direction, resulting in a smooth fracture surface.) FIG. 4C shows that the tensile strength of a nanopillar without initial cracks is above 20 GPa, which stems from the requirement for significant forces to break the strong covalent bonds. The strength is reduced to approximately 12 GPa after introducing cracks into the nanopillar, which indicates that the presence of initial flaws/imperfections facilitates a significant reduction in the tensile strength of pyrolytic carbon pillars. FIG. 45 shows the deformation processes of nanopillars with initial 4- and 8 nm-long nanocracks. We observe that their failure always originated from the growth and extension of the pre-existing nanocracks, leading to a smaller fracture strain and a smoother fracture surface than in nanopillars without nanocracks. The tensile strengths of the simulated samples are much higher than those of the experimental samples, which is a common phenomenon caused by a difference of approximately 10-11 orders of magnitude in the applied strain rate, a difference of approximately 1-2 orders of magnitude in sample size and non-equivalent flaw concentrations in the experiments and simulations. The MD simulations also revealed some mechanistic details regarding the compression and tension of pyrolytic carbon pillars. During compression, the large deformation is accommodated by the closure of sub-nanometer-sized voids, densification of the structures and slipping/shear of the graphene layer fragments. Under tension, samples with initial flaws fail via the coalescence and extension of pre-existing flaws. For samples without initial flaws, tensile deformation is dominated by the nucleation, growth and coalescence of nanoscale cavities and the propagation of the resultant nanoscale cracks (FIGS. 4H-4J and FIGS. 44A-44B). These underlying deformation mechanisms provide reasonable explanations for the observed high deformability, high elastic limit and high strength of the pyrolytic carbon micropillars.

Figure 5A:
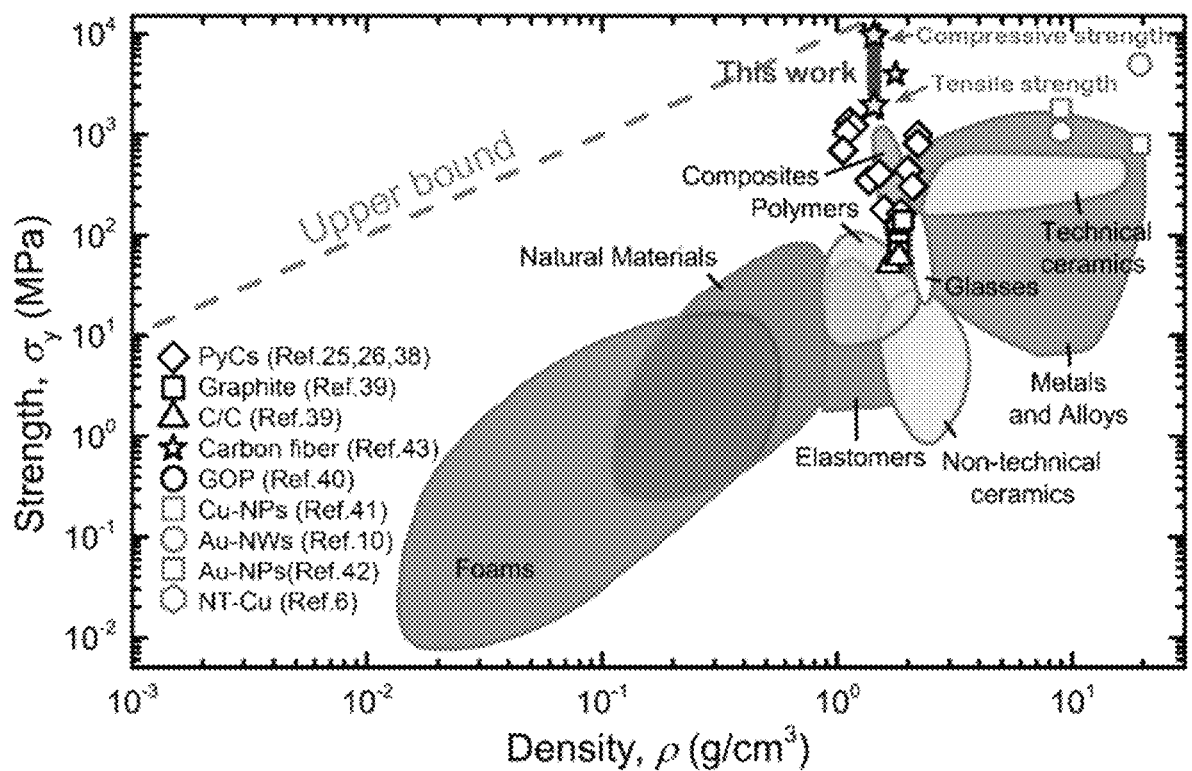
FIGS. 5A-5C. Summary of the combined ultra-high strength/specific strength and large deformability of the pyrolytic carbon micropillars.
Figure 5B:
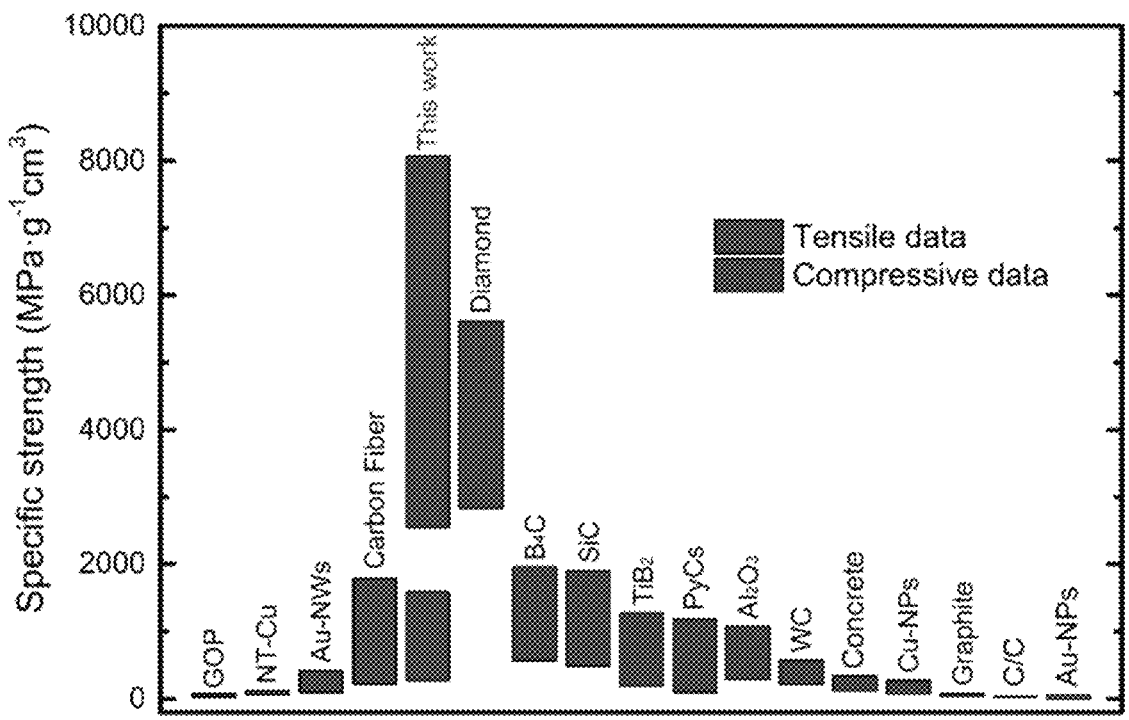
Figure 5C:
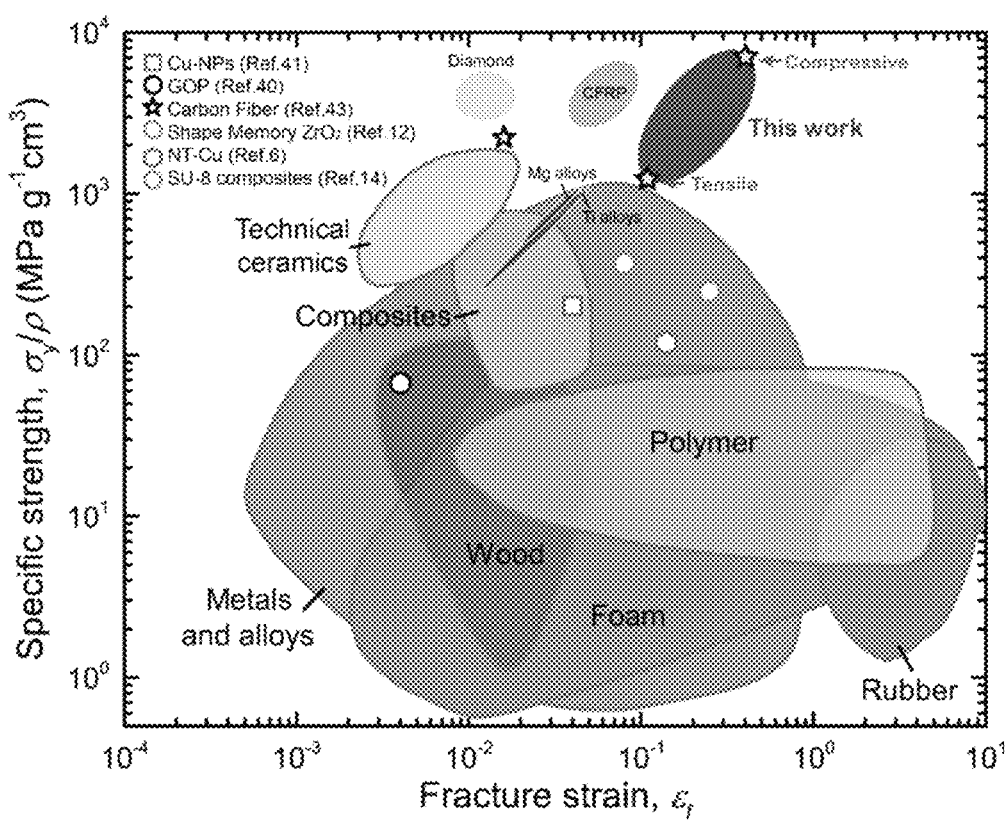
Figure 6:
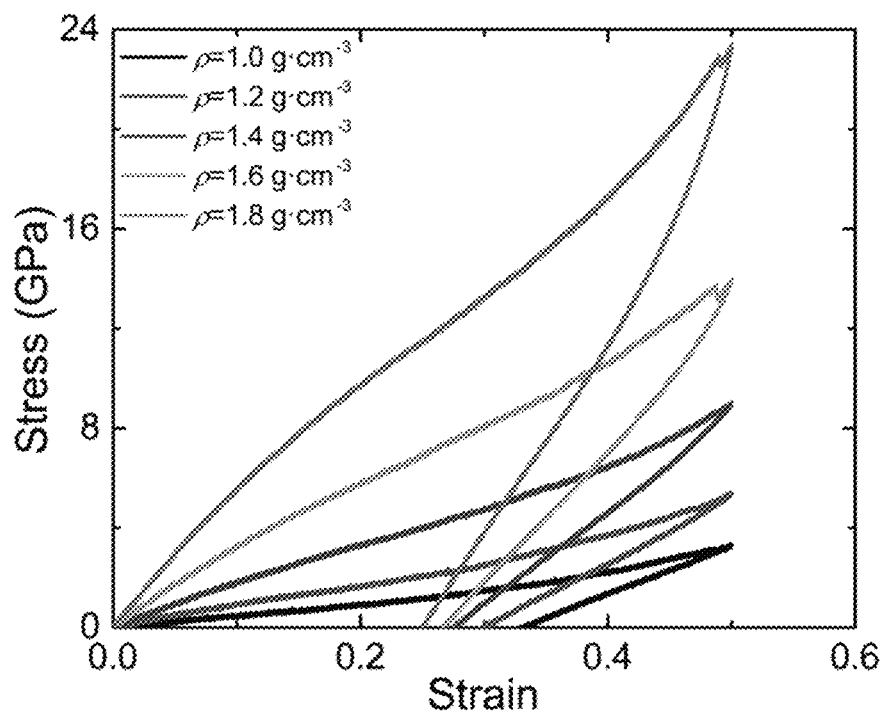
FIG. 6. Compressive stress-strain curves of simulated nanopillars with diameter of 10 nm and different densities.
Figure 7:
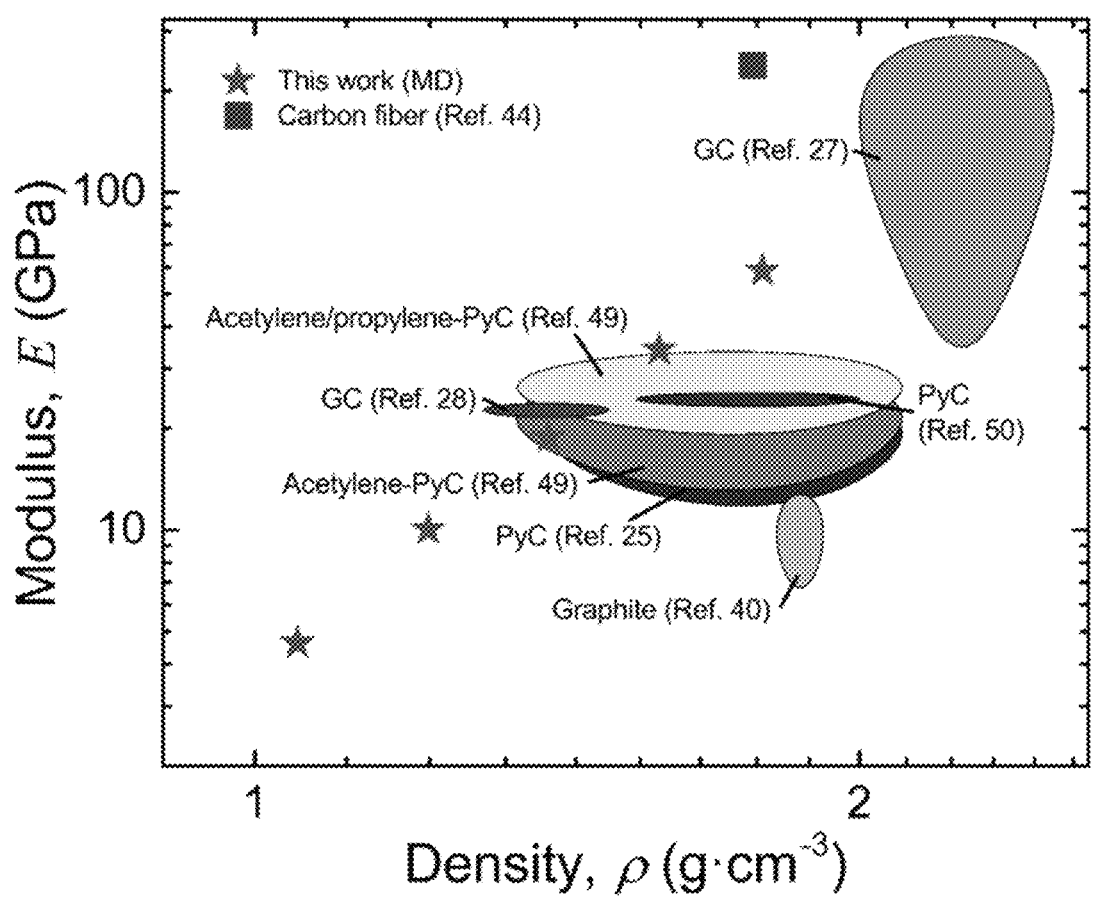
FIG. 7. Plot of Young's modulus (GPa) versus density (g/cm$^3$) corresponding to materials or structures from relevant art as well as to certain embodiments of the present invention.
Figure 8A:
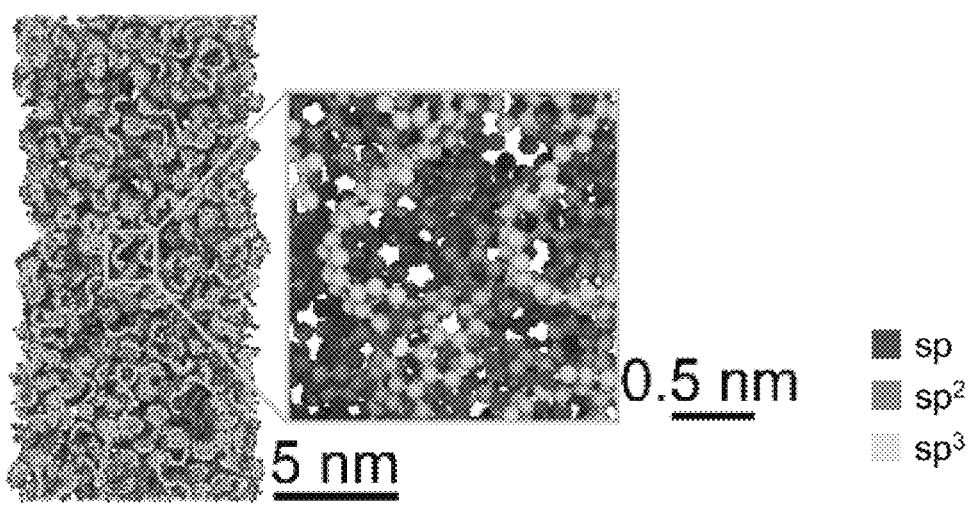
FIGS. 8A-8E. Images corresponding to atom istic configurations of nanopillars formed of carbon allotrope materials. The nanopillars shown here have diameters of 10 nm and different densities of 1.0-1.8 g/cm³. Presence of sp carbon, sp² carbon, and sp³ carbon is identified.
Figure 8B:
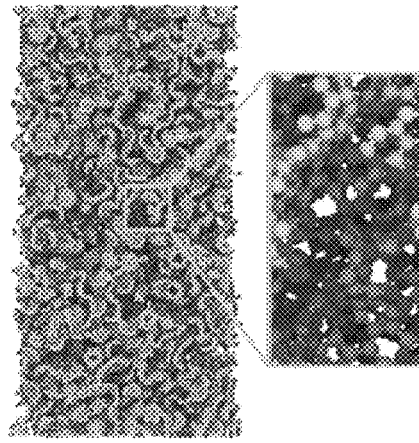
Figure 8C:
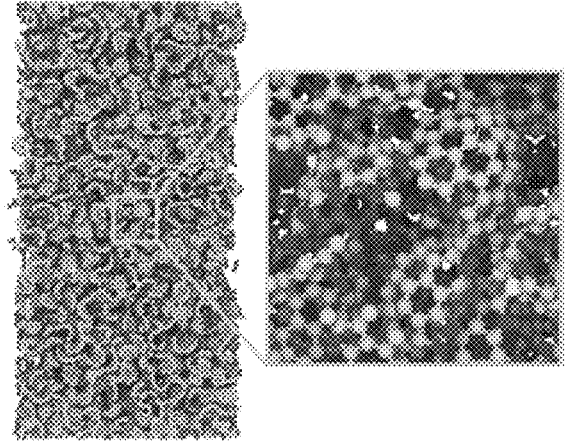
Figure 8D:
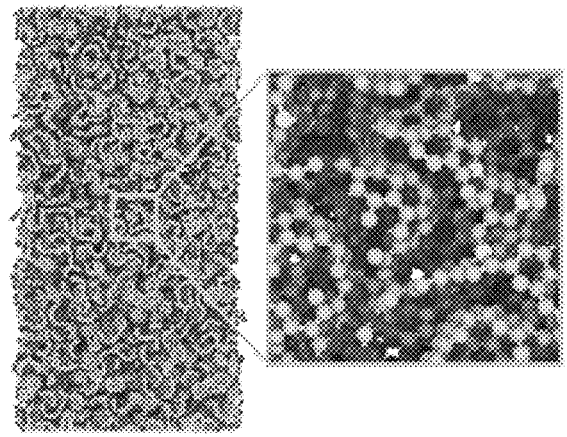
Figure 8E:
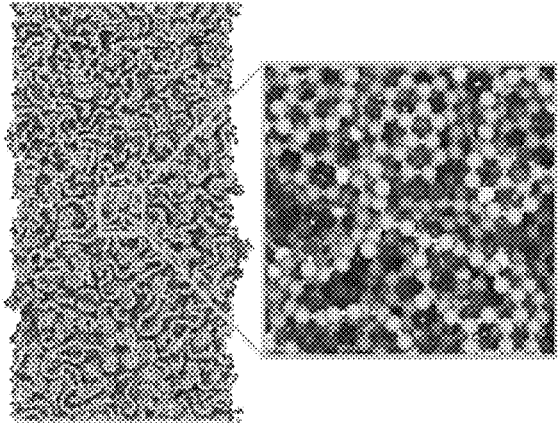
Figure 46:
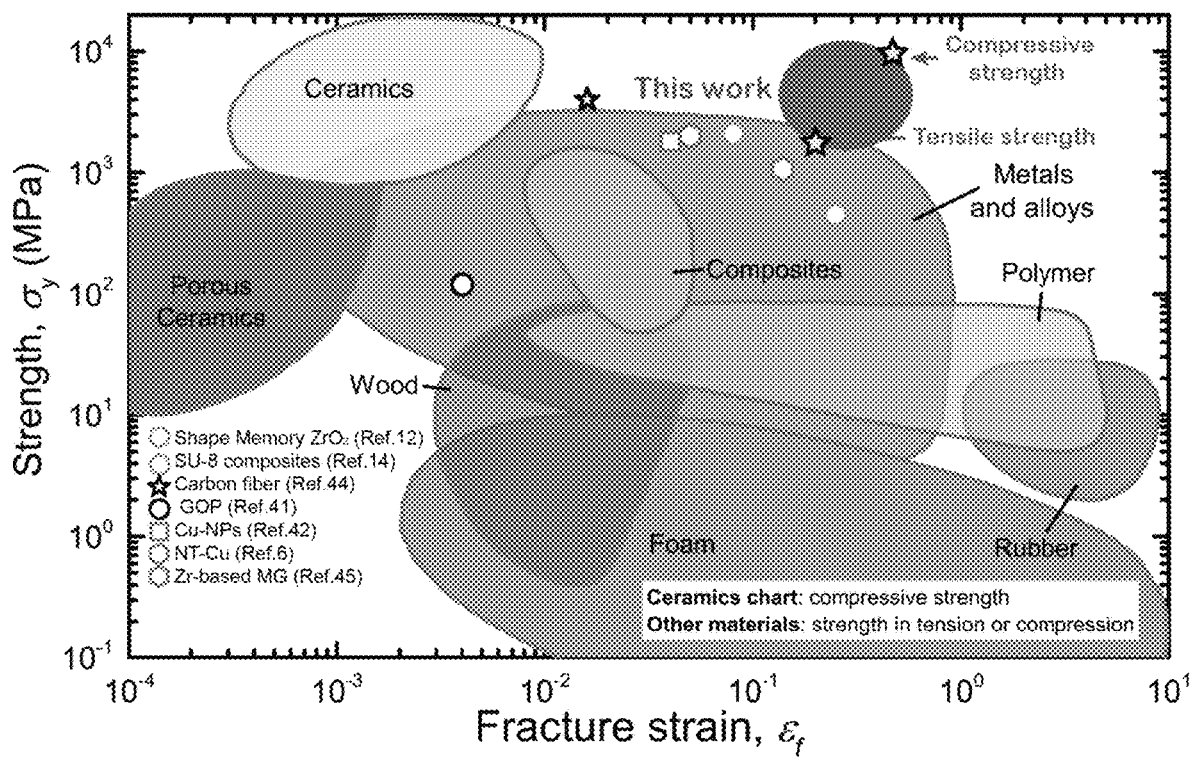
FIG. 46. Summary plot of strength versus fracture strain for our pyrolytic carbon micropillars and other structural materials.

To examine the properties of the pyrolytic carbon materials explored in this work in their context, we plotted a strength-versus-density material parameter landscape for various structural materials in FIG. 5A, which also includes conventional structural materials[4,25,26,39] and recently reported high-strength nanomaterials[6,10,40-43]. This plot reveals that the strengths of the pyrolytic carbon in this work are approximately 1-3 orders of magnitude higher than those of most structural materials, including bulk pyrolytic carbon (PyCs)[25,26,39], graphite, carbon fiber-reinforced carbon (C/C)[40], graphene oxide paper (GOP)[41], copper nanopillars (Cu-NPs)[42], gold nanopillars (Au-NPs)[43], and bulk nanotwinned copper (NT-Cu)[6], and approaches the upper bound for the uniaxial strength of structural materials proposed in Ref. 28. The strength of the pyrolytic carbon micropillars is comparable to those of carbon microfibers[44] and gold nanowires (Au-NWs)[10], but its density is approximately 79% and 7.3% of those of carbon fibers and Au-NWs, respectively. FIG. 46 shows an analogous property plot of the strength versus fracture strain for various materials, including shape memory zirconia[12], SU-8 composites[14], carbon microfibers[44], GOP[41], Cu-NPs[42], NT-Cu[6], and Zr-based metallic glasses (MG)[45]. The pyrolytic carbon micropillars in this work exhibit a superior combination of high strength and high deformability, which implies that they overcome the classical trade-off between strength and deformability that has plagued all materials to date. It appears that the pyrolytic carbon micropillars simultaneously possess high tensile and compressive strengths of 2.5 GPa and 11.0 GPa and a low density of 1.0-1.8 g/cm$^3$, thereby partially overcoming the conflict between high strength and low density, leading to an ultra-high specific strength of 8.07 GPa/g cm$^3$. FIG. 5B shows the specific tensile and compressive strengths of various materials and reveals that the pyrolytic carbon micropillars have at least one order of magnitude greater specific strength than those of GOP, NT-Cu and Au-NWs, comparable to that of carbon microfibers. Their specific compressive strengths exceed that of diamond, which has the highest specific compressive strength to date[28], of common hard ceramics[46] (such as $B_4C$, SiC, and $Al_2O_3$), of metallic nanopillars (Cu-NPs[42] and Au-NPs[43]), and of carbon materials (PyCs[25,26,39], graphite, and C/C[40]). FIG. 5C shows an Ashby plot of specific strength versus fracture strain for our pyrolytic carbon and other various materials, including titanium alloys, magnesium alloys, carbon fiber reinforced polymer (CFRP) and diamond. Notably, our pyrolytic carbon occupies the unexplored space in the Ashby diagram, where no other materials reach. Our experiments and simulations revealed that pyrolytic carbon micropillars exhibit a unique combination of high deformability, an ultra-large elastic limit, and ultra-high strength and specific strength. These superior mechanical properties of the pyrolytic carbon micropillars arise from their microstructures and constituent materials. As basic building blocks, curled graphene layers with a size of 1 nm have high in-plane rigidity and out-of-plane flexibility as well as high strength. The dense assembly of these graphene layers forms pyrolytic carbon micropillars via covalent bonding or van der Waals interactions. As a result, the pyrolytic carbon micropillars can sustain large elastic distortion and resist large compression and stretching. These results offer a new design route of assembling nanometer-sized curled graphene fragments into high-performance carbon materials.

It is noted that our pyrolytic carbon micropillars exhibit 1.5-8.2 times higher compressive strength and at least one order of magnitude larger fracture strain than existing bulk and micro-sized pyrolytic carbon[26,27]. These differences in mechanical properties can be attributed to differences in microstructures and sample sizes between these materials. First, both the crystallite size of the carbon layer fragments and spacing between neighboring layers in our pyrolytic carbon are much smaller than those (about 4-6 nm and 1.67-1.99 nm) of the existing bulk and micro-sized pyrolytic carbon[26,27]. These different microstructures are induced by different pyrolysis precursor materials and conditions (such as temperature and duration time). Second, our pyrolytic carbon with high strength and large deformability are several microns in diameters, which are 2-4 orders of magnitude smaller than diameters (beyond hundreds of microns) of bulk and micro-sized pyrolytic carbon[26,27]. Therefore, designing/controlling atomic-level microstructures and sample dimension have resulted in significant enhancement of the mechanical properties of pyrolytic carbon.

In summary, we have synthesized new pyrolytic carbon micropillars derived from a polymeric photoresist via DLW and pyrolysis. These micropillars consist of curled graphene fragments with an average size of approximately 1.0-1.5 nm. Both compressive and tensile tests showed that these micropillars exhibit an exceptional combination of large deformability, an ultra-large elastic limit, and ultra-high strength and specific strength. Large-scale MD simulations provided some mechanistic details of the deformation of pyrolytic carbon pillars, i.e., compressive deformation was dominated by densification of the structure and slipping/shear of the graphene layers, while tensile deformation was governed by the extension of initial flaws or by the nucleation, growth and coalescence of nanoscale cavities. These deformation mechanisms are responsible for the unique combination of desirable properties such as high deformability, a high elastic limit and high strength. Our results reveal the critical connections between the microstructure, deformation mechanisms and mechanical properties of pyrolytic carbon materials and thereby provide potential routes for designing and synthesizing new high-performance carbon materials.

Methods:

Fabrication of samples: The fabrication process of pyrolytic carbon micropillars includes two steps: two-photon lithography and high-temperature pyrolysis. We first synthesized the pillars using 3D TPL DLW (Photonic Professional, Nanoscribe GmbH) with the dip-in laser lithography configuration, a 63× objective and commercial IP-Dip photoresist. For pyrolysis, the printed polymeric samples were heated to 900° C. at a ramp rate of 7.5° C. min$^{-1}$ in a vacuum tube furnace, then maintained at the target temperature for 5 hours, and finally cooled to the room temperature at a natural rate. After pyrolysis, the pillar dimensions shrank to approximately 20%-25% of their original values, which corresponds to a 98% volumetric contraction. The diameter D of the pyrolytic carbon pillars for the compression experiments varied from 1.28 to 12.7 µm. Dog-bone shaped samples with gauge sections of 0.7 to 2.0 µm were also synthesized using the same procedure for the tensile experiments. The aspect ratios (i.e., height to diameter) of the pyrolytic carbon samples were 1.4-1.8 for compression and 1.5-4.3 for tension.

Microstructural characterization: The microstructure of the pyrolytic carbon micropillars was characterized by an FEI Technai TF-30 TEM at an accelerating voltage of 300 kV. EELS was conducted in an FEI Technai TF-20 at an accelerating voltage of 200 kV to estimate the relative fractions of sp$^2$ and sp$^3$ bonds. Samples for TEM analyses were prepared using a site-specific lift-out procedure, attaching the detached lamella to the TEM grid, and final thinning to a final thickness of 60.73 nm using a voltage of 15 kV and a current of 10 pA in the focused ion beam (FIB, FEI Versa). Raman spectra were collected at room temperature using a Raman spectrometer (Renishaw M1000 Micro) with a 514.5 nm laser.

Nanomechanical experiments: Uniaxial compression on samples with diameters of 1.28-2.28 µm and all uniaxial tension experiments were conducted at a constant nominal strain rate of 10$^{-3}$ s$^{-1}$ in a custom-made in situ nanomechanical instrument (SEMentor)[33] with a 10 µm-diameter flat punch indenter tip. Samples with larger diameters of 4.6-12.7 µm were compressed in a nanoindenter (Nanoindenter G200 XP, Agilent/Keysight Technologies) with a 120 µm-diameter flat punch at a constant loading rate of 0.02-0.2 mN s$^{-1}$ because of the load limit in the in situ instrument. Additional compression experiments were conducted on samples with diameters of 2.21-12.7 µm in the G200 to independently validate the results of the in situ experiments.

Figure 40:
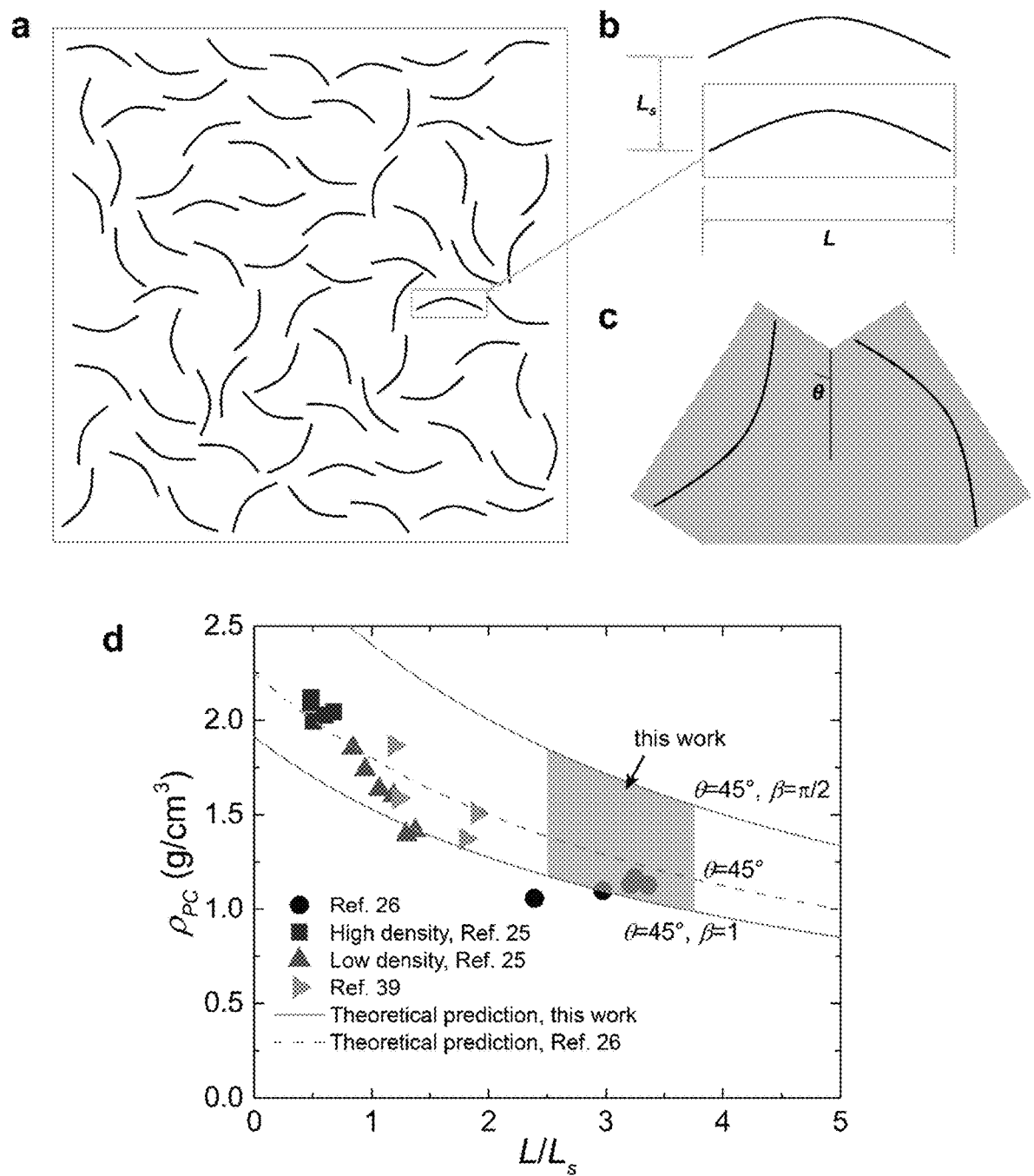
FIG. 40. Model for estimation of density and comparison with densities of pyrolytic carbon reported in recent literatures. Panels (a) and (b): Illustration of packing structure of curved graphene layers in pyrolytic carbon. L is the size of curved graphene layer, and $L_s$ represents the interlayer distance between neighboring layers. Panel (c): Illustration of a typical open-structure unit cell composed of two graphene layers. Panel (d): Density of pyrolytic carbon ($\rho_{PC}$) as a function of the ratio of $L/L_s$. Solid curve is from the prediction based on Eq. (1), while the dashed curve is from Ref. 26. The current extended model supplies a prediction of density of 1.0-1.8 g/cm³ for pyrolytic carbon micropillars.

Estimation of the density of pyrolytic carbon micropillars from TEM analysis: HRTEM images reveal that the pyrolytic carbon micropillars consist of nanometer-sized, randomly distributed curved graphene layers. FIG. 40 provides a comprehensive set of images that pertain to the estimation of density in these materials. FIG. 40, panel (a), illustrates the distribution of the curved graphene segments, and FIG. 40, panel (b), shows an individual representative graphene segment, where the average end-to-end length is L and the spacing between neighboring layers $L_s$. We built upon an existing geometric model[26] to estimate the density ($\rho_{PC}$) of pyrolytic carbon. The density of the curved graphene layers, $\rho_{CGL}$, can be expressed as $$\rho_{CGL} = \frac{\beta L_G}{L_s} \rho_G \quad (1)$$

where $\rho_G$ is the density of single crystalline graphite ($\rho_G$=2.25 g/cm$^3$), $L_G$ is the interlayer distance in single crystalline graphite ($L_G$=0.34 nm), and β is a shape factor that reflects the curvature of the curved graphene layer: β=1 represents a flat graphene layer, and β=π/2 corresponds to a semi-circle. FIG. 40, panel (c), is a schematic that represents a reasonable stacking structure of two curved graphene layers. Using this geometry as a guide, the density of pyrolytic carbon can be estimated as[26]

$$\rho_{PC} = \rho_{CGL} \left( \frac{1}{1 + 0.5(L/L_s)\sin\theta\cos\theta} \right) \quad (2)$$

where ζ is the orientation angle between two graphene layers in a typical unit cell (see FIG. 40, panel (c)), and ζ=45° corresponds to isotropic pyrolytic carbon[26], where the curved graphene layers are randomly distributed. Based on TEM observations (FIGS. 1E-1F), we obtained β=1 or π/2, θ=π/4, $L_s$=0.4 nm, and L=1.0-1.5 nm. By substituting these parameters into Eqs. (1-2), we obtain $\rho_{PC}$=1.0-1.8 g/cm$^3$. FIG. 40, panel (d), compares our modified model, a previous geometric model and the experimental data on bulk pyrolytic carbon. The predictions from this modified model agree with the experimental data[25,39].

Estimation of carbon fragment size based on Raman spectra: Raman spectroscopy is widely used to investigate defects and disorder in carbon materials at the nanoscale level, including graphene, carbon nanotubes and glassy carbon[31,47]. The ratio of the integrated area under the D peak and that under the G peak, $I_D/I_G$, in a Raman spectrum is related to the in-plane crystallite size (L) of carbon materials by Eq. (1)[31]. We first fitted the Raman spectra of a pyrolytic carbon micropillar using four Lorentzian-shaped bands (G, $D_1$, $D_2$, $D_4$) at the Raman shifts of ~1580, 1350, 1620 and 1200 cm$^{-1}$ and a Gaussian-shaped band ($D_3$) at 1500 cm$^{-1}$ in Ref. 47. The Raman spectrum shown in FIG. 1G has $I_D/I_G$=6.937 and the laser wavelength $\lambda_l$=514.5 nm, which gives L=2.4 nm by Eq. (1). This result is in agreement with the characteristic size of 1.0-1.5 nm of curved graphene layers estimated based on HRTEM analysis.

Estimation of fraction of sp$^2$ bonds based on EELS: EELS spectra provide quantitative information about the electronic structure of carbon materials[27,32]. We used the common two-window method[32] to estimate the fraction of sp$^2$ bonds in the pyrolytic carbon micropillars and used the EELS data of raw glassy carbon, which is fully sp$^2$-hybridized, as a reference. From the EELS data of pyrolytic carbon in FIG. 1H and raw glassy carbon, we calculated the areas under the two windows around the π* and σ* peaks, denoted by $I_\pi$ and $I_\sigma$, of the pyrolytic carbon and of raw glassy carbon. A normalized ratio $N_{int}$ can then be calculated as[27,32]

$$N_{int} = \frac{I_\pi^{PC}/I_{\sigma'}^{PC}}{I_\pi^{RG}/I_{\sigma'}^{RG}} \quad (3)$$

where the superscripts "PC" and "RG" represent pyrolytic carbon and raw glassy carbon, respectively. The normalized ratio $N_{int}$ is also a function of the fraction of $sp^2$ bonds f as follows[27,32]:

$$N_{int} = \frac{3f}{4-f} \quad (4)$$

Setting Eq. (3) and Eq. (4) equal to each other, we found the fraction of $sp^2$ bonds in the pyrolytic carbon micropillars to be 96.5%.

Atom istic simulations: We performed a series of large-scale atomistic simulations that emulate the uniaxial compression and tension of pyrolytic carbon nanopillars using LAMMPS[37]. We used the adaptive intermolecular reactive empirical bond order force field[38] in all simulations to describe the interatomic interactions. This force field describes the bonded interactions based on the bond order, the non-bonded interactions (i.e., van der Waals) and the torsional interactions, which enables it to capture the formation and breakage of carbon bonds[38]. We first constructed the simulated samples using the microstructure determined experimentally from the HRTEM images, which contained many curved graphene fragments with an average size of 1 nm. These graphene fragments were extracted from $C_{84}$ fullerene. A large number of such graphene fragments with random orientations were initially hexagonally close-packed in a simulation box with dimensions of 27.5×27.2×54.3 nm³. This system was then equilibrated by an energy minimization and a free relaxation at 300 K for 50 ps under an NPT ensemble. After equilibration, the simulated system was hydrostatically compressed at a constant strain rate of $10^9$ $s^{-1}$ at 300 K for 550 ps via an NVT ensemble until the density of the simulated sample condensed to 1.40 g/cm³ (the estimated median density of the pyrolytic carbon micropillars based on the microstructural features). After compression, the hydrostatic pressure increased to 10 GPa. We then performed a melting-and-quenching process while holding the volume constant by confining all the dimensions of the simulation box. During this process, we first gradually increased the temperature from 300 K to 1200 K within 50 ps, then held the temperature at 1200 K for 300 ps to fuse the graphene flakes at high temperature and high pressure, and finally reduced the temperature from 1200 K to 300 K in 50 ps. We then relaxed the simulated sample at 300 K for 200 ps under an NPT ensemble to fully relieve the pressure to zero. After relaxation, the simulated sample had dimensions of 20.5×20.4×40.8 nm³ and a density of ~1.40 g/cm³. Throughout these processes, periodic boundary conditions were imposed in all three directions of the simulated samples.

We then extracted the nanopillars with diameters of 10 and 20 nm from the above relaxed cubic sample to perform uniaxial deformation simulations. We maintained the aspect ratios of all nanopillars near 2 to mimic the experiments. After equilibration, we compressed or stretched the nanopillars along the axial direction at a constant strain rate of $5×10^8$ $s^{-1}$ and a constant temperature of 300 K via an NVT ensemble. During simulations, the stress of each atom was calculated based on the Virial stress theorem. The compressive and tensile stresses were obtained by averaging over the axial stresses of all atoms in nanopillars.

We also investigated the influence of flaws, such as nanoscale cracks, on the tensile response of simulated samples. We introduced a few nanoscale cracks with lengths of 4 or 8 nm by removing some atoms from the "as-constructed" samples. After equilibration, we applied the same tensile loading to the samples with nanocracks as to the "as-constructed" ones and compared their stress-strain response and fracture. Throughout the simulations, periodic boundary conditions were imposed along the axial direction of the simulated nanopillars. We identified the sp, $sp^2$, and $sp^3$ bonds of the simulated samples by counting the coordination number of each atom. We found that the sp bonds were mainly distributed at the edges of the curved graphene layers, and the $sp^3$ bonds either connected the neighboring graphene layers to each other or were formed at the high-energy curved surfaces of the graphene layers (see FIG. 43). The fractions of sp, $sp^2$ and $sp^3$ hybridized bonds in the "as-constructed" samples were 8.8%, 89.1% and 1.8%, respectively, indicating that $sp^2$ bonding was dominant in the simulated samples, which was consistent with the experimental results (FIG. 1H). The remaining 0.3% of bonds were dangling bonds.

References corresponding to Example 1:
1. Meyers, M. A. & Chawla, K. K. *Mechanical Behavior of Materials* (Cambridge Univ. Press, Cambridge, 2009).
2. Ashby, M. F. Material Property Charts. in *Materials Selection in Mechanical Design* (Butterworth-Heinemann, Oxford, ed. 4, 2011), chap. 4, pp. 57-96.
3. Muth, J. T., Dixon, P. G., Woish, L., Gibson, L. J. & Lewis, J. A. Architected cellular ceramics with tailored stiffness via direct foam writing. *Proc. Natl. Acad. Sci. USA* 114, 1832-1837 (2017).
4. Lucas, R., Meza, L. R., Das, S. & Greer, J. R. Strong, lightweight, and recoverable three-dimensional ceramic nanolattices. *Science* 345, 1322-1326 (2014).
5. Wang, H. et al. Ultralight, scalable, and high-temperature-resilient ceramic nanofiber sponges. *Sci. Adv.* 3, e1603170 (2017).
6. Lu, L., Shen, Y., Chen, X., Qian, L. & Lu, K. Ultrahigh strength and high electrical conductivity in copper. *Science* 304, 422-426 (2004).
7. Sanders, P. G., Eastman, J. A., & Weertman, J. R. Elastic and tensile behavior of nanocrystalline copper and palladium. *Acta Mater.* 45, 4019-4025 (1997).
8. Zhang, Y. et al. Microstructures and properties of high-entropy alloys. *Prog. Mater. Sci.* 61, 1-93 (2014).
9. Greer, J. R. & Hosson, J. T. Plasticity in small-sized metallic systems: Intrinsic versus extrinsic size effect. *Prog. Mater. Sci.* 56, 654-724 (2011).
10. Wu, B., Heidelberg, A. & Boland, J. J. Mechanical properties of ultrahigh-strength gold nanowires. *Nat. Mater.* 4, 525-529 (2005).
11. Lowry, M. B. et al. Achieving the ideal strength in annealed molybdenum nanopillars. *Acta Mater.* 58, 5160-5167 (2010).
12. Lai, A., Du, Z., Gan, C. L. & Schuh, C. A. Shape memory and superelastic ceramics at small scales. *Science* 341, 1505-1508 (2013).
13. Jordan, J., Jacob, K. I., Tannenbaum, R., Sharaf, M. A. & Jasiuk, I. Experimental trends in polymer nanocomposites—a review. *Mater. Sci. Eng. A* 393, 1-11 (2005).
14. Dusoe, K. J. et al. Ultrahigh elastic strain energy storage in metal-oxide-infiltrated patterned hybrid polymer nanocomposites. *Nano Lett.* 17, 7416-7423 (2017).

15. Gogotsi, Y. Not just graphene: The wonderful world of carbon and related nanomaterials. *MRS Bull.* 40, 1110-1121 (2015).
16. C. Lee, C., X. Wei, X., J. W. Kysar, J. W. & Hone, J. Measurement of the elastic properties and intrinsic strength of monolayer graphene. *Science* 321, 385-388 (2008).
17. Rasool, H. I., Ophus, C., Klug, W. S., Zettl, A. & Gimzewski, J. K. Measurement of the intrinsic strength of crystalline and polycrystalline graphene. *Nat. Commun.* 4, 2811 (2013).
18. Zhang, P. et al. Fracture toughness of graphene. *Nat. Commun.* 5, 3782 (2014).
19. Wei, Y. et al. The nature of strength enhancement and weakening by pentagon-heptagon defectsin graphene. *Nat. Mater.* 11, 759-763 (2012).
20. Song, Z., Artyukhov, V. I., Wu, J., Yakobson, B. I. & Xu, Z. Defect-detriment to graphene strength Is concealed by local probe: the topological and geometrical effects. *ACS Nano* 9, 401-408 (2015).
21. Cao, A., Dickrell, P. L., Sawyer, W. G., Ghasemi-Nejhad, M. N. & Ajayan, P. M. Super-compressible foam-like carbon nanotube films. *Science* 310, 1307-1310 (2005).
22. Qu, L., Dai, L., Stone, M., Xia, Z. & Wang, Z. L. Carbon nanotube arrays with strong shear binding-on and easy normal lifting-off. *Science* 322, 238-242 (2008).
23. Barg, S. et al. Mesoscale assembly of chemically modified graphene into complex cellular networks. *Nat. Commun.* 5, 4328 (2014).
24. Qin, Z., Jung, G. S., Kang, M. J. & Buehler, M. J. The mechanics and design of a lightweight three-dimensional graphene assembly. *Sci. Adv.* 3, e1601536 (2017).
25. Zhang, H., Lopez-Honorato, E. & Xiao, P. Fluidized bed chemical vapor deposition of pyrolytic carbon-III. Relationship between microstructure and mechanical properties. *Carbon* 91, 346-357 (2015).
26. Stein, I. Y. et al. Structure-mechanical property relations of non-graphitizing pyrolytic carbon synthesized at low temperatures. *Carbon* 117, 411-420 (2017).
27. Hu, M. et al. Compressed glassy carbon: An ultrastrong and elastic interpenetrating graphene network. *Sci. Adv.* 3, e1603213 (2017).
28. Bauer, J., Schroer, A., Schwaiger, R. & Kraft, O. Approaching theoretical strength in glassy carbon nano-lattices. *Nat. Mater.* 15, 438-443 (2016).
29. Li, X. & Gao, H. Mechanical metamaterials: Smaller and stronger. *Nat. Mater.* 15, 373-374 (2016).
30. Harris, P. J. New perspectives on the structure of graphitic carbons. *Crit. Rev. Solid State* 30, 235-253 (2005).
31. Cancado, G. L. et al. General equation for the determination of the crystallite size of nanographite by Raman spectroscopy. *Appl. Phys. Lett.* 88, 163106 (2006).
32. J Bruley, J., Williams, D. B., Cuomo, J. J. & Pappas, D. P. Quantitative near-edge structure analysis of diamond-like carbon in the electron microscope using a two-window method. *J. Microsc.* 180, 22-32 (1995).
33. Jennings, A. T. & Greer, J. R. Tensile deformation of electroplated copper nanopillars *Phil. Mag.* 91, 1108-1120 (2011).
34. Bazant, Z. P. & Xiang, Y. Size effect in compression fracture: Splitting crack band propogation. *J. Eng. Mech.* 13, 162-172 (1997).
35. Zhao, J. X., Bradt, R. C. & Walker, P. L. The fracture toughness of glassy carbons at elevated temperatures. *Carbon* 23, 15-18 (1985).
36. Qu, R. & Zhang, Z. A universal fracture criterion for high-strength materials. *Sci. Rep.* 3, 1117 (2013).
37. Plimpton, S. Fast parallel algorithms for short-range molecular dynamics. *J. Comp. Phys.* 117, 1-19 (1995).
38. Stuart, S. J., Tutein, A. B. & Harrison, J. A. A reactive potential for hydrocarbons with intermolecular interactions. *J. Chem. Phys.* 112, 6472-6486 (2000).
39. Yajima, S., Hirai, T. & Hayase, T. Micro-hardness of pyrolytic graphite and siliconated pyrolytic graphite. *Tanso* 69, 41-47 (1972).
40. Oku, T., Kurumada, A., Imamura, Y. & Ishihara, M. Effects of ion irradiation on the hardness properties of graphites and C/C composites by indentation tests. *J. Nucl. Mater.* 381, 92-97 (2008).
41. Dikin, D. et al. Preparation and characterization of graphene oxide paper. *Nature* 448, 457-460 (2007).
42. Jang, D., Li, X., Gao, H. & Greer, J. R. Deformation mechanisms in nanotwinned metal nanopillars. *Nat. Nanotechnol.* 7, 594-601 (2012).
43. Greer, J. R., Oliver, W. C. & Nix, W. D. Size dependence of mechanical properties of gold at the micron scale in the absence of strain gradients. *Acta Mater.* 53, 1821-1830 (2005).
44. Fu, S. Y., Lauke, B., Mader, E., Yue, C. Y. & Hu, X. Tensile properties of short-glass-fiber- and short-carbon-fiber-reinforced polypropylene composites. *Composites Part A* 31, 1117-1125 (2000).
45. Jang, D. & Greer, J. R. Transition from a strong-yet-brittle to a stronger-and-ductile state by size reduction of metallic glasses. *Nat. Mater.* 9, 215-219 (2010).
46. Dunlay, W. A., Tracy, C. A. & Perrone, P. J. A proposed uniaxial compression test for high strength ceramics. DTIC Document, (1989).
47. Sadezky, A., Muckenhuber, H., Grothe, H., Niessner, R. & Pöschl, U. Raman microspectroscopy of soot and related carbonaceous materials: Spectral analysis and structural information. *Carbon* 43, 1731-1742 (2005).

Example 2: Lightweight, Flaw Tolerant and Strong Nano-Architected Carbon

Abstract: A long-standing challenge in modern materials design is to create low-density materials that are robust against defects and can withstand extreme thermomechanical environments because these properties typically are mutually exclusive: the lower the density, the weaker and more fragile the material. We developed a simple process to create nano-architected carbon that can attain a specific strength (strength-to-density ratio) of 1.90 GPa g$^{-1}$ cm$^3$, which represents greater than 1-3 orders of magnitude improvement over that of all nano- and micro-architected materials to date. We used two-photon lithography followed by pyrolysis in vacuum at 900° C. to fabricate two prototype topologies of pyrolytic carbon: octet- and iso-truss, with unit-cell dimensions of ~2 μm, beam diameters between 261 nm and 679 nm, and densities of 0.24 to 1.0 g/cm$^3$. Micromechanical experiments demonstrate a Young's modulus of 0.34-18.6 GPa, strengths of 0.05-1.9 GPa, and an average strain-to-fracture of 14%-17%. Experiments and simulations demonstrate that for densities higher than 0.95 g/cm$^3$, these nanolattices become insensitive to fabrication-induced defects, which gives rise to their nearly attaining the theoretical strength of constitute materials and lends nano- and micro-architected carbon to being particularly promising candidates for structural applications under harsh thermomechanical environments. We discuss this combination of high specific strength, low density, and extensive deformability prior to failure in the context of interplay among atomic-level microstructure of pyrolytic carbon, nano-sized beam dimensions, and optimized lattice topology.

Significance:

Strength and density of porous materials typically scale together. A long-standing challenge in modern material design has been to create porous materials that are simultaneously lightweight, strong and stiff. Here we demonstrated the creation of pyrolytic carbon nanolattices with designable topologies by a two-step procedure: direct laser writing and pyrolysis at high temperature. The smallest characteristic size of the struts in nanolattices approached the limits of resolution of the available three-dimensional lithograph technologies. We demonstrated that these pyrolytic carbon nanolattices are 1-3 orders of magnitude stronger nearly all micro-/nano-architected materials reported so far.

Lightweight porous materials, such as wood, bone, Euplectella sponges, diatoms and bamboo, are ubiquitous in nature. These natural structural materials have been extensively investigated (1-5) and shown to be resilient against externally applied loads, as well as powerful in absorbing and dissipating impact energy. Such mechanical resilience is enabled by two main design principles: (i) the multi-scale hierarchy in constituent materials and length scales of natural materials, which generally consist of complex multi-level architectures with characteristic dimensions from nano- to macroscale (5) and (ii) their tolerance to flaws when the characteristic material length scale is below a critical value (4). Both principles have been applied to engineering advanced materials with various degrees of success (5,6).

A general guideline for a material to be considered "lightweight" is for its density to be less than that of water (i.e., $\rho \leq 1.0$ g/cm$^3$) (16). Recent breakthroughs in material processing techniques, especially in three-dimensional (3D) microfabrication and additive manufacturing provide a particularly promising pathway to fabricate lightweight materials, which often possess a suite of other beneficial properties like high specific stiffness, high specific strength and good resilience/recoverability (7-27). The penalty for the ultra light weight in these nano- and micro-architected materials is a severe reduction in their stiffness and strength through power law scaling: $\sigma_y \sim (\rho/\rho_s)^m$, $E \sim (\rho/\rho_s)^n$, where $\sigma_y$ is the yield strength, $E$ is the Young's modulus, $\rho$ is the density, and $\rho_s$ is the density of the fully-dense constituent solid (1). The exponents m and n are generally greater than 1, which renders developing methodologies to create materials that are simultaneously lightweight and strong/stiff, while maintaining their other properties—i.e. thermal stability, electrical conductivity, magnetism, recoverability, etc.—a grand unsolved challenge because of the restricted material choices and limited architectures.

Most work on micro-/nano-architected materials to date has been focused on hollow-beam based architectures, which offer exceptionally light weight with a concomitant high compliance, for example nickel-based hollow-tube microlattices with a modulus of 529 kPa and a compressive strength of ~10 kPa at a density of ~0.010 g/cm$^3$ (7) and ceramic hollow-tube nanolattices with Young's moduli of 0.003-1.4 GPa, compressive strengths of 0.07-30 MPa at densities of 0.006 to 0.25 g/cm$^3$ (10-14). These micro-/nano-architected materials have a common feature of length scale hierarchy, i.e. relevant dimensions of their structural elements span 3-5 orders of magnitude, from tens of nanometers to hundreds of micrometers and even greater. Structural features of nickel-alloy hollow-tube nanolattices fabricated using large-area projection microstereolithography span 7 orders of magnitude in spatial dimensions, from tens of nanometers to tens of centimeters, and attained tensile strains of >20% with a low modulus of 125 kPa and a low tensile strength of ~80 kPa at a density of ~0.20 g/cm$^3$, which corresponds to the relative density of 0.15% (17). The deformability of these nanolattices was attributed to a combination of bending-dominant and stretching-dominated hierarchical architectures distributed over successive hierarchies and shell buckling, an elastic instability characteristic of thin-walled hollow cylinders (17). Among the thin-walled architectures, 3D periodic graphene aerogel microlattices have been synthesized via direct ink writing; these materials are exceptionally lightweight, with a density of 0.031-0.123 g/cm$^3$, very compliant, with a modulus of 1-10 MPa, and weak, with a low strength of 0.10-1.6 MPa, and exhibit nearly complete recovery after compression to 90% strain (23).

Some efforts have also been dedicated to the synthesis and mechanical properties of micro- and nano-architected materials that are comprised of non-hollow beams of various materials, which offer greater stiffness and higher densities compared with the hollow-beam counterparts. Most of these studies have been on architectures comprised of core-shell types of beams, usually with an acrylic polymer core and a thin, from tens of nanometers to several hundred nanometers, rigid outer coating. For example, triangular-truss microlattices with polymer-core-alumina-shell beams have been synthesized by combining TPL and ALD and sustained a modulus of ~30 MPa at a low fracture strain of ~4-6% and a density of 0.42 g/cm$^3$ (16). Octet-truss nanolattices made up of 262-774 nm-diameter polymer beams with sputtered 14-126 nm-thick high-entropy alloy (HEA)-coatings were reported to have a Young's modulus of 16-95 MPa and a compressive strength of 1-10 MPa at densities between 0.087 and 0.865 g/cm$^3$ (20). Samples with HEA thicknesses of less than 50 nm completely recovered after >50% compressions (20). Beyond core-shell-beamed nano- and micro-architected materials, several reports exist on the fabrication and deformation of 3D structural metamaterials with monolithic beams. For example, nanocrystalline nickel octet-truss nanolattices with 300-400 nm-diameter monolithic beams and 2 μm unit cells, created via TPL on custom-synthesized resins followed by pyrolisis exhibited a modulus of ~90 MPa, a compressive strength of 18 MPa, a high fracture strain of >20% at a density of 2.5 g/cm$^3$ (20). Reports on vitreous carbon octet-truss microlattices with beam diameters of ~100 μm, fabricated by pyrolyzing a UV-mask patterned polymer template, reported a modulus of 1.1 GPa, a compressive strength of 10.2 MPa, and a fracture strain of only ~3% at a density of 0.19 g/cm$^3$ (24). Glassy carbon microlattices with rhombic dodecahedron unit cell and beam diameters of 50-150 μm, fabricated by using stereolithography and pyrolysis had densities of 0.03-0.05 g/cm$^3$, moduli of 5-25 MPa, and compressive strengths of 0.08-0.35 MPa, and fractured at a strain of ~5% (25). Glassy carbon nanolattices with tetrahedral unit cells created via TPL and pyrolysis had smaller dimensions, 0.97-2.02 μm unit cells and beam diameters of ~200 nm, a modulus of 3.2 GPa and a compressive strength of ~280 MPa at a density of ~0.35 g/cm$^3$ (18). This brief overview highlights the coupling between density and compliance of architected materials, i.e. the lower the density, the softer and the weaker the material.

We developed an approach to fabricate nano-architected pyrolytic carbon and demonstrate two prototype unit cell geometries, octet- and iso-truss, shown in FIGS. 9A-9F, using two-photon lithography and pyrolysis. The octet-truss architecture has cubic anisotropy and superior overall properties compared to other conventional lattices, such as triangular, tetrahedral, or cubic trusses and foams (28), while the iso-truss structure is isotropic and has been theorized to possess optimal stiffness compared to traditional lattice topologies (29). Uniaxial compression experiments revealed their Young's moduli to be 0.34-18.6 GPa, their fracture strengths to be 0.05-1.9 GPa, and pre-failure deformability of 14-17% at density varying from 0.24 to 1.0 g/cm$^3$. The highest specific strength is up to 1.90 GPa g$^{-1}$ cm$^3$, which outperforms all other reported mechanically robust lightweight meso-/micro-/nano-lattices (7-27). We attribute this distinction to optimized unit-cell geometries, reduced feature sizes, and high quality of pyrolytic carbon.

Figure 9F:
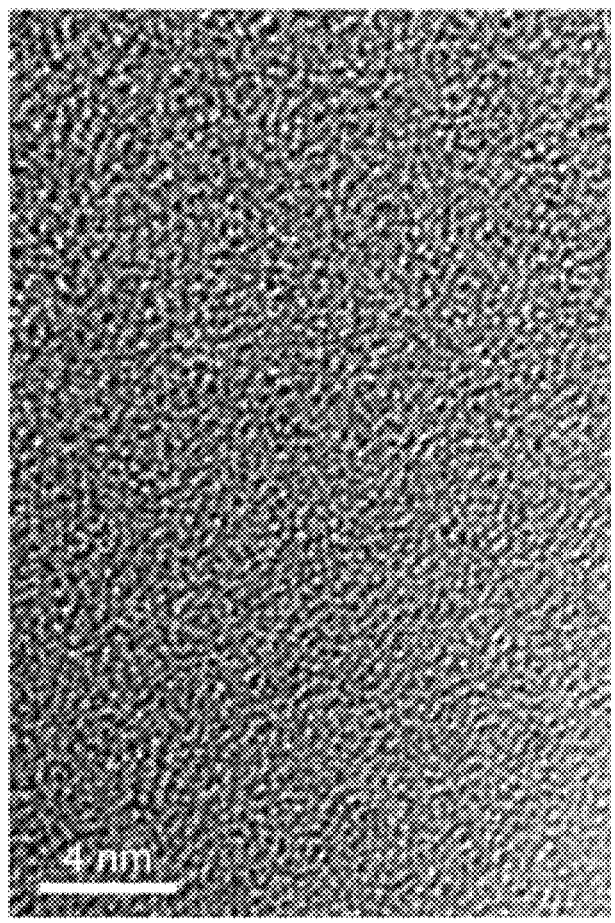

Results:

FIG. 9A illustrates the fabrication process, which begins with printing 5×5×5 unit cells microlattices out of IP-Dip photoresist using TPL. We used the high-speed galvo mode in a layer-by-layer fashion to print 7-10 μm-long struts with 0.8-3.0 μm-diameter circular cross sections. The polymer samples were then heated in a vacuum furnace at a ramp rate of 7.5° C. min$^{-1}$ up to 900° C., pyrolyzed for 5 hours, and cooled down to room temperature at a natural rate (see Methods for more details). FIGS. 9B and 9D show CAD designs of 10 μm-sized octet- and iso-truss unit cells. Strut diameters d in the octet-truss were designed to be 0.8-2.4 μm. In the iso-trusses, the vertical strut diameters $d_1$ were 1.4-3.0 μm, and the prescribed slanted strut diameters $d_2$ were maintained as $d_2 = \sqrt{3\sqrt{3}}d_1/2$, with the $d_2/d_{21}$ ratio of ~1.14 based on topological optimization (29). After pyrolysis, the polymer transformed into a form of carbon and underwent significant volumetric shrinkage and mass loss (30). Each strut shrunk to ~20%-25% of its initial dimensions (FIGS. 9C and 9E) with a concomitant shrinkage in unit-cell size from ~10 μm to ~2 μm. The resulting strut diameters of ~261-679 nm after pyrolysis are significantly below the limits of resolution of most available 3D lithographic technologies (0,0,0). We estimated the relative density $\bar{\rho}$ of pyrolytic carbon nanolattices to be between 17% to 72% by calculating the volume fraction of solid materials in the nanolattices based on 3D CAD models and dimensions measured by the scanning electron microscopy (SEM). The magnified image in FIG. 9E reveals that the $d_2/d_1$ is preserved at ~1.14 after pyrolysis, which suggests uniform volume shrinkage. FIG. 9F shows a high-resolution transmission electron microscopy (HRTEM) image of a typical sample extracted from the nanolattice via focused-ion-beam (FIB) milling and indicates its glassy/amorphous microstructure. In our earlier work, we estimated the density of pyrolytic carbon produced under these conditions to be ~1.40 g/cm$^3$ by using a combination of atomic model and experimental measurements (31), which is consistent with that of type-I glassy carbon fabricated under the pyrolysis temperature of below 2000° C. (32). We calculated the density of nanolattices by multiplying this absolute density by the relative density of nanolattices to vary from 0.24 g/cm$^3$ to 1.0 g/cm$^3$, well within the lightweight range.

Figure 10A:
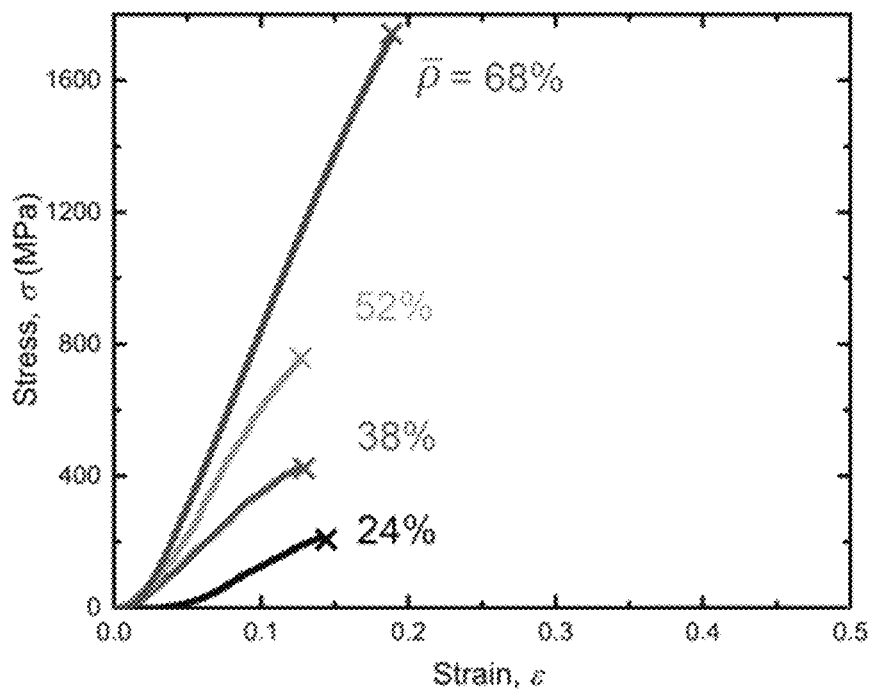
FIGS. 10A-10F. In situ uniaxial compression experiments on pyrolytic carbon nanolattices.
Figure 10B:
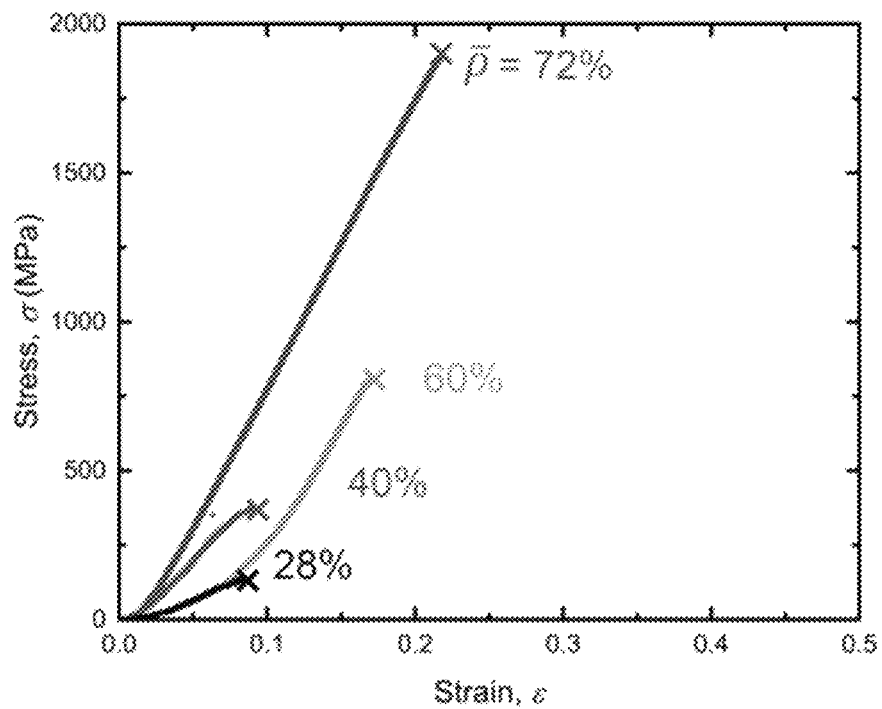
Figure 14F:
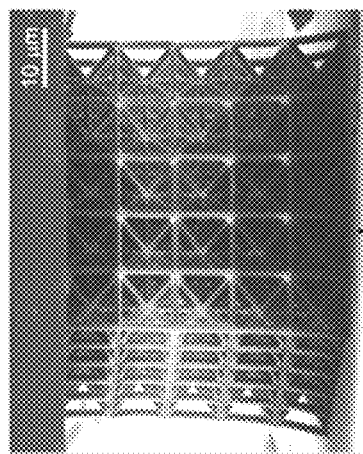
Figure 14G:
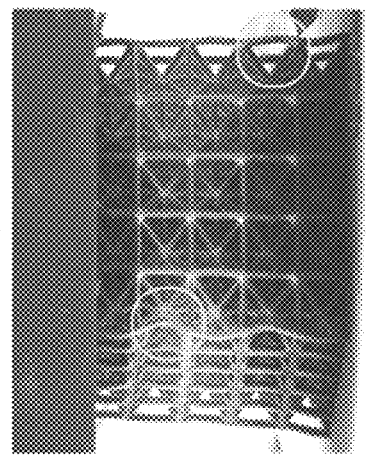
Figure 14H:
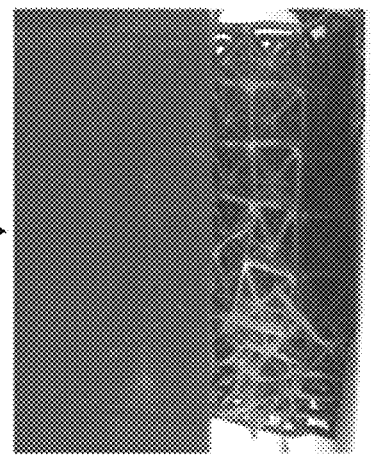
Figure 14E:
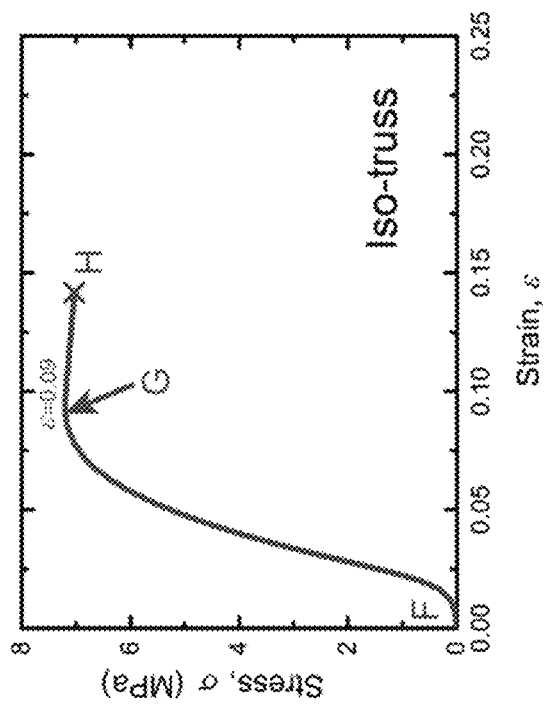

We performed uniaxial compressions on all polymer microlattices and pyrolytic carbon nanolattices (see details in Methods). Engineering stresses versus strains were obtained by normalizing the load-displacement data from compression experiments by the cross-sectional footprint area of the overall samples and the initial height. FIGS. 10A and 10B convey the compressive stress-strain response of some representative octet- and iso-truss pyrolytic carbon nanolattices, which appear to be similar across all samples. As the relative density of the octet-truss nanolattices ranged from 24% to 68%, its Young's modulus increased from 2.57 GPa to 10.73 GPa, and its compressive strength increased from 0.21 GPa to 1.73 GPa (FIG. 10A). The relative density of the iso-truss nanolattices was slightly higher, from 28-72%, its Young's modulus increased from 2.28 GPa to 9.67 GPa, and its compressive strength rose from 0.14 GPa to 1.90 GPa (FIG. 10B). The initial nonlinearity in the stress-strain data arises from the imperfect initial contact and slight initial misalignment between the rough lattice surfaces and the flat punch (16). Linear elastic loading persists up to a strain of about 10-20%, after which all pyrolytic samples catastrophically failed via brittle fracture (FIGS. 10C-10F). The average fracture strains were 14.0% for octet- and 16.7% for the iso-truss nanolattices, which exceed ~10% reported for glassy carbon nanolattices (18) and ~3-5% for glassy carbon microlattices (24,25). This enhanced deformability is enabled by better mechanical stability of circular struts, which are able to transfer load more uniformly than the elliptical ones (33) and a longer pyrolysis time to ensure sufficient carbonation. FIGS. 14A-14H show the compressive stress-strain data of typical polymer microlattices with octet- (FIG. 14A) and iso-truss (FIG. 14E) unit cells for comparison and completeness. This data also has the initial nonlinear region over ~2.5% strain caused by the slightly imperfect initial contact and misalignment between the rough lattice surfaces and the flat punch (16). Linear elastic loading commences over the strain range of ~2.5-7.5% followed by plastic deformation, followed by a stress plateau that extends over 5-7.5%. Such stress plateau corresponds to buckling of the struts, as evidenced by SEM images (FIGS. 14C and 14G). Table 1 summarizes the Young's moduli and strengths of the tested polymeric microlattices with different relative densities and reveals that for comparable relative densities, the Young's modulus of iso-truss microlattices is a factor of ~2, and the strength is 1.3× higher than those of the octet-truss microlattices, consistent with predictions (29).

TABLE 1

Mechanical properties of polymer microlattices under compression

| Unit cell geometry | Relative density $\bar{\rho}$ (%) | Young's modulus E (MPa) | Strength $\sigma_y$ (MPa) |
|---|---|---|---|
| Iso | 9.21 | 112 | 4.47 |
|  | 12.38 | 172 | 7.20 |
| Octet | 11.85 | 89 | 5.52 |
|  | 16.22 | 109 | 7.49 |

Figure 11A:
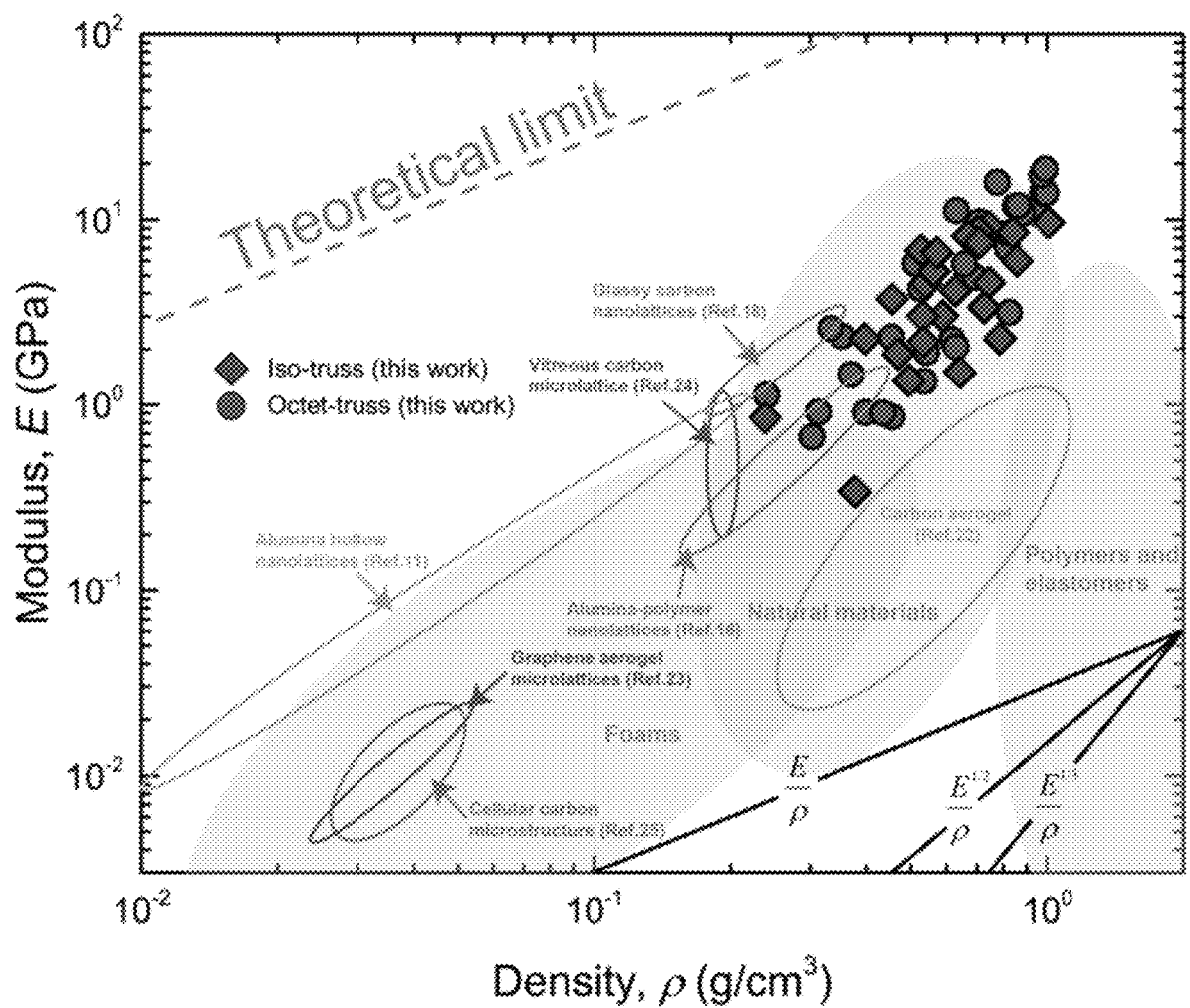
FIGS. 11A-11B. Mechanical properties versus density maps of pyrolytic carbon nanolattices.
Figure 11B:
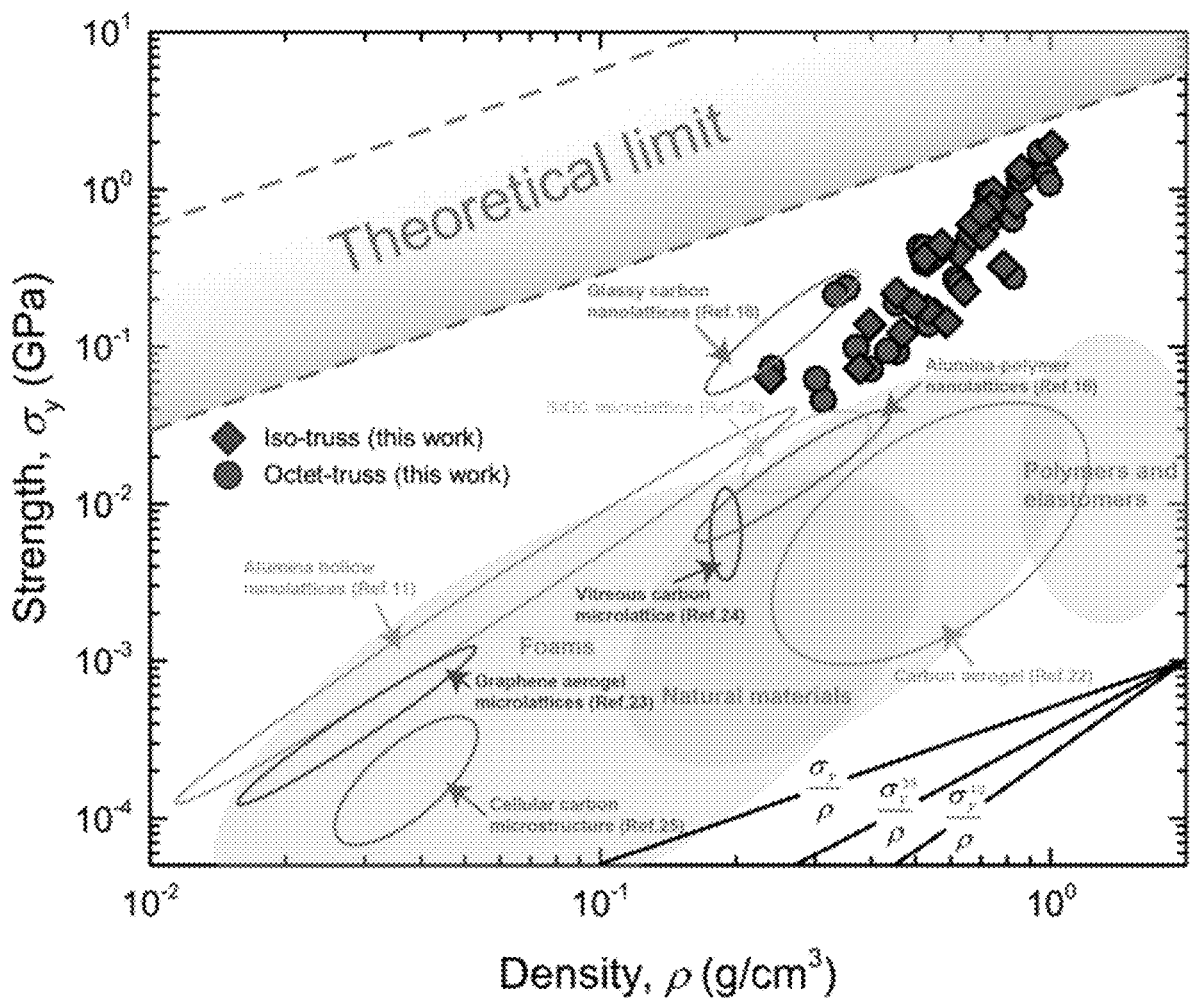

Discussion:

FIGS. 11A-11B show the material property space for Young's modulus (FIG. 11A) and compressive strength (FIG. 11B) versus density of the pyrolytic carbon nanolattices in this work in the context of all reported micro-/nano-architected materials made up of carbon, ceramics or ceramics-polymer composites (11,16,18,22-26). These plots reveal that their moduli and strengths are ~1-2 orders of magnitude greater compared to carbon aerogels (22), vitreous carbon microlattices (24) and alumina-polymer nanolattices (16) with comparable densities. The mechanical attributes of pyrolytic carbon nanolattices in this work span a large density range, from 0.24 to 1.0 g/cm$^3$, and reveal a ~40% higher scaling exponent between mechanical attributes and density, compared with glassy carbon nanolattices (18). These results imply that at densities greater than ~0.4 g/cm$^3$, the strength and stiffness of nano-architected carbon in this work surpass those of all previously reported architected materials. The strength of pyrolytic carbon nanolattices with iso-truss geometries at a density of 1.0 g/cm³ is 1.90 GPa, and that for the octet-truss at a density of 0.95 g/cm³ is 1.73 GPa, which are comparable to the theoretical strength of glassy carbon of ~$E_s$/10, i.e. 2-3 GPa, where E is the modulus of glassy carbon (0,0,0). FIG. 11A demarcates the theoretical limit of Young's modulus as a function of density, expressed as E=250ρ (11), and FIG. 11B includes the theoretical limit of strength versus density, whose lower bound is defined by diamond and the upper bound corresponds to graphene (18). More details about the determination of these theoretical limits are supplied in Methods.

Figure 10C:
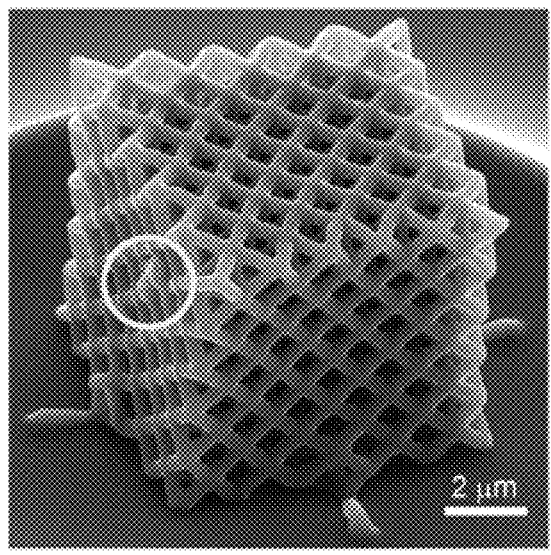
Figure 10D:
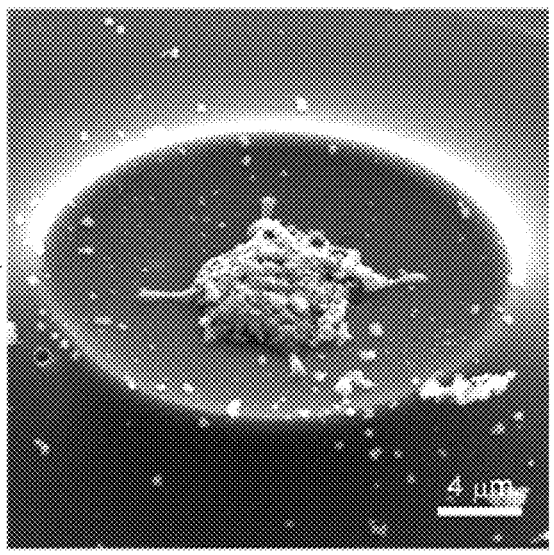
Figure 10E:
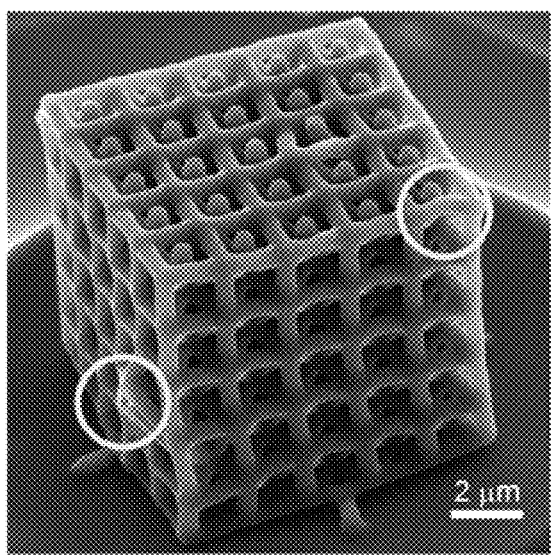
Figure 10F:
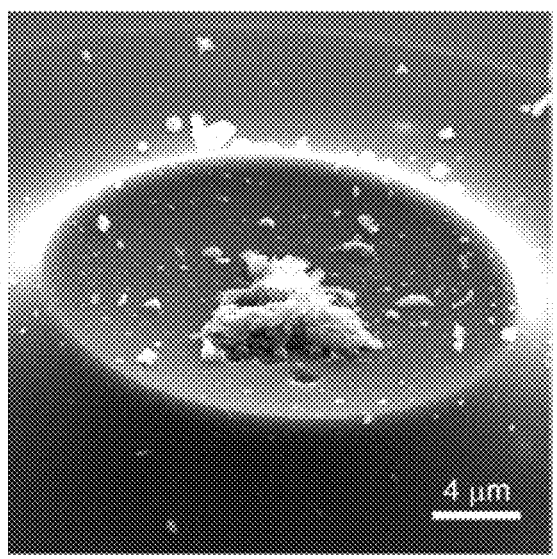
Figure 15A:
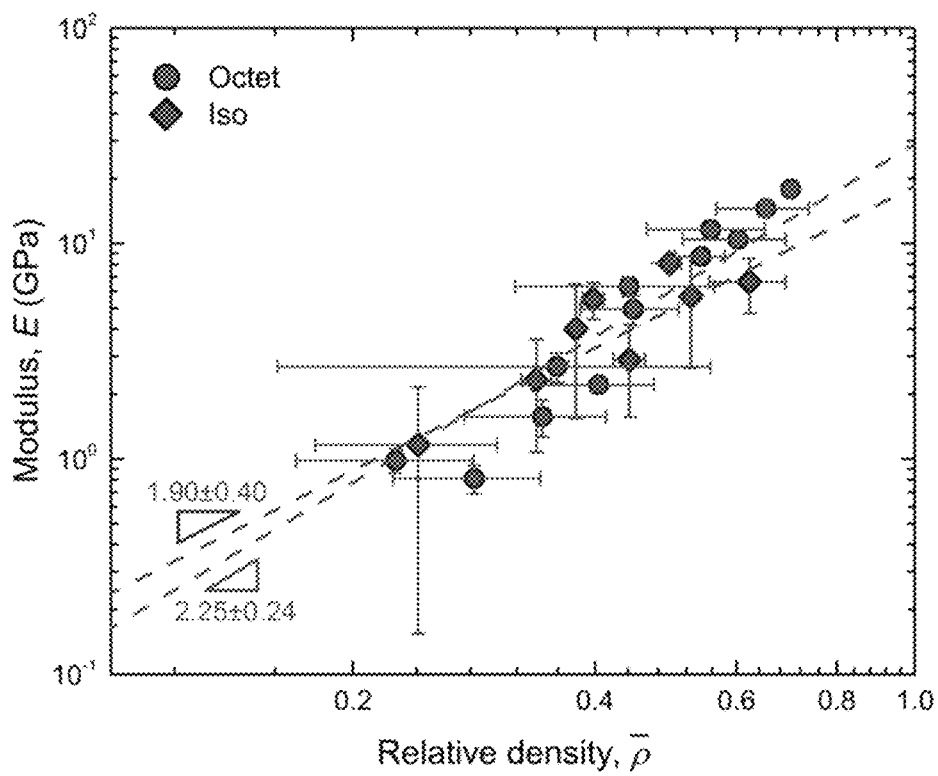
FIGS. 15A-15B. Young's modulus and compressive strength versus density of pyrolytic carbon nanolattices. Young's modulus and strength versus relative density of octet- and iso-truss pyrolytic carbon nanolattices on log-log scale. Scaling power law slopes are indicated for each architecture. Error bars represent the standard deviations from the average over some data of samples with comparable densities.
Figure 15B:
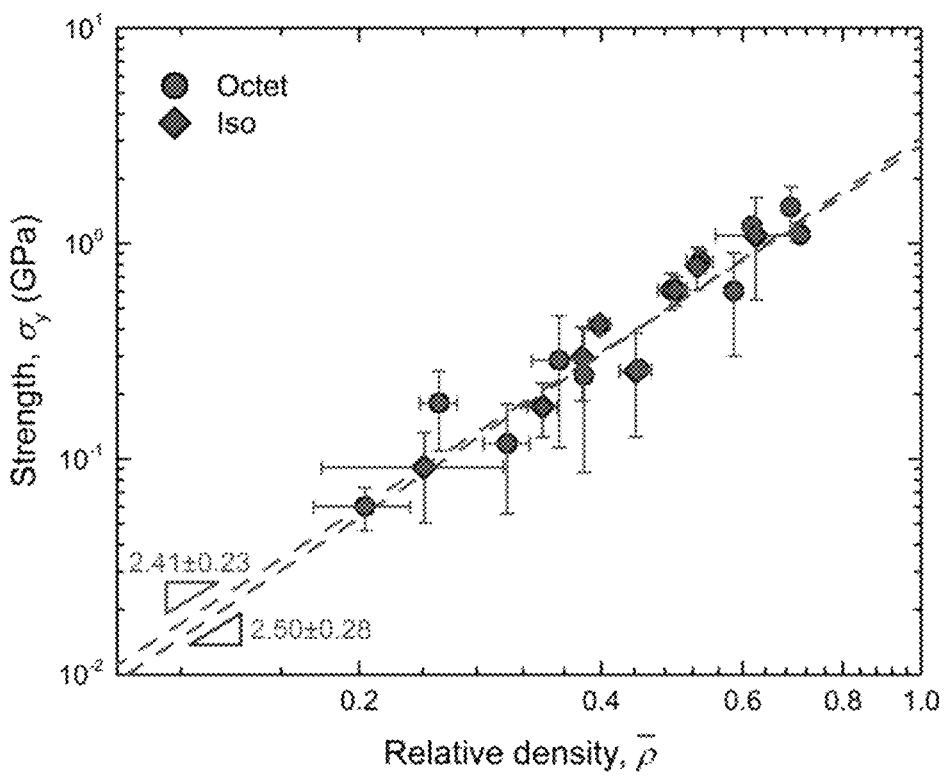

FIGS. 15A and 15B show the variations of Young's modulus and compressive strength with the relative density, respectively. As the relative density spans from 17% to 72%, our pyrolytic carbon nanolattices have the scaling relations of Young's modulus as E~$\bar{\rho}^{2.25}$ for the octet-truss and E~$\bar{\rho}^{1.90}$ for the iso-truss, and those of compressive strength as $\sigma_y$~$\bar{\rho}^{2.41}$ for the octet-truss and $\sigma_y$~$\bar{\rho}^{2.50}$ for the iso-truss. These scaling relations deviate from theoretical predictions for ideal, stretching-dominated structures (1), i.e., E~$\bar{\rho}$ and $\sigma_y$~$\bar{\rho}$, which is mainly attributed to the fabrication-induced structural imperfections and to the non-slender beams. SEM images in FIGS. 10C and 10E show some of the representative detectable fabrication-induced defects that we found to be present in virtually all samples, including beam junction offsets and bulges, slight curvature of the struts, and micro-pits and voids. During compression, these imperfections induce localized deformation and micro-cracking around the nodes, as well as buckling/bending of struts, which leads to premature structural failure (11). When such local deformation and failure occur in stretching-dominated lattices, the scaling exponents for modulus and strength of lattices exceed theoretical predictions and are generally in the range of 1.4-2.5, as exemplified by previous studies (8,11,12,18). The slenderness ratio, defined as R/L, where R is the beam radius and L is the beam length, as well as the nodal geometry have been shown to have significant effect on the stiffness and strength of lattices (9,12,37). The nodes generally form solid joints that impede beam rotation and, to some extent, shorten the effective length of the adjoining beams and lead to stiffening of overall lattices (12). The recent computational and experimental studies found that for solid-beam octet-truss lattices, with a beam slenderness ratio greater than 0.06 and the corresponding relative density beyond 10%, the scaling relations for modulus and strength diverge from existing analytic theories, with the exponents of 2.20 and 1.88 instead of 1.0 (12). The beam slenderness ratios, R/L, of the octet-truss nanolattices in this work are 0.07-0.24, similar to 0.07-0.12 of the monolithic polymer octet-truss nanolattices (12), as well as to 0.06-0.20 of glassy carbon nanolattices with tetrahedral unit cells (18). The scaling exponents of 2.25 (octet-truss) and 1.90 (iso-truss) for Young's modulus and of 2.41 (octet-truss) and 2.50 (iso-truss) for strength found for nano-architected carbon with a relative density between 15% and 80% in this work agree with these existing report (12). FIGS. 11A-11B convey that these relatively high scaling exponents for the mechanical attributes of pyrolytic carbon nanolattices lead to highest stiffness and strength reported to date (11,18).

Figure 12C:
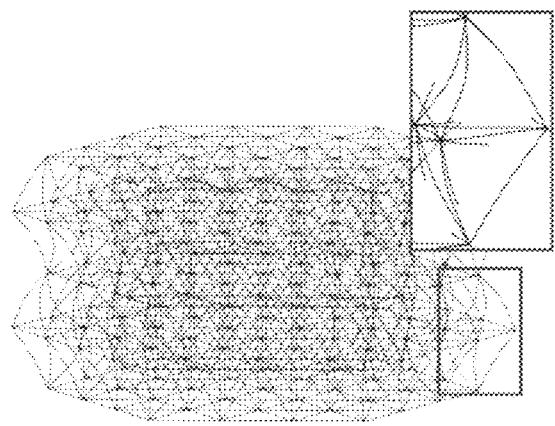
FIGS. 12A-12F. Finite-element simulations of uniaxial compression of pyrolytic carbon nanolattices with different unit cells.
Figure 12B:
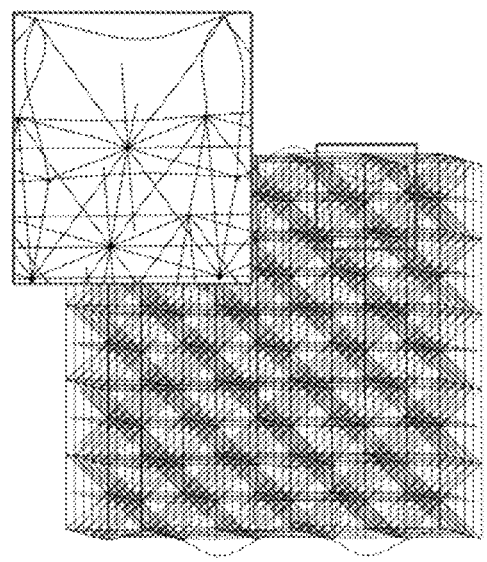
Figure 12A:
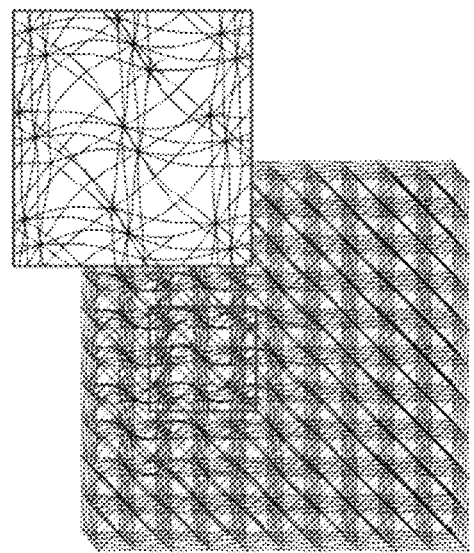
Figure 12D:
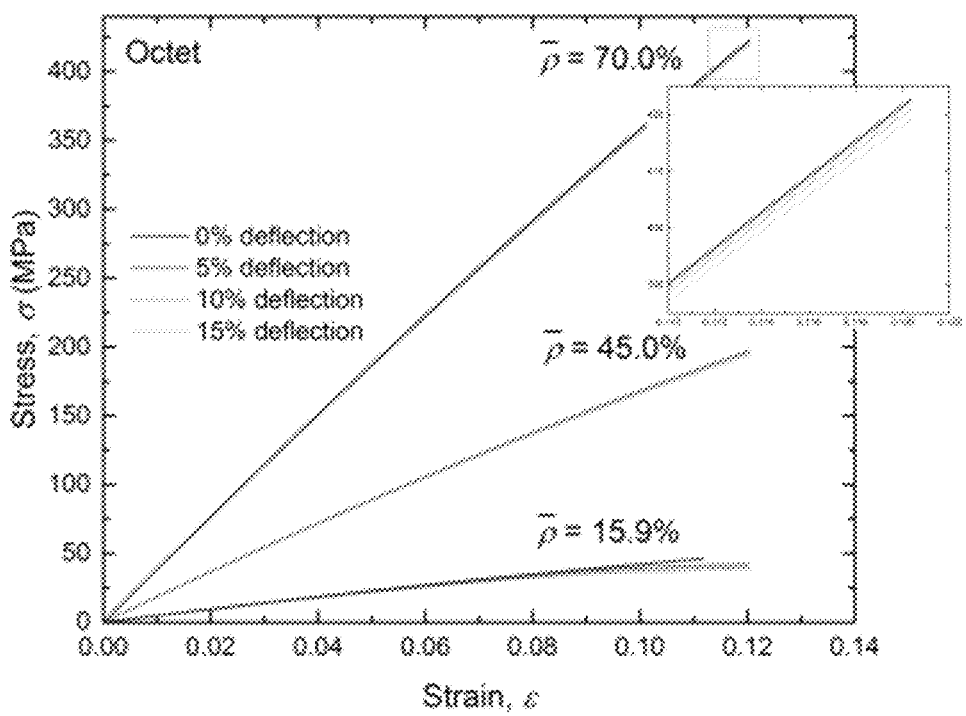
Figure 12E:
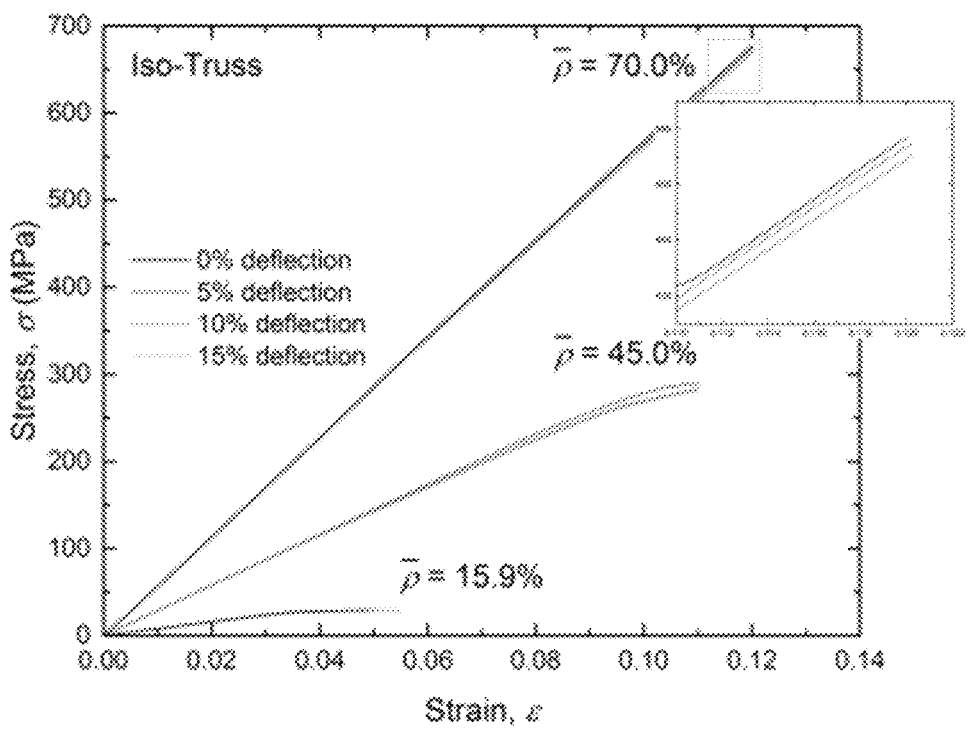
Figure 12F:
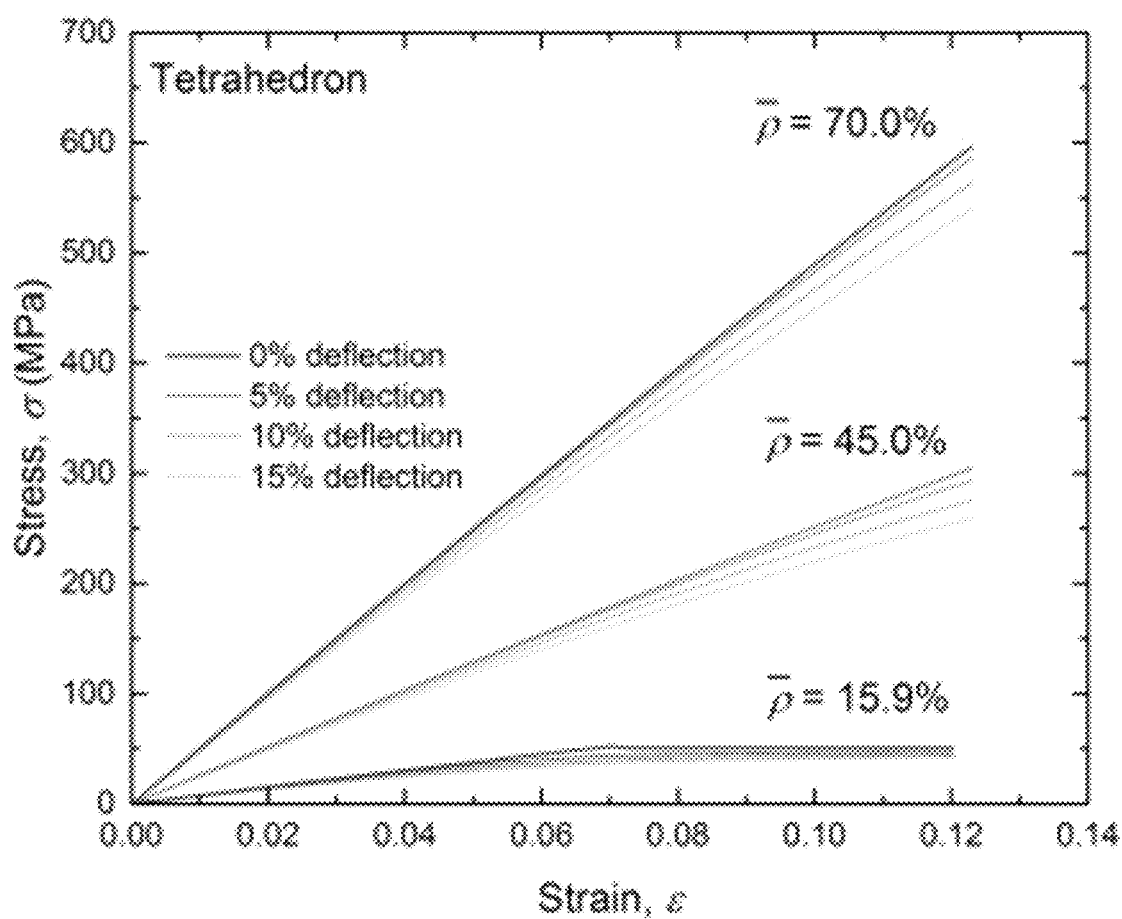
Figure 16:
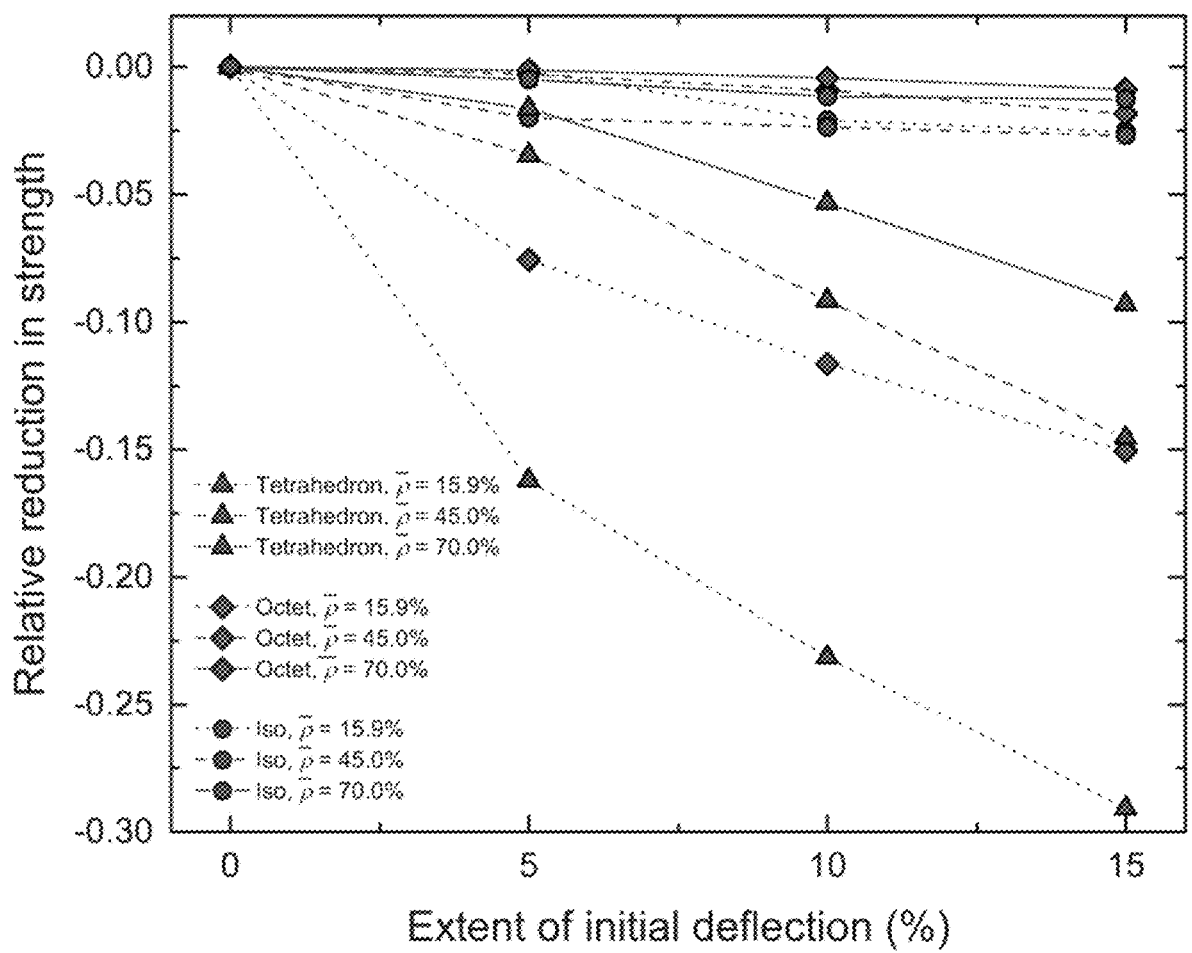
FIG. 16. Relative reduction in strength of nanolattice with initial deflection as a function of the extent of initial deflection.
Figure 17A:
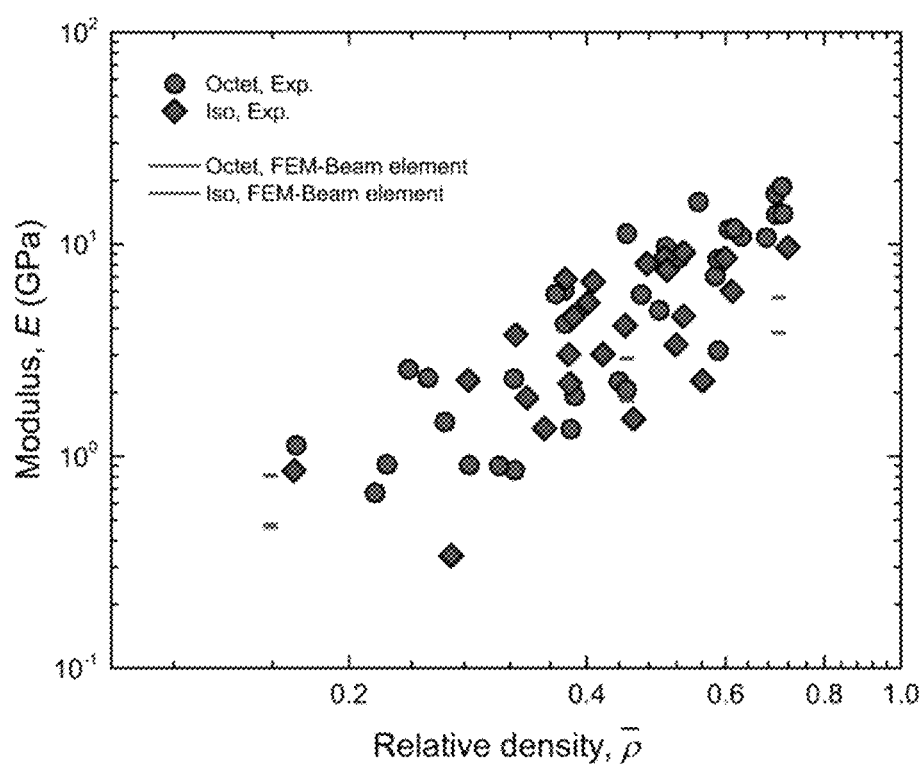
FIGS. 17A-17B. Comparison between finite-element modelling and experimental results. Modulus versus relative density and strength versus relative density from finite-element modelling and experiment. The dependences of modulus and strength of nanolattice on the relative density from finite-element modelling are consistent with those from experimental measurements.
Figure 17B:
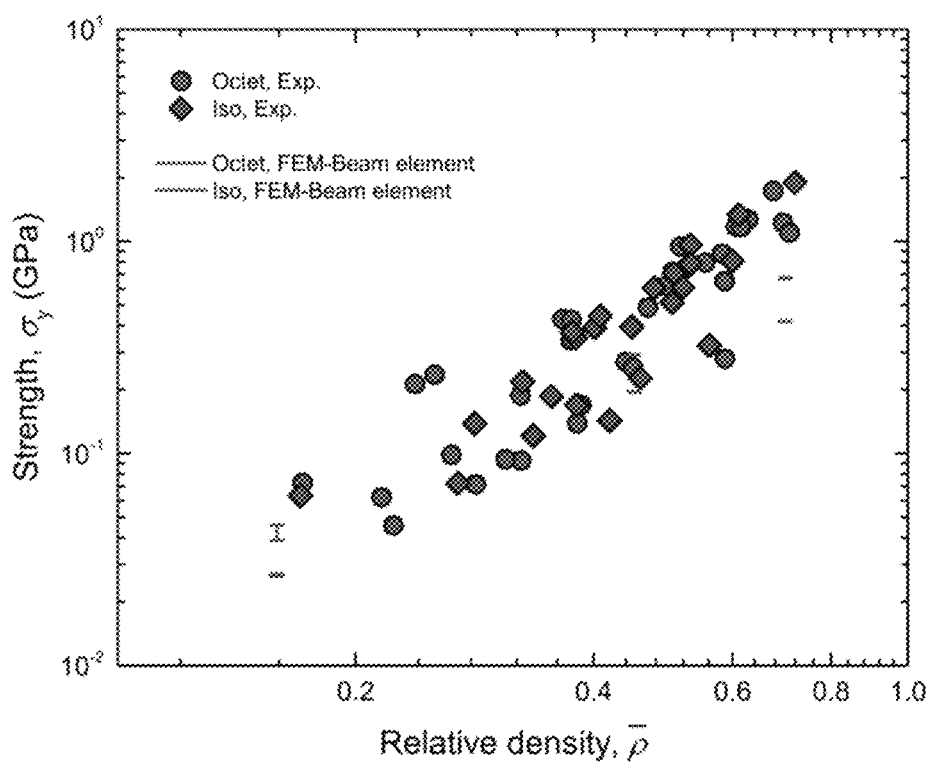
Figure 18:
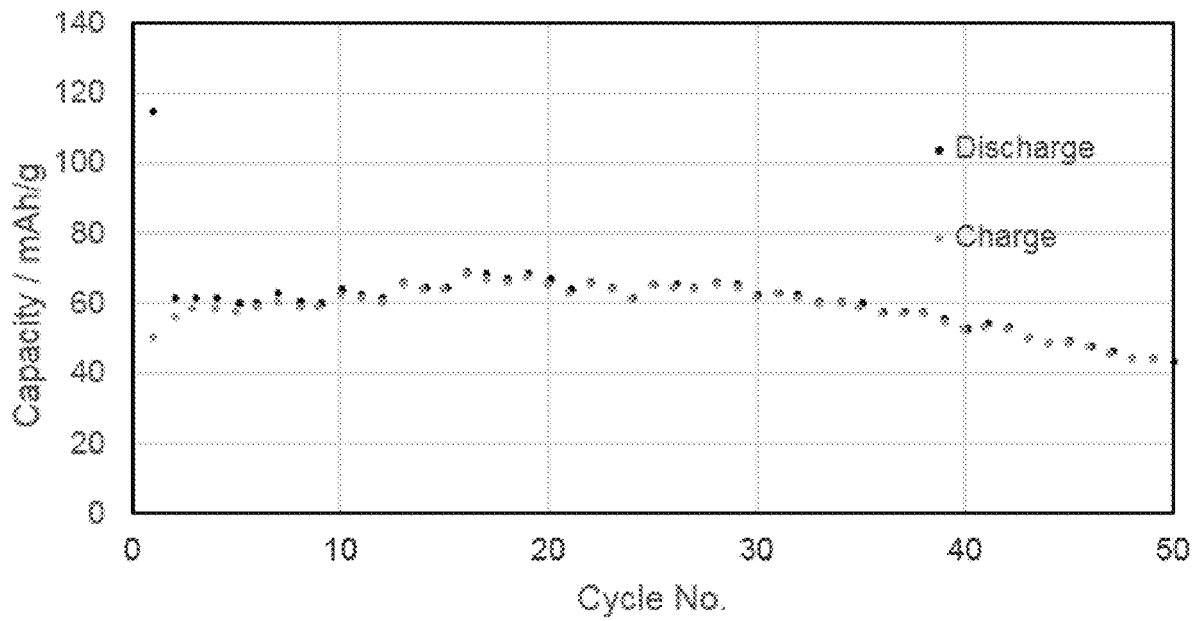
FIG. 18. Na-ion battery cycling using a coin cell. Pyrolyzed 3D carbon electrode was employed for a 2032 coin cell with 1M NaClO4 in propylene carbonate. Counter and reference electrode was Na metal. Capacity started around 60 mA/g at 16.6 mA/g and was fairly stable up to 50 cycles. The first discharge capacity was high because electrons were used for forming solid electrolyte interface (SEI).

To further investigate the influence of the initial imperfections on mechanical properties of pyrolytic carbon nanolattices, we performed a series of finite-element (FE) simulations of compressing samples with relative densities varying from 15.9% to 70%. Details of FE simulations are provided in Methods. The simulated nanolattices had three types of unit-cell geometries: octet-truss and iso-truss for comparison with experiments, and tetrahedron-truss for comparison with previous literature (18), which found that the initial deflection of struts can reduce the compressive strength of nanolattices at lower relative densities. FIGS. 12A-12C show the simulated nanolattices with different unit cells, where pre-existing defects were created by imposing the corresponding buckling eigenmodes with a maximum deflection of the struts prescribed as 5%, 10% and 15% of the edge length, similar to (18). After introducing these initial deflections, some struts remained pre-bent before compression, which resembles structural imperfections in the experimental samples (FIGS. 10C and 10E). We also simulated the compression of a perfect nanolattice as a reference. FIGS. 12D-12F show the compressive stress-strain response up to 12% strain of simulated nanolattices and reveals that the strengths of nanolattices with initial deflection are always lower than those of their perfect counterparts. FIG. 16 shows that FE simulations reveal similar trends in the dependence of modulus and strength on relative density as experimental measurement. FIGS. 17A-17B quantify the variation in strength reduction as a function of initial deflection relative to that of a perfect nanolattice and indicates that (i) for a given relative density and architecture, the relative reduction in strength increases with greater initial deflection; (ii) for a given architecture, the nanolattices with higher densities experience smaller relative weakening with defects; and (iii) nanolattices with tetrahedron-truss unit cells are most susceptible to flaws, followed by octet-truss and iso-truss for all densities. For example, for the relative density of 15.9%, the relative reduction in strength is 2% for the iso-truss and 15% for the octet-truss architectures at a maximum deflection of 15%. The same relative weakening for a relative density of 70% is only <1%.

The results from our current experimental and computational studies indicate that carbon nanolattices with iso-truss and octet-truss architectures, which are intrinsically brittle, exhibit a reduced susceptibility to flaws at higher densities. This can be explained by the local failure in individual struts re-distributing stored elastic energy among other load-bearing truss members instead of triggering catastrophic structural failure. This is consistent with the attainment of nearly-theoretical strengths of carbon nanolattices with densities higher than 0.95 g/cm³. When the struts' diameter is reduced by hundreds of nanometers to dimensions comparable to the critical size for flaw insensitivity of constitute, the struts exhibit high strength and good flaw tolerance, which to some extent contributes to the high strength of carbon nanolattices, which is dictated by local stresses and the volume fractions of the struts (4). Nanolattices with lower densities have thinner and more slender struts, which leads to higher local stresses during compression due to their smaller cross-sectional areas, and the nodal contributions are negligible (12,37). In this case, the higher local stresses lead to earlier buckling of some struts or higher stress concertation around the nodes. Together with the lower volume fraction of thinner struts, the nanolattices with lower densities (i.e. thinner struts) might fail at lower global stresses. In contrast, nanolattices with higher densities (i.e. thicker struts) have lower local stresses because of the greater cross-sectional area in each strut, with significant contribution of the nodes to the load-bearing ability, which results in a relatively uniform distribution of applied load throughout the nanolattice (12,37). Under these conditions, the nanolattices fail when the local stresses in the struts approach the theoretical strength of constitute carbon. Such local stress and higher volume fraction of struts eventually result in high strength of nanolattices at higher densities. The optimized unit-cell geometries, such as octet- and iso-truss, with better flaw tolerance also facilitate the achievement of high strength.

Figure 13:
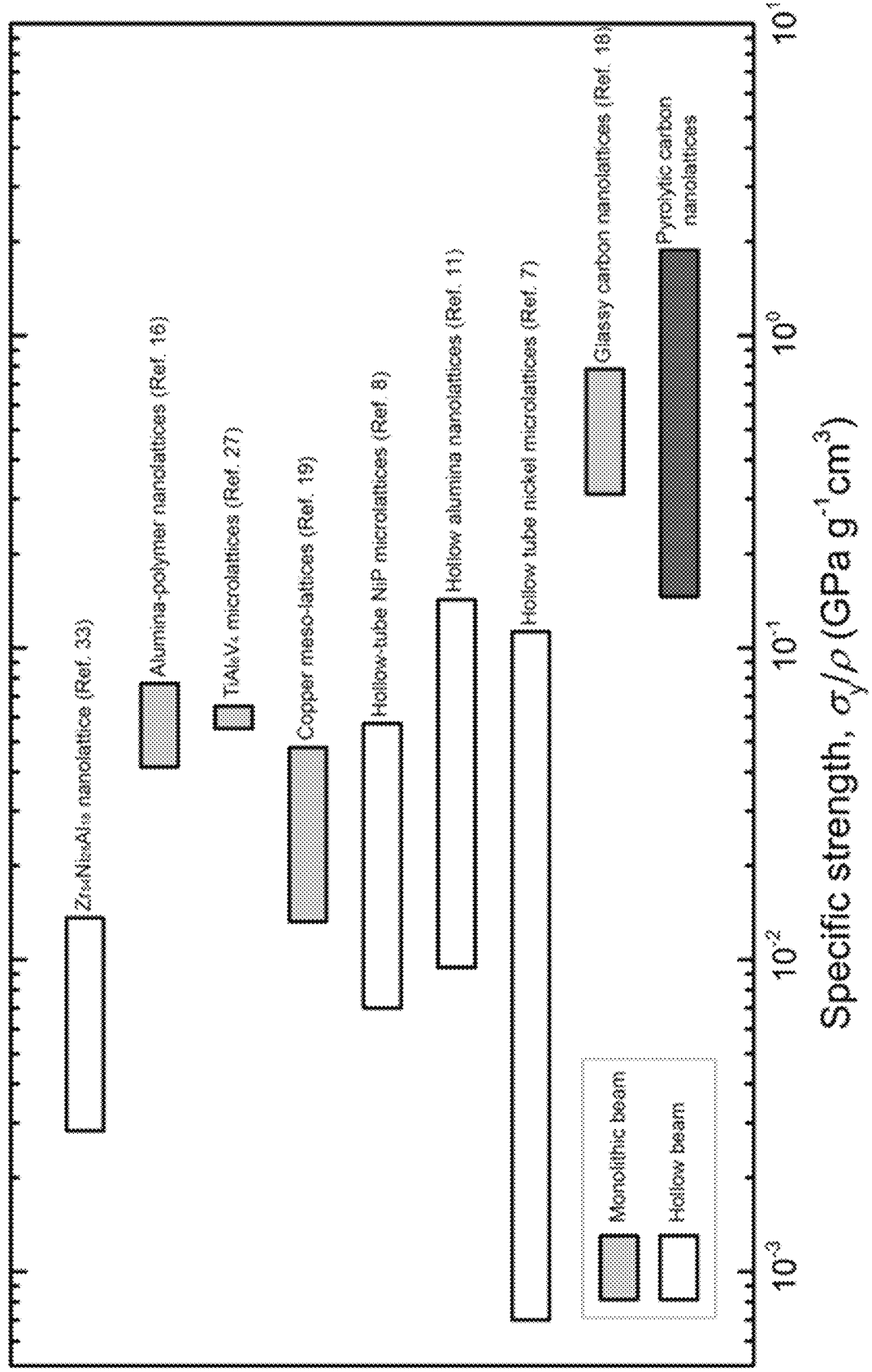
FIG. 13. Comparison of the specific strength between our pyrolytic carbon nanolattices and other micro- and nanolattices reported so far.

FIG. 13 shows that the specific strengths of pyrolytic carbon nanolattices range from 0.146 to 1.90 GPa $g^{-1}$ $cm^3$, which represents 2-3 orders of magnitude improvement over all nano- and micro-architected periodic lattices reported to date, including hollow-tube nickel (7) and NiP (8), copper (19), and $TiAl_6V_4$ (27) microlattices, as well as of hollow-beam alumina (11), alumina-polymer (16) and metallic glass $Zr_{54}Ni_{28}Al_{18}$ nanolattices (33). The maximum specific strength of the carbon nanolattices in this work, at a density of 1.0 $g/cm^3$, is 2.4 times higher than that of 0.80 GPa $g^{-1}$ $cm^3$ reported for glassy carbon nanolattices (18), and represents 35% of fully-dense diamond, at 5.60 GPa $g^{-1}$ $cm^3$, which has the highest specific strength of all bulk materials (18). Such ultra-high specific strength of our pyrolytic carbon nanolattices arises from both the nano-sized beam diameters and the optimized lattice topology.

In this work, we developed an additive fabrication methodology to create micro- and nano-architected pyrolytic carbon with densities below 1.0 $g/cm^3$, GPa-level strengths, and >10% deformability before failure. As a point of departure from all existing work on micro-/nano-lattices (11,16, 18,22-26), the modulus and strength of nano-architected carbon in this work approach their theoretical limits. Rational design of lattice topologies with appropriate microstructure and nano- and micro-scale characteristic materials dimensions enabled us to create prototype architectures of octet- and iso-truss pyrolytic carbon nanolattices with a Young's modulus of 0.34-18.6 GPa and strengths of 0.05-1.90 GPa at densities of 0.24-1.0 $g/cm^3$, which translates into a specific strength of 0.146-1.90 GPa $g^{-1}$ $cm^3$ that has not been attained by any carbon-based or architected material. This nano-architected carbon also exhibited average fracture strains of 14.0%-16.7%, exceeding those of all other reported brittle architected materials. Experiments and simulations demonstrate that for densities higher than 0.95 $g/cm^3$, these samples become virtually insensitive to fabrication-induced defects, which gives rise to their attaining nearly-theoretical strength of 1.90 GPa and lends them to being particularly lucrative candidates for structural applications. This work provides insights into fundamental scientific principles that govern the design and properties of nano-architected materials and provides a feasible pathway for their use in scalable fabrication because of their emergent robustness against defects, ultra-light weight, and superior strength.

Materials and Methods:

Fabrication of pyrolytic carbon nanolattice. We first fabricated polymeric microlattices out of IP-Dip photoresist, using TPL DLW (Nanoscribe, GmbH) with a speed of 10,000 $\mu m$ $s^{-1}$ and laser power of 17.5 mW. During the DLW process, we printed the struts with 0.8-3.0 $\mu m$-diameter circular cross sections via the high-speed galvo mode in a layer-by-layer fashion. All the printed polymeric microlattices have two typical unit-cell geometries: one is the octet-truss (FIG. 9B), and another is the iso-truss (FIG. 9D). The unit-cell size of polymeric microlattices is about 10 $\mu m$. Then the polymeric microlattices were pyrolyzed at 900° C. for 5 hours in a vacuum, with a ramp rate of 7.5° C. $min^{-1}$ up to the target temperature and then cooled down to room temperature at a natural rate. After pyrolysis, the polymeric microlattices transformed into pyrolytic carbon nanolattices, due to the mass-loss-induced carbonation of the polymers at elevated temperature (30). The diameters of all struts in pyrolytic carbon nanolattices isotropically shrunk to about 261-679 nm, which is about 20%-25% of their initial dimensions (FIGS. 9C and 9E). The unit-cell size of all pyrolytic carbon nanolattices is about 2 $\mu m$.

Mechanical testing. We conducted uniaxial compression experiments on all fabricated polymer microlattices and pyrolytic carbon nanolattices. Some of these experiments were performed in an in situ instrument (InSEM, Nanomechanics) with a 170 $\mu m$-diameter flat diamond punch at a constant strain rate of $10^{-3}$ $s^{-1}$ to reveal the deformation morphology simultaneously with mechanical data acquisition. Other experiments were carried out at a constant loading rate of 0.2 mN $s^{-1}$ in a nanoindenter (G200, Agilent/Keysight Technologies) using a 120 $\mu m$-diameter diamond flat punch.

Finite element modelling. We carried out a series of FE modelling for the compression of pyrolytic carbon nanolattices via Abaqus. The isotropic linear elastic material was used for modelling. All nanolattices were modeled with beam element. The Young's modulus of material is 20 GPa (34) and the Poisson's ratio was 0.15 (18). The simulated nanolattices have three types of unit-cell geometries, including octet-truss, iso-truss and tetrahedron-truss. For each type of nanolattice, the unit-cell size sets to be 2 $\mu m$, and the relative density varies from 15.9% to 70% by alternating the diameter of struts. Before compression, we introduce initial deflection to the struts of simulated nanolattices by imposing the corresponding buckling eigenmodes of nanolattices (e.g., FIGS. 12A-12C). The maximum deflection of the struts is set as 5%, 10% and 15% of the edge length. After introducing initial deflection, some struts remain pre-bent before compression, which is very similar to some structural imperfections in the experimental samples (FIGS. 10C and 10E). During compression, the bottom of nanolattice was fixed, and the top is imposed by the displacement loading. We simulated the compression of nanolattice with perfectly straight struts as a reference to address the influence of imperfections/flaws on mechanical properties and response of nanolattice.

Determination of theoretical limits for Young's modulus and strength versus density. The modulus-density theoretical limit is taken from the literature (11) and determined by the bound of many data of real materials based on Granta Design, which is a standard software for materials selection and graphical analysis of materials properties. More information about Granta Design can be found in the webpage (https://www.grantadesign.com/) and relevant software documentation. The strength-density limit is defined in the literature (18) and just a specific range based on the measurements for all materials to date. The lower bound of this range is defined by diamond, which has the highest specific strength of all bulk materials, while the upper bound is determined by graphene, which holds the highest strength in all materials so far.

References corresponding to Example 2:
1. Gibson L J, Ashby M F (1999) *Cellular Solids: Structure and Properties* (Cambridge University Press, Cambridge, U K), 2nd ed.
2. Hamm C E, Merkel R, Springer O, Jurkojc P, Maier C, Prechtel K, Smetacek V (2003) Architecture and material properties of diatom shells provide effective mechanical protection. *Nature* 421:841-843.
3. Weiner S, Wagner H D (1998) The material bone: structure-mechanical function relations. *Annu. Rev. Mater. Sci.* 28:271-298.

4. Gao H, Ji B, Jäger I L, Arzt E, Fratzl P (2003) Materials become insensitive to flaws at nanoscale: lessons from nature. *Proc. Natl. Acad. Sci. U.S.A.* 100:5597-5600.
5. Wegst U G K, Bai H, Saiz E, Tomsia A P, Ritchie R O (2015) Bioinspired structural materials. *Nat. Mater.* 14:23-36.
6. Libonati F, Gu G, Qin Z, Vergani L, Buehler M J (2016) Bone-inspired materials by design: Toughness amplification observed using 3D printing and testing. *Adv. Eng. Mater.* 18:1354-1363.
7. Schaedler T A, Jacobsen A J, Torrents A, Sorensen A E, Lian J, Greer J R, Valdevit L, Carter W B (2011) Ultralight metallic microlattices. *Science* 334:962-965.
8. Torrents A, Schaedler T A, Jacobsen A J, Carter W B, Valdevit L (2012) Characterization of nickel-based microlattice materials with structural hierarchy from the nanometer to the millimeter scale. *Acta Mater.* 60:3511-3523.
9. Valdevit L, Godfrey S W, Schaedler T A, Jacobsen A J, Carter W B (2013) Compressive strength of hollow microlattices: Experimental characterization, modeling, and optimal design. *J. Mater. Res.* 28:2461-2473.
10. Jang D, Meza L R, Greer F, Greer J R (2013) Fabrication and deformation of three-dimensional hollow ceramic nanostructures. *Nat. Mater.* 12:893-898.
11. Meza L R, Das S, Greer J R (2014) Strong, lightweight, and recoverable three-dimensional ceramic nanolattices. *Science* 345:1322-1326.
12. Meza L R, Phlipot G P, Portela C M, Maggi A, Montemayor L C, Comella A, Kochmann D M, Greer J R (2017) Reexamining the mechanical property space of three-dimensional lattice architectures. *Acta Mater.* 140: 424-432.
13. Maggi A, Li H, Greer J R (2017) Three-dimensional nano-architected scaffolds with tunable stiffness for efficient bone tissue growth. *Acta Biomater.* 63:294-305.
14. Meza L R, Zelhofera A J, Clarke N, Mateosa A J, Kochmanna D M, Greer J R (2015) Resilient 3D hierarchical architected metamaterials. *Proc. Natl. Acad. Sci. U.S.A.* 112:11502-11507.
15. Zheng X, Lee H, Weisgraber T H, Shusteff M, DeOtte J, Duoss E B, Kuntz J D, Biener M M, Ge Q, Jackson J A, Kucheyev S O, Fang N X, Spadaccini C M (2014) Ultralight, ultrastiff mechanical metamaterials. *Science* 344:1373-1377.
16. Bauer J, Hengsbach S, Tesari I, Schwaiger R, Kraft O (2014) High-strength cellular ceramic composites with 3D microarchitecture. *Proc. Natl. Acad. Sci. U.S.A.* 111: 2453-2458.
17. Zheng X, Smith W, Jackson J, Moran B, Cui H, Chen D, Ye J, Fang N, Rodriguez N, Weisgraber T, Spadaccini C M (2016) Multiscale metallic metamaterials. *Nat. Mater.* 15:1100-1106.
18. Bauer J, Schroer A, Schwaiger R, Kraft O (2016) Approaching theoretical strength in glassy carbon nanolattices. *Nat. Mater.* 15:438-444.
19. Gu X W, Greer J R (2015) Ultra-strong architected Cu meso-lattices. *Extreme Mech. Lett.* 2:7-14.
20. Vyatskikh A, Delalande S, Kudo A, Zhang X, Portela C M, Greer J R (2018) Additive manufacturing of 3D nano-architected metals. *Nat. Commun.* 9:593.
21. Zhang X, Yao J, Liu B, Yan J, Lei L, Li Y, Gao H, Li X (2018) Three-dimensional high-entropy alloy-polymer composite nanolattices that overcome the strength-recoverability trade-off. *Nano Lett.* 18:4247-4256.
22. Fairén-Jiménez D, Carrasco-Marin F, Moreno-Castilla C (2007) Adsorption of benzene, toluene, and xylenes on monolithic carbon aerogels from dry air flows. *Langmuir* 23:10095-10101.
23. Zhu C, Han T Y, Duoss E B, Golobic A M, Kuntz J D, Spadaccini C M, Worsley M A (2015) Highly compressible 3D periodic graphene aerogel microlattices. *Nat. Commun.* 6:6962.
24. Jacobsen A J, Mahoney S, Carter W B, Nutt S (2011) Vitreous carbon micro-lattice structures. *Carbon* 49:1025-1032.
25. Chen X, Zhao G, Wu Y, Huang Y, Liu Y, He J, Wang L, Lian Q, Li D (2017) Cellular carbon microstructures developed by using stereolithography. *Carbon* 123:34-44.
26. Eckel Z C, Zhou C, Martin J H, Jacobsen A J, Carter W B, Schaedler T A (2016). Additive manufacturing of polymer-derived ceramics. *Science* 351:58-62.
27. Challis V J, Xu X, Zhang L, Roberts A P, Grotowski J F, Sercombe T B (2014) High specific strength and stiffness structures produced using selective laser melting. *Mater. Design* 63, 783-788.
28. Deshpande V S, Fleck N A, Ashby M F (2001) Effective properties of the octet-truss lattice material. *J. Mech. Phys. Solids* 49:1747-1769.
29. Messner M C (2016) Optimal lattice-structured materials. *J. Mech. Phys. Solids* 96:162-183.
30. Li X, Gao H (2016) Smaller and stronger. *Nat. Mater.* 15:373-374.
31. Zhang X, Zhong L, Mateos A, Kudo A, Vyatskikh A, Gao H, Greer J R, Li X (2018) Carbon by design through atomic-level architecture. *Under submission*.
32. Harris P J (2005) New perspectives on the structure of graphitic carbons. *Crit. Rev. Solid State* 30:235-253.
33. Liontas R, Greer J R (2017) 3D nano-architected metallic glass: Size effect suppresses catastrophic failure. *Acta Mater.* 133:393-407.
34. Stein Y I, Constable A J, Morales-Medina N, Sackier C V, Devoe M E, Vincent H M, Wardle B L (2017) Structure-mechanical property relations of non-graphitizing pyrolytic carbon synthesized at low temperatures. *Carbon* 117:411-420.
35. Cowlard F C, Lewis J C (1967) Vitreous carbon—a new form of carbon. *J. Mater. Sci.* 2, 507-512.
36. Zhao J X, Bradt R C, Walker P L J (1985) The fracture toughness of glassy carbons at elevated temperatures. *Carbon* 23, 15-18.
37. Portela C M, Greer J R, Kochmann D M (2018) Impact of node geometry on the effective stiffness of non-slender three-dimensional truss lattice architectures. *Extreme Mech. Lett.* 22:138-148.

Example 3: Additional Supplemental Materials for 3D Pyrolyzed Electrodes

Figure 19:
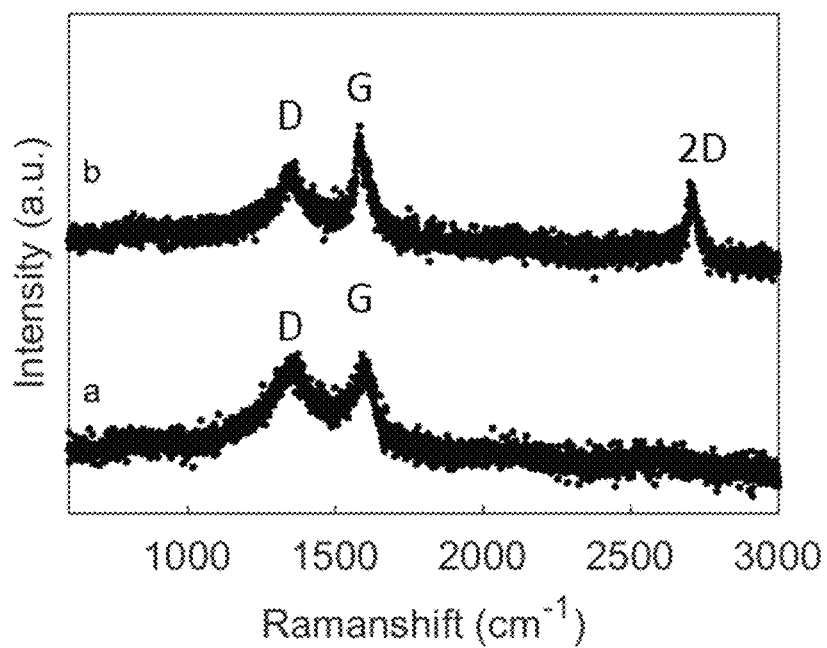
FIG. 19. Graphitization using Ni catalyst. Raman spectrums of (a) photoresin-derived carbon, (b) Ni salt-containing photoresin derived carbon.

In order to increase degree of graphitization by Ni catalyst, $Ni(NO_3)_2$ in ethanol was mixed with acryl-based photoresin. Pyrolysis process was same as previous one used for 3D architected carbon electrode (i.e. 1000 C). Referring to FIG. 19, Raman spectrum of the carbon pyrolyzed from $Ni(NO_3)_2$ contained photoresin showed sharp G peak and 2D peak, which demonstrate the presence of graphitic structure.

Figure 20:
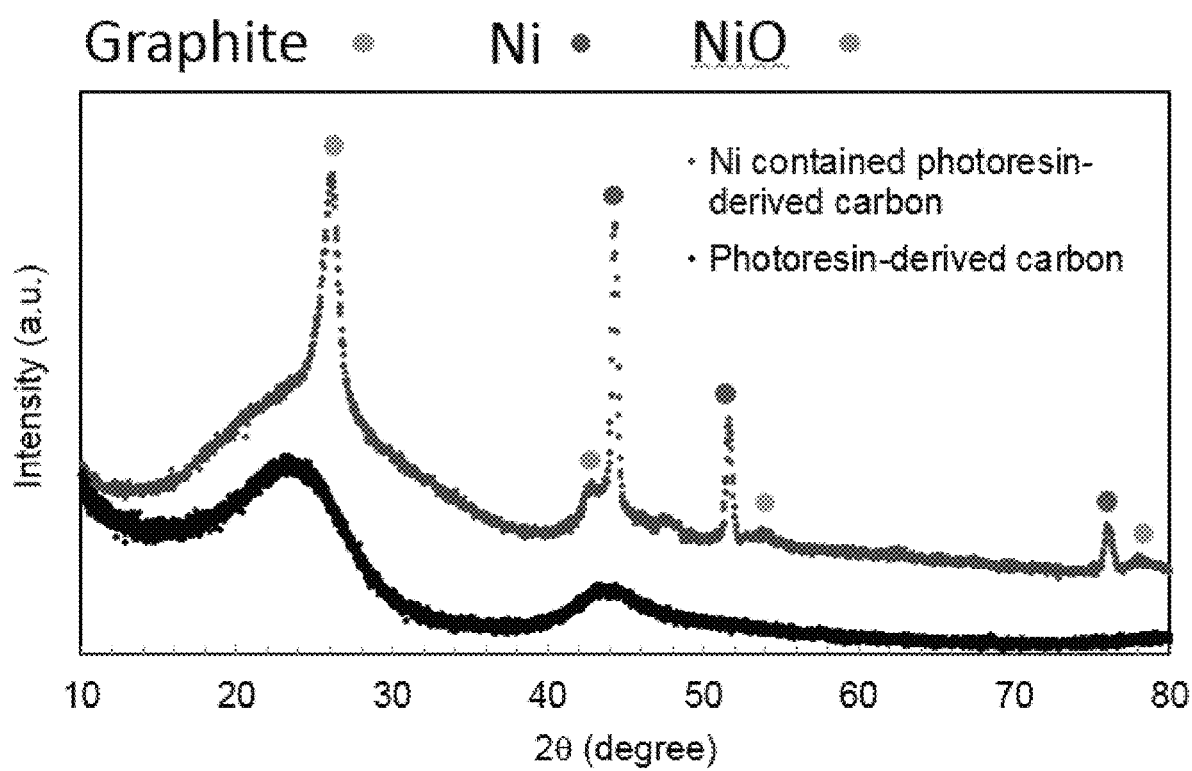
FIG. 20. Graphitization using Ni catalyst. XRD patterns of photoresin-derived carbon and Ni salt-containing photoresin derived carbon.
Figure 21:
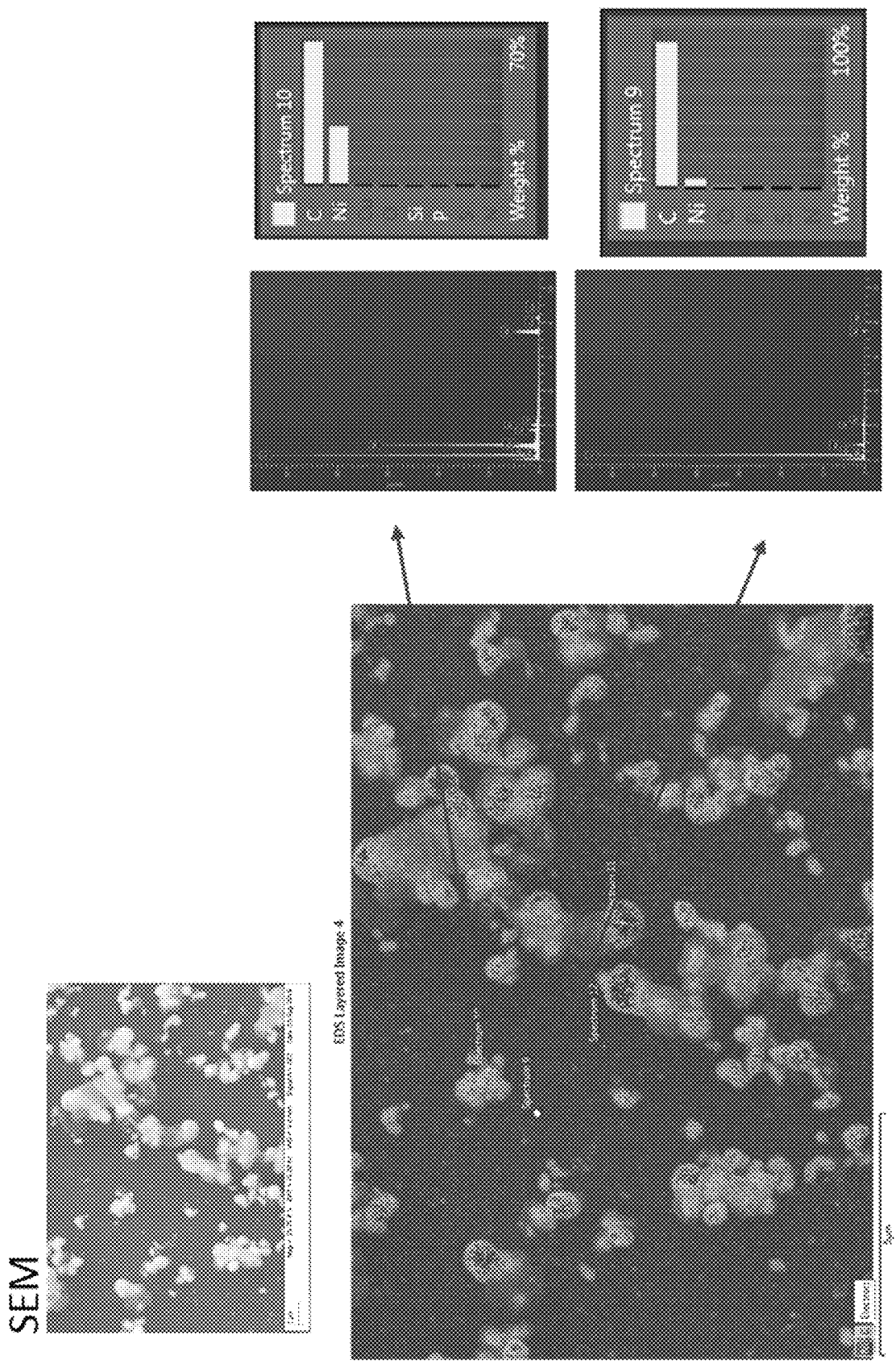
FIG. 21. Graphitization using Ni catalyst. EDS elemental mapping showed very dispersed particles contained Ni. Energy dispersive spectroscopy (EDS) elemental mapping and point analysis for Ni salt-containing photoresin derived carbon.

Referring to FIG. 20, XRD pattern of carbon pyrolyzed from $Ni(NO_3)_2$ contained photoresin showed sharp graphite peaks, which also support that the presence of graphitic structure. Peaks of Ni were also detected, which indicate this material was graphite-Ni composite. Photoresin-derived carbon (i.e. 3D architected carbon) showed broad patterns, which indicates amorphous carbon structure.

Example 4: Scalable Fabrication Method of 3D Architected Battery Electrode Using Additive Manufacturing and Pyrolysis with Fully Controllable Electrode Engineering Factors Abstract: Engineering optimal electrode architecture in lithium-ion batteries is one strategy to meet demands of the current electronic applications in volumetric power and energy density in order to surpass a conventional slurry electrode, which has dependent relationship in an active materials fraction and ion-diffusion path in electrode and electrolyte. Here, we demonstrated the facile and scalable fabrication method of the additive and substrate-free 3D architected electrode using digital light processing (DLP) 3D printing and subsequent pyrolysis, which can control independently all of those factors to realize any desirable architectures with excellent structural integrity. The 1 mm thick and non-tortuous periodic structure of disordered carbon showed more than 4 mAh/g at 0.38 mA/cm$^2$ over 100 cycles without structural damage and 30 MPa as yield strength, despite remaining huge room of material and architecture optimization. This multi-scale tunable fabrication method can give a new path not only to electrode design in conventional planner cells but also to a 3D interdigitated full battery.

Introduction: Lithium (Li)-ion batteries have been developed and widely used in various applications such as portable electronics and electric vehicles[1]. In a battery system, carriers (e.g. Li-ion) move through an electrolyte between two electrodes which function as a reservoir and determine theoretical maximum capacity. Therefore, the electrode materials development has pushed boundaries in theoretical performances[2,3]. In a battery package, however, the structure of electrodes limits achievable performance. For example, a fraction of active materials in an overall battery design including non-active materials such as binders, conductive additives, current collector and separator determines practical volumetric energy density[4]; tortuosity in electrode affects effective ion diffusion length, which limits kinetics and resultant power density[5]. The most conventional but commercially employed electrode structure was composed of active particles randomly stacked on a current collector with binders and conductive additives, namely slurry electrode[6], although it has trade-off relationship between tortuosity and active materials fraction due to its random porous structure as represented by the Bruggeman relation[7]. Therefore, in recent years, engineering of electrode structures has been explored to increase electrode thickness and then the active materials fraction in a battery package, which affect overall volumetric energy density, with sustaining low tortuosity and high electric conductivity, which have a significant influence on power density. For instance, thick slurry electrodes have been developed with some methods including magnetic alignment of porous structure for low tortuosity[8] and loading slurry on the surface of a 3D current collector to shorten an electron path through active particles and conductive additives.[9,10] Moreover, non-tortuous porous monolith has been developed by various sacrificial template methods such as a bio-template,[11] monodispersed particles template (i.e. inverse opal structure),[12] and magnetically aligned template.[13] The recent development in additive manufacturing, for instance extrusion-based 3D printing and lithography, has also contributed to the engineering of the electrode structure to make pre-designed structure.[14-20] One recent research conducted by M. Saleh et al. demonstrated the fabrication of a 3D architected battery electrode made of silver using a commercial aerosol jet 3D printer.[21] Yet, all of these methods are still limited in one or more aspects: scalability, facileness, non-active components requirement, and especially the range of controllable form-factors. The fabrication method with all controllable form-factors can independently determine tortuosity, the effective active materials fraction as well as mechanical resilience, which significantly influences on structural integrity in a real battery throughout packaging and operation but hardly addressed in laboratory-research.

Here, we introduce facile and scalable fabrication method of the 3D architected carbon battery electrode that can control all form-factors from the micron scale to centimeter scale by 3D printing of photo-cured resin and subsequent pyrolysis for carbonization. Methods using lithography-based techniques with pyrolysis to form 3D architected carbon were demonstrated for the study of nanomechanics[22] or catalyst support,[23] but not for battery applications. The full flexibility in 3D architecture can realize free-standing (i.e. substrate-free) and additive-free 3D architected monolithic electrode with minimized tortuosity, great mechanical resilience, and suitable global geometry to a final battery product design.

Figure 23:
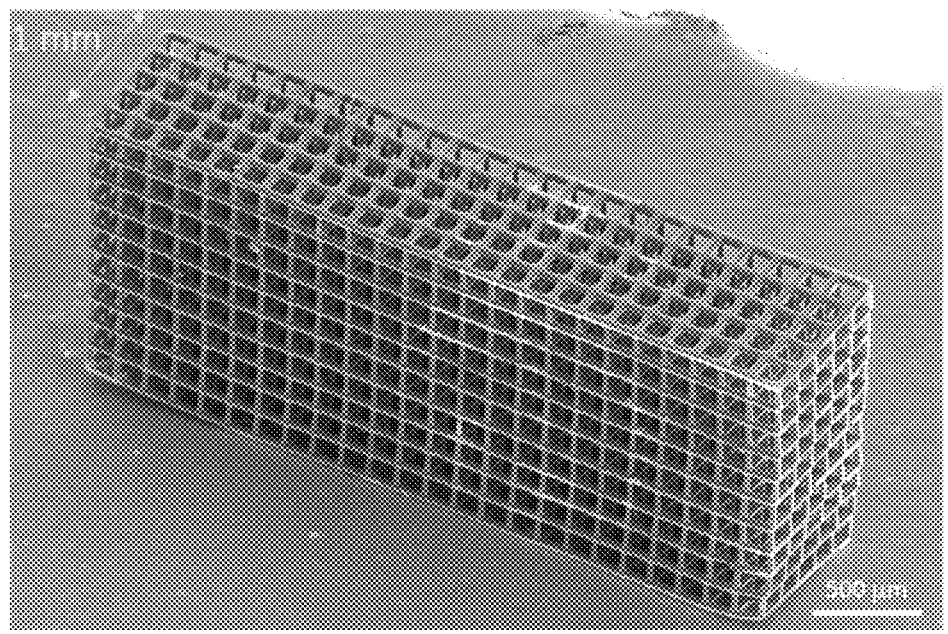
FIG. 23. An electrode, comprising a porous three-dimensional structure, according to an embodiment.
Figure 24:
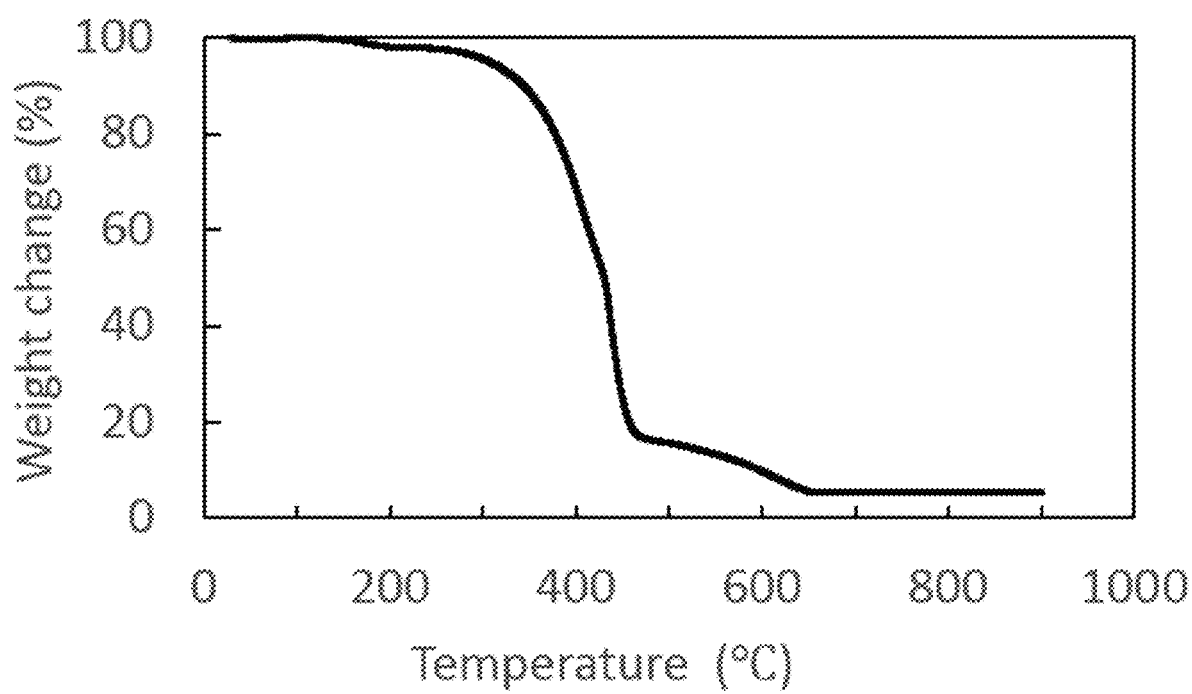
FIG. 24. Thermogravimetric analysis (TGA) of acryl-based photoresin in $N_2$ atmosphere.

Results: For proof-of-concept, free-standing 3D architected carbon was fabricated by digital light processing (DLP) 3D printing and subsequent pyrolysis in a vacuum. FIGS. 22A-22I illustrate the fabrication processes of the 3D architected carbon. The desired structure was designed in computer-aided design and printed by the DLP 3D printer (FIGS. 22A and 22B). Periodic structure with unit structures composed of diagonal beams of imaginary cubic was chosen for this study because of its simple and non-tortuous structure. Note that the DLP 3D printer can print any arbitrary architectures (FIG. 23). In the DLP 3D printer, acryl-based resin was cured by ultraviolet light with a 2D pixel pattern in a layer-by-layer manner. The 3D architected polymer shown in FIG. 22A, which have 3 mm tall, took a half hour to print. The 3D architected polymer was pyrolyzed in vacuum at 1000° C. for 4 hours following step heat processes at 300 C and 400 C for completing decomposition involving gas evolution. Thermogravimetric analysis showed initiation of decomposition at 300° C. and rapid mass reduction around 400° C., and carbonization completion around 650° C. (FIG. 24). Secondary electron images of FIG. 22C illustrate the morphology of the 3D architecture before and after pyrolysis. The edge of the square beam of the 3D architected polymer was rounded because its length was close to the resolution of the used DLP 3D printer. The pyrolysis process shrunk the structure isotropically with maintaining its detail morphology with the shrinkage ratio of approximately 3. The 3D architected carbon had, as representation, 28 um in beam length, 166 μm in unit structure length, 1.1 cm in global diameter, 1 mm in sample's thickness (corresponding to 6 layers) and 10% in relative density. For the low relative density, mass loading was relatively high due to its ultrathick structure, 23-27 mg/cm$^2$. The insets in FIG. 22C in both 3D architected polymer and carbon show the top view of the architecture, which illustrates the straight pores (i.e. non-tortuous) from top to bottom.

Figure 25A:
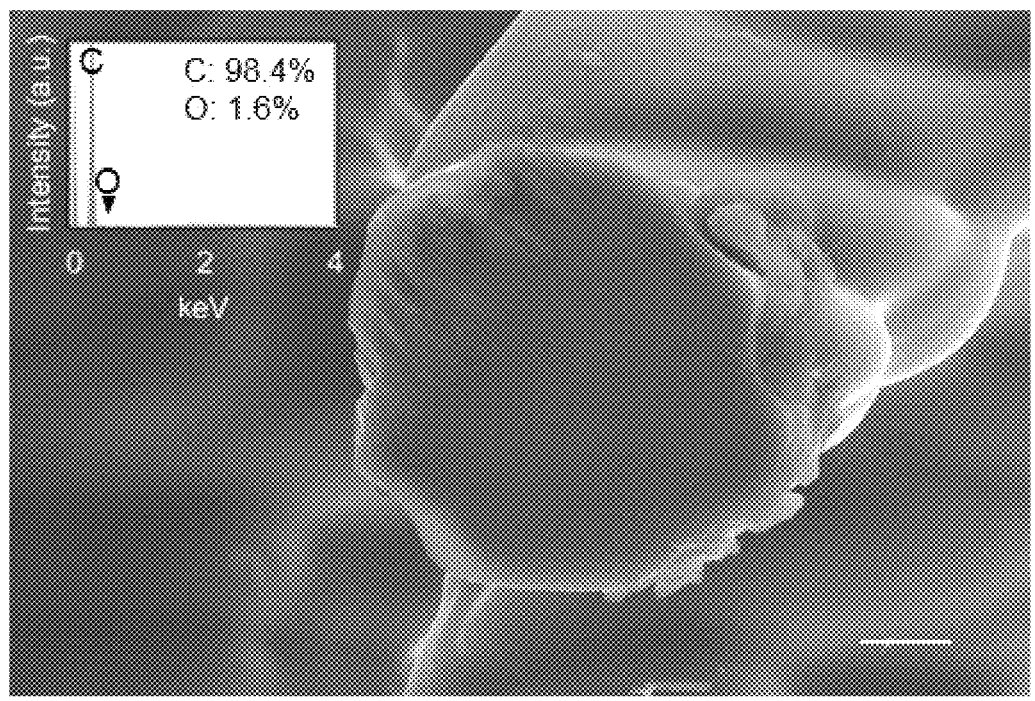
FIGS. 25A-25D. Microstructure characterization of 3D architected carbon.
Figure 25B:
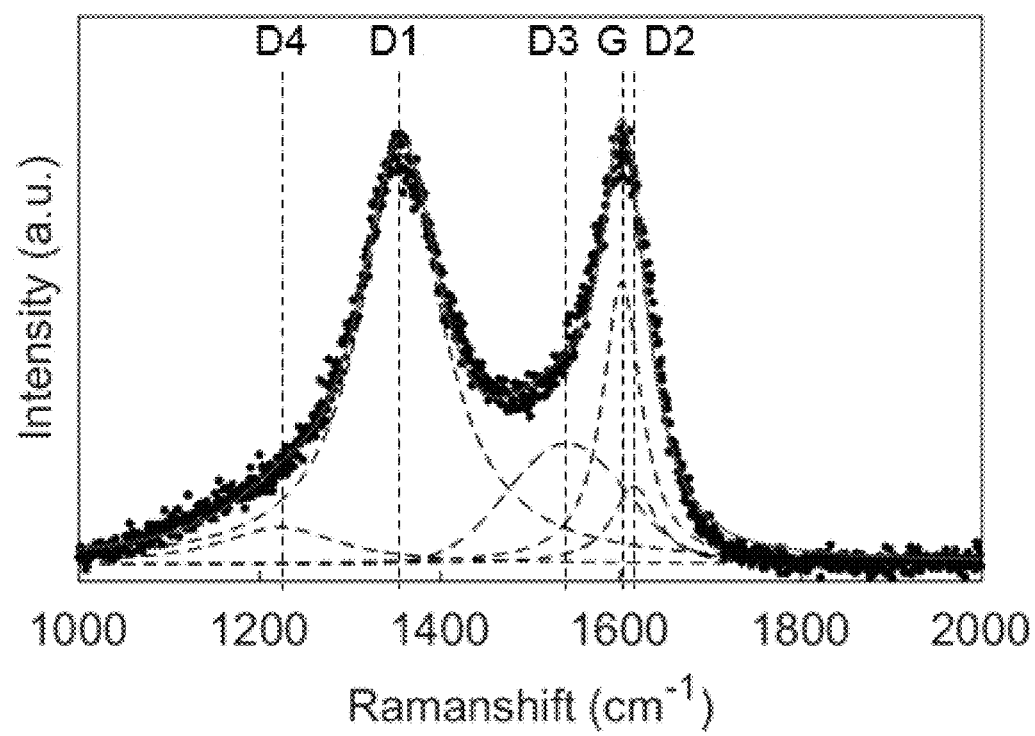
Figure 25C:
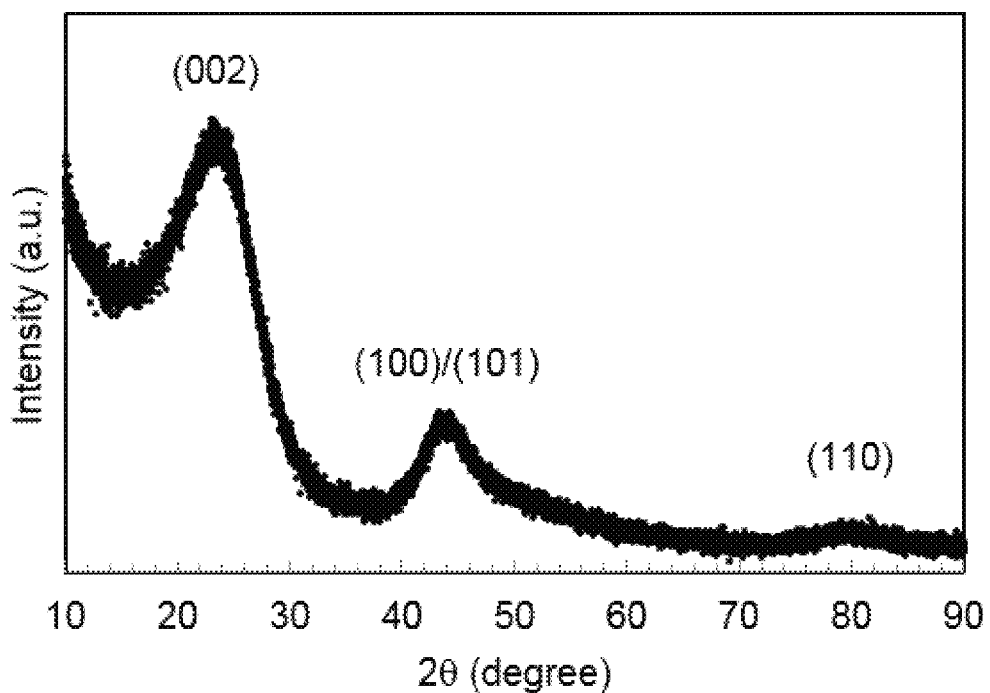
Figure 25D:
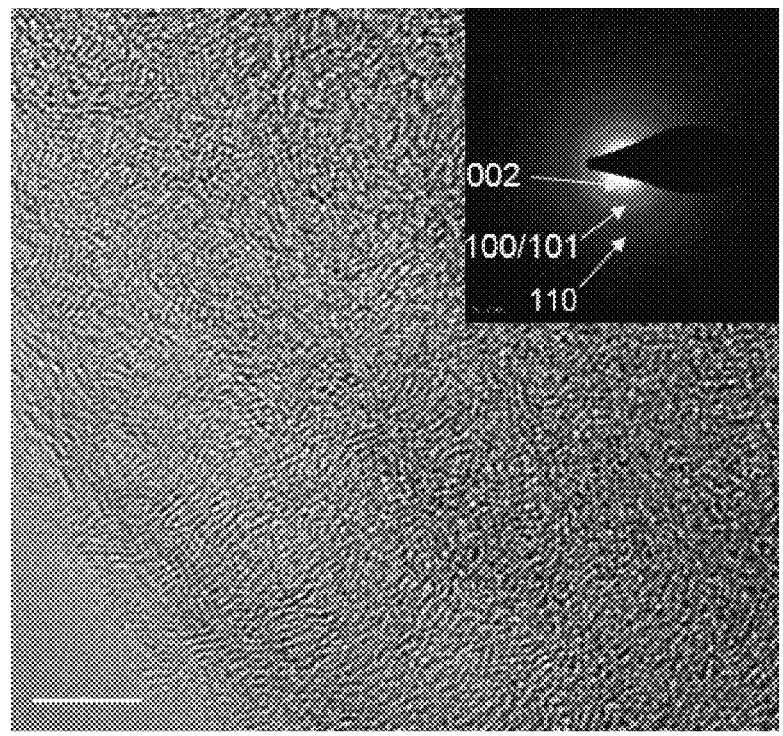

FIGS. 25A-25D exhibit characterizations of the microstructure of the 3D architected carbon. A cross-section image of the 3D architected carbon, shown in FIG. 25A, demonstrates its monolithic structure without any micropores. EDS analysis on the cross-section surface showed that the 3D architected carbon was composed of 98.4% carbon in an average with minor content of oxygen. Line analysis showed homogeneous elemental composition across the cross-section (FIG. 26A). FIG. 25B shows XRD patterns with three broad peaks at 23.5°, 44.3° and 79.8° in 2θ, corresponding to (002), (100)/(101) and (110) of graphite. The average interlayer spacing for graphene sheets and crystallite size along (002) (i.e. $d_{002}$ and $L_c$) were estimated to be 3.78 Å and 9.3 Å using the Bragg's law and Scherrer equation respectively, which suggested that there existed several stacked graphitic layers in average. Raman spectra, shown in FIG. 25C, was deconvoluted into five peaks: strong peaks of D1 (at 1355 cm$^{-1}$) and G (at 1603 cm$^{-1}$) and weak peaks of D2 (at 1613 cm$^{-1}$), D3 (at 1539 cm$^{-1}$) and D4 (1225 cm$^{-1}$). The G peak corresponds to in-plane bond-stretching motion of pairs of C sp$^2$ atoms with $E_{2g}$ symmetry.[24] The D1 peak appears only in the presence of the disorder of graphite and corresponds to a graphitic lattice vibration mode with $A_{1g}$ symmetry.[24] The D2 peak was considered attributed to a graphitic lattice vibration, and D3 and D4 peaks have been seen in amorphous or glassy carbon in other studies.[25,26] The high-resolution image of TEM in FIG. 25D confirmed the tangled microstructure containing several stacked graphitic layers. Diffused diffraction rings at (002), (100)/(101) and (110) in the inset illustrated disordered carbon microstructure, which agreed with broad peaks of the XRD pattern.

Figure 27A:
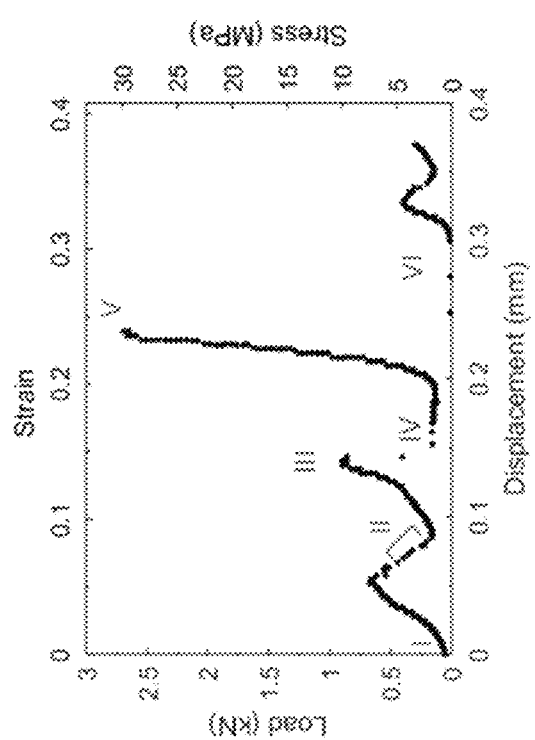
FIG. 27A. Representative stress-strain curve for compression. Roman numerals corresponds to distinct events shown in FIG. 27B.
Figure 27B:
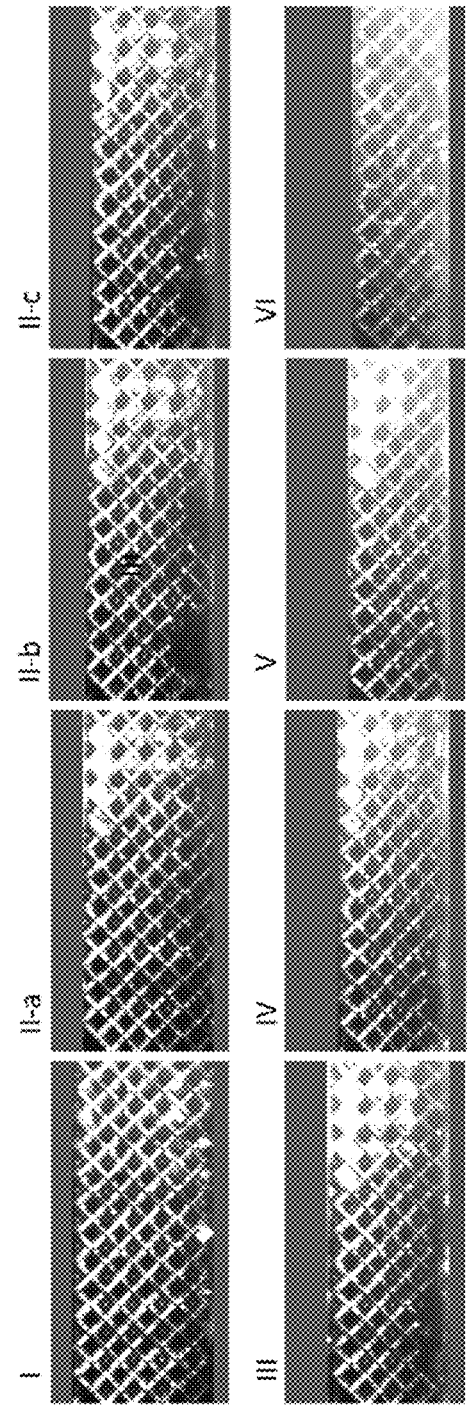
FIG. 27B. Photographic images of the compressed 3D architected carbon, I at the initial contact, II-a, b, c at local fractures shown in red doted-circle, III before the second stress release IV at the partial layer collapse shown by red line, V before the third stress release, and VI at the half layer collapse. Substrate and top load cell was grayed out.

Mechanical behaviors of the 3D architected carbon were evaluated by using uniaxial compression tests with a microcamera. FIGS. 27A-27B show representative mechanical response with in-situ compression side-views of a part of the architecture around each collapse event (full movie is accessible in Supplemental). Note that the bottom side of the 3D architecture was chipped when removing it from a substrate of the DLP 3D printer.

Figure 28:
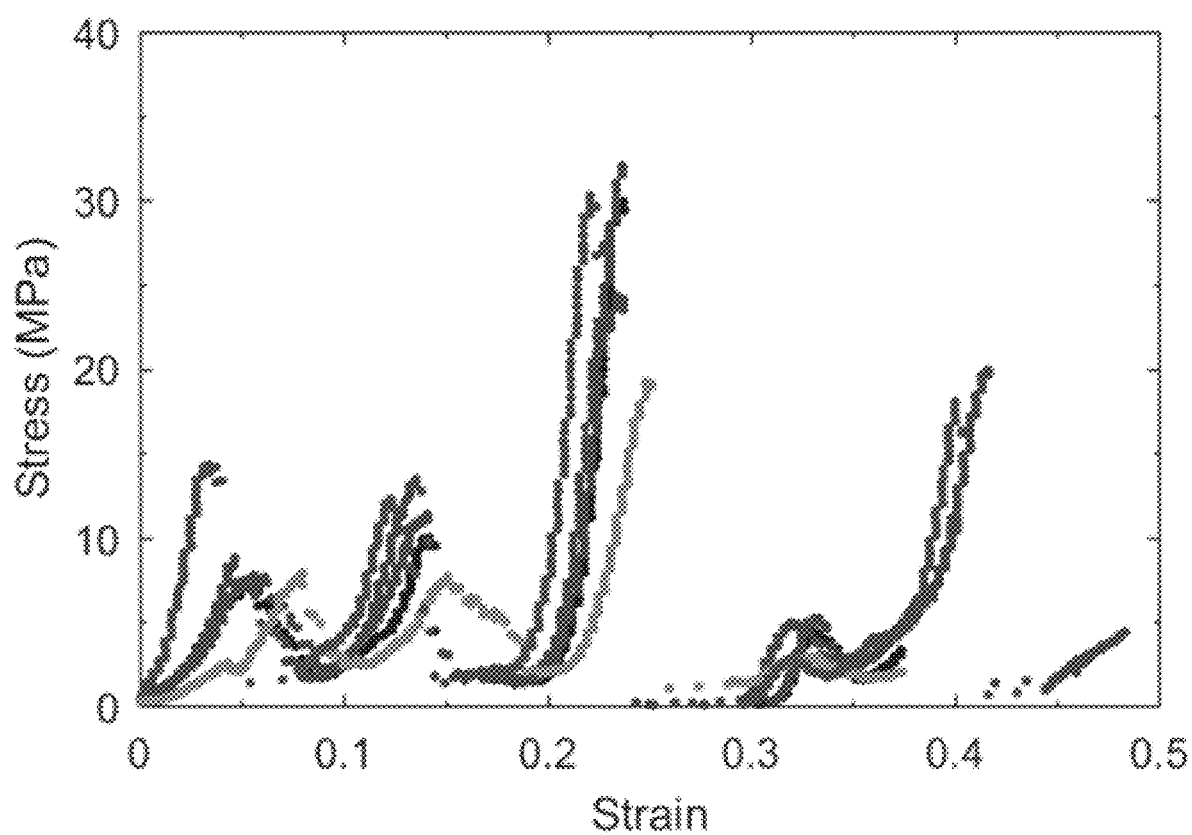
FIG. 28. Stress-strain curve of five samples of the 3D architected carbon.

The first stress release was followed by the gradual decrease of the load with local failure events as pointed by red circles in FIG. 27B II-a, II-b, and II-c. The second stress release event occurred when the contact part of 3D architected carbon on the substrate was fractured by a half layer (FIG. 27B IV). At the third stress release, the 3D architected carbon was almost fully contacted on the substrate and collapsed by a half layer with showing the largest yield stress (29.9 MPa). These two collapse events with small yield strength and the subsequent third collapse with high strength were repeatedly observed (FIG. 28). Average yield strengths at each stress release event were tabulated in Table 2.

TABLE 2

Average values and standard deviations of the 1$^{st}$, 2$^{nd}$ and 3$^{rd}$ yield strength

|  | 1$^{st}$ yield | 2$^{nd}$ yield | 3$^{rd}$ yield |
| --- | --- | --- | --- |
| Average (MPa) | 9.2 | 14.2 | 27.1 |
| SD (MPa) | 2.9 | 6.4 | 5.3 |

Battery performance of the 3D architected carbon was evaluated using a 2032 coin cell as a half cell against lithium metal as a counter and reference electrode (FIGS. 29A-29C). FIGS. 30A-30F depict discharge-charge curves of the galvanostatic cycling test at slow current, 2 mA/g. The irreversible capacity on the first cycle was 62 mAh/g, and the second and subsequent cycles reached the coulombic efficiency of 97% with reversible capacity of 404 mAh/g (10.3 mA/cm$^2$). The large hysteresis with a gradual change of voltage was shown between 0.1 and 1.1 V, and plateau region below 0.1 V. FIG. 4b shows reversible capacity retention by varying current densities from 16.6 mA/g (i.e. 0.38 mA/cm$^2$) to 300 mA/g (6.89 mA/cm$^2$) for every five cycles, followed by long cycles at 16.6 mA/g. Discharge-charge curves were shown in FIGS. 31A and 31B. The discharge capacity was decreased as current density increased, and recovered with over 100% coulombic efficiency when changing to slow current. The long cycles after step currents started from the reversible capacity of 235 mAh/g and retained over 85% until 100 cycles Long cycling test at 100 mA/g (2.4 mA/cm$^2$) was also conducted over 300 cycles using the 3D architected carbon. The initial few cycles showed very small capacities, and then the stable capacity of 2 mAh/cm$^2$ (83 mAh/g) continued up to 50 cycles. FIGS. 30D-30F show the representative morphology of the 3D architecture after over 300 cycles at 100 mA/g. The 3D architecture showed no visible cracks or deformation. A few defected beams were observed, which were probably caused by handling after printing (FIG. 31C). The surface was covered by a layer formed during cycling, namely a solid electrolyte interface ("SEI", FIG. 30F).

Discussions:

Additive manufacturing of battery electrodes: The centimeter-scale 3D architected carbon battery electrode was fabricated by the facile method involving DLP 3D printing and subsequent pyrolysis. Although a 3D architected battery electrode has been demonstrated using extrusion-based 3D printing and lithography-based techniques,[15,27] our method has several advantages over them. First, the layer-by-layer manner of the DLP 3D printing enabled to print the structure having two beams with an angle of 90°, such as cubic structure. In contrast, an extrusion-based 3D printing and lithography have a limitation in the angle between previous layer and printing layer, which often resulted in demonstrating only the "2.5D" structure printed only above previous layers such as pillar arrays.[20,27] Second, our method can create any desired architecture without closed micropores. Extrusion-based 3D printing created micro/nano porous structure caused by the process of consolidating small particles in ink.[14,16-19] For the same architecture, therefore, our method has a higher fraction of active materials and greater capabilities of controlling ion-diffusion path. Furthermore, surface status and microstructure of the 3D architected carbon can be controlled by tuning pyrolysis conditions. For instance, the nanoporous surface can be formed to have high surface area and carbon microstructure can be optimized to have high capacity in either Li-ion[28] or Na-ion batteries.[29] These materials optimization of the 3D architected carbon will be discussed elsewhere. In addition to these advantages, we used a commercial photo-cured resin with a commercial DLP 3D printer, indicating the method is facile and accessible to other researchers too.

Battery Cycling Test of the 3D Architected Carbon:

Battery cycling test was conducted using a coin cell, which is a commercially employed tool and applies load all cell components to ensure their contacts. Another commercially applied cell is a packaged cell, which requires the stack pressure of 0.1-1 MPa.[30] The facts the load in a pouch cell is much lower than the first yielding stress of the 3D architected carbon and maintained 3D architecture maintained after more than 300 cycles (FIGS. 30D and 30E) indicated the feasibility of commercialization with maintaining the architected structure.

The observed discharge and charge behaviors at low current with the gradual change above 0.1 V (FIG. 30A) was typical in the disordered carbon pyrolyzed at around 1000 C, because Li-ion was intercalated into defects of graphitic layers in disordered carbon microstructure without forming a new phase.[28,31] The plateau region below 0.1 V indicated graphite-like lithiation process, which formed $LiC_x$ phases (x=0~6) with several stacked graphitic sheets in the 3D architected carbon.[31] The large irreversible capacity at the first cycle was also typically seen in carbon electrodes because electrons were consumed to form the SEI on the electrode surface, which was an irreversible reaction as opposed to the reversible lithiation-delithiation process.[32]

Figure 30A:
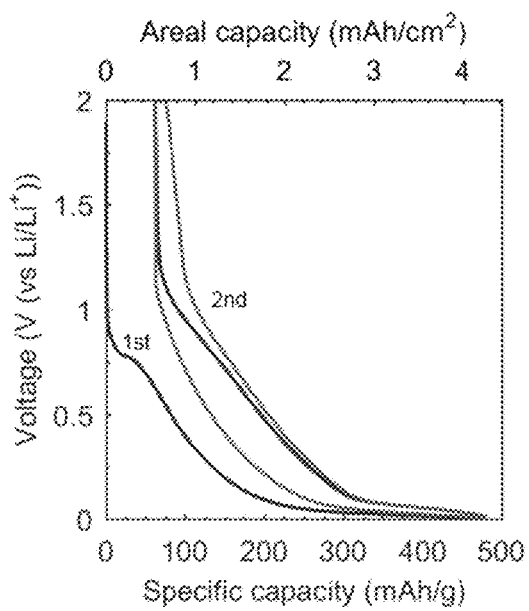
FIGS. 30A-30F. Galvanostatic cycling of the 3D architected carbon and SEM images after the cycling.
Figure 30B:
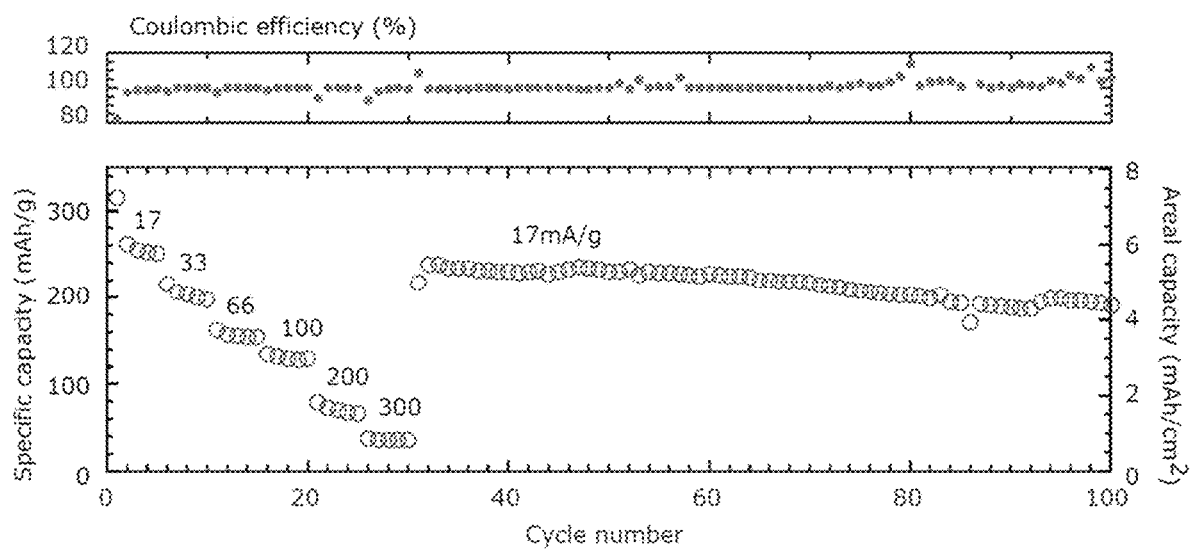
Figure 30C:
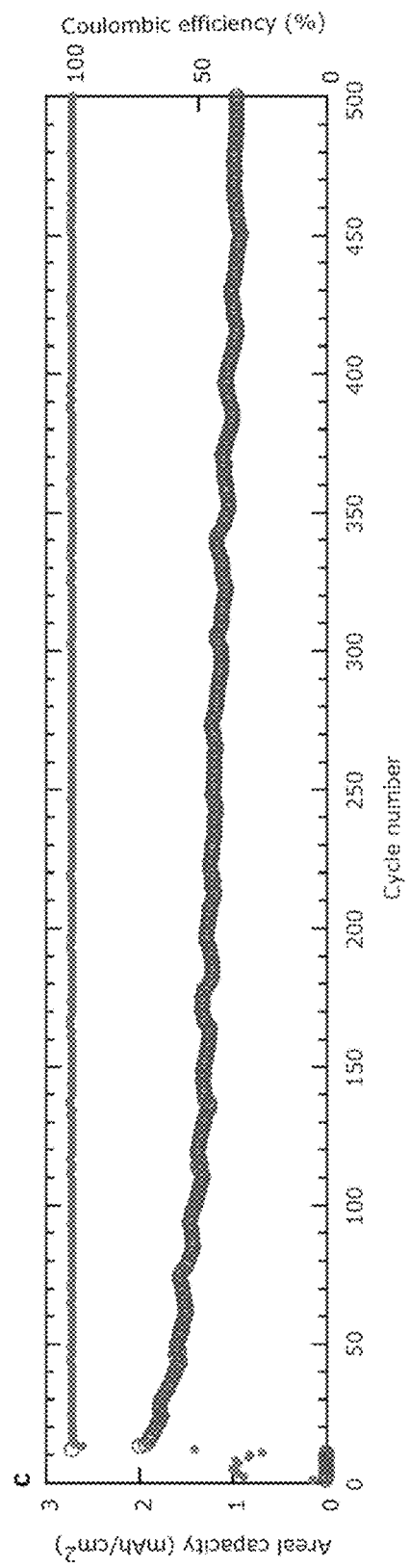
Figures 30D, 30E, 30F:
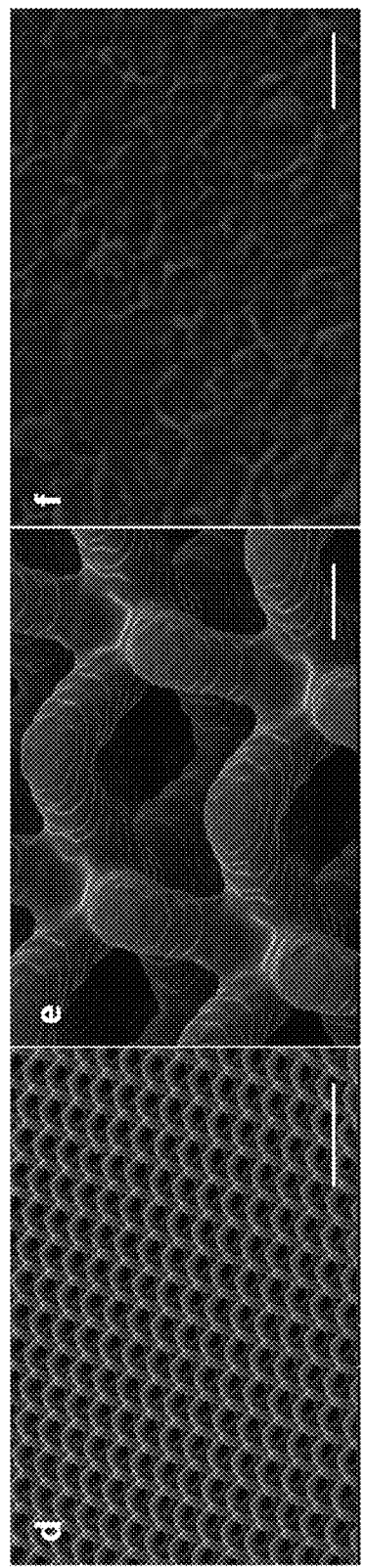
Figure 31A:
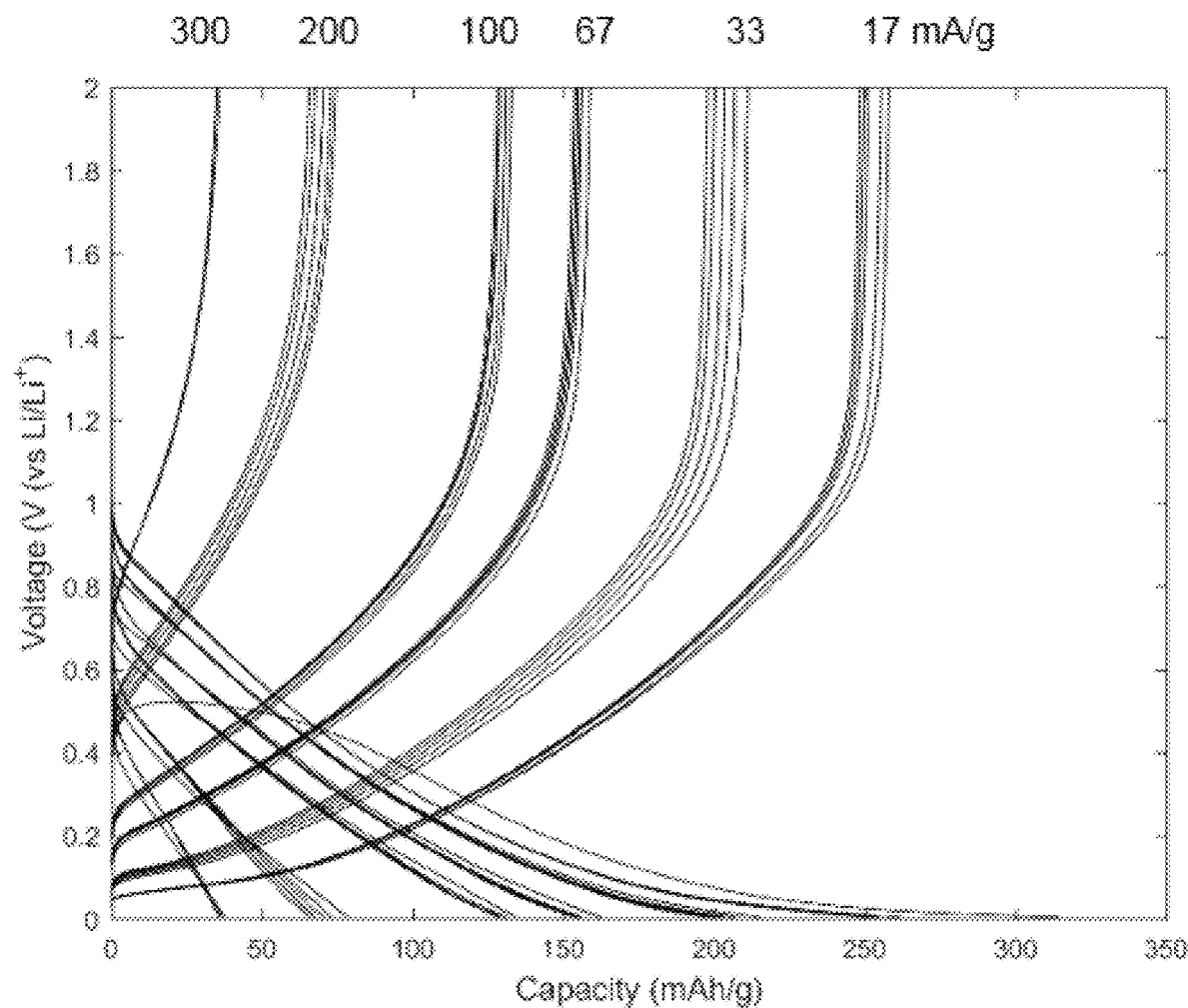
FIG. 31A. Discharge-charge curves at step currents and FIG. 31B at 16 mA/g after step currents.
Figure 31B:
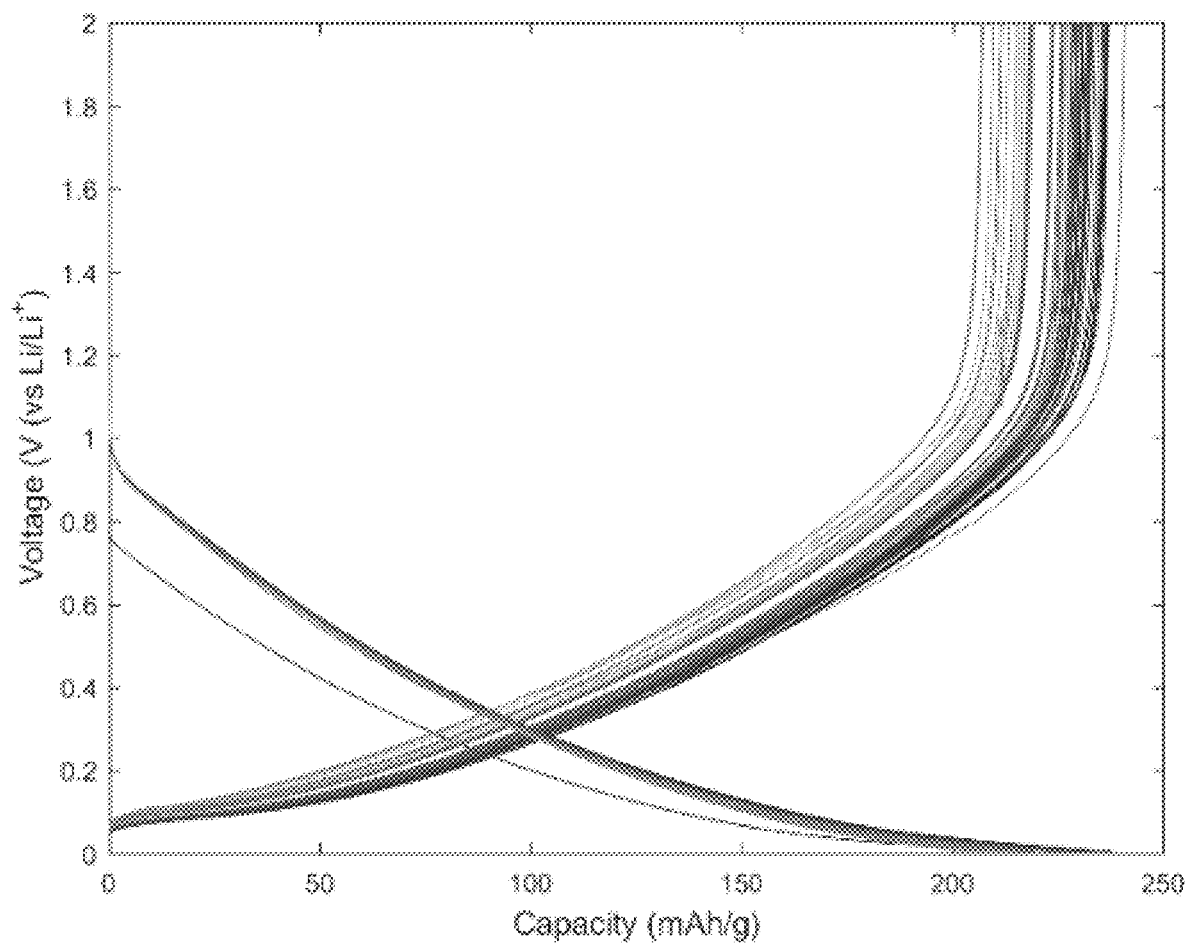
FIG. 31C. Defected beam pointed by circle after long cycles.
Figure 31C:
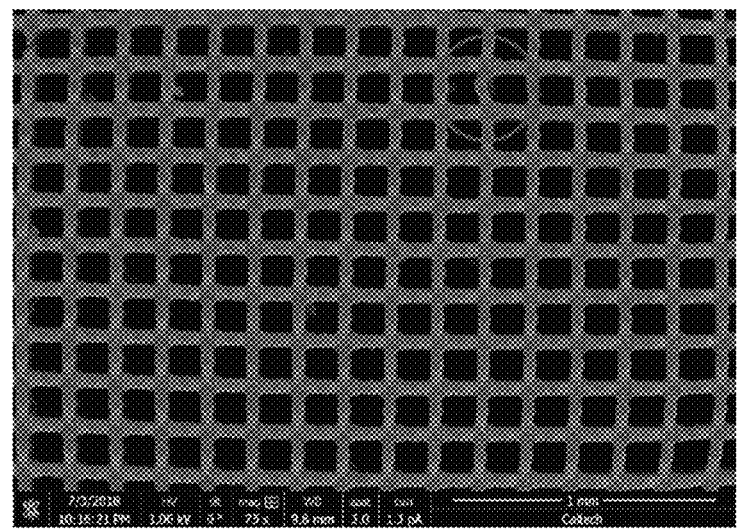

The 3D architected carbon showed rapid capacity deterioration upon increasing current density as shown in FIG. 30B compared with other reported pyrolytic carbonaceous materials[33,34] mainly because the 3D architected carbon had longer ion-diffusion path in electrode (~15 um) and electrolyte (~1 mm) compared with thin slurry electrode composing of sub-micron particles. The beam diameter could be decreased by some techniques: developing high-resolution 3D printer or increase shrinkage ratio of beams via pyrolysis by using a more heteroatoms-contained photo-cured resin or a salt support to constrain shrinkage of unit structures.[35] On the other hand, areal capacity was high (2 $mAh/cm^2$ at 2.4 $mA/cm^2$ over 50 cycles) despite the long solid-diffusion length in the electrode and low relative density (10%) thanks to non-tortuous geometry and good electrical conductivity of carbon. For relative density, although we achieved 35% by decreasing only unit structure length, it could be improved further by interlocking separately printed parts. Over 100% coulombic efficiency after changing from high current density to low was because the delithiation was not completed at high current densities and remained in the carbon until applying enough low current density (i.e. enough long time of charge) for Li-ion to diffuse out from the carbon. At the high current density of 100 mA/g, the first few cycles did show little capacity perhaps because the stable SEI was not formed in a few cycles.

Figure 32:
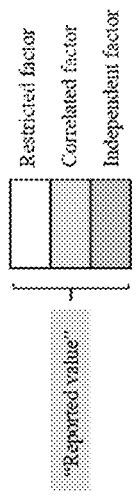
FIG. 32. Summary of current methods of engineering electrode structure.

Control Capabilities of Electrode Engineering Factors and Structural Integrity:

In this paper, we demonstrated the facile and scalable fabrication method of the 3D architected battery electrode with all controllable form-factors from micron to centimeter scales. To compare the capabilities of controllable factors with other methods of engineering of the electrode structure, we summarized current reported methods for engineering of the electrode structure for Li-ion batteries in FIG. 32. In addition to materials versatility, we focused on control capabilities of the electrode structure factors which can be separated from materials properties and yet significantly affect battery performance: the solid-diffusion length of Li-ion in electrode, tortuosity of a Li-ion diffusion path in the electrolyte filled in pore spaces of an electrode cell, a fraction of active materials in an electrode cell. Other factors of the electrode structure such as the electron migration path in electrode, which affects overpotential prominently at high current densities were not included because they could be different by materials significantly; for instance electric conductivity of carbon was higher than lithium transition metal oxides by 5 or 6 orders of magnitude (e.g. lithium cobalt oxide). The electrode engineering factors were categorized into three degrees: "Restricted factor", the factor which is restricted in very limited range, "Correlated factor", the factor which can be reproducibly controlled but affects another electrode engineering factor when adjusted, and "Independent factor", the factor which can be controlled independently from other electrode engineering factors. In addition to these electrode structure factors, structural integrity was also qualitatively compared because it is a key factor to maintain the architecture during handling, packaging, transporting, and battery cycling. Low structural integrity may lead to difficulties of commercialization and fast decaying of battery performance due to the loss of electric current connections and the designed architecture.

The DLP 3D printing-based method with all controllable form-factors is the only method which can control independently these three electrode engineering factors and has good structural integrity. In other words, the method could make any ideal architectures maintained throughout a battery life from the very initial fabrication until disposal or even recycling. Since the 3D architected carbon had exceptional structural integrity and did not require binders, conductive additives or a substrate, it might be possible to recycle by some chemical treatment on the surface if battery aging was mainly due to changes at the electrode/electrolyte interface.[36] The deterministic electrode structure throughout fabrication and operation could also help to predict precisely discharge-charge behaviors and cycle life, which may remove the necessity of non-destructive observation such as X-ray tomography.[37] In particular, it can resolve the difficulty of predicting overpotential of carbon anodes, which currently limits the depth of discharge to avoid lithium metal plating and battery failure.[4] Finally, the 3D printing of photo-cured resin and subsequent pyrolysis can create other materials than carbon.[38,39] Therefore, it is possible to make a 3D interdigitated full cell to have great energy and power density due to short ion-diffusion length in an electrolyte and a high active materials fraction.

Conclusion: The facile and scalable fabrication method of the 3D architected battery electrodes was developed using a commercial DLP 3D printer and subsequent pyrolysis. This DLP-based method can control all form-factors from micro to centimeter scales and thus independently control electrode engineering factors including solid diffusion length in the electrode, tortuosity of electrolyte filled in the electrode porous structure, and an active materials fraction. In addition, the fabricated 3D monolithic electrode may have great structural integrity, which can maintain the designed architecture from the fabrication even after battery operations. For proof-of-concept, the 3D architected disordered carbon electrodes were fabricated and evaluated using uniaxial compression tests with in-situ observation and galvanostatic cycling tests. The 3D architected carbon electrode did not require any additives or substrates for battery cycling tests using a common coin cell, and showed more than 4 mAh/g at 0.38 $mA/cm^2$ over 100 cycles without structural damage, thanks to its non-tortuous and ultrathick architecture with high yield strength of 30 MPa. This novel fabrication method of the 3D architected electrodes may pave the way for a 3D interdigitated full cell to achieve great energy and power density due to short ion-diffusion length in an electrolyte and a high active materials fraction.

Methods:

Fabrication of the 3D architected polymer and carbon: Desired architecture was designed by a computer-aided design program (Solidworks, Dassault Systems) and printed by a commercial digital light processing (DLP) 3D printer (Ember, Autodesk) using commercial acryl-based photo-cured resin (PR-48, Colorado photopolymer solutions). In the DLP 3D printer, 2D digital pattern was irradiated by UV light through a glass window and cured on a buildhead or previous layers, and the 3D architecture was printed by layer-by-layer manner as the buildhead rose (FIG. 22B). The layer thickness was 25 μm and one pixel size of the 2D digital pattern was 50×50 μm. After removing the printed architecture from the buildhead, the printed architecture was rinsed by isopropanol and dried. Then, the printed architecture was pyrolyzed by a tube furnace (OTL-1500X-UL, MTI) on an alumina boat. The heating process started after reaching the pressure below 100 mTorr, and the step heating processes were employed at 300° C. for 4 hours, 400° C. for 1 hour and 1000° C. for 4 hours at the heating rate of 5° C./min. Then, the furnace was cooled down at 5° C./min up to around 300° C. and at a natural rate up to room temperatures. The specimens were weighed by an analytical balance (XS105, Mettler Toledo) and measured for diameter and thickness by a caliper.

Characterizations of the 3D architected polymer and carbon: Thermogravimetry (TG) analysis (STA 6000, PerkinElmer) was conducted for the 3D architected polymer in a 99.999% nitrogen flow at heating rate of 5° C./min.

The morphology of the 3D architecture was observed by scanning electron microscope (Versa 3D Dual Beam, FEI). A specimen of the 3D architected carbon was cut by a razor blade and the cross-section was analyzed by a field emission SEM (ZEISS 1550 VP) equipped with energy-dispersive spectroscopy (Oxford X-max SDD). The 3D architected carbon was crushed into powder using a mortar and pestle for X-ray diffraction analysis (X'Pert, Philips) to investigate the crystal structure. The morphology of the used powder was shown in FIG. 26B. Cu Kα radiation was used at 45 kV and 40 mA. Carbon microstructure was analyzed by Raman spectroscopy (M-1000, Renishaw) using a laser at the wavelength of 514 nm on the flat surface of the 3D architected carbon. More than three different spots were obtained and the spectrum closest to their average was chosen as a representative. Transmission electron microscope (TEM, Tecnai F30ST, FEI) was conducted for high-resolution imaging and obtaining diffraction pattern. The sample was prepared by breaking the 3D architected carbon into particles and grinded them by glass slides. The particles bridged on the hole of a sample holder was observed to avoid obtaining information from the amorphous carbon substrate.

Compression test: Uniaxial compression tests for five specimens were conducted using a materials testing machine (Instron 5569) with a laser extensometer (LE-01, Electronic Instrument Research) for obtaining displacement and microcamera for in-situ observation. The side of 3D architected carbon which had beam defects were placed on the bottom. The strain rate was 0.15 mm/min. The top cross-head and substrate was grayed out to clarify the sample position from them because lattice morphology was reflected on both of them.

Galvanostatic cycling tests: The 3D architected carbon electrodes were prepared using a stainless steel 2032 coin cell (20 mm diameter. 3.2 mm thickness, MTI). Half-cell was assembled against a lithium foil (99.9%, Sigma-Aldrich) as a counter and reference electrode with 1.0M lithium hexafluorophosphate in 1:1 (v/v) ratio of ethylene carbonate:diethyl carbonate (Dongguan Shanshan Battery Materials) as received. In addition to common parts of a coin cell (i.e. cases, electrodes, spring, separator and spacer), a polypropylene washer was put as surrounding the 3D architected carbon in order to make sure the carbon electrode was positioned in the projected area of the lithium foil. Polypropylene and polyethylene porous separator (Samsung) was used. The electrolyte was flooded in a coin cell and coin cell assembly was conducted using a hydraulic crimper (MTI) by applying 500 psi on the coin cell. All battery construction was performed in a Ar-filled glove box with $O_2$ and $H_2O$ levels maintained below 0.1 ppm (HE-243-XW, Vacuum Atmospheres).

Galvanostatic cycling tests were conducted using the assembled coin cells by a battery testing machine (BTS3000, Neware) at room temperature. Open-circuit voltage was applied for more than four hours before starting cycling tests in order to obtain equilibrium. Slow current density cycling tests at 2 mA/g were performed to investigate achievable maximum capacity without kinetics limitations. Step currents tests were also conducted at 16, 33, 66, 100, 200, 300 mA/g for every five cycles to evaluate rate performance of the 3D architected carbon. Open-circuit voltage was applied for ten hours before changing the current density. After step currents, 16 mA/g of the current density was applied for investigating the cycle life. Galvanostatic cycling tests at 100 mA/g was also conducted for more than 300 cycles. For all galvanostatic cycling tests, cut-off voltages were set at 2 V and 0.005 V. After ending the charge process of the cycles at 100 mA/g for more than 300 cycles, the coin cell was disassembled with the caution not to deform the 3D architected carbon in the Ar-filled glove box. The cycled 3D architected carbon was rinsed, immersed in dimethyl carbonate for overnight, and then dried for the observation by SEM. The exposure of the carbon electrode to air during transferring the specimens were minimized up to a few seconds.

References corresponding to Example 4
1. M. S. Whittingham, Proc. IEEE 2012, 100, 1518.
2. K. J. Griffith, K. M. Wiaderek, G. Cibin, L. E. Marbella, C. P. Grey, Nature 2018, 559, 556.
3. N. Nitta, F. Wu, J. T. Lee, G. Yushin, Mater. Today 2015, 18, 252.
4. K. G. Gallagher, S. E. Trask, C. Bauer, T. Woehrle, S. F. Lux, M. Tschech, P. Lamp, B. J. Polzin, S. Ha, B. Long, Q. Wu, W. Lu, D. W. Dees, A. N. Jansen, J. Electrochem. Soc. 2016, 163, A138.
5. C. J. Bae, C. K. Erdonmez, J. W. Halloran, Y. M. Chiang, Adv. Mater. 2013, 25, 1254.
6. R. Moshtev, B. Johnson, J. Power Sources 2000, 91, 86.
7. D. W. Chung, M. Ebner, D. R. Ely, V. Wood, R. Edwin Garcia, Model. Simul. Mater. Sci. Eng. 2013, 21, 1.
8. J. Billaud, F. Bouville, T. Magrini, C. Villevieille, A. R. Studart, Nat. Energy 2016, 1, 1.
9. H. Ji, L. Zhang, M. T. Pettes, H. Li, S. Chen, L. Shi, R. Piner, R. S. Ruoff, Nano Lett. 2012, 12, 2446.
10. J. S. Wang, P. Liu, E. Sherman, M. Verbrugge, H. Tataria, J. Power Sources 2011, 196, 8714.
11. L. L. Lu, Y. Y. Lu, Z. J. Xiao, T. W. Zhang, F. Zhou, T. Ma, Y. Ni, H. Bin Yao, S. H. Yu, Y. Cui, Adv. Mater. 2018, 30, 1.
12. K. T. Lee, J. C. Lytle, N. S. Ergang, S. M. Oh, A. Stein, Adv. Funct. Mater. 2005, 15, 547.
13. J. S. Sander, R. M. Erb, L. Li, A. Gurijala, Y. M. Chiang, Nat. Energy 2016, 1, 1.
14. J. Li, X. Liang, F. Liou, J. Park, Sci. Rep. 2018, 8, 1.
15. T.-S. Wei, B. Y. Ahn, J. Grotto, J. A. Lewis, Adv. Mater. 2018, U.S. Pat. Nos. 1,703,027, 1,703,027.
16. K. Shen, H. Mei, B. Li, J. Ding, S. Yang, Adv. Energy Mater. 2018, 8, 1.
17. K. Sun, T. S. Wei, B. Y. Ahn, J. Y. Seo, S. J. Dillon, J. A. Lewis, Adv. Mater. 2013, 25, 4539.
18. K. Fu, Y. Wang, C. Yan, Y. Yao, Y. Chen, J. Dai, S. Lacey, Y. Wang, J. Wan, T. Li, Z. Wang, Y. Xu, L. Hu, Adv. Mater. 2016, 28, 2587.
19. S. D. Lacey, D. J. Kirsch, Y. Li, J. T. Morgenstern, B. C. Zarket, Y. Yao, J. Dai, L. Q. Garcia, B. Liu, T. Gao, S. Xu, S. R. Raghavan, J. W. Connell, Y. Lin, L. Hu, Adv. Mater. 2018, 1705651, 1.
20. C. Wang, L. Taherabadi, G. Jia, M. Madou, Y. Yeh, B. Dunn, Electrochem. Solid-State Lett. 2004, 7, A435.
21. M. S. Saleh, J. Li, J. Park, R. Panat, Addit. Manuf. 2018, 23, 70.

22. J. Bauer, A. Schroer, R. Schwaiger, O. Kraft, Nat. Mater. 2016, 15, 438.
23. D. B. Burckel, C. M. Washburn, A. K. Raub, S. R. J. Brueck, D. R. Wheeler, S. M. Brozik, R. Polsky, Small 2009, 5, 2792.
24. A. C. Ferrari, J. Robertson, Phys. Rev. B 2000, 61, 14095.
25. M. Pawlyta, J. N. Rouzaud, S. Duber, Carbon N.Y. 2015, 84, 479.
26. A. Sadezky, H. Muckenhuber, H. Grothe, R. Niessner, U. Pöschl, Carbon N.Y. 2005, 43, 1731.
27. J. I. Hur, L. C. Smith, B. Dunn, Joule 2018, 1.
28. J. R. Dahn, T. Zheng, Y. Liu, J. S. Xue, Science (80-.). 1995, 270, 590.
29. E. Irisarri, A. Ponrouch, M. R. Palacin, J. Electrochem. Soc. 2015, 162, A2476.
30. J. Cannarella, C. B. Arnold, J. Power Sources 2014, 245, 745.
31. N. Ogihara, Y. Igarashi, A. Kamakura, K. Naoi, Y. Kusachi, K. Utsugi, Electrochim. Acta 2006, 52, 1713.
32. S. J. An, J. Li, C. Daniel, D. Mohanty, S. Nagpure, D. L. Wood, Carbon N.Y. 2016, 105, 52.
33. J. Wang, J. L. Liu, Y. G. Wang, C. X. Wang, Y. Y. Xia, Electrochim. Acta 2012, 74, 1.
34. J. Yang, X. Y. Zhou, J. Li, Y. L. Zou, J. J. Tang, Mater. Chem. Phys. 2012, 135, 445.
35. X. Chen, G. Zhao, Y. Wu, Y. Huang, Y. Liu, J. He, L. Wang, Q. Lian, D. Li, Carbon N.Y. 2017, 123, 34.
36. J. Vetter, P. Novák, M. R. Wagner, C. Veit, K. C. Möller, J. O. Besenhard, M. Winter, M. Wohlfahrt-Mehrens, C. Vogler, A. Hammouche, J. Power Sources 2005, 147, 269.
37. V. Wood, Nat. Rev. Mater. 2018, 3, 1.
38. A. Vyatskikh, A. Kudo, S. Delalande, J. R. Greer, Mater. Today Commun. 2018, 15, 288.
39. A. Vyatskikh, S. Delalande, A. Kudo, X. Zhang, C. M. Portela, J. R. Greer, Nat. Commun. 2018, 9, 593.
40. B. Kang, G. Ceder, Nature 2009, 458, 190.
41. T. Marks, S. Trussler, A. J. Smith, D. Xiong, J. R. Dahn, J. Electrochem. Soc. 2011, 158, A51.
42. M. Ebner, D. W. Chung, R. E. Garcia, V. Wood, Adv. Energy Mater. 2014, 4, 1.
43. J. B. Bates, N. J. Dudney, B. Neudecker, A. Ueda, C. D. Evans, Solid State Ionics 2000, 135, 33.
44. Y. N. Zhou, M. Z. Xue, Z. W. Fu, J. Power Sources 2013, 234, 310.
45. W. Lai, C. K. Erdonmez, T. F. Marinis, C. K. Bjune, N. J. Dudney, F. Xu, R. Wartena, Y. M. Chiang, Adv. Mater. 2010, 22, 139.
46. X. Qin, X. Wang, J. Xie, L. Wen, J. Mater. Chem. 2011, 21, 12444.
47. C. Lim, B. Yan, H. Kang, Z. Song, W. C. Lee, V. De Andrade, F. De Carlo, L. Yin, Y. Kim, L. Zhu, J. Power Sources 2016, 328, 46.
48. H. Ji, L. Zhang, M. T. Pettes, H. Li, S. Chen, L. Shi, R. Piner, R. S. Ruoff, Nano Lett. 2012, 12, 2446.
49. G.-F. Yang, K.-Y. Song, S.-K. Joo, RSC Adv. 2015, 5, 16702.
50. A. Etiemble, J. Adrien, E. Maire, H. Idrissi, D. Reyter, L. Roué, Mater. Sci. Eng. B Solid-State Mater. Adv. Technol. 2014, 187, 1.

Example 5: 3D Architected Pyrolyzed Electrodes for Use in Secondary Batteries and Method of Making Same Abstract: A method for producing three dimensional electrode structures comprised of reversible active-ion host material (positive or negative electrode) with custom or arbitrary physical dimensions and features for use in secondary batteries is described.

Introduction: Standard state of the art batteries use parallel and adjacent sheets of electrodes with a porous separator in between such as those found in an 18650-type cell and can exceed 700 Wh/L.[1] Methods to increase the ratio of active to inactive materials, and thus the total amount of theoretical charge per unit volume of the battery in such designs, include increasing the thickness of the host electrodes relative to their current collectors, decreasing the porosity of the electrodes via compression, and any method which increases electrode loading (capacity per unit area) of the electrode coating. However, in the process of increasing the volume, it has been shown to be reduce the rate capability of the electrode due to diffusion limitations within the electrode.[2,3] At sufficiently high currents, the theoretical volumetric/gravimetric energy density cannot be fully utilized. The thickness of a typical planar electrode stack is on the order of 100 microns. Variation of the electrode thickness, and thus the diffusion pathlength of the active ions, has been shown to directly affect rate capability.[2,3] For example, rate capability was shown to be substantially reduced when electrode thicknesses are increased between 54-140 μm in graphite containing electrodes, using rates measured between 1-12 C-rate.[2] In order to decrease the maximum diffusion pathlength of the active ions by varying the active electrode thickness, the energy density must also be reduced, because the ratio of the active mixture to the current collector is also reduced. This tradeoff and ways to improve performance at a given electrode thickness are described in relevant art and is an ongoing subject of research.[4-7]

Non-conventional arrangements of the electrode materials and current collectors are necessary to escape the tradeoff between power density and energy density, such as those architected in the third dimension.[8-10] Simulations of interdigitated Li-ion batteries result in four orders of magnitude increase in areal capacity at 330 C-rate from 0.58 Ah/m$^2$ in conventional geometries to 318 Ah/m$^2$ for the interdigitated geometry.[11] Several examples exist where alternate arrangements of the electrodes are created or proposed by use of three dimensional geometries in efforts to improve rate capability necessary for micro battery or other applications.[12-17] However, no method currently exists to generate free standing 3D architected electrodes comprised of active material for secondary battery anodes, with custom geometric design for attainment of this function. Methods exist which increase the surface to volume ratio of the electrodes by modifying the electrode geometry, i.e. in the form of cylindrical rods, rectangular prisms, or others.[12-17] The present invention includes simple and potentially low cost methods to generate truly customized three dimensional porous structures comprised of active electrode material or electrode material composites for use in secondary batteries.

Other methods of improving battery electrode performance in secondary batteries include the improvement of the performance of materials by variation of the heating protocol, gas, pressures and temperatures, the precursor materials, the resulting particle morphology, particle size distribution, and porosity.[18-26] A subject of ongoing extensive investigation in secondary batteries is to customize and improve the electrode performance from the perspective of materials optimization. For example, in the case of carbon electrodes, these may include production of various forms of hard carbons, glassy carbons, graphitic carbons, and the use of slurries containing carbon blacks to improve ionic and electronic conductivity within the electrode composite.

These methods have been extensively studied.[18-26] Previous studies on synthesis of battery electrodes for the purposes of tuning the structure of electrode materials also apply to the materials or structures contained within alternate electrode geometries.

Three basic steps summarize certain embodiments of methods disclosed herein: 1) 3D print architected material from desired model with precursor containing active electrode material. 2) Apply heat treatment, pyrolysis of resulting structure. 3) Incorporation of resulting pyrolyzed structure as a reversible active-ion host (negative or positive electrode) in a secondary battery.

Certain embodiments of the methods disclosed herein provide a simple method for generating highly tunable, customizable active 3D architected electrodes for use in interdigitated secondary batteries to achieve improved rate capability and for purposes outlined in previously mentioned relevant art where methods of creating alternative electrode geometries are described.[8-17] In the proposed method of generating a 3D battery electrode, the extent of the bulk of the positive and negative electrodes can be created within close proximity to one another if the 3D architected electrode is incorporated into an interdigitated full cell, (i.e. <10 microns), with significantly reduced need for supporting network of current collectors in comparison to conventional parallel sheet designs or prior proposed 3D battery geometries.[12-17] Thus, by use of a thin conformal electronically insulating separator which enables ion transfer between the 3D architected electrode and the interdigitated electrode composite (beyond scope of this document), the methods and electrodes disclosed herein have potential to realize much shorter active ion diffusion lengths without requiring a reduction in theoretical volumetric energy density.

Figure 33:
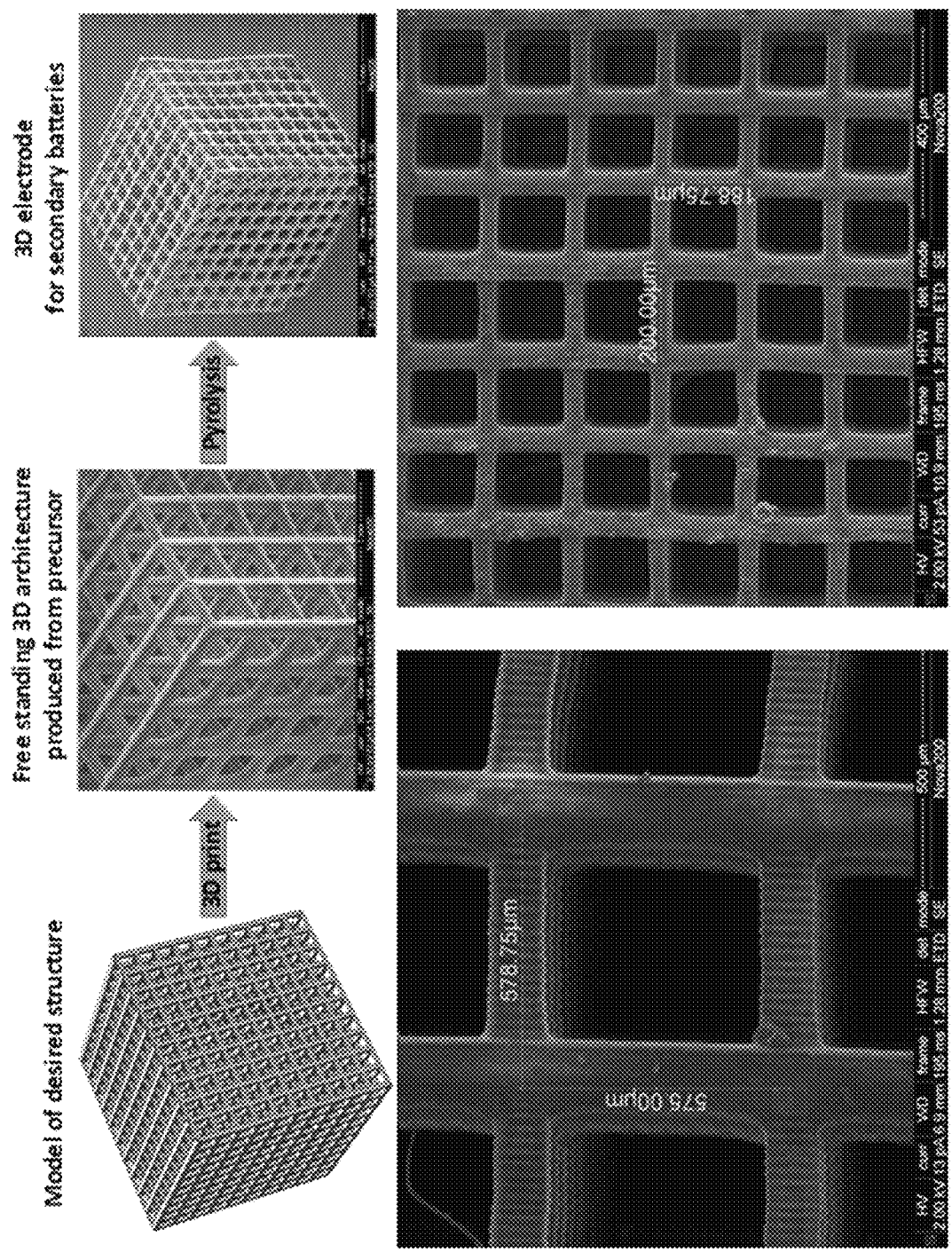
FIG. 33. Illustration of the process of creation of a customized 3D pyrolyzed lattice for use as electrodes in secondary batteries, shown for the case of a carbon-based 3D cubic lattice.

Active materials are rearranged to produce a three dimensional architected lattice of custom shape and design, consisting entirely of the active material or active material composites which may contain a combination both active and inactive ingredients in the heat treated product, which can be optimized in parameter space for proposed use in a 3D interdigitated full cell design. The active architected electrode material is produced by pyrolysis of 3D printed structures having custom and completely tunable, isotropic or anisotropic lattice with custom unit cell shape, size, porosity, and other features, as exemplified in FIG. 33 for the case of a periodic 3D cubic carbon-based lattice. Carbon based active materials are the dominant anode used in commercial lithium-ion anodes, and are also prime candidates for anode materials used in present and future generation sodium-ion batteries.[27] It is therefore desirable to use this technology on the materials level to form the anode in secondary batteries, and is thus used as an example throughout this document.

Performance of the electrodes can then be improved through focusing on engineering of the geometry of the electrodes,[2,8] by incorporating or rearranging the active positive or negative electrode material into the form of a precisely designed, three dimensional, porous framework where a thin, conformal separator/electrolyte is used and the other electrode is placed into the resulting empty space within the lattice framework, or interdigitated. The goal of this rearrangement is to decrease the average and maximum active ion diffusion path length between positive and negative electrodes in comparison to the conventional geometry, without reducing the overall theoretical charge per unit volume of the battery.

Certain embodiments of the electrodes and methods disclosed herein have application as secondary battery electrodes in cell phones, laptops, portable devices, electric vehicles, grid energy storage, micro devices, satellites, or any other application where high energy and simultaneously power secondary batteries are required. In addition, the customizable 3D architecture may exhibit excellent mechanical properties and form the backbone of a mechanically robust battery, which may be particularly helpful for applications where the battery pack is subjected to large variable forces.

3D printed structures are heated and pyrolyzed to form a 3D electrode comprised of active material or active material composites which may be produced using any method or device which can create the structures designed from computer generated models having features and dimensions necessary to achieve the stated objective. Methods of 3D printing include but are not limited to fused deposition molding, stereolithography, 2-photon lithography, or any other method or technology used to print desired arbitrary 3D architectures from active material containing precursors with desired dimensions. For instance, commercially available or customized liquid or gel-based resins which solidify or cross link upon exposure to UV light can be used as the precursor material. Commercially available or custom built 3D printers such as a Nanoscribe Photonic Professional GT, Autodesk Ember, or any other 3D printing technology which may come into existence used to generate a desired structure, can be used to generate lattices. Lattice feature sizes ranging anywhere between 1 nm-1000 µm are preferable.

Ways to modify and improve the rate performance of the active pyrolyzed 3D architecture which serves as the anode or cathode in a 3D interdigitated battery design include but are not limited to the following: (1) modification of the dimensions of the 3D architecture to minimize diffusion lengths of active ions within the host structure(s) contained within the elements that define the architected electrode. (2) modification of the microstructure or structure of the active material contained within the pyrolyzed 3D architecture by variation of the heating protocol, such as changing the temperature, time, pressure, and gas, or introduction of multiple temperatures, times, gases, etc. (3) modification of the surface morphology or features that define the 3D architecture, i.e. by introduction of pores, channels, or other surface features present which form the architected electrode, in a manner similar in effect to those employed for conventional battery geometries. (4) modification of the density of the active material contained within the 3D architecture, for example by adjustment of the exposure time used in stereolithography or modification of the chemical composition of the precursor, as outlined below. (5) modification of the chemical composition of the precursor materials, gels or liquids with intent of: (a.) achieving higher volumetric energy density within fixed beam dimensions. Silicon, tin, antimony, phosphorous, graphitic carbons, hard carbons, layered oxides, or any other high capacity active material shown to be effective as a reversible host for the chosen active ion may be included in the precursor materials and thus into the resulting 3D printed architecture and its corresponding heat treated or pyrolyzed 3D architecture. (b.) increasing the electronic or ionic conductivity within the 3D architecture. This may include but is not limited to the introduction of graphitic carbons, hard carbons, super-P carbon black, super-S carbon black, ketjen black, or any other material serving to improve the ionic and electronic conductivity of the 3D architecture after heat treatment or pyrolysis. (c.) changing the amount of shrinkage caused by material loss during heat treatment or pyrolysis of 3D architecture, in order to achieve desired porosity, dimensions or other characteristics defining the architecture.

For example, by changing the volume fraction carbon or carbon composite in the precursor materials.

In the following two examples, the preceding method is followed. A 3D architecture is generated in the form of a 3D cubic lattice and the beam diameter is varied. The ability to tune the electrochemical performance of the 3D architecture is demonstrated by varying only the beam diameter.

Figure 34:
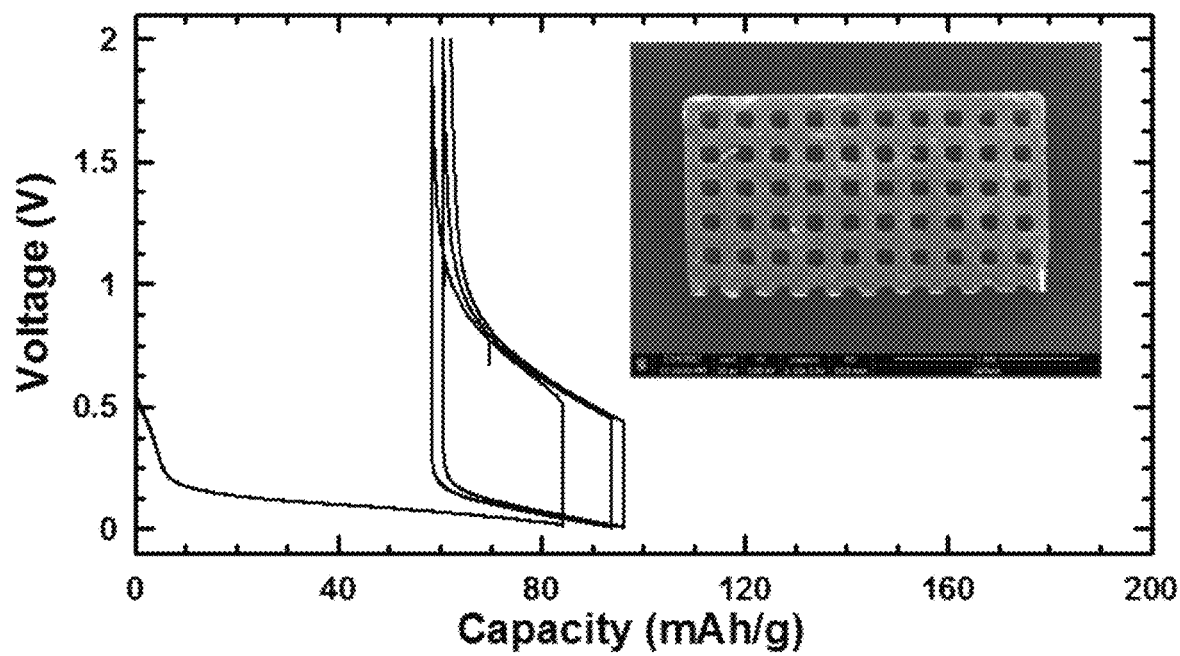
FIG. 34. Voltage vs. capacity (at 16.6 mA/g) in Na-ion cell with pyrolyzed 3D cubic carbon based electrode having "thick beams" with SEM of representative beam thicknesses 90-100 µm shown in the inset.

Embodiment 1:

A commercially available 3D printer, the Autodesk Ember, was used to 3D print a cubic lattice. A model of the 3D cubic lattice was first generated using SolidWorks. The cubic lattice was 3D printed and the unit cell had dimensions 580 µm×580 µm×580 µm, with beam thickness 200 µm. The precursor resin used was PR-48 manufactured by Autodesk. After 3D printing, the free standing 3D cubic lattice was inserted into an alumina tube which was then vacuum sealed. The pressure was reduced below 50 mTorr and the temperature was raised to 300° C. for 4 hours, followed by 400° C. for 1 hour, followed by pyrolysis at 1000° C. for 4 hours. 1000° C. has been evaluated as an annealing temperature for Na-ion anodes and has been shown to be an effective anode material in Na-ion batteries,[23] and is applied here as the pyrolysis temperature for the 3D architecture. The sample was then allowed to cool to room temperature and then removed from the furnace. The dimensions of the unit cell after heat treatment were approximately 200 µm×200 µm×200 µm with beam diameter 80-90 µm, as shown in the inset of FIG. 34. The weight of the pyrolyzed sample after heat treatment was 0.00733 g.

The lattice was transferred into an Ar-filled glove box and incorporated into a two electrode beaker-type half-cell, of similar function and design to those commonly used in battery electrode research. A magnetic stirring bar rotating at 800 RPM was used to further reduce the possibility of concentration gradients existing in the electrolyte, particularly in the empty spaces within the lattice. A glass jar was used as the container, and aluminum clips were soldered onto stainless steel bolts attached to the lid which served as current collectors and to suspend electrodes in the electrolyte.

Sodium was chosen as the active ion in the beaker cell using 1M $NaClO_4$ in PC electrolyte. Approximately 4.897 grams of $NaClO_4$ (98%, Sigma) was weighed and added to approximately 40 mL of PC (Sigma). The sodium counter+reference electrode was cut into a thin flat surface from larger ingots (99%, Sigma) using a pair of scissors and the surface of the sodium metal was cleaned of passivating layers using a polymer brush. Voltage-capacity plots were collected on a BioLogic SP-150 potentiostat using a constant current of 0.122167 mA (current density of 16.667 mA/g). The upper and lower cutoff voltages were 0.005-2.0 V. The resulting voltage vs. capacity plot for the first three cycles is shown in FIG. 34. Reversible capacity of the carbon lattice at this current density exceeds 35 mAh/g.

Figure 35:
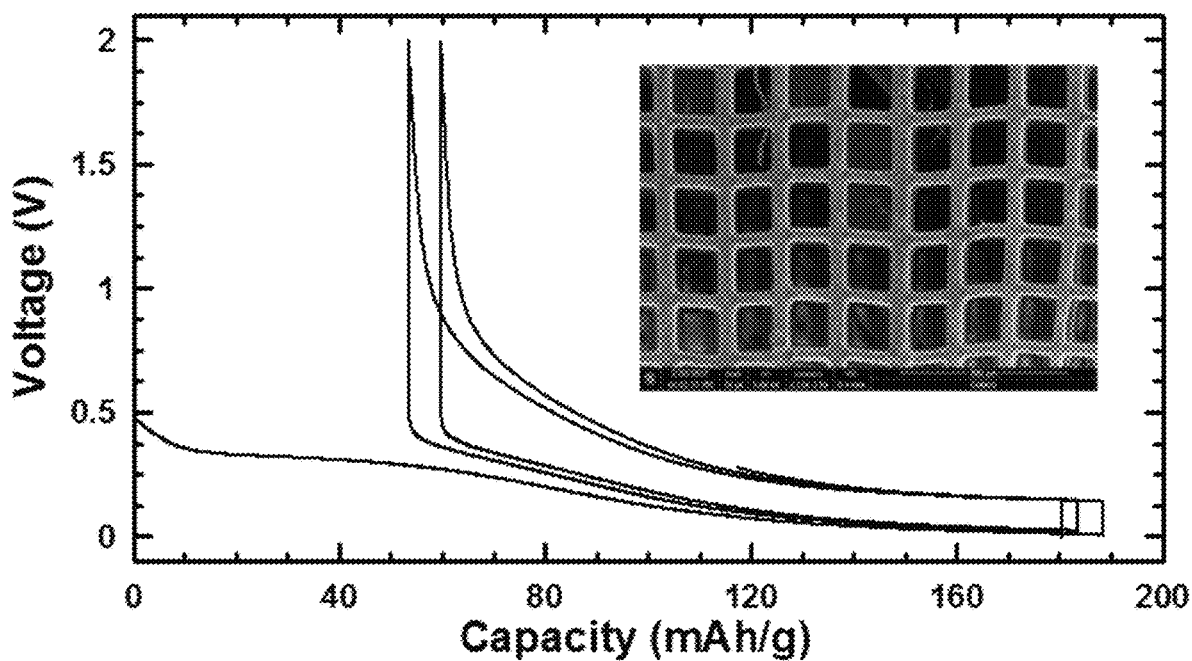
FIG. 35. Voltage vs. capacity (at 16.6 mA/g) in Na-ion cell with pyrolyzed 3D cubic carbon based electrode having "thin beams" with SEM of example beam thicknesses of 40-50 µm shown in the inset.

Embodiment 2:

Sodium was chosen as the active ion. The method used to prepare the sample was the same as Embodiment 1 including unit cell dimensions and resin type, except for the following: the average beam diameter was 100 µm before heat treatment. The average beam diameter was 40-50 µm after heat treatment. The beams from the resulting lattice are shown in the inset of FIG. 35. The weight of the sample after heat treatment was 0.00227 g.

The lattice was transferred into an Ar-filled glove box and incorporated into a beaker-type sodium-ion half cell, using a sodium foil counter electrode, as described in Example 1. Voltage capacity plots were collected as described in Embodiment 1, except a current of 0.037833 mA was used (current density 16.667 mA/g). The upper and lower cutoff voltages were 0.005-2.0 V. The resulting voltage vs. capacity plot for the first three cycles is shown in FIG. 35. Reversible capacity of the carbon lattice at this current density exceeds 120 mAh/g.

References corresponding to Example 5

1. http://news.panasonic.com/global/press/data/en091225-3/en091225-3.html retrieved Sep. 28, 2017.
2. Hilmi Buqa, Dietrich Goers, Michael Holzapfel, Michael E. Spahr, and Petr Novak. "High Rate Capability of Graphite Negative Electrodes for Lithium-Ion Batteries". J. Electrochem. Soc. 152 (2005) A474-A481.
3. Madhav Singh, Jörg Kaiser, and Horst Hahn. "Thick Electrodes for High Energy Lithium Ion Batteries". J. Electrochem. Soc. 162 (2015) A1196-A1201.
4. Zhijia Du, D. L. Wood III, C. Daniel, S. Kalnaus, J. Li. "Understanding limiting factors in thick electrode performance as applied to high energy density Li-ion batteries". J. Appl. Electrochem. 47 (2017) 405-415.
5. Jelle Smekens, Rahul Gopalakrishnan, Nils Van den Steen, Noshin Omar, Omar Hegazy, Annick Hubin, and Joeri Van Mierlo. "Influence of Electrode Density on the Performance of Li-Ion Batteries: Experimental and Simulation Results". Energies 9 (2016) 104.
6. Kevin G. Gallahjer, Stephen E. Trask, Christoph Bauer, Thomas Woehrle, Simon F. Lux, Matthias Tschech, Peter Lamp, Bryant J. Polzin, Seungbum Ha, Brandon Long, Qingliu Wu, Wenquan Lu, Dennis W. Dees, and Andrew N. Jansen. "Optimizing Areal Capacities through Understanding the Limitations of Lithium-Ion Electrodes". J. Electrochem. Soc. 163 (2016) A138-A149.
7. Timo Danner, Madhav Singh, Simon Hein, Jörg Kaiser, Horst Hahn, and Arnulf Latz. "Thick electrodes for Li-ion batteries: A model based analysis". J. Power Sources 334 (2016) 191-201.
8. N. Cirigliano, G. Sun, D. Membreno, P. Malati, C. J. Kim, B. Dunn. Energy Technology 2 (2014) 362-369.
9. T. S. Arthur, D. J. Bates, N. Cirigliano, D. C. Johnson, P. Malati, J. M. Mosby, E. Perre, M. T. Rawls, A. L. Prieto, B. Dunn. MRS Bulletin 36 (2011) 523-531.
10. C. Liu, E. I. Gillette, X. Chen, A. J. Pearse, A. C. Kozen, M. A. Schroeder, K. E. Gregorczyk, S. B. Lee, G. W. Rubloff. Nature Nanotechnology 9 (2014) 1031-1039.
11. D. Miranda, C. M. Costa, A. M. Almeida, S. Lanceros-Méndez. Applied Energy 165 (2016) 318-328,
12. Bruce Dunn, Jeffery W. Long, Debra R. Rolison, Henry S. White, Fred Wudl, Sarah H. Tolbert, Chang-Jin Kim. "Three dimensional Battery Architectures and Methods of Making Same". US2011/0171518 A1 (2011).
13. Harold Jones Rust, III, Ashok Lahiri, Murali Ramasubramanian, Robert Spotnitz. "Three-dimensional batteries and methods of manufacturing the same". US2011/0111283 A1 (2011).
14. Harrold Jones Rust, III, Ashok Lahiri, Murali Ramasubramanian, Robert M. Spotnitz, Robert A. Cole, Gunther Koblmiller, Nirav Shah, Brian E. Brusca, Christopher G. Castledine, Laurie J. Lauchlan, James D. Wilcox. "Electrode structures for three-dimensional batteries". U.S. Pat. No. 9,660,292 B2 (2017).
15. Jennifer Lewis, Shen Dillon, Ke Sun, Bok Yeop Ahn, Teng-Sing Wei. "Three-dimensional (3d) electrode architecture for a microbattery". US 2016/0126558 A1 (2016).
16. Asok Lahiri, Robert M. Spotnitz, Nirav S. Shah, Murali Ramasubramanian, Harrold J. Rust, III, James D. Wilcox, Michael J. Armstrong, Brian E. Brusca, Christopher G. Castledine, Laurie J. Lauchlan. "Microstructured Electrode Structures". U.S. Pat. No. 9,362,553 B2 (2016).
17. Farshid Roumi, Jamshid Roumi. "Electrochemical Energy Storage Systems and Methods". US 2012/0077095 A1 (2012).
18. Subrahmanyam Goriparti, Ermanno Miele, Francesco De Angelis, Enzo Di Fabrizio, Remo Proietti Zaccaria, Claudio Capiglia. "Review on recent progress of nanostructured anode materials for Li-ion batteries". J. Power Sources 257 (2014) 421-443.
19. W. Xing, J. S. Xue, and J. R. Dahn. "Optimizing Pyrolysis of Sugar Carbons for Use as Anode Materials in Lithium-Ion Batteries". J. Electrochem. Soc. 143 (1996) 3046-3052.
20. Edward Buiel and J. R. Dahn. "Li-insertion in hard carbon anode materials for Li-ion batteries." Electrochim. Acta 45 (1999) 121-130.
21. Tao Zheng, Q. Zhong, and J. R. Dahn. "High-Capacity Carbons Prepared from Phenolic Resin for Anodes of Lithium-Ion Batteries". J. Electrochem. Soc. 142 (1995) L211-L214.
22. Sebastian Wenzel, Takeshi Hara, Jürgen Janek, Philipp Adelhelm. "Room-temperature sodium-ion batteries: Improving the rate capability of carbon anode materials by templating strategies". Energy Environ. Sci. 4 (2011) 3342-3345.
23. D. A. Stevens and J. R. Dahn. "High Capacity Anode Materials for Rechargeable Sodium-Ion Batteries". J. Electrochem. Soc. 147 (2000) 1271-1273.
24. Hongshuai Hou, Xiaoqing Qiu, Weifeng Wei, Yun Zheng, and Xiaobo Ji. "Carbon Anode Materials for Advanced Sodium-Ion Batteries". Adv. Energy Mater. (2017) 1602898.
25. E. Irisarri, A. Ponrouch, and M. R. Palacin. "Review-Hard carbon Negative Electrode Materials for Sodium-Ion Batteries". J. Electrochem. Soc. 162 (2015) A2476-A2482.
26. Mouad Dahbi, Manami Kiso, Kei Kubota, Tatsuo Horiba, Tarik Chafik, Kazuo Hida, Takashi Matsuyama, and Sinichi Komaba. "Synthesis of hard carbon from argan shells for Na-ion batteries". J. Mater. Chem. A 5 (2017) 9917-9928.
27. Jeremy Barker and Richard Heap. "Doped nickelate compounds". US 2015/0207138 A1 (2015).

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every structure, electrode, cell, device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An electrode for an electrochemical cell, comprising:
    a structure having a nano- or micro-architected three-dimensional geometry; said structure comprising one or more active carbon allotrope materials;
    wherein said structure is characterized by an average density less than or equal to 2.3 g cm$^{-3}$ and an average specific strength (strength-to-density ratio) greater than or equal to 0.004 GPa g$^{-1}$ cm$^3$; and
    wherein said three-dimensional electrode geometry is an isotropic or anisotropic lattice geometry, and wherein said lattice geometry is characterized by unit-cell dimensions selected over the range of 100 nm to 200 μm, beam diameters selected over the range of 20 nm to 50 μm, and densities of less than or equal to 2.3 g/cm$^{-3}$.

2. The electrode of claim 1, wherein said nano- or micro-architected geometry is a deterministic three-dimensional geometry characterized by said plurality of features independently having physical dimensions independently selected to a tolerance within 100 nm.

3. The electrode of claim 1, wherein said electrode is fabricated via one or more an additive manufacture processes and one or more a pyrolysis processes.

4. The electrode of claim 1, wherein said structure comprises at least 50% by volume of said one or more active carbon allotrope materials.

5. The electrode of claim 1, wherein said structure comprises a plurality of features characterized by a core that is at least 50% by volume of said one or more active carbon allotrope materials.

6. The electrode of claim 1, where a porosity of said structure is selected from the range of 10% to 95%.

7. The electrode of claim 1, wherein said structure is characterized by a plurality of features independently having at least one physical dimension less than or equal to 50 μm.

8. The electrode of claim 1, wherein said structure is characterized by an average specific strength (strength-to-density ratio) of selected from the range of 0.14 to 1.90 GPa g$^{-1}$ cm$^3$.

9. The electrode of claim 1, wherein said structure is characterized by an average density selected from the range of 0.24 to 1.0 g cm$^{-3}$.

10. The electrode of claim 1, wherein said structure is characterized by an average Young's modulus selected from the range of 0.16 to 18.6 GPa.

11. The electrode of claim 1, wherein said structure is characterized by a compressive strength selected from the range of 5 MPa to 20 GPa.

12. The electrode of claim 1, wherein said active carbon allotrope materials are selected from the groups consisting of glassy carbon, graphitic carbon, amorphous carbon, pyrolytic carbon, graphite, carbon black, and any combination thereof.

13. The electrode of claim 1, wherein said active electrode carbon allotrope material is a composite comprising glassy carbon, pyrolytic carbon, graphitic carbon, amorphous carbon, or a combination of these, and one or more additives selected from the group consisting of nickel, copper, cobalt, iron, silicon, germanium, tin, magnesium, aluminum, titanium, vanadium, chromium, zinc, molybdenum, antimony, phosphorous, nickel oxide, niobium oxide, tungsten oxide, niobium tungsten oxide, copper oxide, titanium oxide, lithium titanium oxide, MnO, MnO$_2$, Mn$_2$O$_3$, Mn$_3$O$_4$, Cr$_2$O$_3$, Fe$_3$O$_4$, Fe$_2$O$_3$, CoO, Co$_3$O$_4$, and Co$_2$O$_3$.

14. The electrode of claim 13, wherein composite comprises less than 10% by weight of said one or more additives.

15. The electrode of claim 1, wherein said three-dimensional geometry is characterized by a plurality of features, wherein at least a portion of said features independently have one or more average cross sectional physical dimensions selected over the range of 50 nm to 200 μm.

16. The electrode of claim 15, wherein said features comprise one or more of struts, beams, ties, trusses, sheets, and shells.

17. The electrode of claim 1, wherein said three-dimensional geometry is a node-free geometry.

18. The electrode of claim 17, wherein said structure is characterized by a strain-to-failure value of greater than or equal to 20%.

19. The electrode of claim 17, wherein said structure is characterized by a strength-to-failure value of greater than or equal to 1 GPa.

20. The electrode of claim 1, wherein said three-dimensional electrode geometry is a free-standing electrode geometry.

21. The electrode of claim 1, wherein said electrode is an interdigitated electrode in said electrochemical cell.

22. The electrode of claim 1, wherein said electrode is in said electrochemical cell, and wherein said electrochemical cell is a secondary cell.

23. The electrode of claim 1, wherein said electrode is in said electrochemical cell, and wherein said electrochemical cell is primary cell, a secondary cell, a fuel cell, a supercapacitor, a metal-air battery, a flow battery, a lithium-ion battery, a sodium ion battery, lithium metal battery, magnesium ion battery, an alkaline battery, a lead acid battery, a redox flow battery, an electrochemical capacitor, a lithium-silicon battery, or a silicon-air battery.

24. A method of making an electrode for an electrochemical cell, said method comprising:
   a. preparing a framework using an additive manufacturing process; said framework comprising a precursor material and characterized by a three-dimensional framework geometry comprising one or more nano-sized features, micro-sized features or both; and
   b. processing said framework structure via heat treatment under conditions to at least partially transform said framework into a structure having a nano- or micro-architected three-dimensional geometry; said structure comprising one or more active carbon allotrope materials; wherein said structure comprises at least 50% by volume of said one or more active carbon allotrope materials;

wherein said three-dimensional electrode geometry is an isotropic or anisotropic lattice geometry, and wherein said lattice geometry is characterized by unit-cell dimensions selected over the range of 100 nm to 200 µm, beam diameters selected over the range of 20 nm to 50 µm, and densities of less than or equal to 2.3 g/cm$^{-3}$.

25. A method of making an electrochemical cell, said method comprising:
   a. preparing a framework using an additive manufacturing process; said framework comprising a precursor material and characterized by a three-dimensional framework geometry comprising one or more nano-sized features, micro-sized features or both;
   b. processing said framework structure via heat treatment under conditions to at least partially transform said framework into a structure having a nano- or micro-architected three-dimensional geometry; wherein said structure comprises at least 50% by volume of said one or more active carbon allotrope materials; thereby generating an electrode; and
   c. providing said electrode in said electrochemical cell;

wherein said three-dimensional electrode geometry is an isotropic or anisotropic lattice geometry, and wherein said lattice geometry is characterized by unit-cell dimensions selected over the range of 100 nm to 200 µm, beam diameters selected over the range of 20 nm to 50 µm, and densities of less than or equal to 2.3 g/cm$^{-3}$.

* * * * *